US010479844B2

(12) United States Patent
Endo et al.

(10) Patent No.: US 10,479,844 B2
(45) Date of Patent: Nov. 19, 2019

(54) POLYMERIZABLE COMPOSITION AND OPTICALLY ANISOTROPIC BODY USING SAME

(71) Applicant: DIC CORPORATION, Tokyo (JP)

(72) Inventors: Kouichi Endo, Kita-adachi-gun (JP); Toru Ishii, Kita-adachi-gun (JP); Yasuhiro Kuwana, Kita-adachi-gun (JP); Kazuaki Hatsusaka, Kita-adachi-gun (JP); Mika Yamamoto, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/249,355

(22) Filed: Jan. 16, 2019

(65) Prior Publication Data

US 2019/0153125 A1 May 23, 2019

Related U.S. Application Data

(62) Division of application No. 15/543,782, filed as application No. PCT/JP2015/085343 on Dec. 17, 2015, now Pat. No. 10,202,470.

(30) Foreign Application Priority Data

Jan. 16, 2015 (JP) ................................ 2015-006298

(51) Int. Cl.

| | |
|---|---|
| ***C08F 2/44*** | (2006.01) |
| ***C08F 20/18*** | (2006.01) |
| ***G02B 5/30*** | (2006.01) |
| ***C08F 220/24*** | (2006.01) |
| ***C08F 220/28*** | (2006.01) |
| ***C08F 265/06*** | (2006.01) |
| ***G02B 1/04*** | (2006.01) |
| ***C09D 151/00*** | (2006.01) |
| ***G02F 1/13363*** | (2006.01) |

(52) U.S. Cl.

CPC ................ *C08F 2/44* (2013.01); *C08F 20/18* (2013.01); *C08F 220/24* (2013.01); *C08F 220/28* (2013.01); *C08F 265/06* (2013.01); *C09D 151/00* (2013.01); *G02B 1/04* (2013.01); *G02B 1/041* (2013.01); *G02B 5/30* (2013.01); *G02F 1/13363* (2013.01)

(58) Field of Classification Search

CPC .......... C08F 2/44; C08F 20/18; C08F 220/24; C08F 220/28; C08F 265/06; G02F 1/13363; G02B 1/04; G02B 1/041; G02B 5/30; C09D 161/00

USPC .......................................................... 526/328

See application file for complete search history.

(56) References Cited

U.S. PATENT DOCUMENTS

| | | | | |
|---|---|---|---|---|
| 7,658,864 B2 * | 2/2010 | Yoshikawa ........ | C09K 19/3444 | 252/299.01 |
| 9,586,917 B2 * | 3/2017 | Sakamoto ............ | C07D 417/12 | |
| 9,777,096 B2 * | 10/2017 | Sakamoto ............ | C07D 277/20 | |
| 9,995,865 B2 * | 6/2018 | Aimatsu .................. | G02B 1/04 | |
| 2009/0009693 A1 * | 1/2009 | Yoshikawa ........ | C09K 19/3444 | 349/75 |
| 2010/0072422 A1 | 3/2010 | Parri et al. | | |
| 2012/0224245 A1 | 9/2012 | Adlem et al. | | |
| 2014/0142266 A1 | 5/2014 | Sakamoto et al. | | |
| 2015/0175564 A1 * | 6/2015 | Sakamoto ............ | C07D 417/12 | 526/257 |
| 2015/0274872 A1 * | 10/2015 | Sakamoto ............ | C07D 277/20 | 526/257 |
| 2015/0277010 A1 * | 10/2015 | Aimatsu .................. | G02B 1/04 | 359/489.07 |

FOREIGN PATENT DOCUMENTS

| | | | |
|---|---|---|---|
| JP | 2008-033285 A | | 2/2008 |
| JP | 2008033285 A | * | 2/2008 |
| JP | 2008-107767 A | | 5/2008 |
| JP | 2009-62508 A | | 3/2009 |
| JP | 2010-522892 A | | 7/2010 |
| JP | 2013-509458 A | | 3/2013 |
| JP | 2013-071956 A | | 4/2013 |
| JP | -2013071956 A | * | 4/2013 |
| WO | 2012/147904 A1 | | 11/2012 |

OTHER PUBLICATIONS

International Search Report dated Mar. 22, 2016, issued in counterpart International Application No. PCT/JP2015/085343.
Notification of Reasons for Refusal dated Feb. 16, 2017, issued in counterpart Japanese Patent Application No. 2016-558156.
Notice of Allowance dated Dec. 11, 2018, issued in U.S. Appl. No. 15/543,782.

* cited by examiner

*Primary Examiner* — Michael Bernshteyn
(74) *Attorney, Agent, or Firm* — Westerman, Hattori, Daniels & Adrian, LLP

(57) ABSTRACT

The present invention provides a polymerizable composition containing a specific polymerizable compound and a fluorosurfactant having a specific polyoxyalkylene skeleton and having specific molecular weight. The invention also provides an optically anisotropic body, a retardation film, an antireflective film, and a liquid crystal display device that are produced using the polymerizable composition of the present invention. The present invention is useful because, when an optically anisotropic body is produced by photo-polymerization of the polymerizable composition, three features including the leveling properties of the surface of the optically anisotropic body, offset onto the substrate, and liquid crystal alignment can be improved simultaneously.

11 Claims, No Drawings

POLYMERIZABLE COMPOSITION AND OPTICALLY ANISOTROPIC BODY USING SAME

CROSS-REFERENCE TO RELATED APPLICATIONS

This application is a Continuation of U.S. patent application Ser. No. 15/543,782, filed on Jul. 14, 2017, which is a § 371 National Stage Application of PCT International Application No. PCT/JP2015/085343 filed on Dec. 17, 2015, which claims a Japanese priority of application No. 2015-006298 filed on Jan. 16, 2015.

TECHNICAL FIELD

The present invention relates to optically anisotropic polymers having various optical properties, to polymerizable compositions useful for components of films, to optically anisotropic bodies, retardation films, optical compensation films, antireflective films, lenses, and lens sheets that are composed of the polymerizable compositions, and to liquid crystal display devices, organic light-emitting display devices, lighting devices, optical components, polarizing films, coloring agents, security markings, laser light-emitting components, printed materials, etc. that use the polymerizable compositions.

BACKGROUND ART

Compounds having polymerizable groups (polymerizable compounds) are used for various optical materials. For example, by aligning a polymerizable composition containing a polymerizable compound into a liquid crystal state and then polymerizing the resulting polymerizable composition, a polymer with uniform alignment can be produced. Such a polymer can be used for polarizing plates, retardation plates, etc. necessary for displays. In many cases, polymerizable compositions containing two or more polymerizable compounds are used in order to meet the required optical properties, polymerization rate, solubility, melting point, glass transition temperature, transparency of polymers, mechanical strength, surface hardness, heat resistance, and light fastness. It is necessary for the polymerizable compounds used to provide good physical properties to the polymerizable compositions without adversely affecting other characteristics.

To improve the viewing angle of liquid crystal displays, it is necessary for retardation films to show birefringence with weak or reverse wavelength dispersion. Various polymerizable liquid crystal compounds with reverse or weak wavelength dispersion have been developed as the materials of these retardation films. When these polymerizable compounds are added to polymerizable compositions, crystals are precipitated, so that the storage stability of the polymerizable compositions is insufficient (PTL 1). Another problem with these polymerizable compounds is that when the polymerizable compositions are applied to substrates and polymerized, unevenness easily occurs (PTL 1 to PTL 3). When an uneven film is used for, for example, a display, a problem arises in that the quality of the display product deteriorates significantly because of unevenness in display brightness or unnatural color tone. There is therefore a need for the development of a polymerizable liquid crystal compound with reverse or weak wavelength dispersion that can solve the above problems. To solve the unevenness problem, specific surfactants are generally added to polymerizable liquid crystal compound compositions (PTL 2 to PTL 5). Another problem is that, when a polymerizable composition is applied to substrates and polymerized and the substrates are stacked and brought into contact with each other, the surfactant present on the coated surfaces is offset onto the substrates, causing poor appearance. An important technique to solve the coating unevenness problem and the offset problem simultaneously is to select an optimal surfactant.

CITATION LIST

Patent Literature

PTL 1: Japanese Unexamined Patent Application Publication No. 2008-107767

PTL 2: Japanese Unexamined Patent Application Publication (Translation of PCT Application) No. 2010-522892

PTL 3: Japanese Unexamined Patent Application Publication (Translation of PCT Application) No. 2013-509458

PTL 4: WO12/147904

PTL 5: Japanese Unexamined Patent Application Publication No. 2009-062508

SUMMARY OF INVENTION

Technical Problem

An object of the present invention is to provide a polymerizable composition that is excellent in solubility, causes no precipitation of crystals, and has high storage stability. When the polymerizable composition provided is polymerized to produce a film-shaped polymerized product, unevenness is unlikely to occur, and poor appearance due to offset of the surfactant is unlikely to occur. Other objects of the invention are to provide optically anisotropic bodies, retardation films, optical compensation films, antireflective films, lenses, and lens sheets that are composed of the polymerizable composition and to provide liquid crystal display devices, organic light-emitting display devices, lighting devices, optical components, coloring agents, security markings, laser light-emitting components, polarizing films, coloring materials, printed materials, etc. that use the polymerizable composition.

Solution to Problem

In the present invention, to achieve the above objects, extensive studies have been conducted with attention paid to polymerizable compositions that use a specific fluorosurfactant and a polymerizable compound having a specific structure with one or at least two polymerizable groups. As a result of the extensive studies, the present invention is provided.

Accordingly, the present invention provides a polymerizable composition comprising:

a) a polymerizable compound having one polymerizable group or two or more polymerizable groups and satisfying formula (I)

$$Re(450\ nm)/Re(550\ nm)<1.0 \quad (I)$$

(wherein Re(450 nm) is an in-plane retardation at a wavelength of 450 nm when the polymerizable compound having one polymerizable group is aligned on a substrate such that the direction of long axes of molecules of the polymerizable compound is substantially horizontal to the substrate, and Re(550 nm) is an in-plane retardation at a wavelength of 550 nm when the polymerizable compound having one polymerizable group is aligned on the substrate such that the direction of the long axes of the molecules of the polymerizable compound is substantially horizontal to the substrate); and b) at least one fluorosurfactant selected from the group consisting of copolymers (III) having a weight average molecular weight of 2,500 to 30,000 and each obtained by copolymerizing essential monomers including a polymerizable monomer containing a fluorine atom and a polymerizable monomer represented by general formula (B), having a solubility parameter (SP value) of 8.9 to 10.5 $(cal/cm^3)^{0.5}$, and satisfying the following formula (1A):

$$1.00<100\times(s+t+u)/MB<2.10 \quad (1A)$$

(wherein s is an integer of 1 or more; t and u are each an integer of 0 or 1 or more; and MB is the molecular weight of the polymerizable monomer represented by general formula (B)).

[Chem.1]

(B)

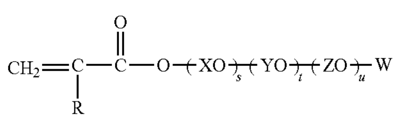

(wherein R is a hydrogen atom or a methyl group; X, Y, and Z are each independently an alkylene group; s is an integer of 1 or more; t and u are each an integer of 0 or 1 or more; and W is a hydrogen atom, an alkyl group having 1 to 6 carbon atoms, or an aryl group).

Moreover, the present invention provides an optically anisotropic body, a retardation film, an optical compensation film, an antireflective film, a lens, and a lens sheet that are composed of the polymerizable composition and also provides a liquid crystal display device, an organic light-emitting display device, a lighting device, an optical component, a coloring agent, a security marking, a laser light-emitting component, a printed material, etc. that use the polymerizable composition.

Advantageous Effects of Invention

The polymerizable composition of the present invention uses the fluorosurfactant (III) simultaneously with the polymerizable compound having a specific structure with one polymerizable group or two or more polymerizable groups and showing reverse wavelength dispersion. This allows the polymerizable composition obtained to have excellent solubility and excellent storage stability and also allows provision of polymers, optically anisotropic bodies, retardation films, etc. that are excellent in coating film surface leveling properties, cause less offset from liquid crystal coating film surfaces, and have good productivity.

DESCRIPTION OF EMBODIMENTS

Best modes of the polymerizable composition according to the present invention will next be described. In the present invention, the "liquid crystalline compound" is intended to mean a compound having a mesogenic skeleton, and it is not necessary for the compound alone to exhibit liquid crystallinity. The polymerizable composition can be polymerized (formed into a film) through polymerization treatment by irradiation with light such as UV rays or heating.

(Polymerizable Compound having One Polymerizable Group or Two or More Polymerizable Groups)

The liquid crystalline compound having one polymerizable group or two or more polymerizable groups in the present invention is characterized in that the birefringence of the compound is lager on a long-wavelength side than on a short-wavelength side within the visible range. Specifically, it is only necessary that formula (I):

$$Re(450\ nm)/Re(550\ nm)<1.0 \quad (I)$$

be satisfied (wherein Re(450 nm) is an in-plane retardation at a wavelength of 450 nm when the polymerizable compound having one polymerizable group is aligned on a substrate such that the direction of the long axes of molecules of the polymerizable compound is substantially horizontal to the substrate, and Re(550 nm) is an in-plane retardation at a wavelength of 550 nm when the polymerizable compound having one polymerizable group is aligned on the substrate such that the direction of the long axes of the molecules of the polymerizable compound is substantially horizontal to the substrate). It is not necessary that the birefringence be larger on the long-wavelength side than on the short-wavelength side within the ultraviolet and infrared ranges.

The above compound is preferably a liquid crystalline compound. In particular, it is preferable that the compound comprises at least one of liquid crystalline compounds represented by general formulas (1) to (7).

[Chem. 2]

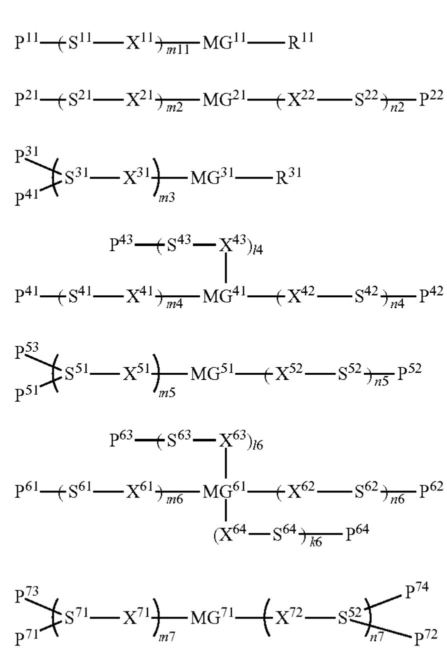

(1) (2) (3) (4) (5) (6) (7)

(In the above formulas, $P^{11}$ to $P^{74}$ each represent a polymerizable group; $S^{11}$ to $S^{72}$ each represent a spacer group or a single bond; when a plurality of $S^{11}$s to $S^{72}$s are present, they may be the same or different;

$X^{11}$ to $X^{72}$ each represent —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—

CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH═CH—, —N═N—, —CH═N—N═CH—, —CF═CF—, —C≡C—, or a single bond (provided that each P—(S—X)— bond contains no —O—O—); when a plurality of $X^{11}$s to $X^{72}$s are present, they may be the same or different;

$MG^{11}$ to $MG^{71}$ each independently represent formula (a):

[Chem. 3]

$$-\left(A^{11}-Z^{11}\right)_{j11}\underset{}{\overset{G}{\overset{|}{M}}}-\left(Z^{12}-A^{12}\right)_{j12} \quad (a)$$

(wherein $A^{11}$ and $A^{12}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, each of which may be unsubstituted or substituted by at least one $L^1$; when a plurality of $A^{11}$s and/or $A^{12}$s are present, they may be the same or different;

$Z^{11}$ and $Z^{12}$ each independently represent —O—, —S—, —$OCH_2$—, —$CH_2O$—, —$CH_2CH_2$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH═CH—, —N═N—, —CH═N—, —N═CH—, —CH═N—N═CH—, —CF═CF—, —≡C—, or a single bond; when a plurality of $Z^{11}$s and/or $Z^{12}$s are present, they may be the same or different;

M represents a group selected from formula (M-1) to formula (M-11) below:

[Chem. 4]

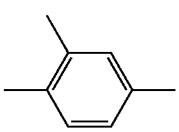
(M-1)

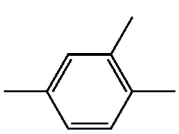
(M-2)

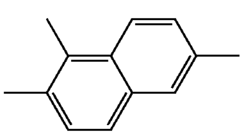
(M-3)

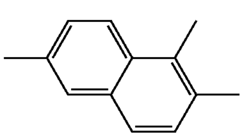
(M-4)

-continued

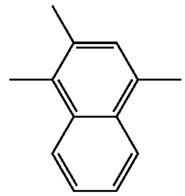
(M-5)

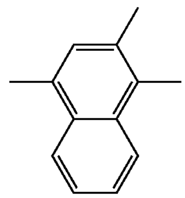
(M-6)

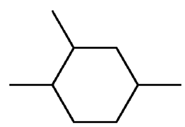
(M-7)

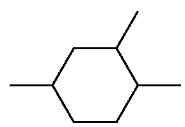
(M-8)

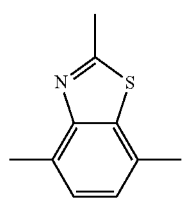

(M-9)

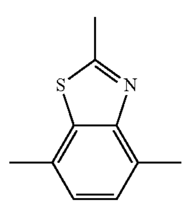

(M-10)

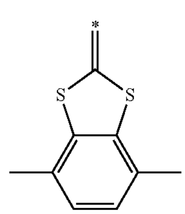

(M-11)

the groups represented by formula (M-1) to formula (M-11) may be unsubstituted or substituted by at least one $L^1$;

G is one of formula (G-1) to formula (G-6) below:

[Chem. 5]

(G-1)

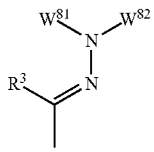

(G-2)

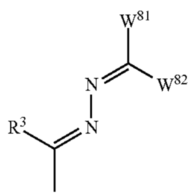

(G-3)

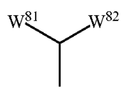

(G-4)

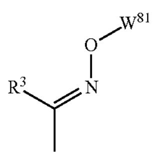

(G-5)

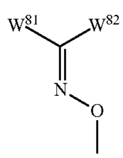

(G-6)

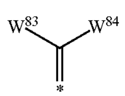

(wherein $R^3$ represents a hydrogen atom or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by —O—, —S—, —CO—, —COO—, —OCO—, —CO—S—, —S—CO—, —O—CO—O—, —CO—NH—, —NH—CO—, —NH—CO—, or —C≡C—;

$W^{81}$ represents a group that has at least one aromatic group and has 5 to 30 carbon atoms and that may be unsubstituted or substituted by at least one $L^1$;

$W^{82}$ represents a hydrogen atom or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—; the meaning of $W^u$ may be the same as the meaning of $W^{81}$; $W^{81}$ and $W^{82}$ may be bonded together to form a single ring structure; alternatively, Wrepresents $W^{82}$ the following group:

$$P^{W82}\text{—}(S^{W82}\text{—}X^{W82})_{n^{W82}}$$ [Chem. 6]

(wherein the meaning of $P^{W82}$ is the same as the meaning of $P^{11}$; the meaning of $S^{W82}$ is the same as the meaning of $S^{11}$; the meaning of $X^{W82}$ is the same as the meaning of $X^{11}$; and the meaning of $n^{W82}$ is the same as the meaning of m11); $W^{83}$ and $W^{84}$ are each independently a halogen atom, a cyano group, a hydroxy group, a nitro group, a carboxyl group, a carbamoyloxy group, an amino group, a sulfamoyl group, a group having at least one aromatic group and having 5 to 30 carbon atoms, an alkyl group having 1 to 20 carbon atoms, a cycloalkyl group having 3 to 20 carbon atoms, an alkenyl group having 2 to 20 carbon atoms, a cycloalkenyl group having 3 to 20 carbon atoms, an alkoxy group having 1 to 20 carbon atoms, an acyloxy group having 2 to 20 carbon atoms, or an alkylcarbonyloxy group having 2 to 20 carbon atoms, one —$CH_2$— group or two or more nonadjacent —$CH_2$— groups in each of the alkyl group, the cycloalkyl group, the alkenyl group, the cycloalkenyl group, the alkoxy group, the acyloxy group, and the alkylcarbonyloxy group being each independently optionally replaced by —O—, —S—, —CO—, —COO—, —OCO—, —CO—S—, —S—CO—, —O—CO—O—, —CO—NH—, —NH—CO—, —NH—CO—, or —C≡C—; when M is selected from formula (M-1) to formula (M-10), G is selected from formula (G-1) to formula (G-5); when M represents formula (M-11), G represents formula (G-6);

$L^1$ represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by a group selected from —O—, —S—, —CO—, —COO—, —OCO—, —CO—S—, —S—CO—, —O—CO—O—, —CO—NH—, —NH—CO—, —CH≡CH—COO—, —CH═CH—OCO—, —COO—CH═CH—, —OCO—CH═CH—, —CH═CH—, —CF═CF—, and —C≡C—; when a plurality of $L^1$s are present in the compound, they may be the same or different;

j11 represents an integer from 1 to 5; and j12 represents an integer of 1 to 5 while j11+j12 is an integer from 2 to 5); $R^{11}$ and $R^{31}$ each represent a hydrogen atom, a fluorine atom, a chlorine atom, a bromine atom, an iodine atom, a pentafluorosulfuranyl group, a cyano group, a nitro group, an isocyano group, a thioisocyano group, or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by —O—, —S—, —CO—, —COO—, —OCO—, —CO—S—, —S—CO—, —O—CO—O—, —CO—NH—, —NH—CO—, or —C≡C—; m11 represents an integer of 0 to 8; and m2 to m7, n2 to n7, 14 to 16, and k6 each independently represent an integer from 0 to 5.)

In general formula (1) to general formula (7), it is preferable that the polymerizable groups $P^{11}$ to $P^{74}$ each represent a group selected from formula (P-1) to formula (P-20) below:

[Chem. 7]

(P-1)

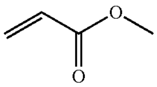

(P-2)

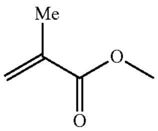

(P-3)

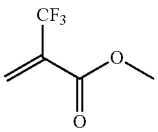

(P-4)

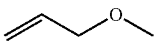

(P-5)

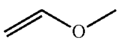

(P-6)

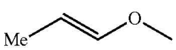

(P-7)

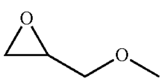

(P-8)

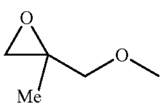

(P-9)

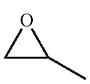

(P-10)

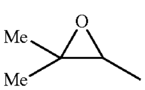

(P-11)

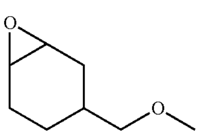

(P-12)

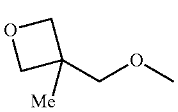

(P-13)

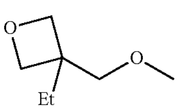

(P-14)

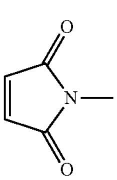

(P-15)

-continued (P-16)

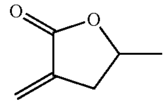

(P-17)

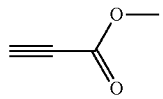

(P-18)

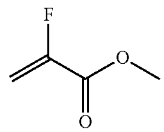

(P-19)

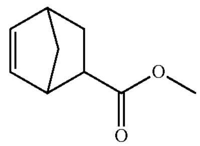

(P-20)

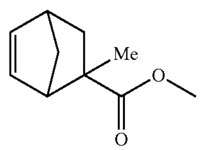

These polymerizable groups are polymerized by radical polymerization, radical addition polymerization, cationic polymerization, or anionic polymerization. In particular, when the polymerization method is UV polymerization, formula (P-1), formula (P-2), formula (P-3), formula (P-4), formula (P-5), formula (P-7), formula (P-11), formula (P-13), formula (P-15), or formula (P-18) is preferable, and formula (P-1), formula (P-2), formula (P-7), formula (P-11), or formula (P-13) is more preferable. Formula (P-1), formula (P-2), or formula (P-3) is still more preferable, and formula (P-1) or formula (P-2) is particularly preferable.

In general formula (1) to general formula (7), $S^{11}$ to $S^{72}$ each represent a spacer group or a single bond. When a plurality of $S^{11}$s to $S^{72}$s are present, they may be the same or different. Preferably, the spacer group represents an alkylene group which has 1 to 20 carbon atoms and in which one —$CH_2$— group or two or more nonadjacent —$CH_2$— groups may be each independently replaced by —O—, —COO—, —OCO—, —OCO—O—, —CO—NH—, —NH—CO—, —CH═CH—, —C≡C—, or formula (S-1) below:

[Chem. 8]

(S-1)

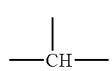

When a plurality of S's are present, they may be the same or different and more preferably each independently represent a single bond or an alkylene group which has 1 to 10 carbon atoms and in which one —$CH_2$— group or two or more nonadjacent —$CH_2$— groups may be each independently replaced by —O—, —COO—, or —OCO—, in terms of availability of raw materials and ease of synthesis. Still more preferably, $S^{11}$ to $S^{72}$ each independently represent a single bond or an alkylene group having 1 to 10 carbon atoms. When a plurality of S's are present, they may be the same or different and particularly preferably each independently represent an alkylene group having 1 to 8 carbon atoms.

In general formula (1) to general formula (7), $X^{11}$ to $X^{72}$ each represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond (provided that each P—(S—X)— bond contains no —O—O—). When a plurality of $X^{11}$s to $X^{72}$s are present, they may be the same or different. When a plurality of $X^{11}$s to $X^{72}$s are present, they may be the same or different, preferably each independently represent —O—, —S—, —OCH$_2$—, —CH$_2$O—, —COO—, —OCO—, —CO—S—, —S—CO—, —O—CO—O—, —CO—NH—, —NH—CO—, —COO—CH$_2$CH$_2$—, —OCO—CH$_2$CH$_2$—, —CH$_2$CH$_2$—COO—, —CH$_2$CH$_2$—OCO—, or a single bond, and more preferably each independently represent —O—, —OCH$_2$—, —CH$_2$O—, —COO—, —OCO—, —COO—CH$_2$CH$_2$—, —OCO—CH$_2$CH$_2$—, —CH$_2$CH$_2$—COO—, —CH$_2$CH$_2$—OCO—, or a single bond, in terms of availability of raw materials and ease of synthesis. When a plurality of $X^{11}$s to $X^{72}$s are present, they may be the same or different and particularly preferably each independently represent —O—, —COO—, —OCO—, or a single bond.

In general formula (1) to general formula (7), $A^{11}$ and $A^{12}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, each of which may be unsubstituted or substituted by at least one $L^1$. When a plurality of $A^{11}$s and/or $A^{12}$s are present, they may be the same or different. In terms of availability of raw materials and ease of synthesis, $A^{11}$ and $A^{12}$ preferably each independently represent a 1,4-phenylene group, a 1,4-cyclohexylene group, or naphthalene-2,6-diyl, each of which may be unsubstituted or substituted by at least one $L^1$, more preferably each independently represent a group selected from formula (A-1) to formula (A-11) below:

[Chem. 9]

(A-1)

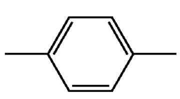

(A-2)

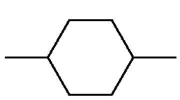

(A-3)

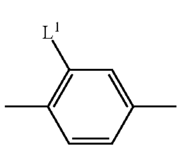

-continued (A-4)

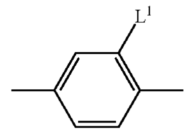

(A-5)

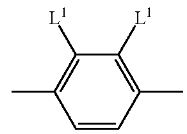

(A-6)

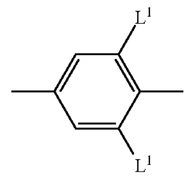

(A-7)

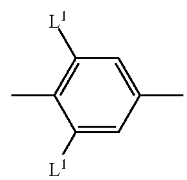

(A-8)

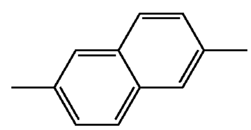

(A-9)

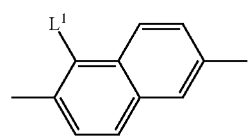

(A-10)

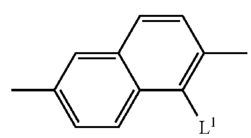

(A-11)

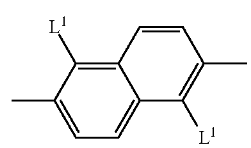

still more preferably each independently represent a group selected from formula (A-1) to formula (A-8), and particularly preferably each independently represent a group selected from formula (A-1) to formula (A-4).

In general formula (1) to general formula (7), $Z^{11}$ and $Z^{12}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—, —N═CH—, —CH═N—N═CH—, —CF═CF—, —C≡C—, or a single bond. When a plurality of $Z^{11}$s and/or $Z^{12}$s are present, they may be the same or different. In terms of the liquid crystallinity of the compound, availability of raw materials, and ease of synthesis, $Z^{11}$ and $Z^{12}$ preferably each independently represent a single bond, —OCH$_2$—, —CH$_2$O—, —COO—, —OCO—, —CF$_2$O—, —OCF$_2$—, —CH$_2$CH$_2$—, —CF$_2$CF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —CH═CH—, —CF═CF—, —C≡C—, or a single bond, more preferably each independently represent —OCH$_2$—, —CH$_2$O—, —CH$_2$CH$_2$—, —COO—, —OCO—, —COO—CH$_2$CH$_2$—, —OCO—CH$_2$CH$_2$—, —CH$_2$CH$_2$—COO—, —CH$_2$CH$_2$—OCO—, —CH═CH—, —C≡C—, or a single bond, still more preferably each independently represent —CH$_2$CH$_2$—, —COO—, —OCO—, —COO—CH$_2$CH$_2$—, —OCO—CH$_2$CH$_2$—, —CH$_2$CH$_2$—COO—, —CH$_2$CH$_2$—OCO—, or a single bond, and particularly preferably each independently represent —CH$_2$CH$_2$—, —COO—, —OCO—, or a single bond.

In general formula (1) to general formula (7), M represents a group selected from formula (M-1) to formula (M-11) below:

[Chem. 10]

(M-1)

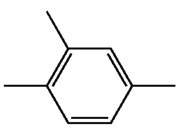

(M-2)

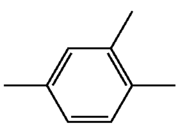

(M-3)

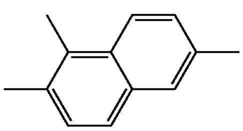

(M-4)

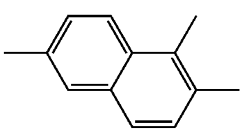

(M-5)

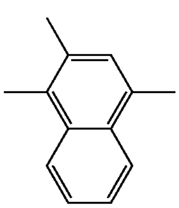

(M-6)

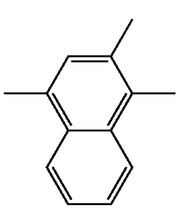

-continued (M-7)

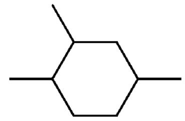

(M-8)

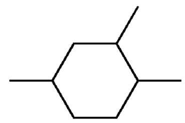

(M-9)

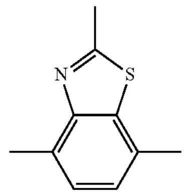

(M-10)

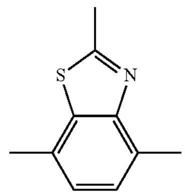

(M-11)

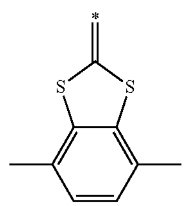

These groups may be unsubstituted or substituted by at least one $L^1$. In terms of availability of raw materials and ease of synthesis, M preferably represents a group selected from formula (M-1) and formula (M-2) that may be each independently unsubstituted or substituted by at least one $L^1$ and formula (M-3) to formula (M-6) that are unsubstituted, more preferably represents a group selected from formula (M-1) and formula (M-2) that may be unsubstituted or substituted by at least one $L^1$, and particularly preferably represents a group selected from formula (M-1) and formula (M-2) that are unsubstituted.

In general formula (1) to general formula (7), $R^{11}$ and $R^{31}$ each represent a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group which has 1 to 20 carbon atoms and in which one —CH$_2$— group or two or more nonadjacent —CH$_2$— groups may be each independently replaced by —O—, —S—, —CO—, —COO—, —OCO—, —CO—S—, —S—CO—, —O—CO—O—, —CO—NH—, —NH—CO—, or —C≡C—, and any hydrogen atom in the alkyl group may be replaced by a fluorine atom. In terms of liquid crystallinity and ease of synthesis, $R^1$ preferably represents a hydrogen atom, a fluorine atom, a chlorine atom, a cyano group, or a linear or branched alkyl group which has 1 to 12 carbon atoms and in which one —CH$_2$— group or two or more nonadjacent —CH$_2$— groups may be each independently replaced by —O—, —COO—, —OCO—, or —O—CO—O—. $R^1$ more preferably represents a hydrogen atom, a fluorine atom, a chlorine atom, a cyano group, a linear alkyl group having 1 to 12 carbon atoms, or a linear alkoxy group having 1 to 12 carbon atoms and particularly preferably represents a linear alkyl group having 1 to 12 carbon atoms or a linear alkoxy group having 1 to 12 carbon atoms.

In general formula (1) to general formula (7), G represents a group selected from formula (G-1) to formula (G-6):

[Chem. 11]

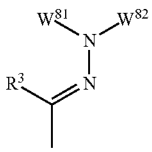

(G-1)

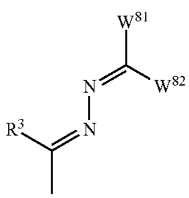

(G-2)

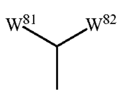

(G-3)

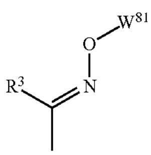

(G-4)

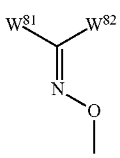

(G-5)

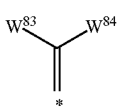

(G-6)

In these formulas, $R^3$ represents a hydrogen atom or an alkyl group having 1 to 20 carbon atoms. The alkyl group may be linear or branched, and any hydrogen atom in the alkyl group may be replaced by a fluorine atom. One —$CH_2$— group or two or more nonadjacent —$CH_2$— groups in the alkyl group may be each independently replaced by —O—, —S—, —CO—, —COO—, —OCO—, —CO—S—, —S—CO—, —O—CO—O—, —CO—NH—, —NH—CO—, or —C≡C—. $W^{81}$ represents a group that has at least one aromatic group and has 5 to 30 carbon atoms and that may be unsubstituted or substituted by at least one $L^1$. $W^{82}$ represents a hydrogen atom or an alkyl group having 1 to 20 carbon atoms, and the alkyl group may be linear or branched. Any hydrogen atom in the alkyl group may be replaced by a fluorine atom, and one —$CH_2$— group or two or more nonadjacent —$CH_2$— group in the alkyl group may be each independently replaced by —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—. The meaning of $W^{82}$ may be the same as the meaning of $W^{81}$, and $W^{81}$ and $W^{82}$ may together form a ring structure. Alternatively, $W^{82}$ represents the following group:

$$P^{W82}\text{—}(S^{W82}\text{—}X^{W82})_{n^{W82}}\text{—}$$ [Chem. 2]

(wherein the meaning of $P^{W82}$ is the same as the meaning of $P^{11}$; the meaning of $S^{W82}$ is the same as the meaning of $S^{11}$; the meaning of $X^{W82}$ is the same as the meaning of $X^{11}$; and the meaning of $n^{W82}$ is the same as the meaning of m11).

The aromatic group included in $W^{81}$ may be an aromatic hydrocarbon group or a heteroaromatic group, and $W^{81}$ may include both of them. These aromatic groups may be bonded through a single bond or a linking group (—OCO—, —COO—, —CO—, or —O—) or may form a condensed ring. $W^{81}$ may include, in addition to the aromatic group, an acyclic structure and/or a cyclic structure other than the aromatic group. In terms of availability of raw materials and ease of synthesis, the aromatic group included in $W^{81}$ is one of formula (W-1) to formula (W-19) below that may be unsubstituted or substituted by at least one $L^1$:

[Chem. 13]

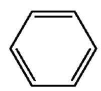

(W-1)

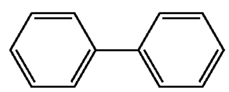

(W-2)

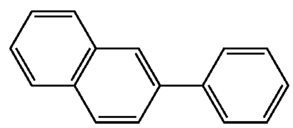

(W-3)

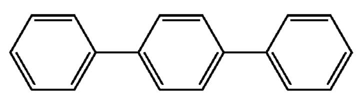

(W-4)

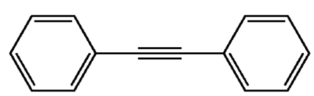

(W-5)

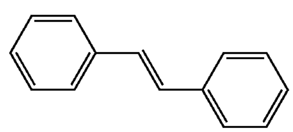

(W-6)

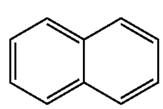

(W-7)

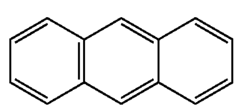

(W-8)

-continued (W-9)

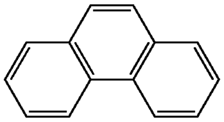

(W-10)

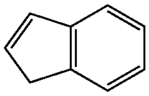

(W-11)

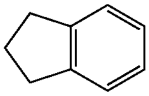

(W-12)

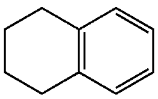

(W-13)

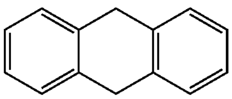

(W-14)

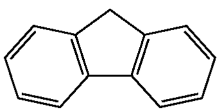

(W-15)

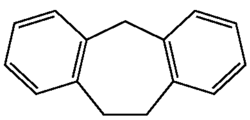

(W-16)

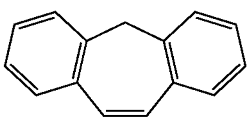

(W-17)

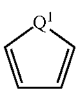

(W-18)

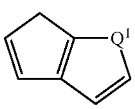

(W-19)

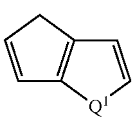

(In the above formulas, these groups may have a bond at any position, and any two or more aromatic groups selected from these groups may form a group connected through a single bond. $Q^1$ represents —O—, —S—, or —$NR^4$— (wherein $R^4$ represents a hydrogen atom or an alkyl group having 1 to 8 carbon atoms), or —CO—. In these aromatic groups, —CH═ groups may be each independently replaced by —N═, and —$CH_2$— groups may be each independently replaced by —O—, —S—, —$NR^4$— (wherein $R^4$ represents a hydrogen atom or an alkyl group having 1 to 8 carbon atoms) or —CO—. However, these groups include no —O—O— bond. The group represented by formula (W-1) is preferably a group selected from formula (W-1-1) to formula (W-1-8) below that may be unsubstituted or substituted by at least one $L^1$:

[Chem. 14]

(W-1-1)

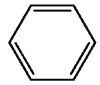

(W-1-2)

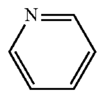

(W-1-3)

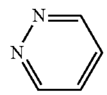

(W-1-4)

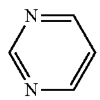

(W-1-5)

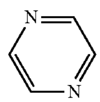

(W-1-6)

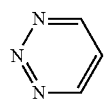

(W-1-7)

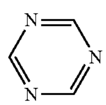

(W-1-8)

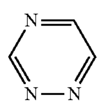

(wherein these groups may have a bond at any position). The group represented by formula (W-7) is preferably a group selected from formula (W-7-1) to formula (W-7-7) below that may be unsubstituted or substituted by at least one $L^1$:

[Chem. 15]

(W-7-1)

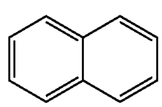

(W-7-2)

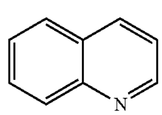

(W-7-3)

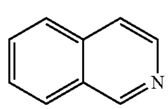

-continued (W-7-4)

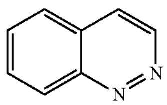

(W-7-5)

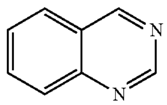

(W-7-6)

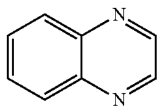

(W-7-7)

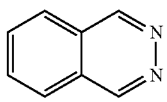

(wherein these groups may have a bond at any position). The group represented by formula (W-10) is preferably a group selected from formula (W-10-1) to formula (W-10-8) below that may be unsubstituted or substituted by at least one $L^1$:

[Chem. 16]

(W-10-1)

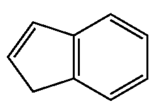

(W-10-2)

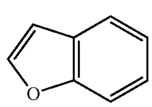

(W-10-3)

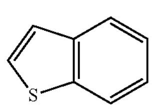

(W-10-4)

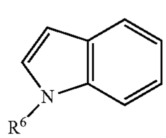

(W-10-5)

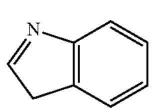

(W-10-6)

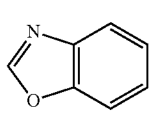

(W-10-7)

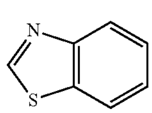

-continued (W-10-8)

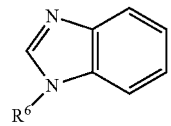

(wherein these groups may have a bond at any position, and $R^6$ represents a hydrogen atom or an alkyl group having 1 to 8 carbon atoms). The group represented by formula (W-11) is preferably a group selected from formula (W-11-1) to formula (W-11-13) below that may be unsubstituted or substituted by at least one $L^1$:

[Chem. 17]

(W-11-1)

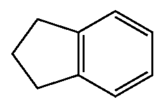

(W-11-2

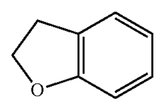

(W-11-3

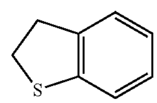

(W-11-4)

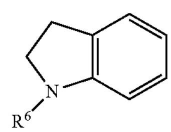

(W-11-5)

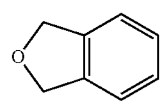

(W-11-6)

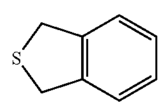

(W-11-7)

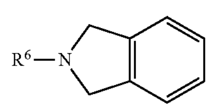

(W-11-8)

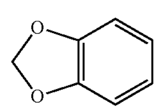

(W-11-9)

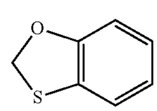

(W-11-10)

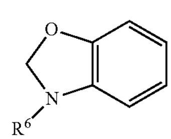

-continued (W-11-11)

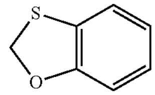

(W-11-12)

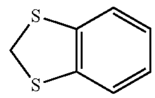

(W-11-13)

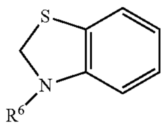

(wherein these groups may have a bond at any position, and $R^6$ represents a hydrogen atom or an alkyl group having 1 to 8 carbon atoms). The group represented by formula (W-12) is preferably a group selected from formula (W-12-1) to formula (W-12-19) below that may be unsubstituted or substituted by at least one $L^1$:

[Chem. 18]

(W-12-1)

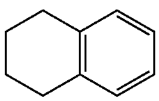

(W-12-2)

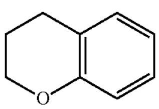

(W-12-3)

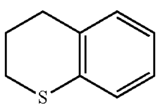

(W-12-4)

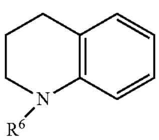

(W-12-5)

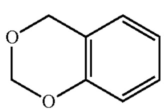

(W-12-6)

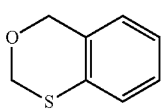

(W-12-7)

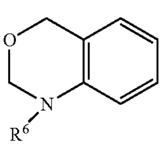

(W-12-8)

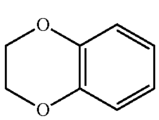

-continued (W-12-9)

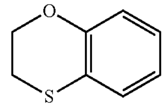

(W-12-10)

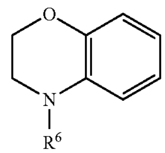

(W-12-11)

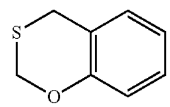

(W-12-12)

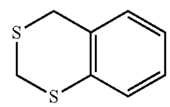

(W-12-13)

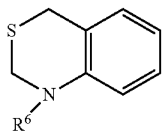

(W-12-14)

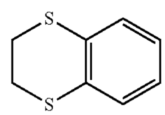

(W-12-15)

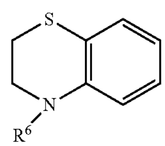

(W-12-16)

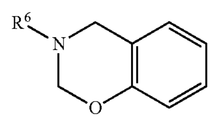

(W-12-17)

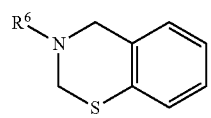

(W-12-18)

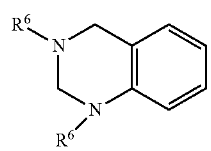

(W-12-19)

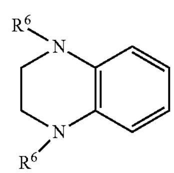

(wherein these groups may have a bond at any position; $R^6$ represents a hydrogen atom or an alkyl group having 1 to 8 carbon atoms; and, when a plurality of $R^6$s are present, they may be the same or different). The group represented by formula (W-13) is preferably a group selected from formula (W-13-1) to formula (W-13-10) below that may be unsubstituted or substituted by at least one $L^1$:

[Chem. 19]

(W-13-1)

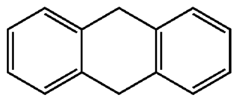

(W-13-2)

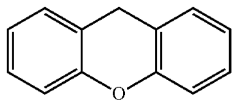

(W-13-3)

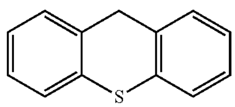

(W-13-4)

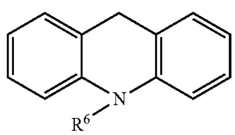

(W-13-5)

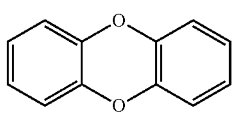

(W-13-6)

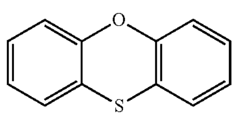

(W-13-7)

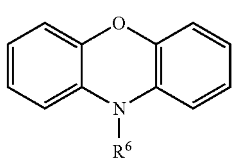

(W-13-8)

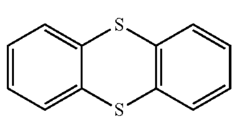

(W-13-9)

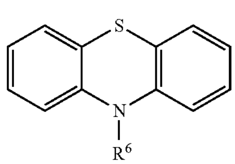

(W-13-10)

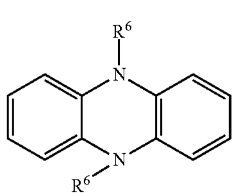

(wherein these groups may have a bond at any position; $R^6$ represents a hydrogen atom or an alkyl group having 1 to 8 carbon atoms; and, when a plurality of $R^6$s are present, they may be the same or different). The group represented by formula (W-14) is preferably a group selected from formula (W-14-1) to formula (W-14-4) below that may be unsubstituted or substituted by at least one $L^1$:

[Chem. 20]

(W-14-1)

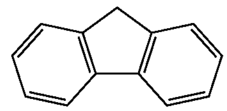

(W-14-2)

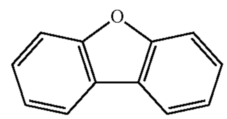

(W-14-3)

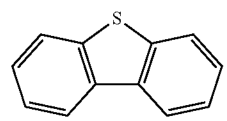

(W-14-4)

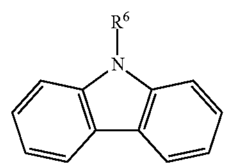

(wherein these groups may have a bond at any position, and $R^6$ represents a hydrogen atom or an alkyl group having 1 to 8 carbon atoms). The group represented by formula (W-15) is preferably a group selected from formula (W-15-1) to formula (W-15-18) below that may be unsubstituted or substituted by at least one $L^1$:

[Chem. 21]

(W-15-1)

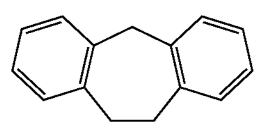

(W-15-2)

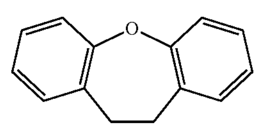

(W-15-3)

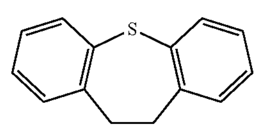

(W-15-4)

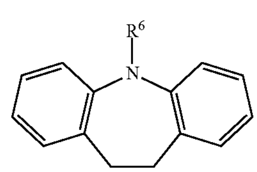

(W-15-5)

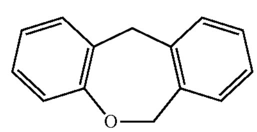

-continued (W-15-6)

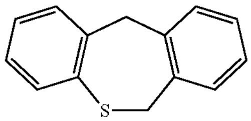

(W-15-7)

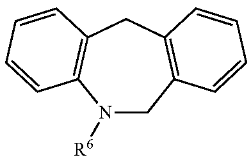

(W-15-8)

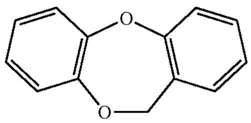

(W-15-11)

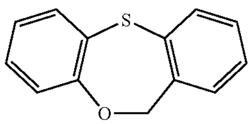

(W-15-12)

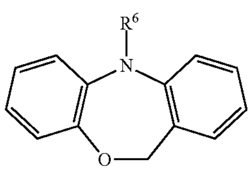

(W-15-13)

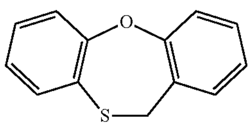

(W-15-14)

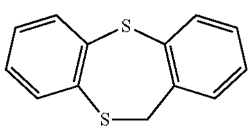

(W-15-15)

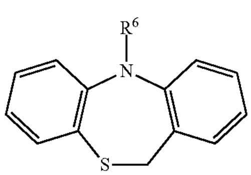

(W-15-16)

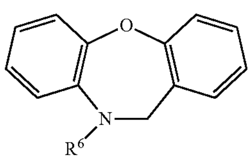

(W-15-17)

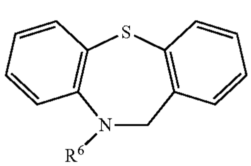

-continued (W-15-18)

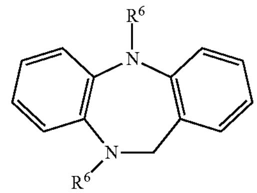

(wherein these groups may have a bond at any position, and $R^6$ represents a hydrogen atom or an alkyl group having 1 to 8 carbon atoms). The group represented by formula (W-16) is preferably a group selected from formula (W-16-1) to formula (W-16-4) below that may be unsubstituted or substituted by at least one $L^1$:

[Chem. 22]

(W-16-1)

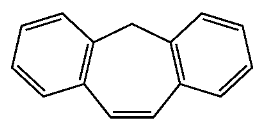

(W-16-2)

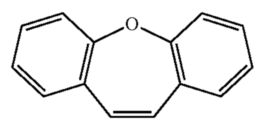

(W-16-3)

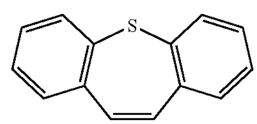

(W-16-4)

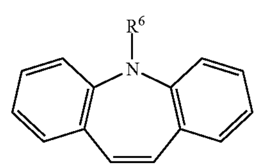

(wherein these groups may have a bond at any position, and $R^6$ represents a hydrogen atom or an alkyl group having 1 to 8 carbon atoms). The group represented by formula (W-17) is preferably a group selected from formula (W-17-1) to formula (W-17-6) below that may be unsubstituted or substituted by at least one $L^1$:

[Chem. 23]

(W-17-1)

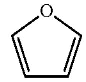

(W-17-2)

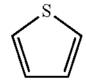

(W-17-3)

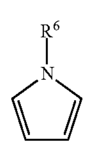

-continued (W-17-4)

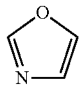

(W-17-5)

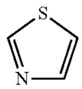

(W-17-6)

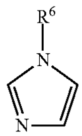

(wherein these groups may have a bond at any position, and $R^6$ represents a hydrogen atom or an alkyl group having 1 to 8 carbon atoms). The group represented by formula (W-18) is preferably a group selected from formula (W-18-1) to formula (W-18-6) below that may be unsubstituted or substituted by at least one $L^1$:

[Chem. 24]

(W-18-1)

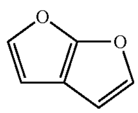

(W-18-2)

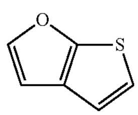

(W-18-3)

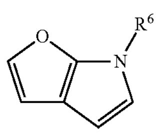

(W-18-4)

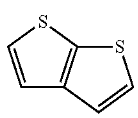

(W-18-5)

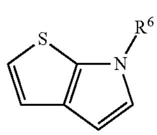

(W-18-6)

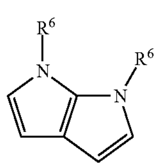

(wherein these groups may have a bond at any position; $R^6$ represents a hydrogen atom or an alkyl group having 1 to 8 carbon atoms; and, when a plurality of $R^6$s are present, they may be the same or different). The group represented by formula (W-19) is preferably a group selected from formula (W-19-1) to formula (W-19-9) below that may be unsubstituted or substituted by at least one $L^1$:

[Chem. 25]

(W-19-1)

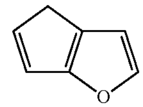

(W-19-2)

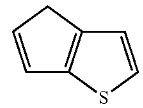

(W-19-3)

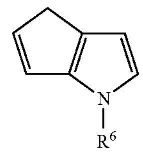

(W-19-4)

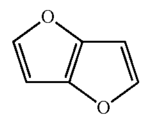

(W-19-5)

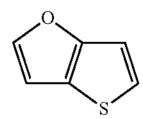

(W-19-6)

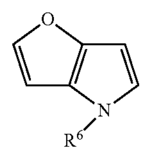

(W-19-7)

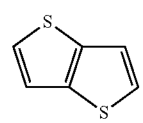

(W-19-8)

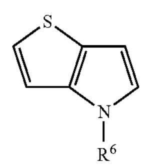

(W-19-9)

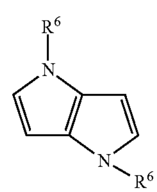

(wherein these groups may have a bond at any position; $R^6$ represents a hydrogen atom or an alkyl group having 1 to 8 carbon atoms; and, when a plurality of $R^6$s are present, they may be the same or different).

The aromatic group included in $W^{81}$ is more preferably a group selected from formula (W-1-1), formula (W-7-1), formula (W-7-2), formula (W-7-7), formula (W-8), formula (W-10-6), formula (W-10-7), formula (W-10-8), formula (W-11-8), formula (W-11-9), formula (W-11-10), formula (W-11-11), formula (W-11-12), and formula (W-11-13) that may be unsubstituted or substituted by at least one $L^1$ and is particularly preferably a group selected from formula (W-1-

1), formula (W-7-1), formula (W-7-2), formula (W-7-7), formula (W-10-6), formula (W-10-7), and formula (W-10-8) that may be unsubstituted or substituted by at least one $L^1$. Particularly preferably, $W^{81}$ is a group selected from formula (W-a-1) to formula (W-a-6) below:

[Chem. 26]

(W-a-1)

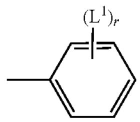

(W-a-2)

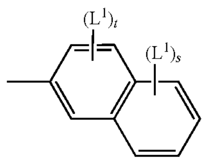

(W-a-3)

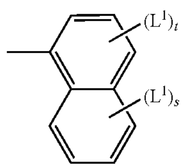

(W-a-4)

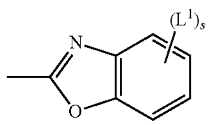

(W-a-5)

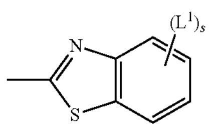

(W-a-6)

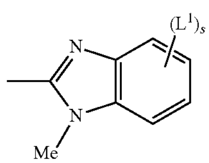

(wherein r represents an integer from 0 to 5; s represents an integer from 0 to 4; and t represents an integer from 0 to 3).

$W^{82}$ represents a hydrogen atom or a linear or branched alkyl group which has 1 to 20 carbon atoms and in which one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be replaced by a fluorine atom. The meaning of $W^{82}$ may be the same as the meaning of $W^{81}$, and $W^{81}$ and $W^{82}$ may together form a ring structure. Alternatively, $W^{82}$ represents the following group:

$$P^{W82}\text{—}(S^{W82}\text{—}X^{W82}\text{—})_{n^{W82}}$$ [Chem. 27]

(wherein the meaning of $P^{W82}$ is the same as the meaning of $P^{11}$; the meaning of $S^{W82}$ is the same as the meaning of $S^{11}$; the meaning of $X^{W82}$ is the same as the meaning of $X^{11}$; and the meaning of $n^{W82}$ is the same as the meaning of m11).

In terms of availability of raw materials and ease of synthesis, $W^{82}$ preferably represents a hydrogen atom or a linear or branched alkyl group which has 1 to 20 carbon atoms, in which any hydrogen atom in the alkyl group may be replaced by a fluorine atom, and in which one —$CH_2$— group or two or more nonadjacent —$CH_2$— groups in the alkyl group may be each independently replaced by —O—, —CO—, —COO—, —OCO—, —CH═CH—COO—, —OCO—CH═CH—, —CH═CH—, —CF═CF—, or —C≡C—, more preferably represents a hydrogen atom or a linear or branched alkyl group having 1 to 20 carbon atoms, and particularly preferably represents a hydrogen atom or a linear alkyl group having 1 to 12 carbon atoms. When the meaning of $W^{82}$ is the same as the meaning of $W^{81}$, $W^{82}$ and $W^{82}$ may be the same or different, and preferred groups for $W^{82}$ are the same as those described for $W^{81}$. When $W^{81}$ and $W^{82}$ together form a ring structure, a ring group represented by —$NW^{81}W^{82}$ is preferably a group selected from formula (W-b-1) to formula (W-b-42) below that may be unsubstituted or substituted by at least one $L^1$:

[Chem. 28]

(W-b-1)

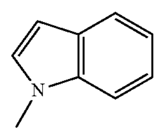

(W-b-2)

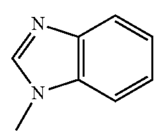

(W-b-3)

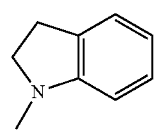

(W-b-4)

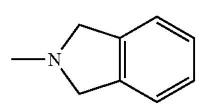

(W-b-5)

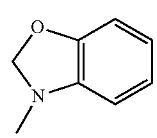

(W-b-6)

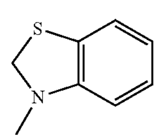

(W-b-7)

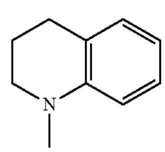

-continued
(W-b-8)
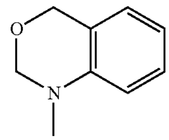
(W-b-9)
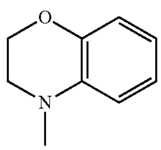
(W-b-9)
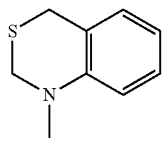
(W-b-10)
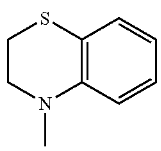
(W-b-11)
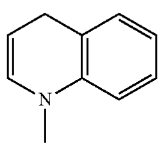
(W-b-11)
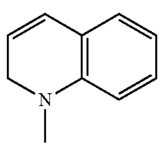
(W-b-12)
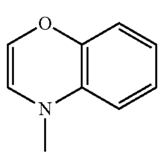
(W-b-13)
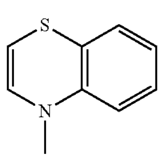
(W-b-14)
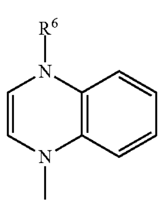
(W-b-15)
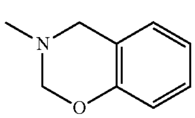
-continued
(W-b-16)
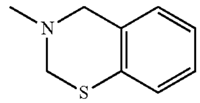
(W-b-17)
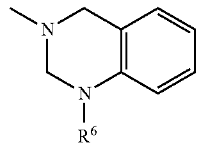
(W-b-18)
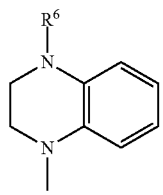
(W-b-19)
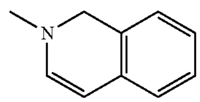
[Chem. 29]
(W-b-20)
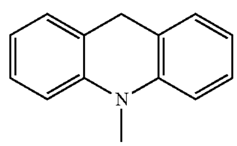
(W-b-21)
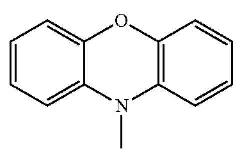
(W-b-22)
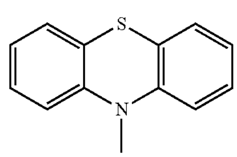
(W-b-23)
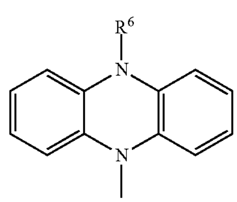
(W-b-24)
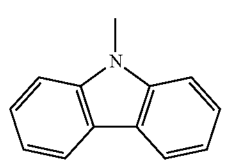
(W-b-25)
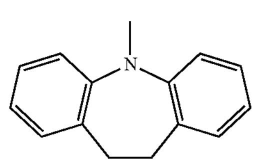

-continued (W-b-26)

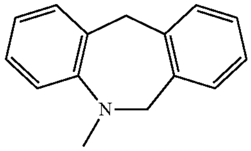

(W-b-27)

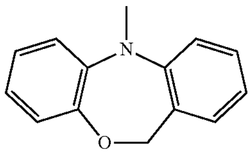

(W-b-28)

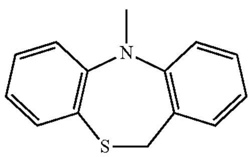

(W-b-29)

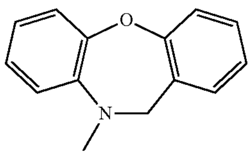

(W-b-30)

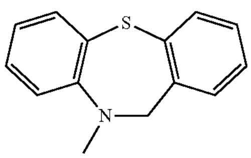

(W-b-31)

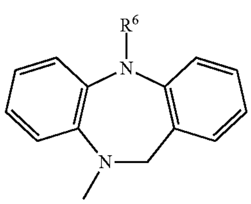

(W-b-32)

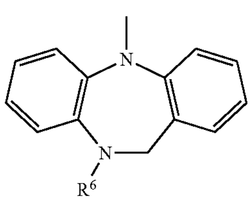

(W-b-33)

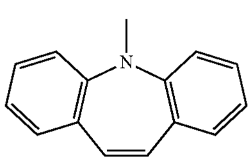

(W-b-34)

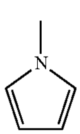

-continued (W-b-35)

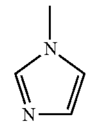

(W-b-36)

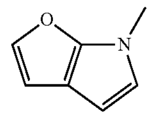

(W-b-37)

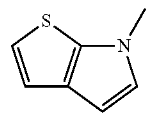

(W-b-38)

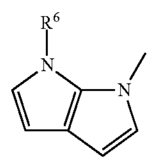

(W-b-39)

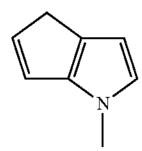

(W-b-40)

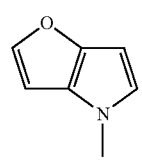

(W-b-41)

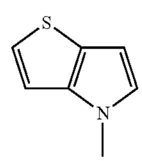

(W-b-42)

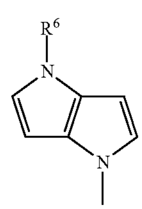

(wherein $R^6$ represents a hydrogen atom or an alkyl group having 1 to 8 carbon atoms). In terms of availability of raw materials and ease of synthesis, the ring group represented by —$NW^{81}W^{82}$ is particularly preferably a group selected from formula (W-b-20), formula (W-b-21), formula (W-b-22), formula (W-b-23), formula (W-b-24), formula (W-b-25), and formula (W-b-33) that may be unsubstituted or substituted by at least one $L^1$.

A ring group represented by $=CW^{81}W^{82}$ is preferably a group selected from formula (W-c-1) to formula (W-c-81) below that may be unsubstituted or substituted by at least one $L^1$:

[Chem. 30]
(W-c-1)
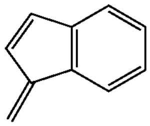
(W-c-2)
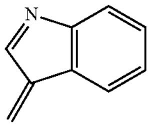
(W-c-3)
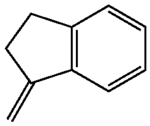
(W-c-4)
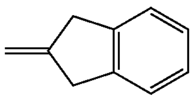
(W-c-5)
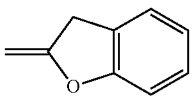
(W-c-6)
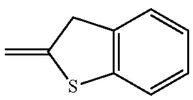
(W-c-7)
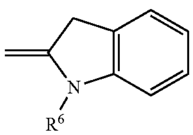
(W-c-8)
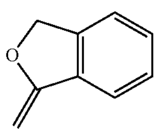
(W-c-9)
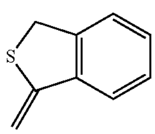
(W-c-9)
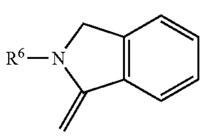
(W-c-10)
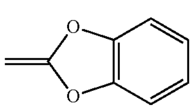
(W-c-11)
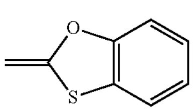
-continued
(W-c-11)
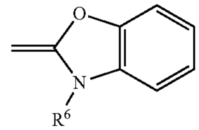
(W-c-12)
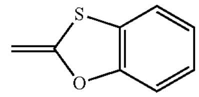
(W-c-13)
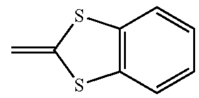
(W-c-14)
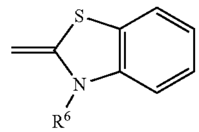
(W-c-15)
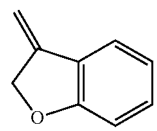
(W-c-16)
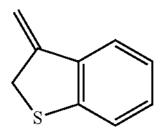
(W-c-17)
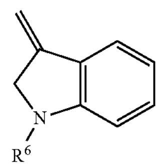
(W-c-18)
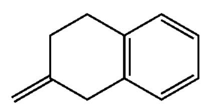
(W-c-19)
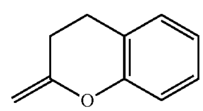
(W-c-20)
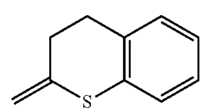
(W-c-21)
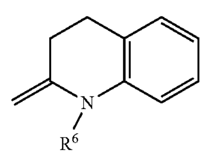
(W-c-22)
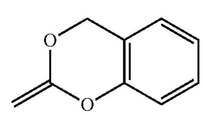

-continued
(W-c-23)
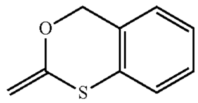
(W-c-24)
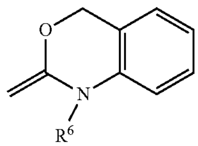
(W-c-25)
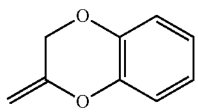
(W-c-26)
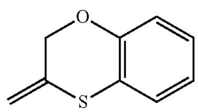
(W-c-27)
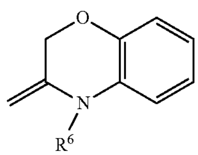
(W-c-28)
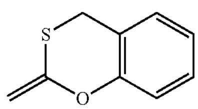
[Chem. 31]
(W-c-29)
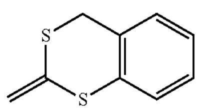
(W-c-30)
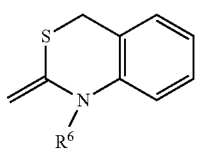
(W-c-31)
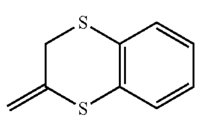
(W-c-32)
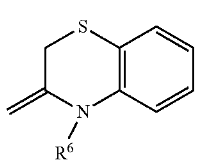
(W-c-33)
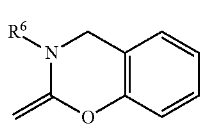
(W-c-34)
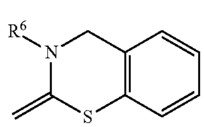
-continued
(W-c-35)
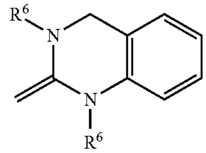
(W-c-36)
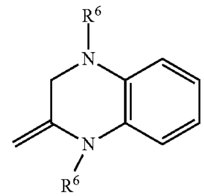
(W-c-37)
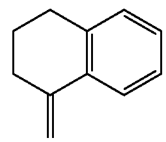
(W-c-38)
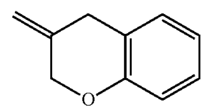
(W-c-39)
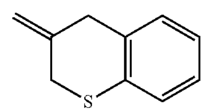
(W-c-40)
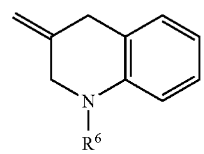
(W-c-41)
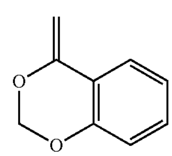
(W-c-42)
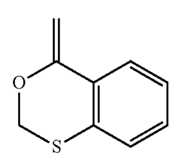
(W-c-43)
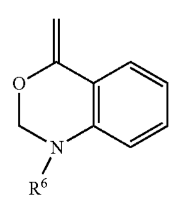
(W-c-44)
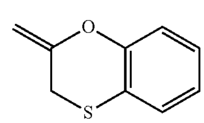

-continued
(W-c-45)
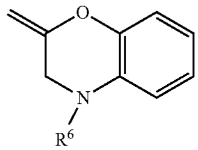
(W-c-46)
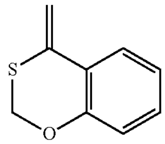
(W-c-47)
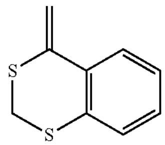
(W-c-48)
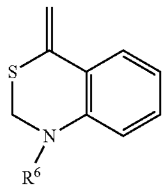
(W-c-49)
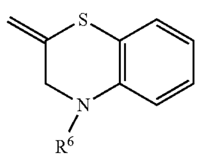
(W-c-50)
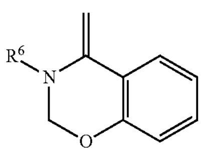
(W-c-51)
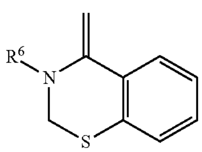
(W-c-52)
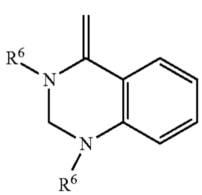
(W-c-53)
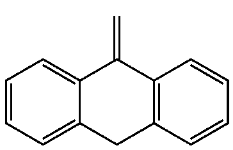
(W-c-54)
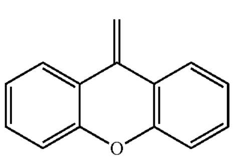
-continued
(W-c-55)
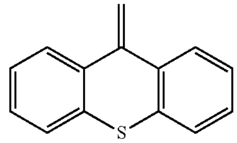
(W-c-56)
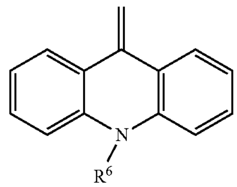
(W-c-57)
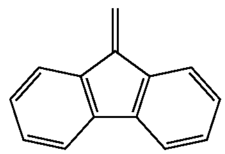
[Chem. 32]
(W-c-58)
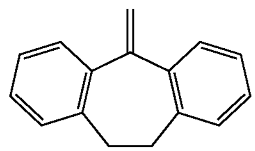
(W-c-59)
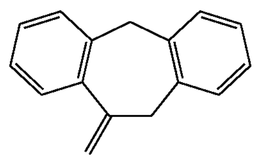
(W-c-60)
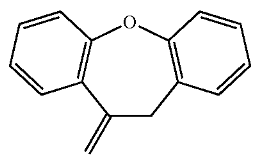
(W-c-61)
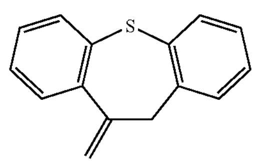
(W-c-62)
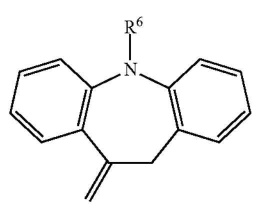
(W-c-63)
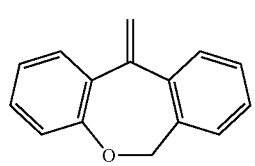

-continued
(W-c-64)
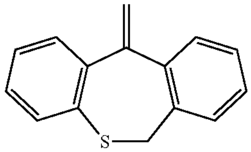
(W-c-65)
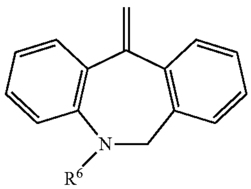
(W-c-66)
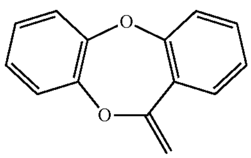
(W-c-67)
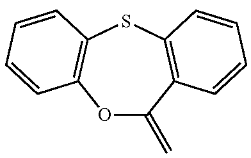
(W-c-68)
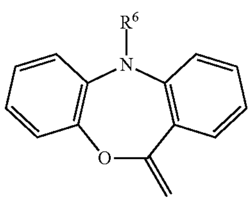
(W-c-69)
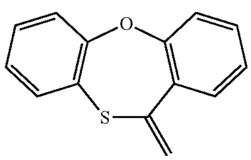
(W-c-70)
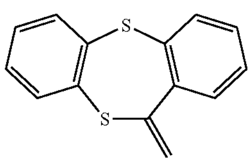
(W-c-71)
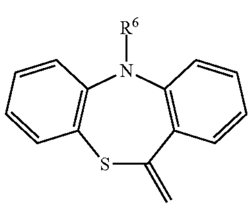
(W-c-72)
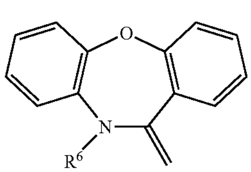
-continued
(W-c-73)
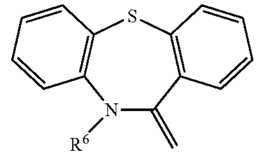
(W-c-74)
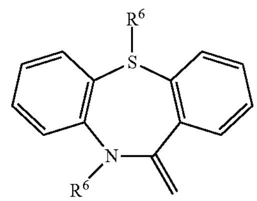
(W-c-75)
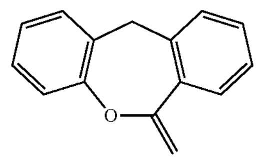
(W-c-76)
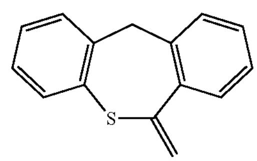
(W-c-77)
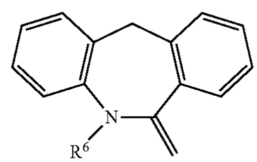
(W-c-78)
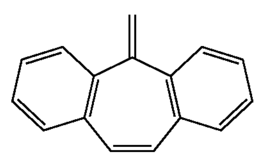
(W-c-79)
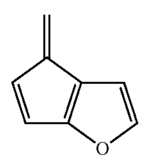
(W-c-80)
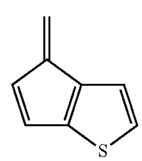
(W-c-81)
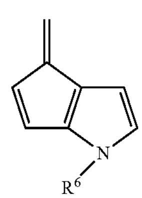
(wherein $R^6$ represents a hydrogen atom or an alkyl group having 1 to 8 carbon atoms, and, when a plurality of $R^6$s are present, they may be the same or different). In terms of availability of raw materials and ease of synthesis, the ring group represented by $=CW^{81}W^{82}$ is particularly preferably a group selected from formula (W-c-11), formula (W-c-12), formula (W-c-13), formula (W-c-14), formula (W-c-53), formula (W-c-54), formula (W-c-55), formula (W-c-56), formula (W-c-57), and formula (W-c-78) that may be unsubstituted or substituted by at least one L.

When $W^{82}$ represents the following group:

$$P^{W82}\text{—}(S^{W82}\text{—}X^{W82})_{n^{W82}} \quad \text{[Chem. 33]}$$

preferred groups for $P^{W82}$ are the same as those described for $P^{11}$, and preferred groups for $S^{W82}$ are the same as those described for $S^{11}$. Preferred groups for $X^{W82}$ are the same as those described for $X^{11}$, and preferred $n^{W82}$ is the same as that described for m11.

The total number of π electrons contained in $W^{81}$ and $W^{82}$ is preferably 4 to 24, in terms of wavelength dispersion properties, storage stability, liquid crystallinity, and ease of synthesis. $W^{83}$ and $W^{84}$ each independently represent a halogen atom, a cyano group, a hydroxy group, a nitro group, a carboxyl group, a carbamoyloxy group, an amino group, a sulfamoyl group, a group having at least one aromatic group and having 5 to 30 carbon atoms, an alkyl group having 1 to 20 carbon atoms, a cycloalkyl group having 3 to 20 carbon atoms, an alkenyl group having 2 to 20 carbon atoms, a cycloalkenyl group having 3 to 20 carbon atoms, an alkoxy group having 1 to 20 carbon atoms, an acyloxy group having 2 to 20 carbon atoms, or an alkylcarbonyloxy group having 2 to 20 carbon atoms. In the alkyl group, the cycloalkyl group, the alkenyl group, the cycloalkenyl group, the alkoxy group, the acyloxy group, and the alkylcarbonyloxy group, one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, or —C≡C—. $W^{83}$ is more preferably a group selected from a cyano group, a nitro group, a carboxyl group, and alkyl, alkenyl, acyloxy, and alkylcarbonyloxy groups which have 1 to 20 carbon atoms and in which one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, or —C≡C—. $W^{83}$ is particularly preferably a group selected from a cyano group, a carboxyl group, and alkyl, alkenyl, acyloxy, and alkylcarbonyloxy groups which have 1 to 20 carbon atoms and in which one —$CH_2$— group or two or more nonadjacent —$CH_2$— groups may be each independently replaced by —CO—, —COO—, —OCO—, —O—CO—O—, —CO—NH—, —NH—CO—, or —C≡C—. $W^{84}$ is more preferably a group selected from a cyano group, a nitro group, a carboxyl group, and alkyl, alkenyl, acyloxy, and alkylcarbonyloxy groups which have 1 to 20 carbon atoms and in which one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, or —C≡C—. $W^{84}$ is particularly preferably a group selected from a cyano group, a carboxyl group, and alkyl, alkenyl, acyloxy, and alkylcarbonyloxy groups which have 1 to 20 carbon atoms and in which one —$CH_2$— group or two or more nonadjacent —$CH_2$— groups may be each independently replaced by —CO—, —COO—, —OCO—, —O—CO—O—, —CO—NH—, —NH—CO—, or —C≡C—.

$L^1$ represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group which has 1 to 20 carbon atoms and in which one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and any hydrogen atom in the alkyl group may be replaced by a fluorine atom. In terms of liquid crystallinity and ease of synthesis, $L^1$ preferably represents a fluorine atom, a chlorine atom, a pentafluorosulfuranyl group, a nitro group, a methylamino group, a dimethylamino group, a diethylamino group, a diisopropylamino group, or a linear or branched alkyl group which has 1 to 20 carbon atoms, in which any hydrogen atom may be replaced by a fluorine atom, and in which one —$CH_2$— group or two or more nonadjacent —$CH_2$— groups may be each independently replaced by a group selected from —O—, —S—, —CO—, —COO—, —OCO—, —O—CO—O—, —CH=CH—, —CF=CF—, and —C≡C—. $L^1$ more preferably represents a fluorine atom, a chlorine atom, or a linear or branched alkyl group which has 1 to 12 carbon atoms, in which any hydrogen atom may be replaced by a fluorine atom, and in which one —$CH_2$— group or two or more nonadjacent —$CH_2$— groups may be each independently replaced by a group selected from —O—, —COO—, and —OCO—. $L^1$ still more preferably represents a fluorine atom, a chlorine atom, or a linear or branched alkyl or alkoxy group which has 1 to 12 carbon atoms and in which any hydrogen atom may be replaced by a fluorine atom. $L^1$ particularly preferably represents a fluorine atom, a chlorine atom, or a linear alkyl or alkoxy group having 1 to 8 carbon atoms.

In general formula (1), m11 represents an integer of 0 to 8. In terms of liquid crystallinity, availability of raw materials, and ease of synthesis, m11 represents preferably an integer from 0 to 4, more preferably an integer from 0 to 2, still more preferably 0 or 1, and particularly preferably 1.

In general formula (2) to general formula (7), m2 to m7 each represent an integer from 0 to 5. In terms of liquid crystallinity, availability of raw materials, and ease of synthesis, m2 to m7 each represent preferably an integer from 0 to 4, more preferably an integer from 0 to 2, still more preferably 0 or 1, and particularly preferably 1.

In general formula (a), j11 and j12 each independently represent an integer from 1 to 5 while j11+j12 represents an integer from 2 to 5. In terms of liquid crystallinity, ease of synthesis, and storage stability, j11 and j12 each independently represent preferably an integer from 1 to 4, more preferably an integer from 1 to 3, and particularly preferably 1 or 2. Preferably, j11+j12 represents an integer from 2 to 4.

Specifically, the compound represented by general formula (1) is preferably compounds represented by the following formula (1-a-1) to formula (1-a-105):

[Chem. 34]
(1-a-1)
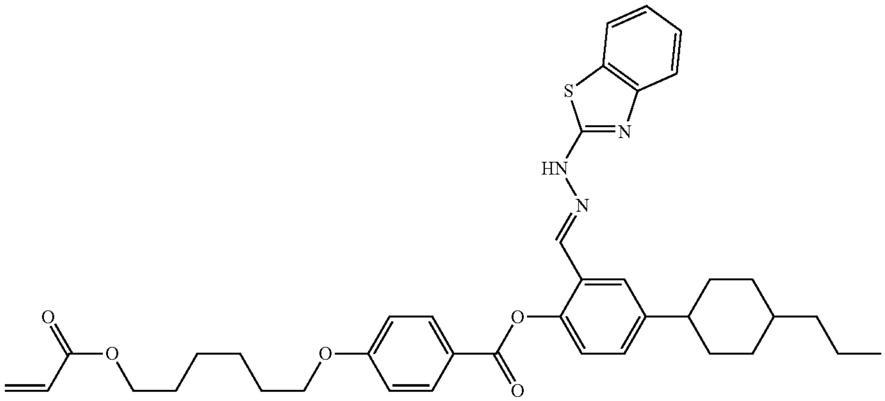
(1-a-2)
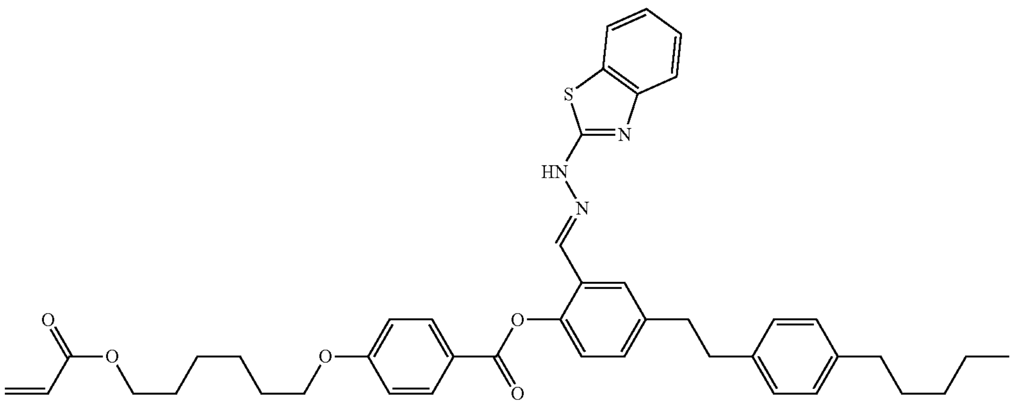
(1-a-3)
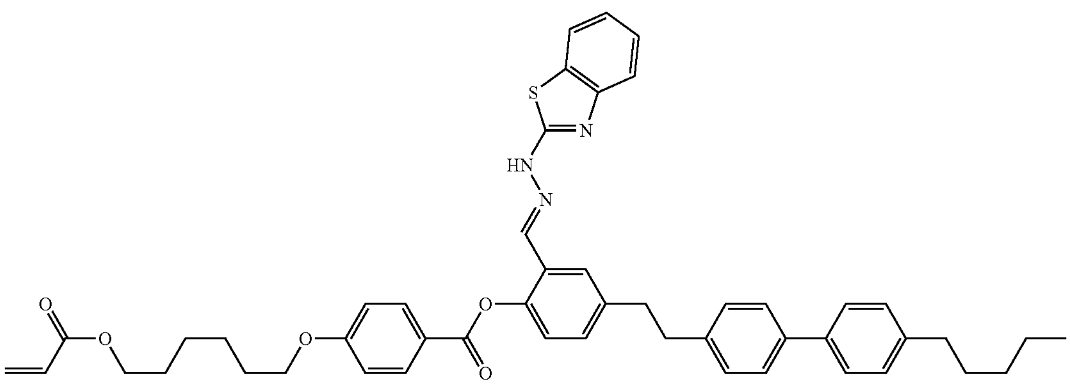
(1-a-4)
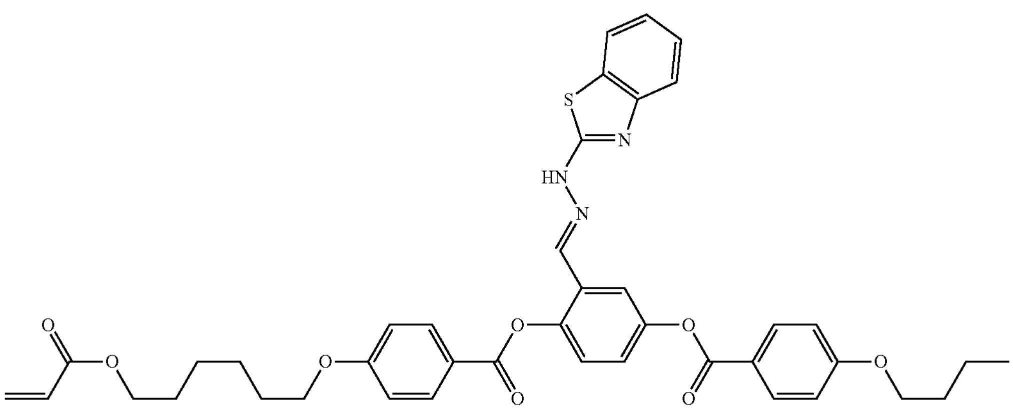

-continued
(1-a-5)
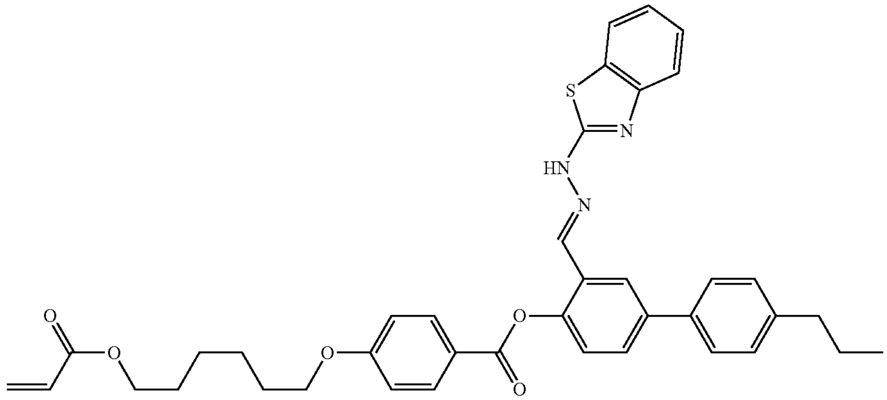
[Chem. 35]
(1-a-6)
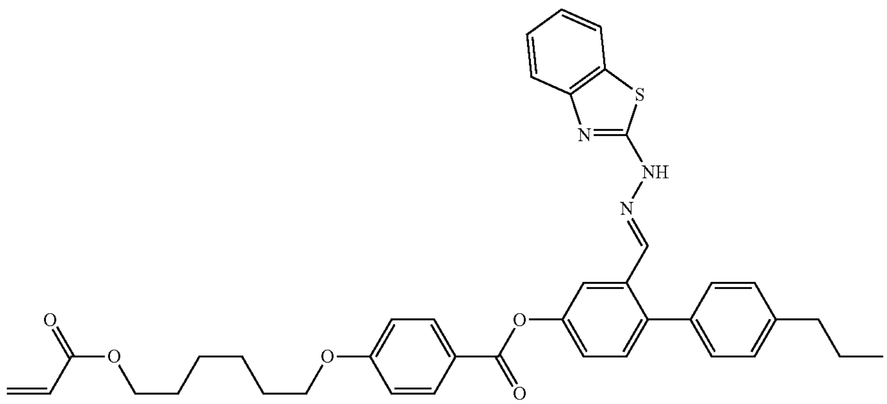
(1-a-7)
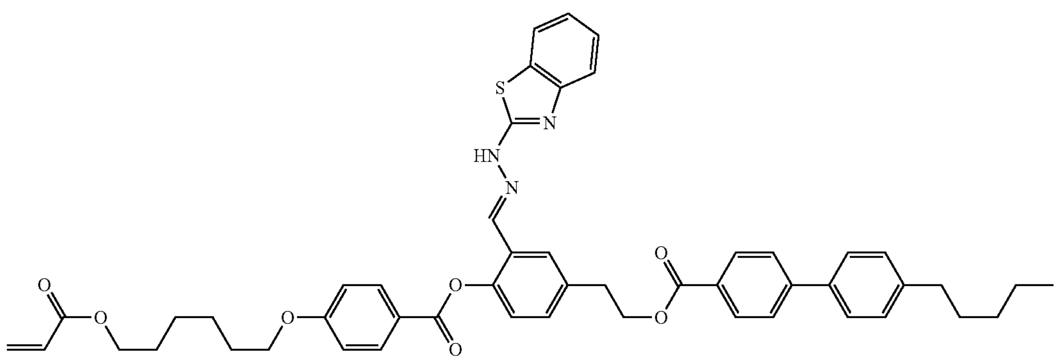
(1-a-8)
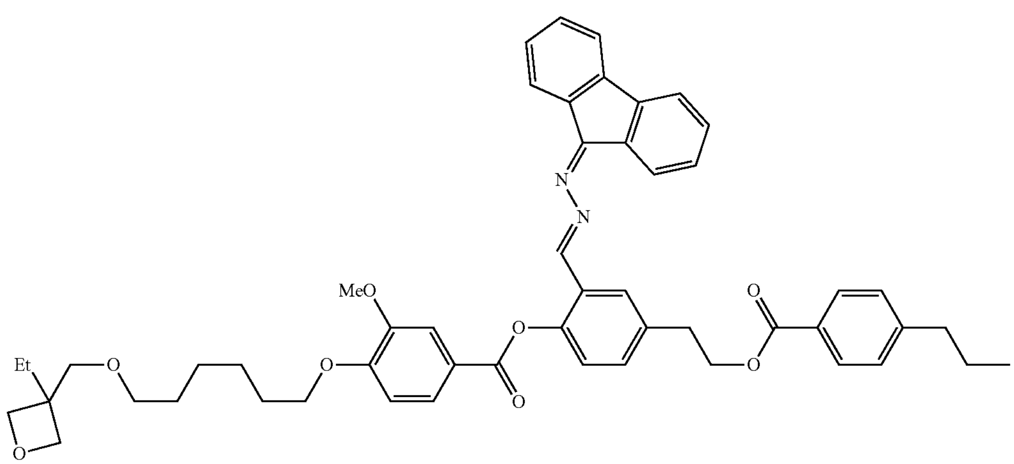

-continued
(1-a-9)
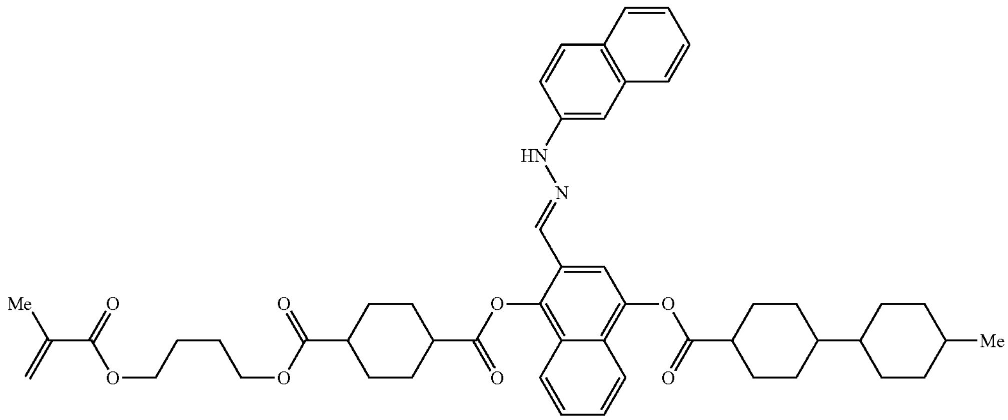
[Chem. 36]
(1-a-10)
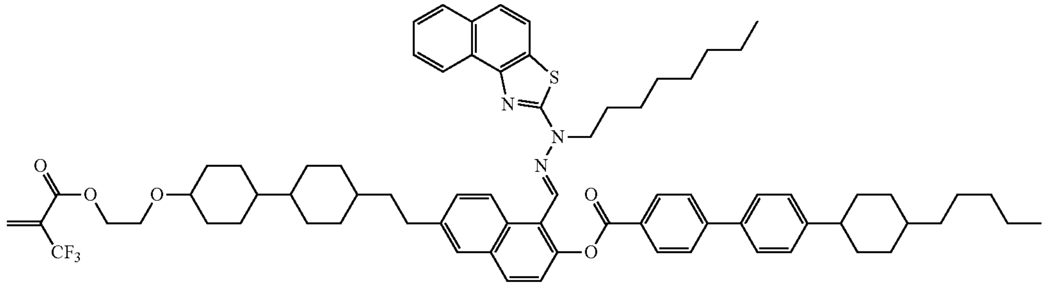
(1-a-11)
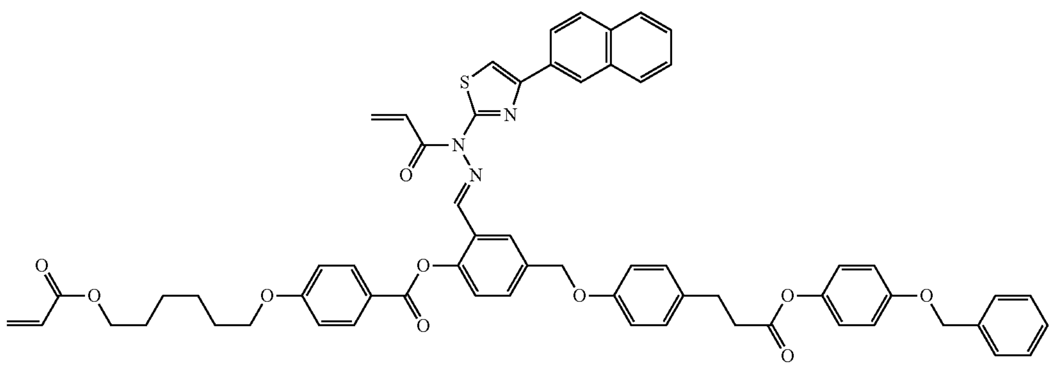
(1-a-12)
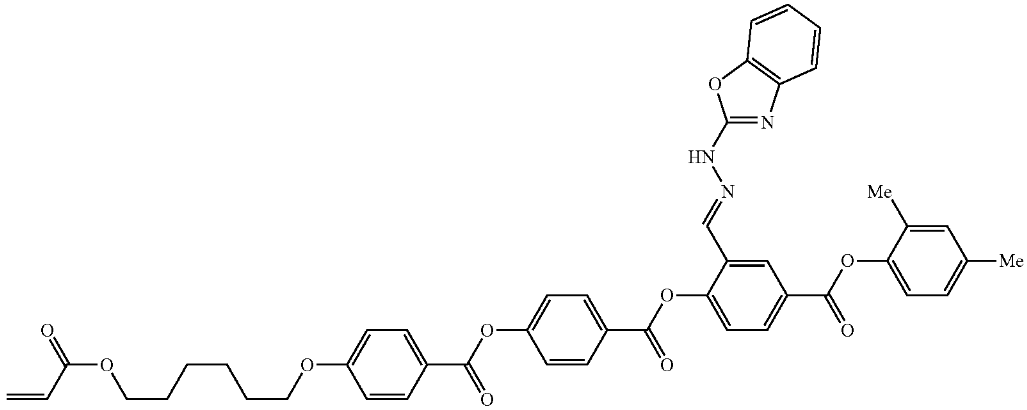

-continued
(1-a-13)
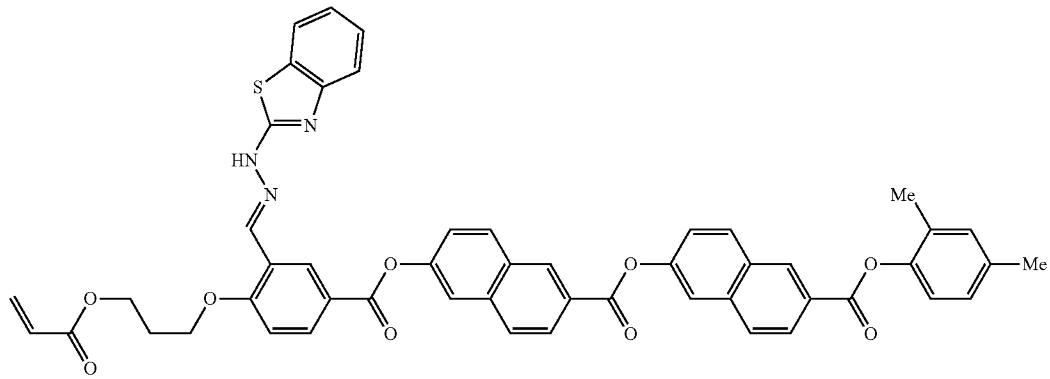
[Chem. 37]
(1-a-14)
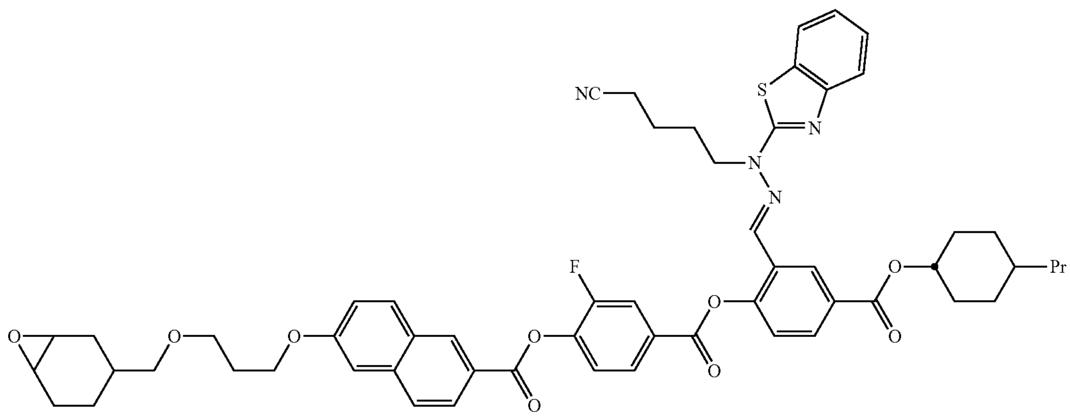
(1-a-15)
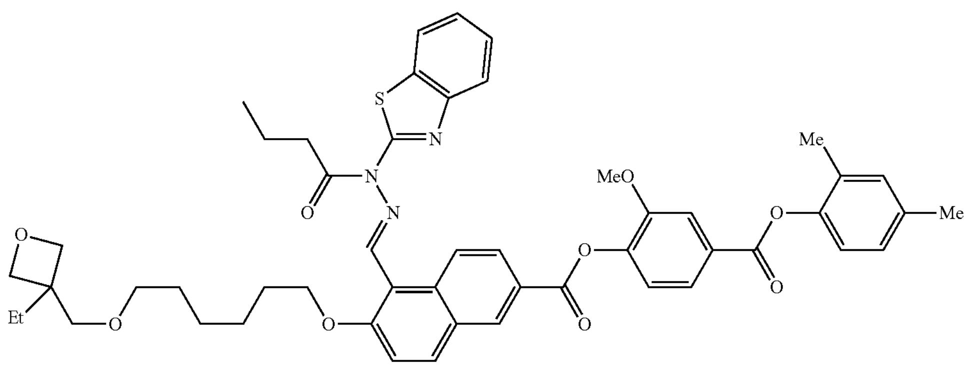
(1-a-16)
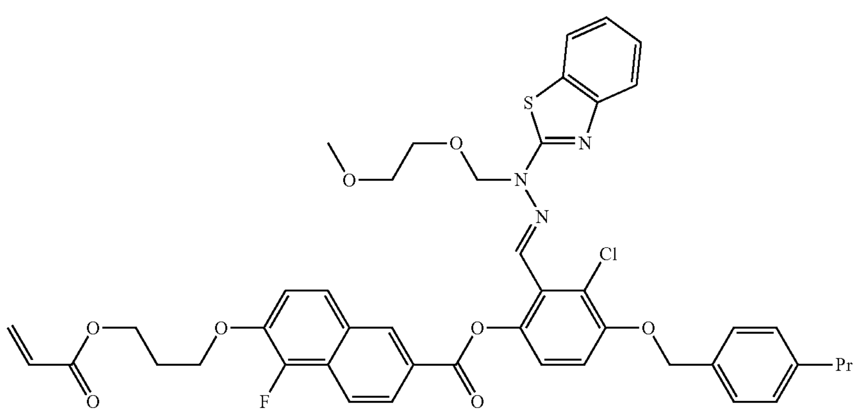

-continued
(1-a-17)
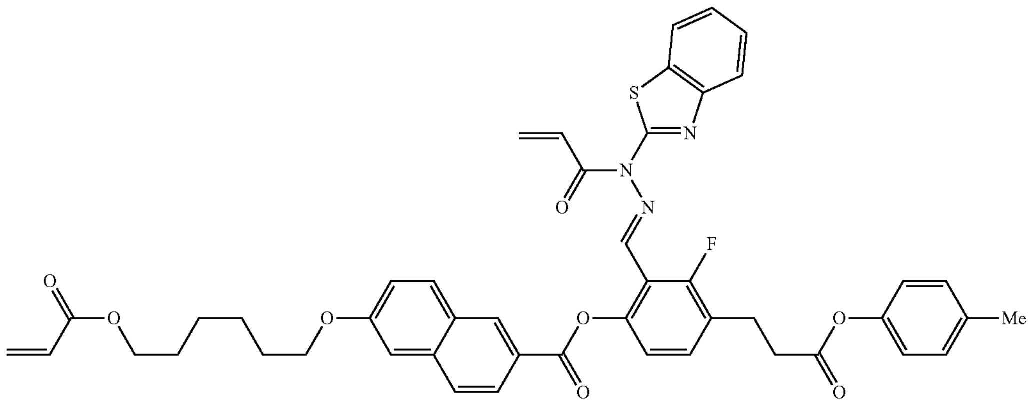
[Chem. 38]
(1-a-20)
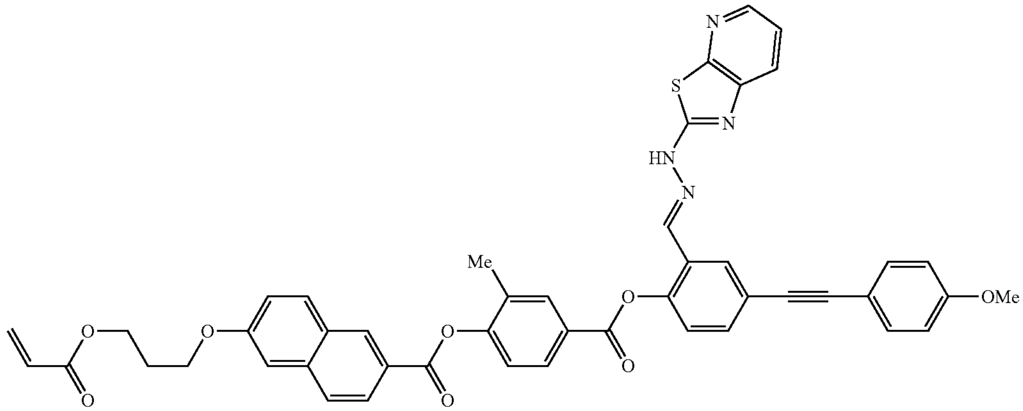
(1-a-21)
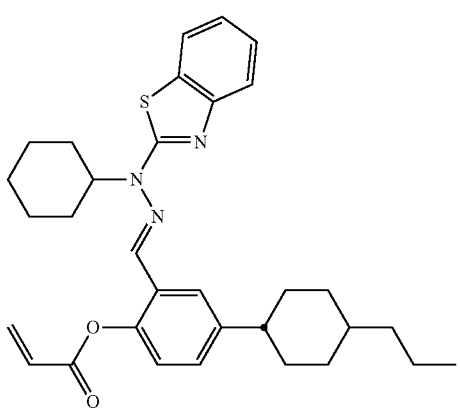
(1-a-22)
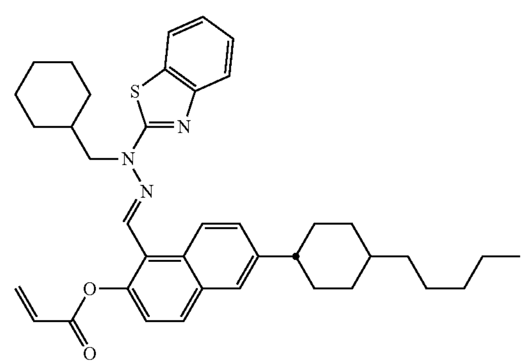

-continued
[Chem. 39]
(1-a-23)
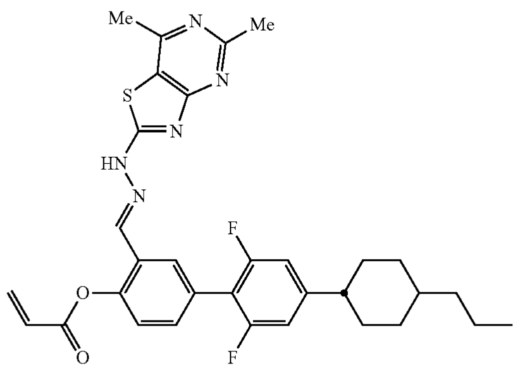
(1-a-24)
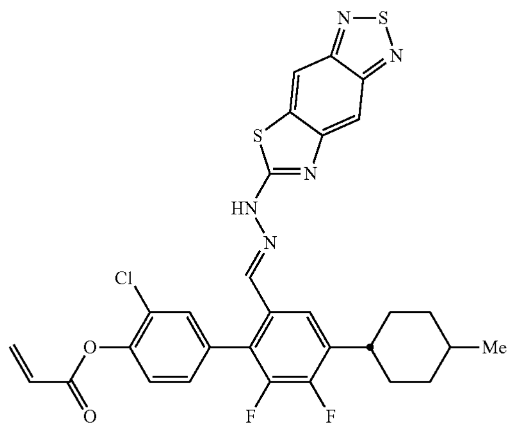
(1-a-25)
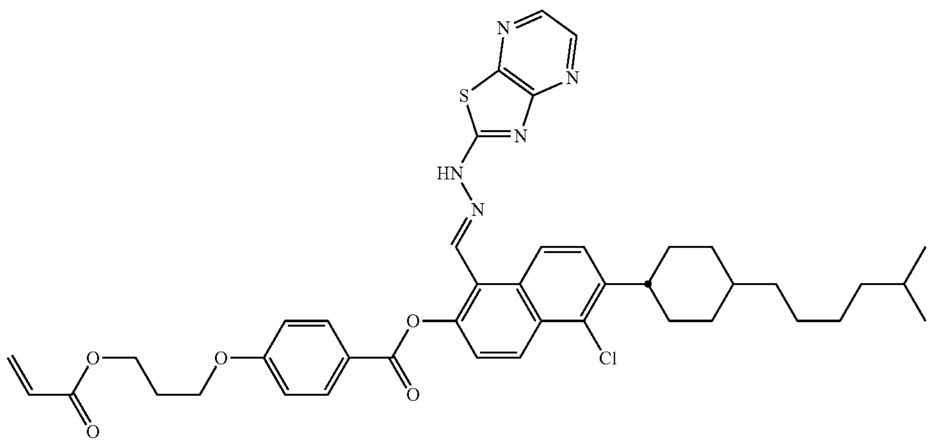
(1-a-26)
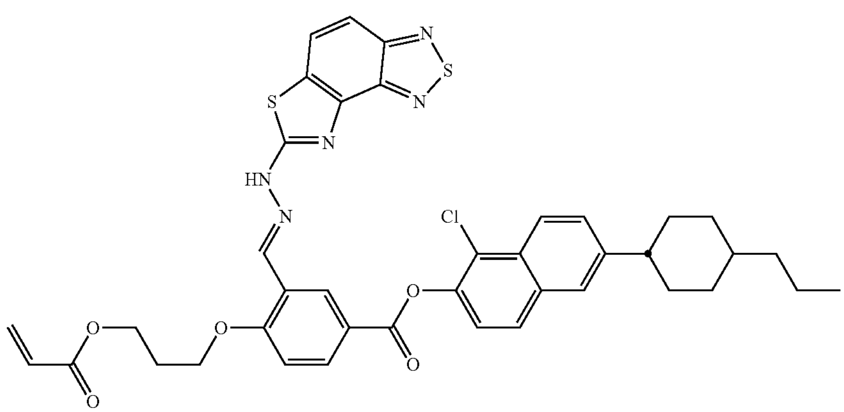

-continued
(1-a-27)
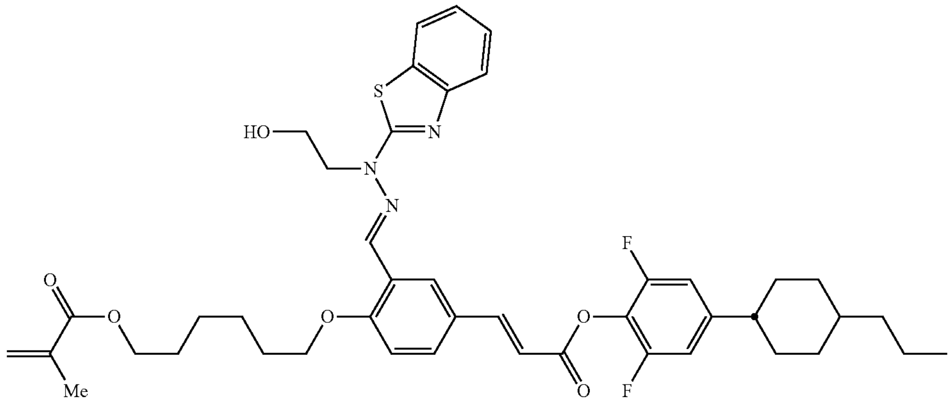
[Chem. 40]
(1-a-28)
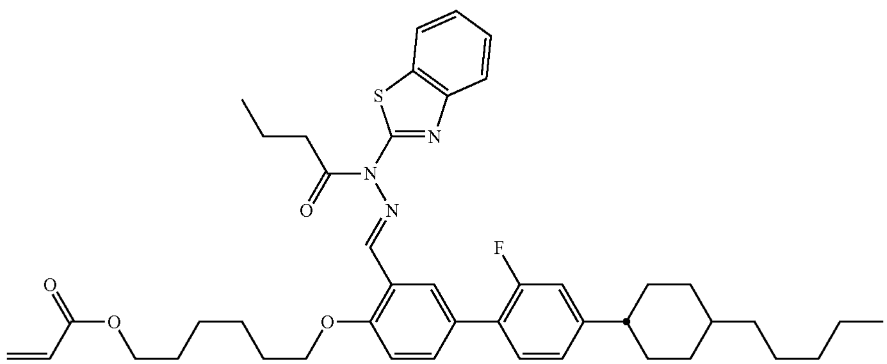
(1-a-29)
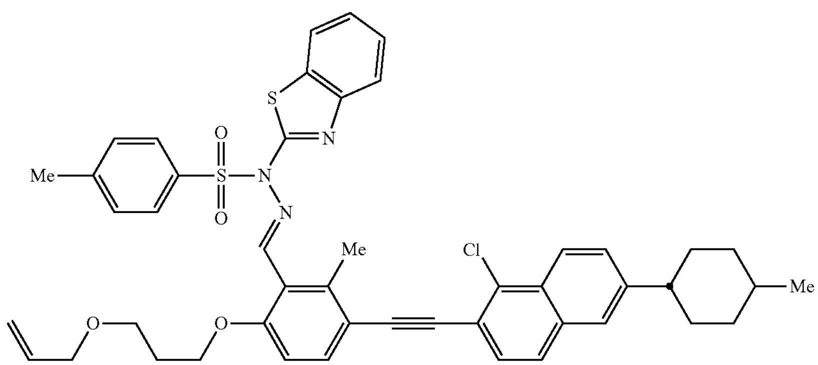
(1-a-30)
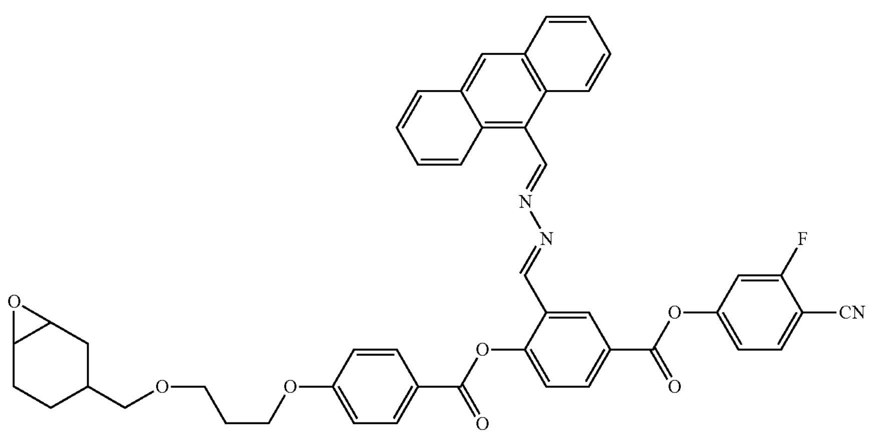

-continued
(1-a-31)
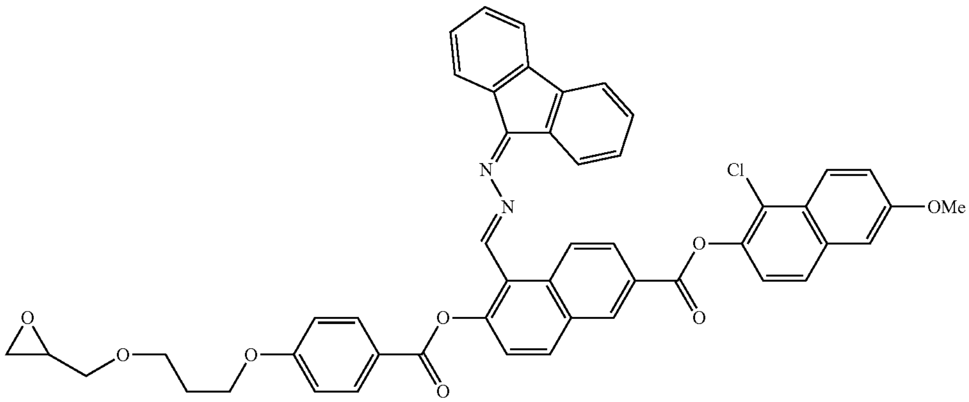
(1-a-32)
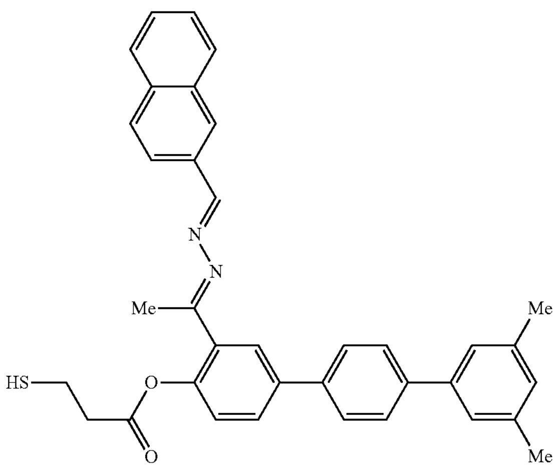
[Chem. 41]
(1-a-33)
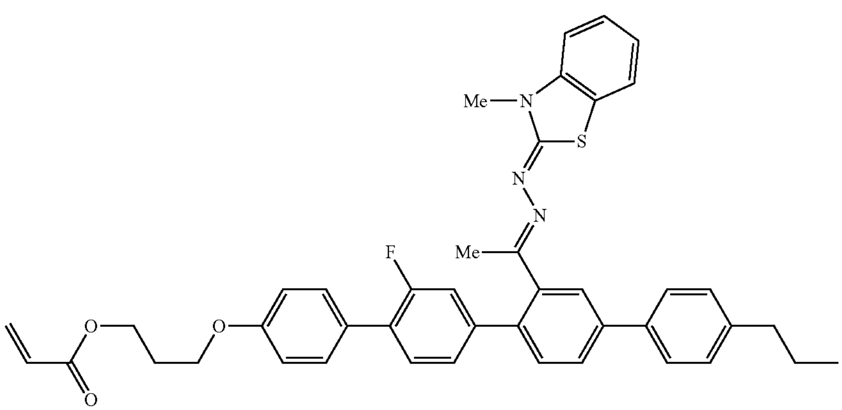

-continued
(1-a-34)
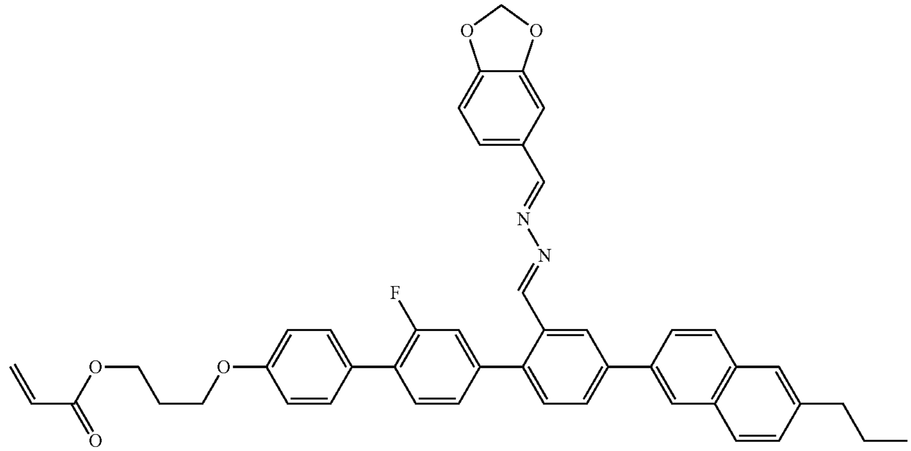
(1-a-35)
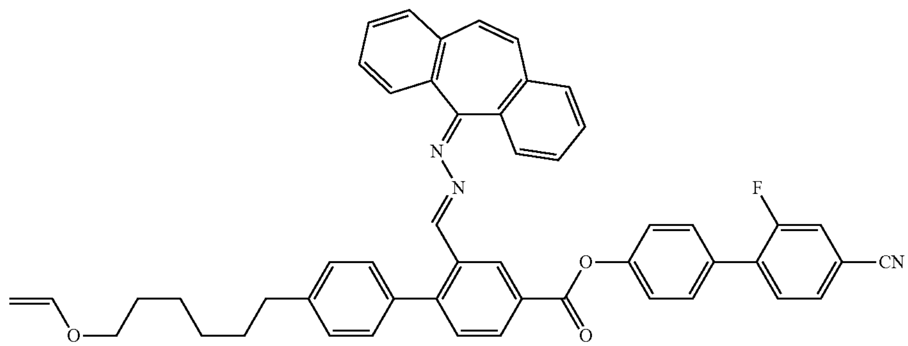
(1-a-36)
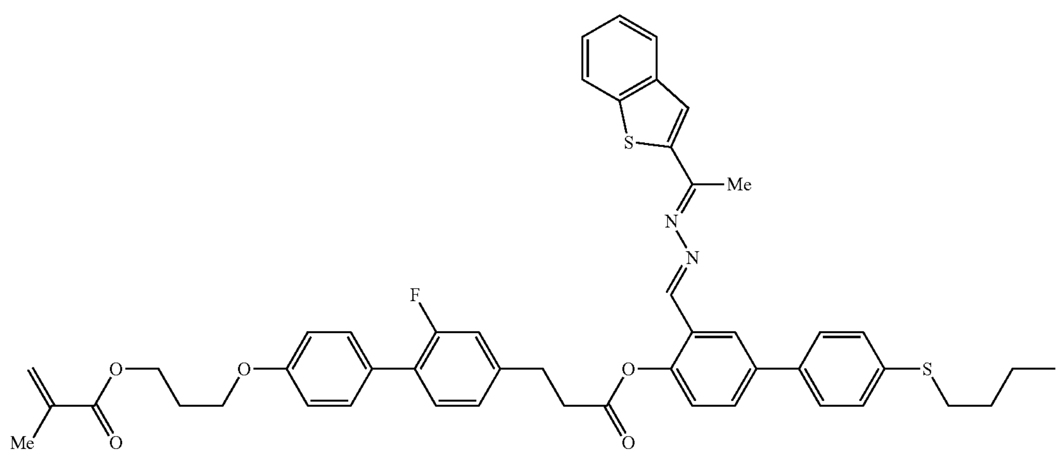
(1-a-37)
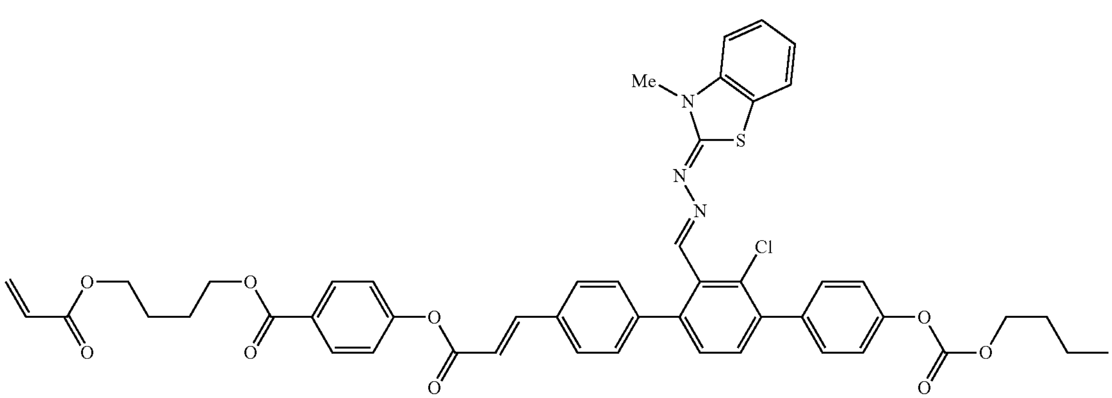

-continued
[Chem. 42]
(1-a-38)
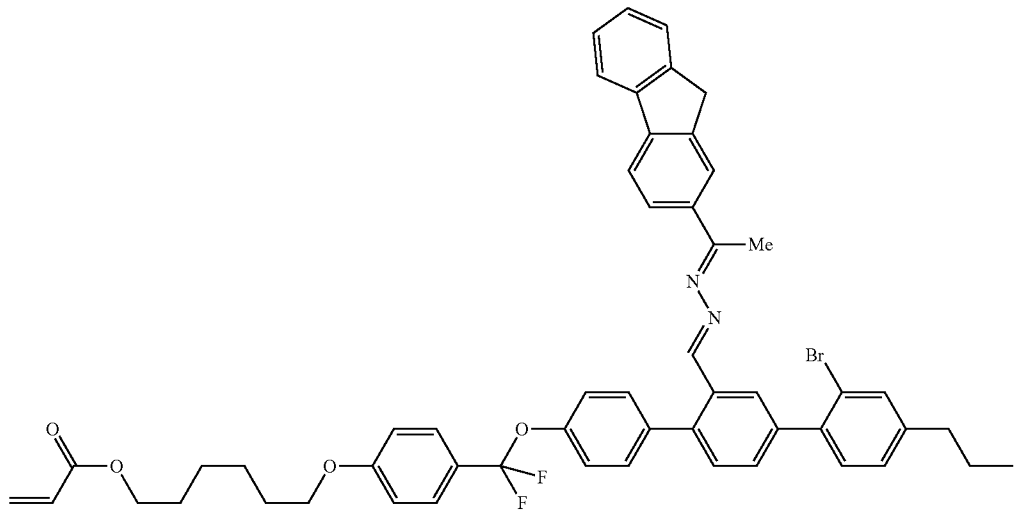
(1-a-39)
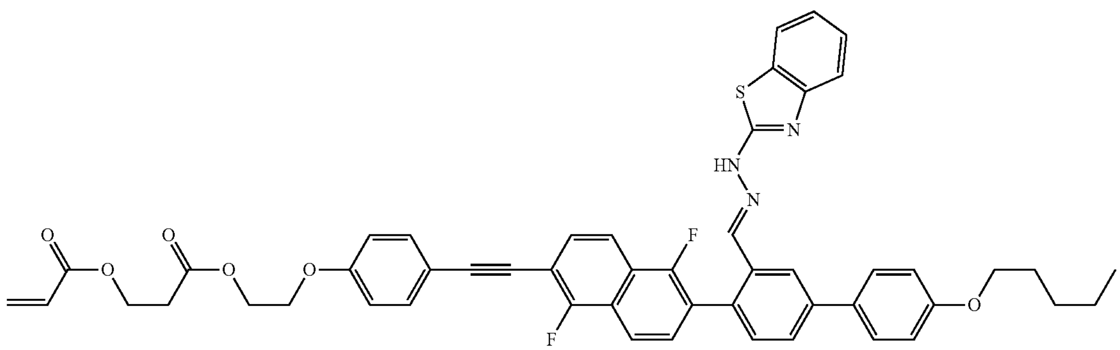
(1-a-40)
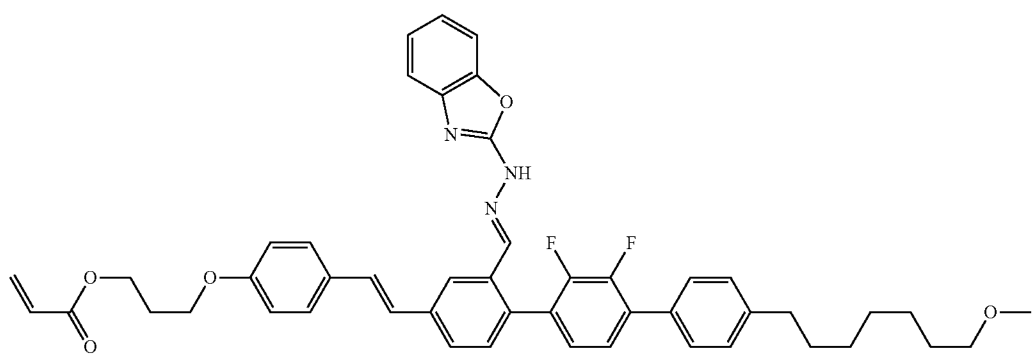
(1-a-41)
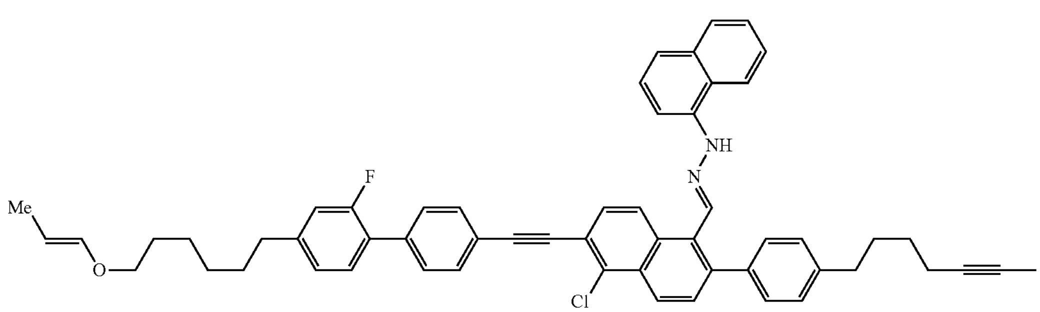

-continued
(1-a-42)
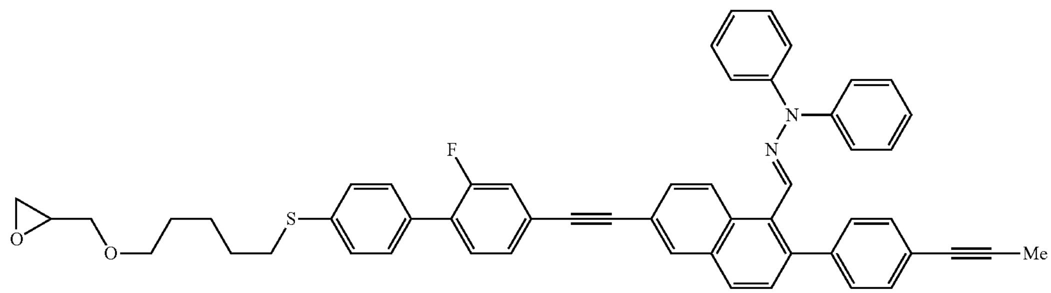
[Chem. 43]
(1-a-43)
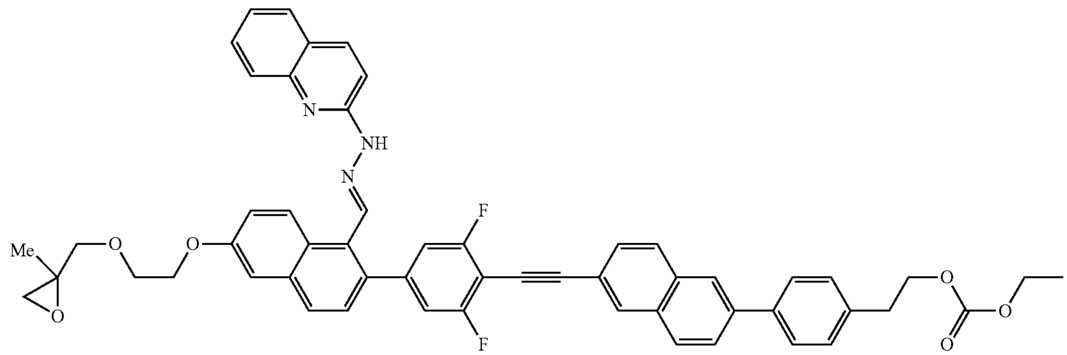
(1-a-44)
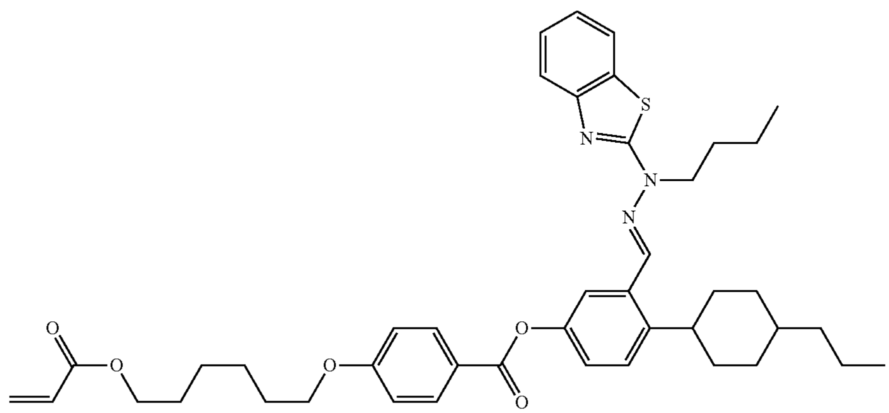
(1-a-45)
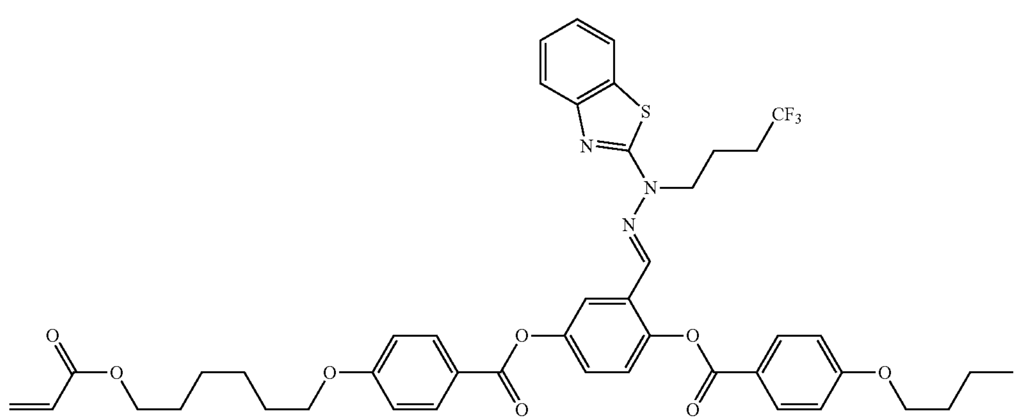

-continued
(1-a-47)
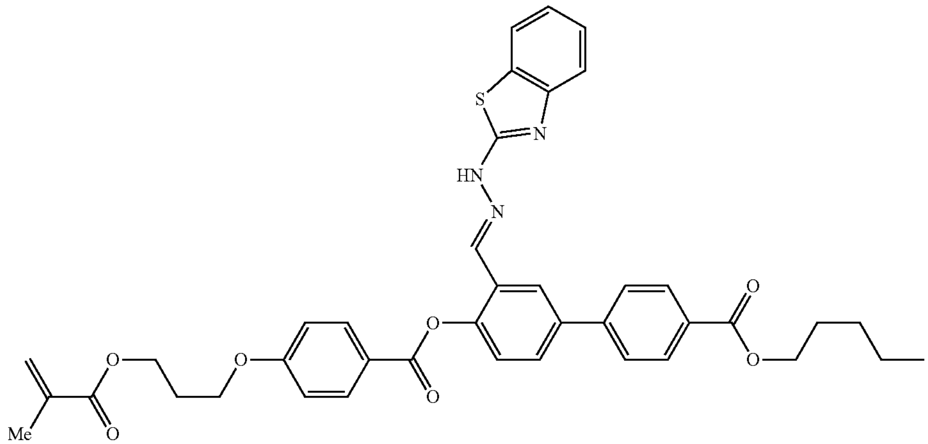
(1-a-48)
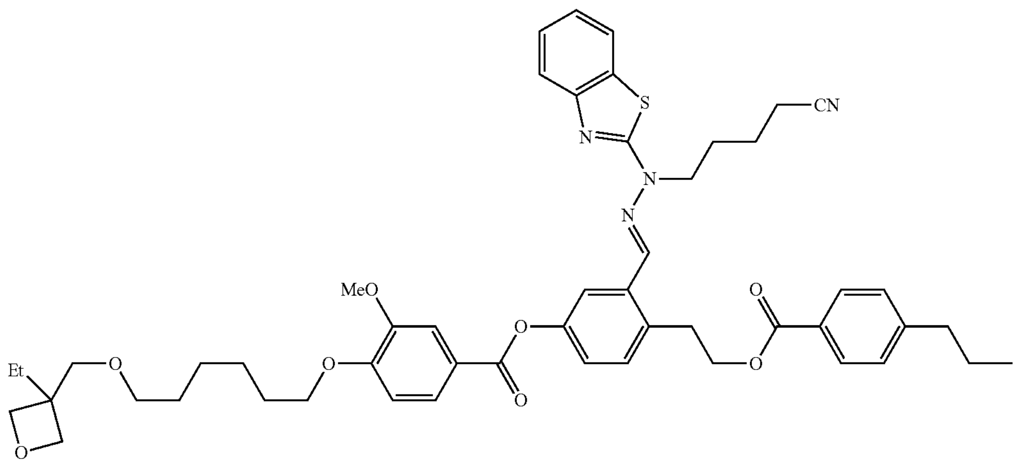
(1-a-49)
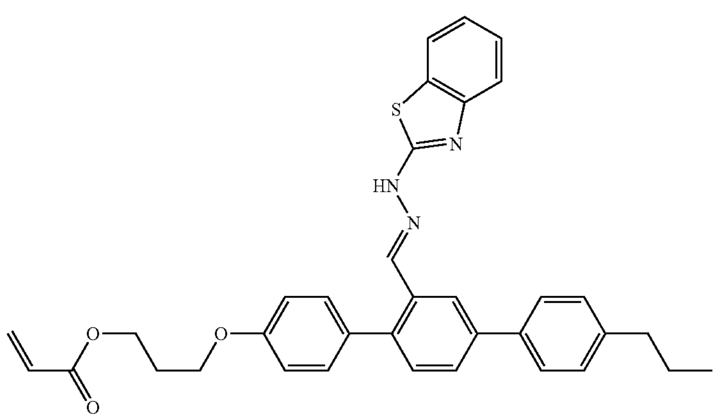

-continued
[Chem. 44]
(1-a-50)
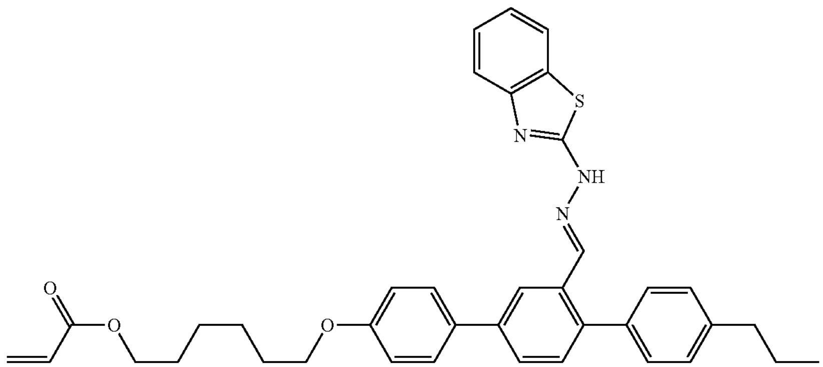
(1-a-51)
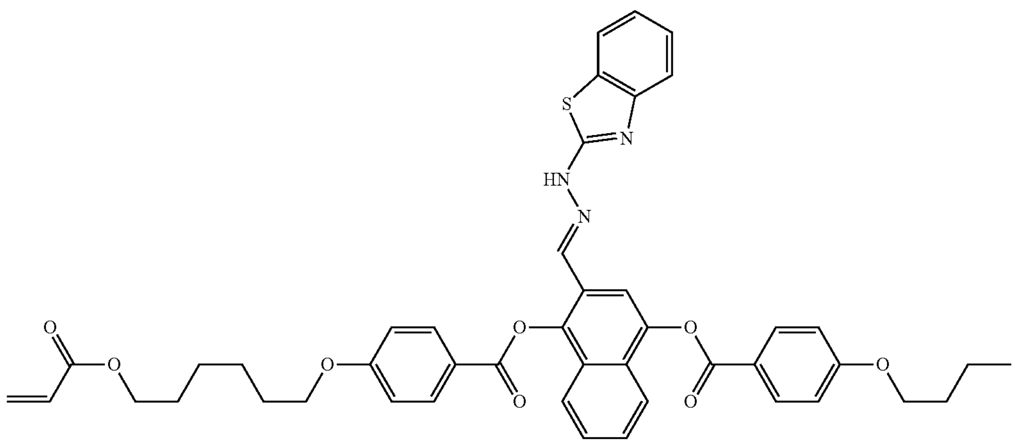
(1-a-52)
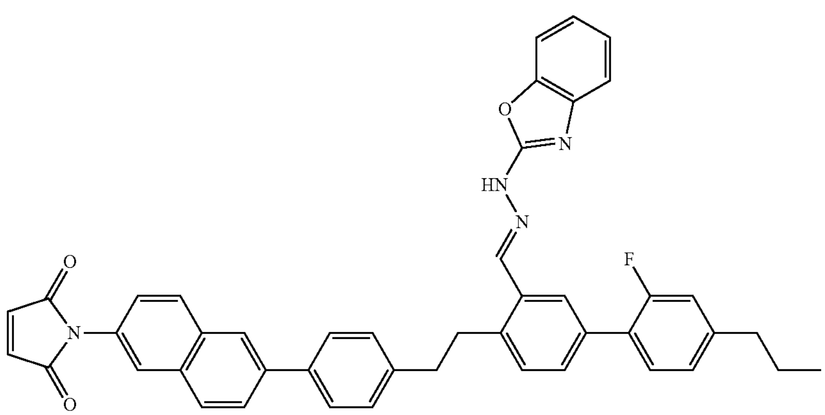

-continued
(1-a-53)
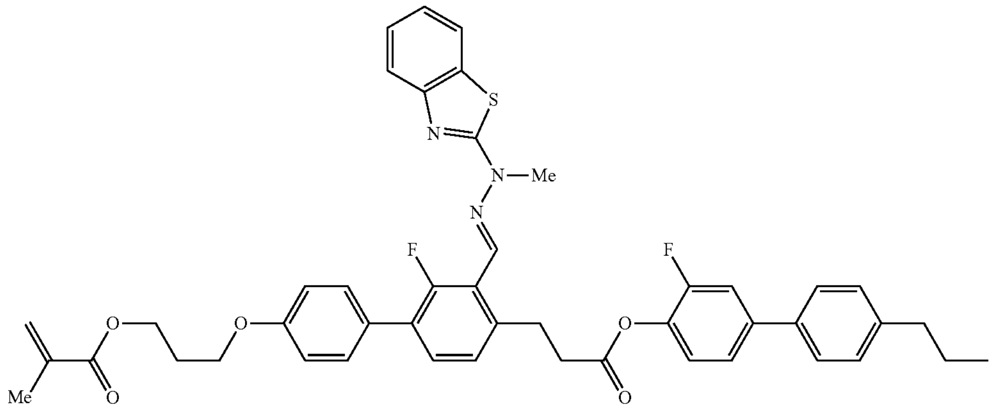
(1-a-54)
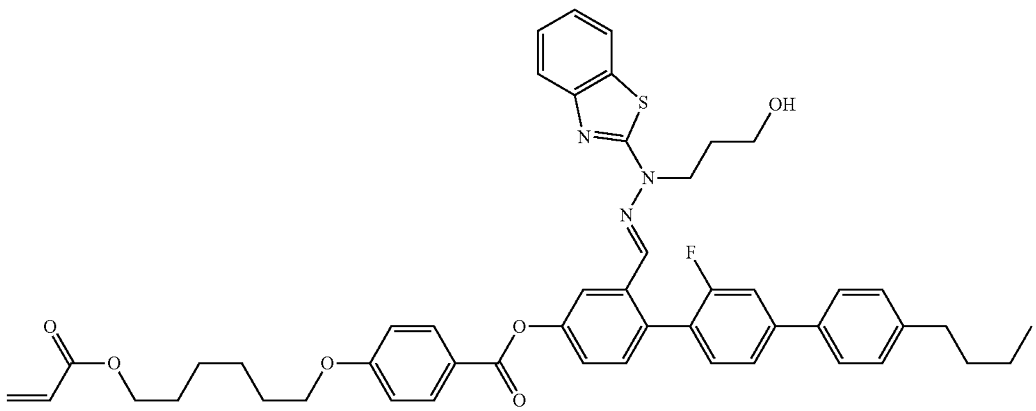
[Chem. 45]
(1-a-55)
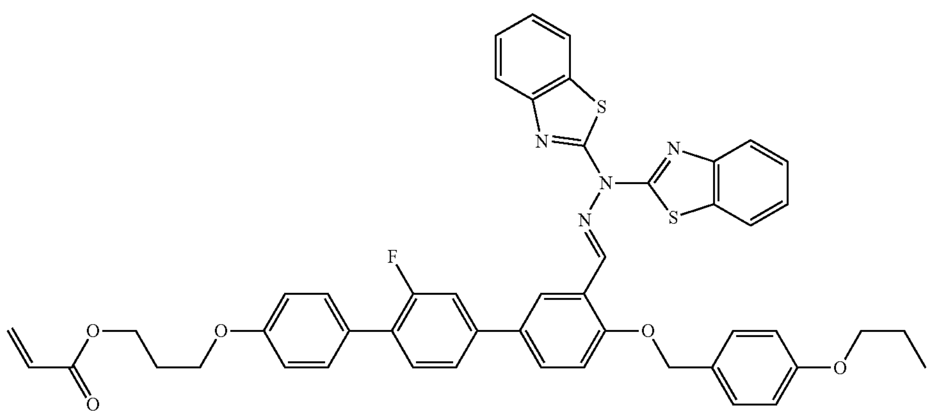
(1-a-56)
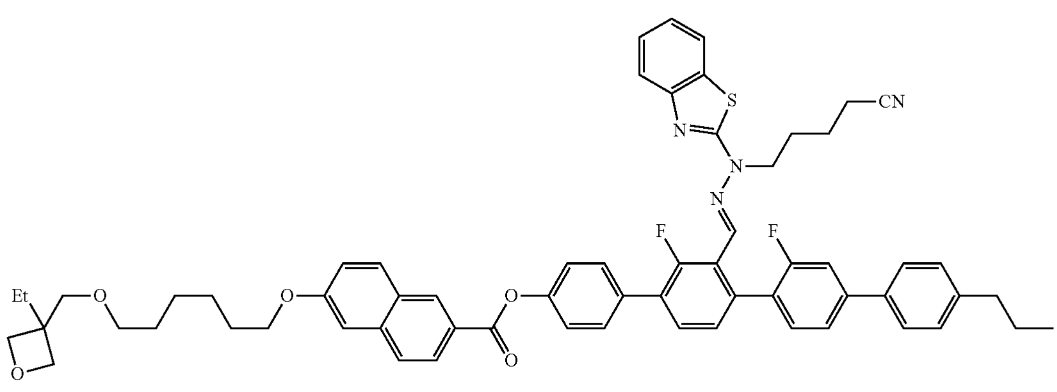

-continued
(1-a-57)
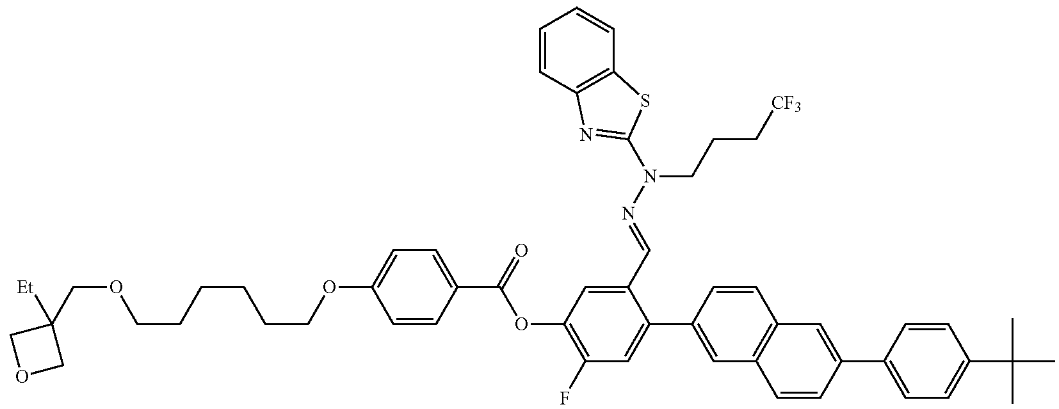
(1-a-58)
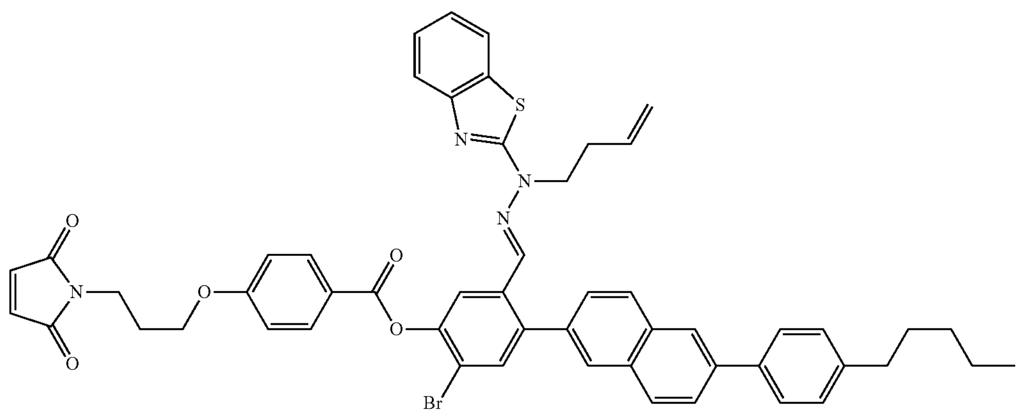
(1-a-59)
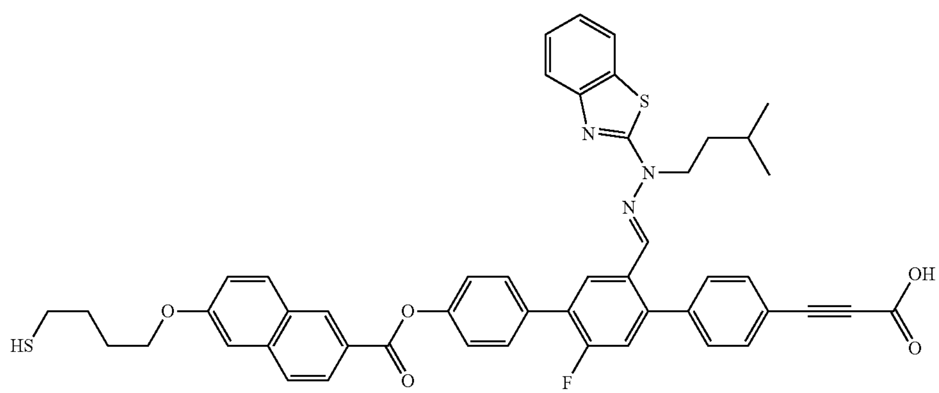
[Chem. 46]
(1-a-60)
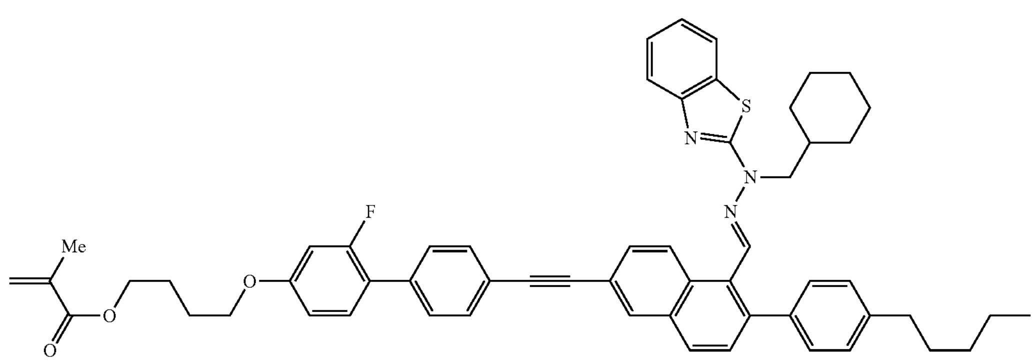

-continued
(1-a-61)
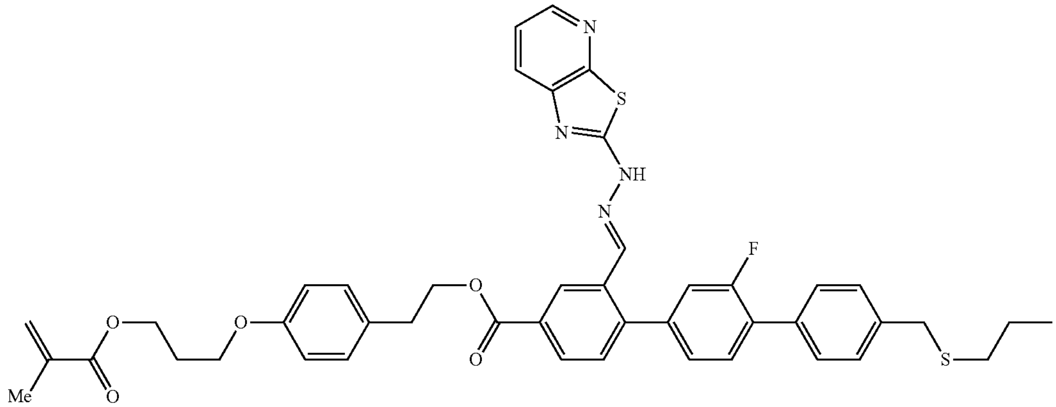
(1-a-62)
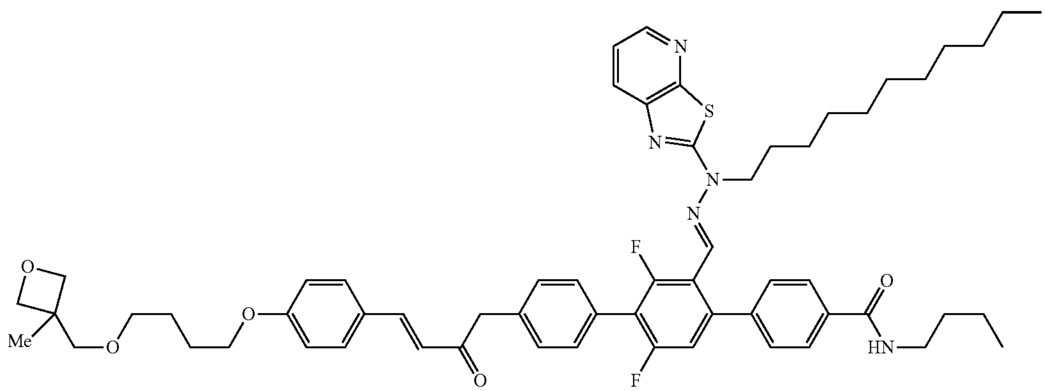
(1-a-63)
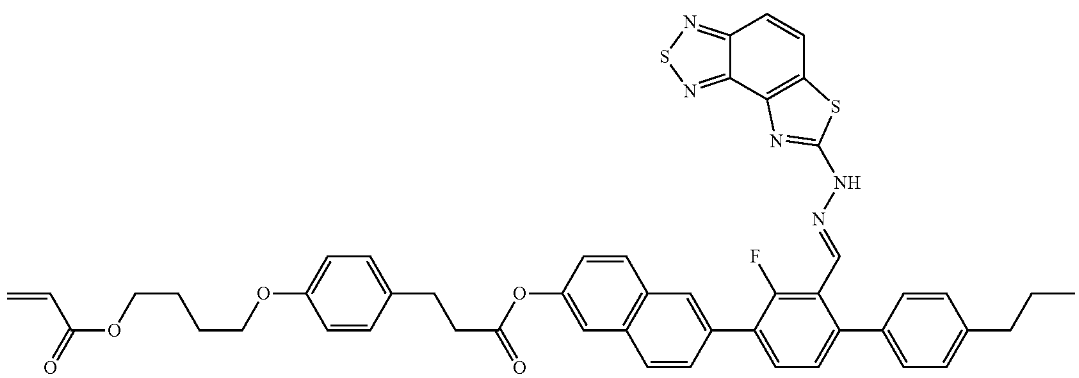
(1-a-64)
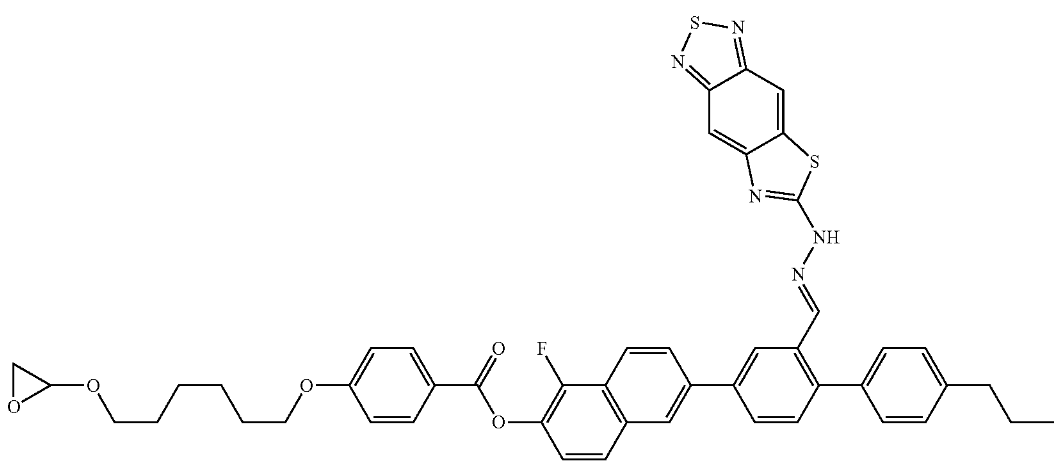

-continued
[Chem. 47]
(1-a-65)
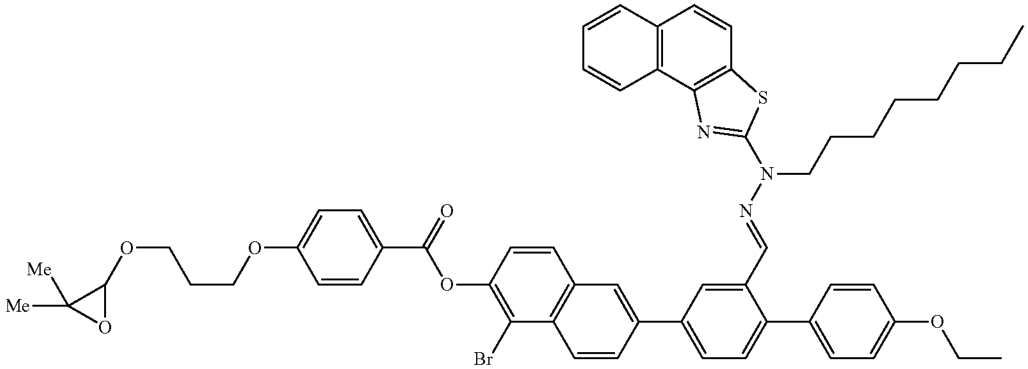
(1-a-66)
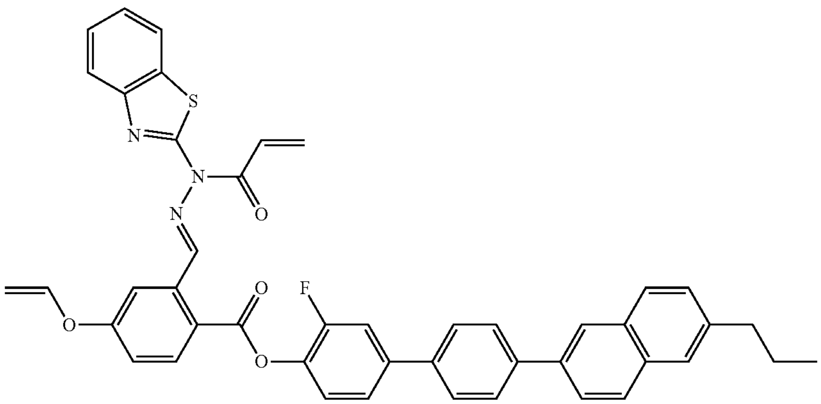
(1-a-67)
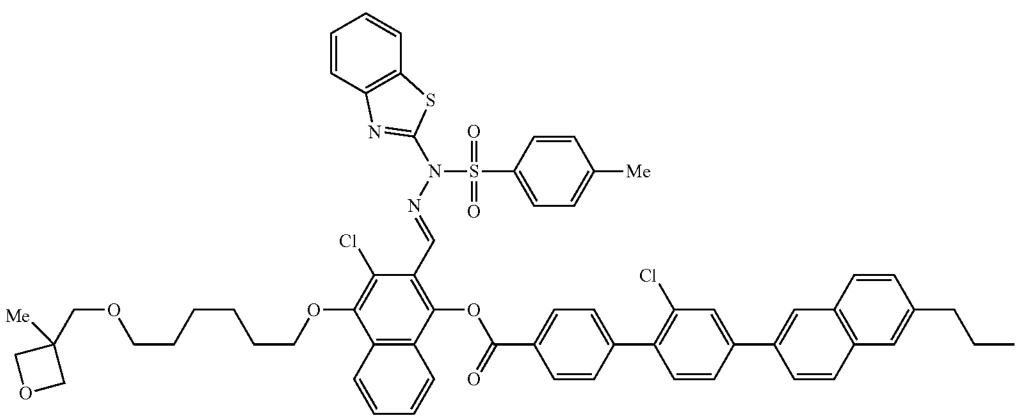
(1-a-68)
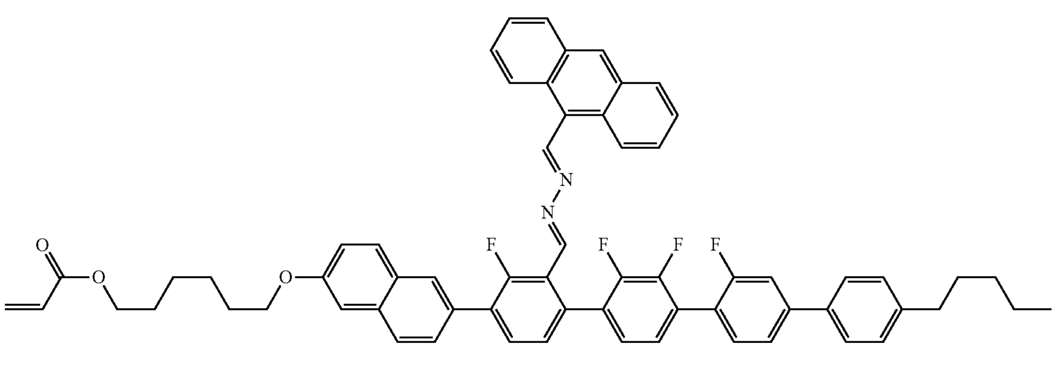

-continued
(1-a-69)
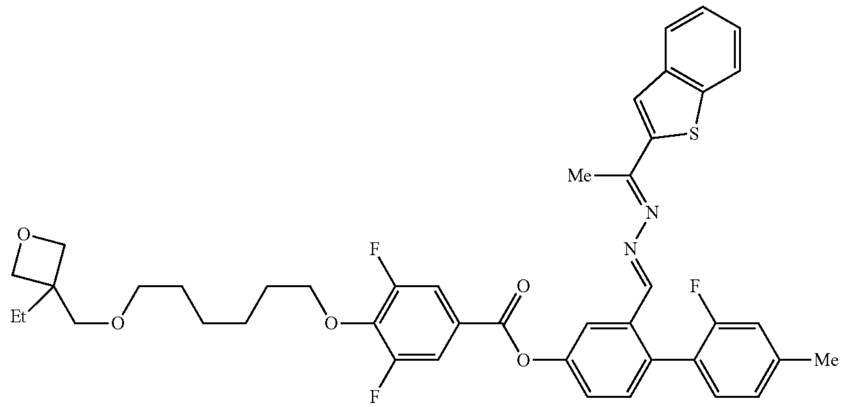
(1-a-70)
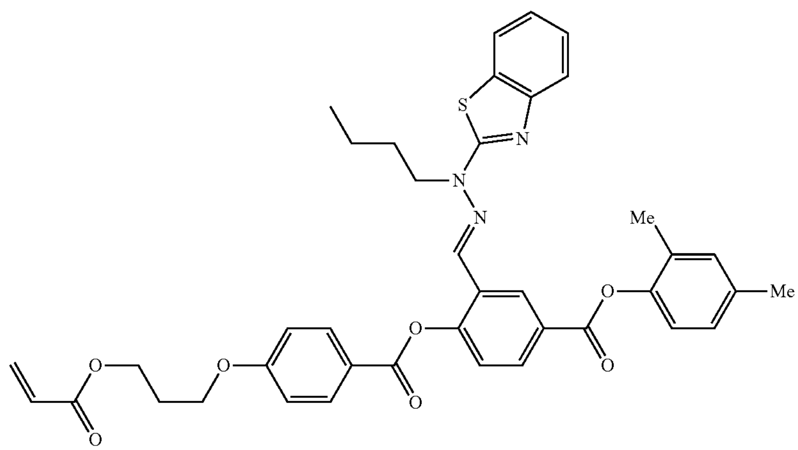
[Chem. 48]
(1-a-71)
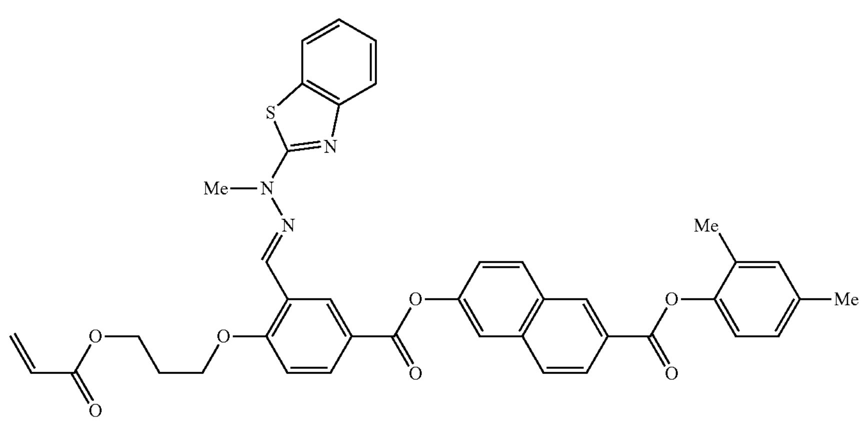

-continued
(1-a-72)
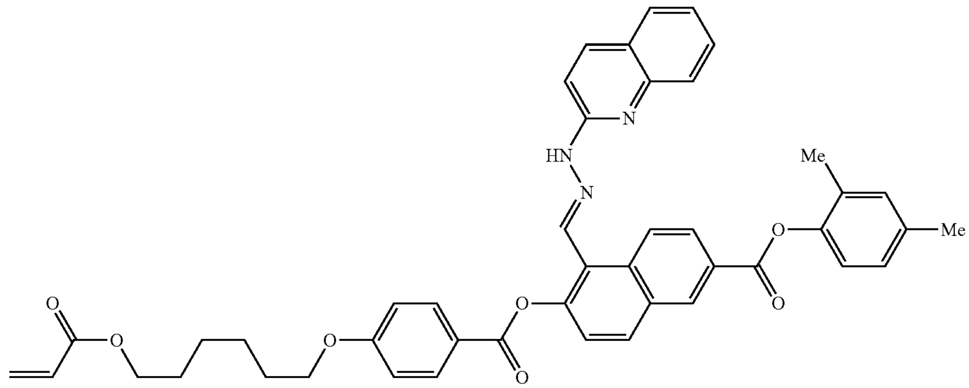
(1-a-73)
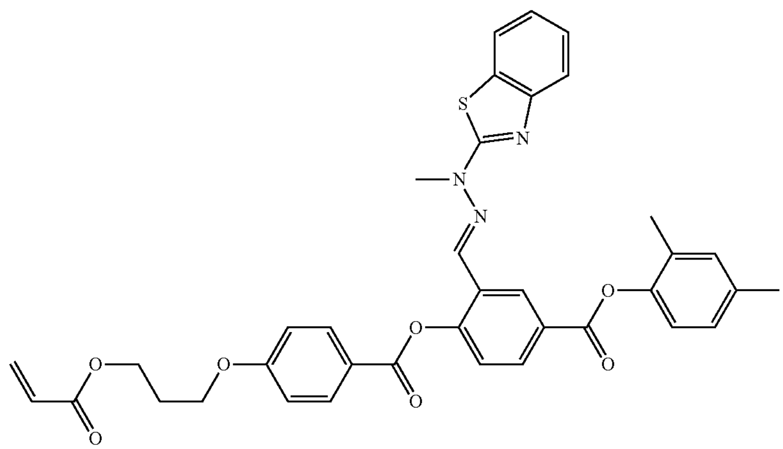
(1-a-75)
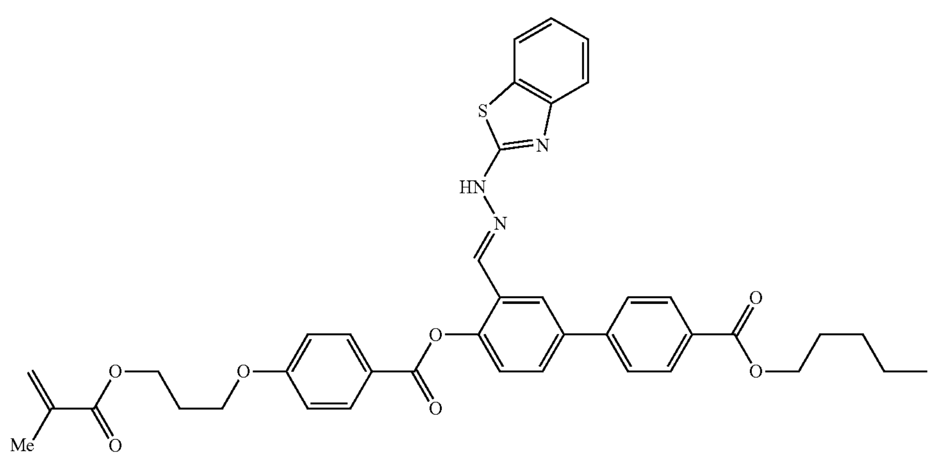

-continued
(1-a-76)
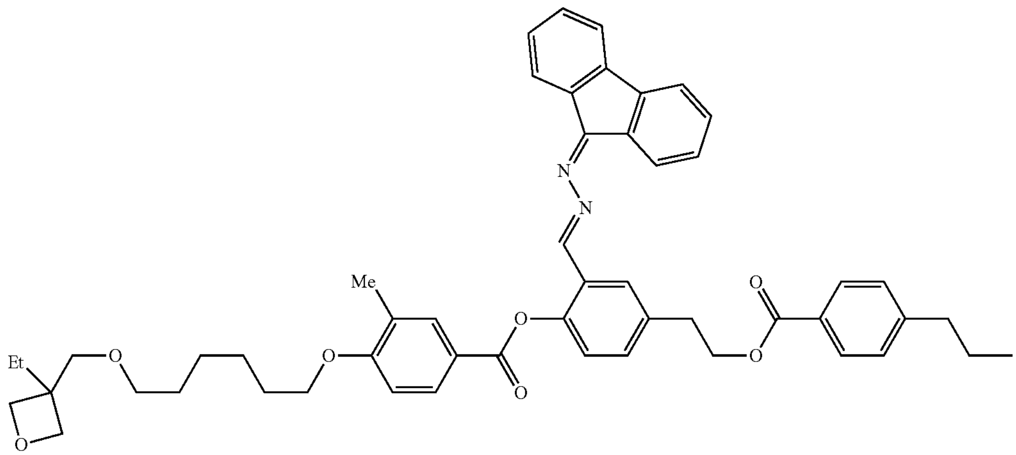
[Chem. 49]
(1-a-77)
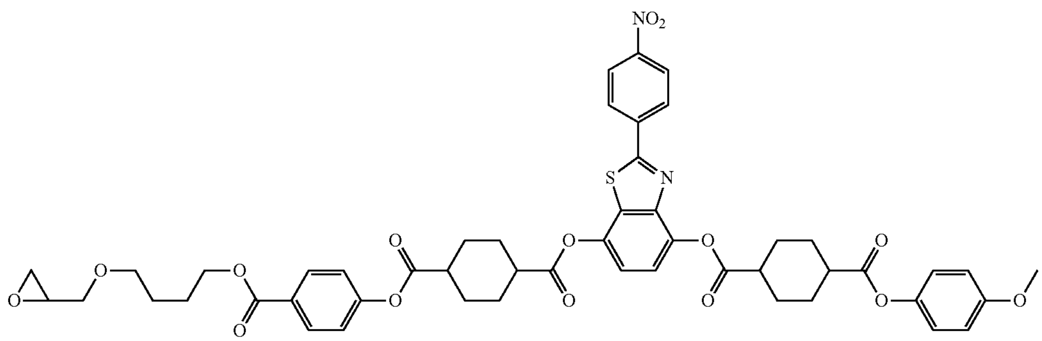
(1-a-78)
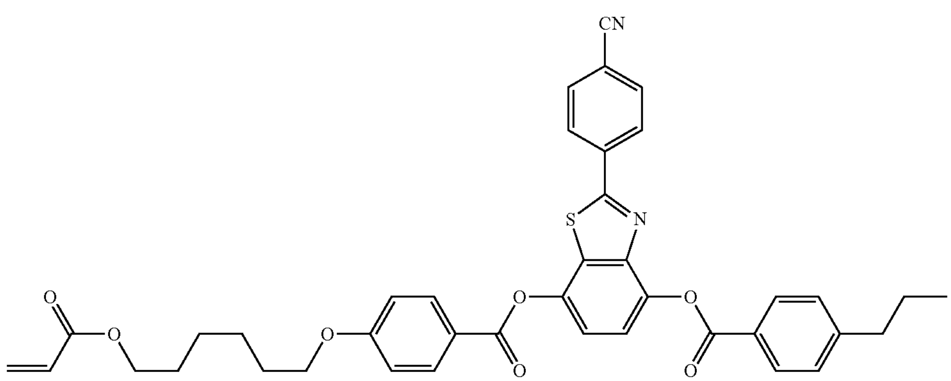
(1-a-79)
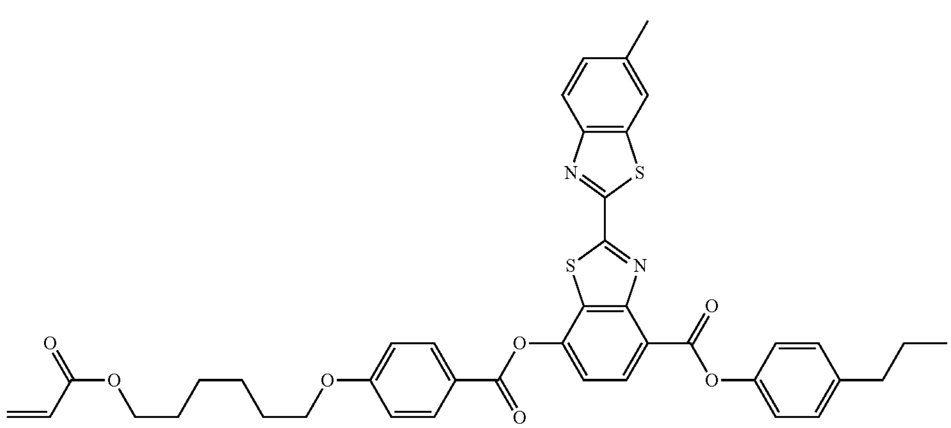

-continued
(1-a-80)
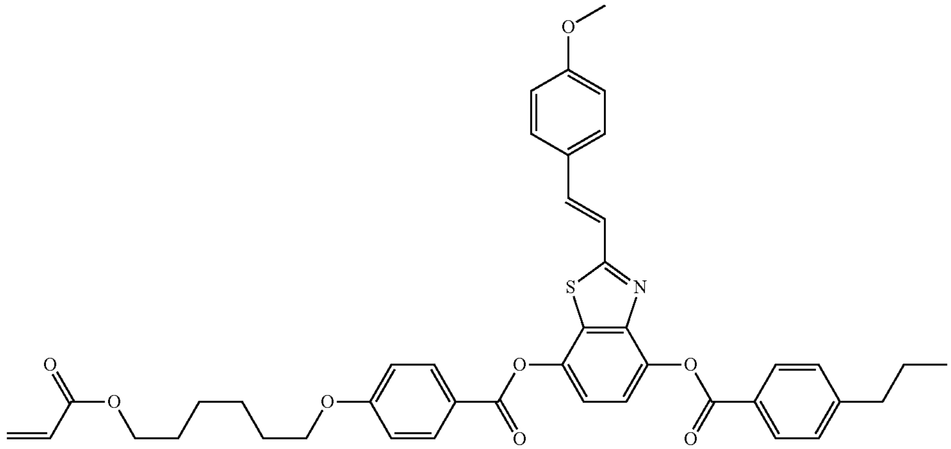
(1-a-81)
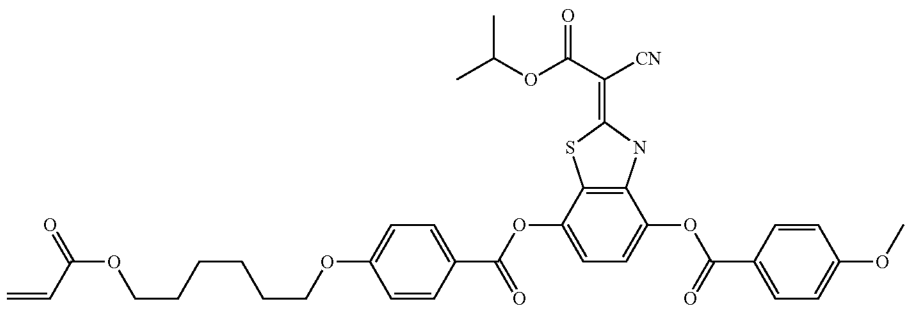
[Chem. 50]
(1-a-82)
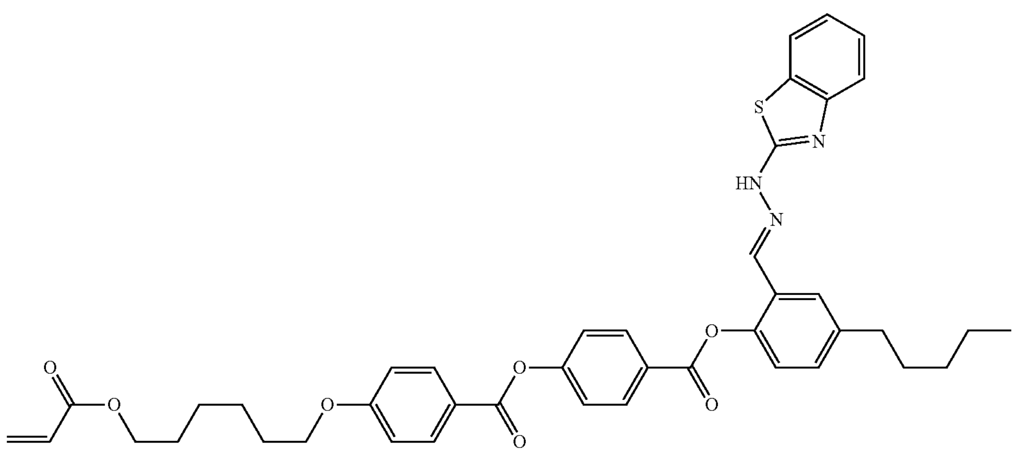
(1-a-83)
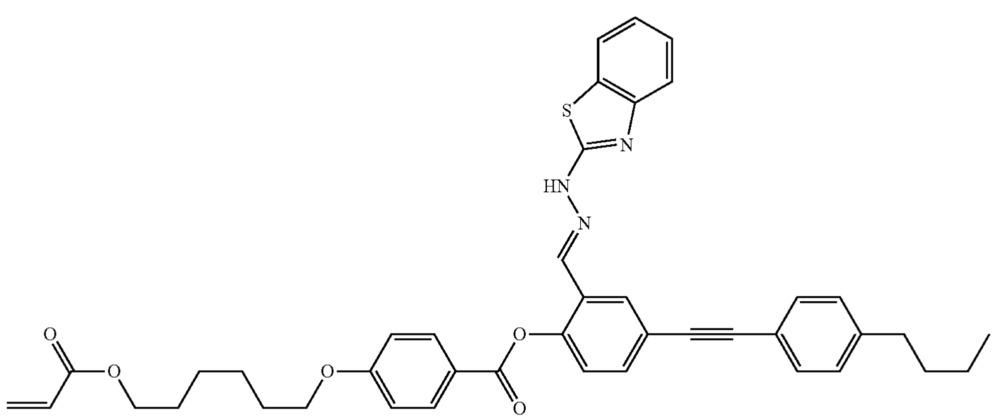

-continued
(1-a-84)
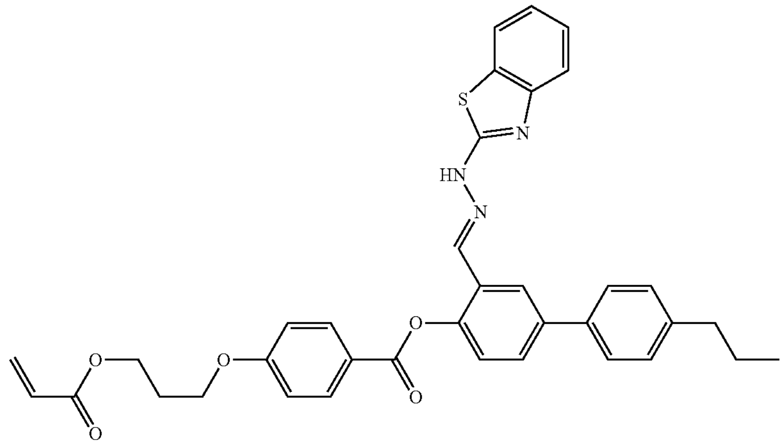
[Chem. 51]
(1-a-85)
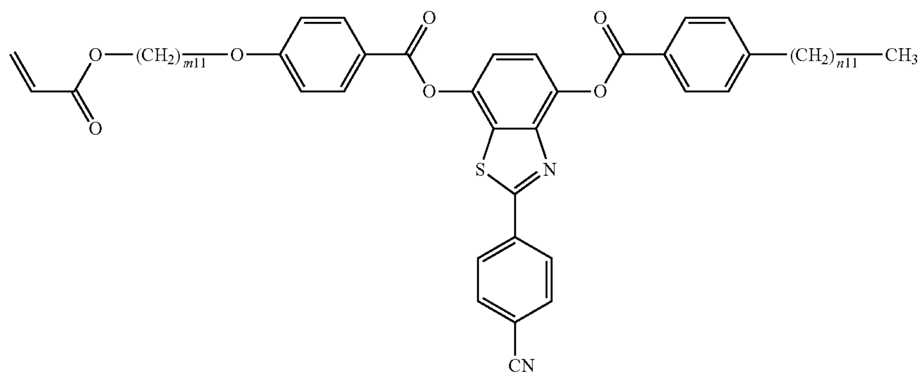
(1-a-86)
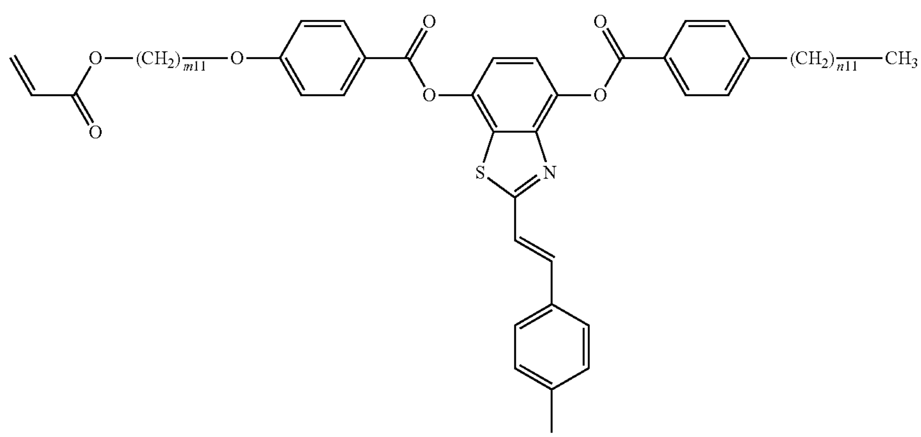
(1-a-87)
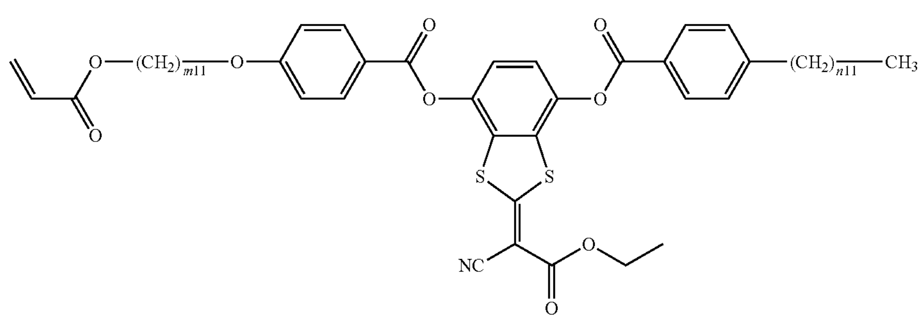

-continued
(1-a-88)
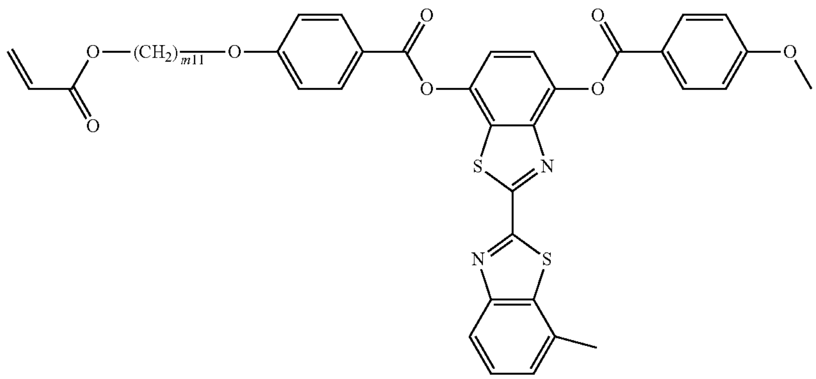
[Chem. 52]
(1-a-89)
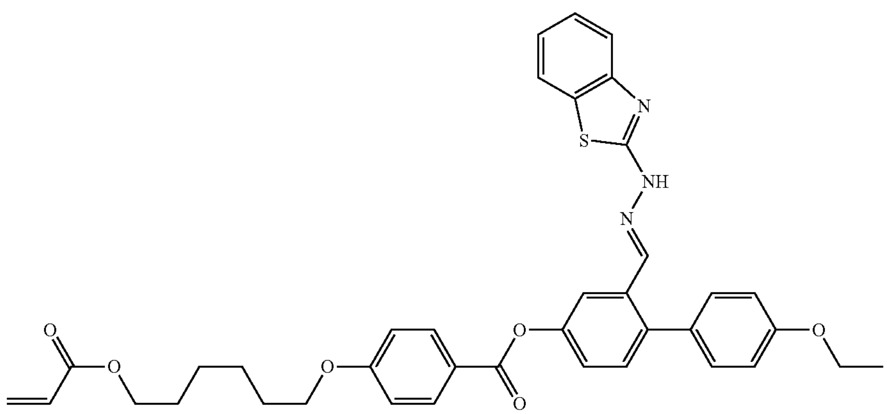
(1-a-90)
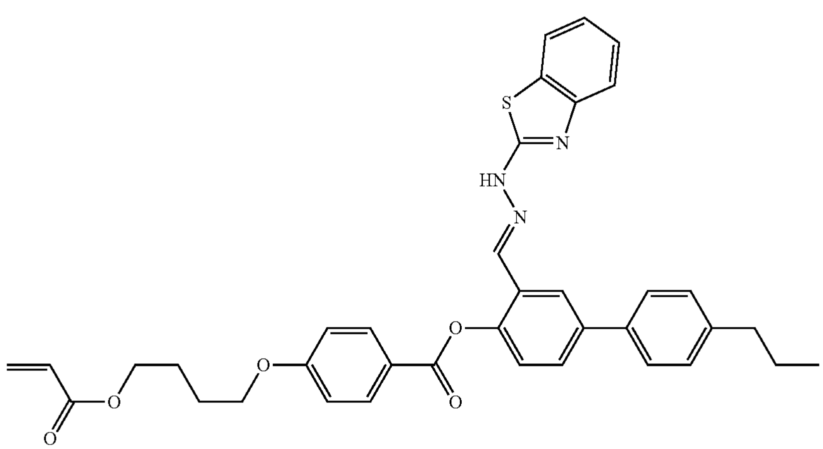

-continued
(1-a-91)
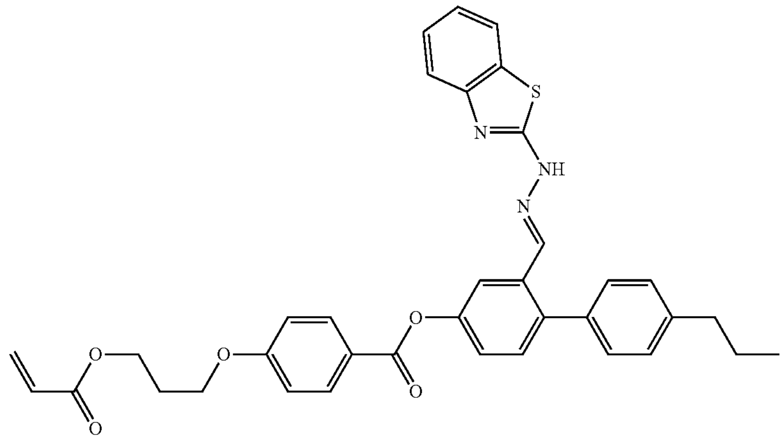
(1-a-92)
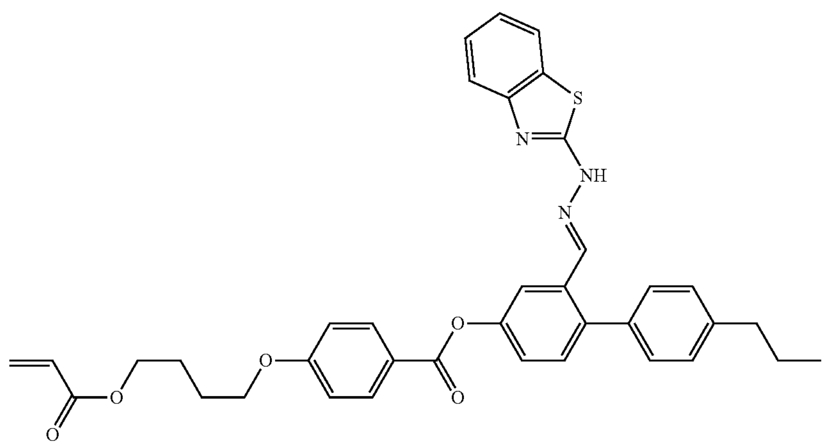
[Chem. 53]
(1-a-93)
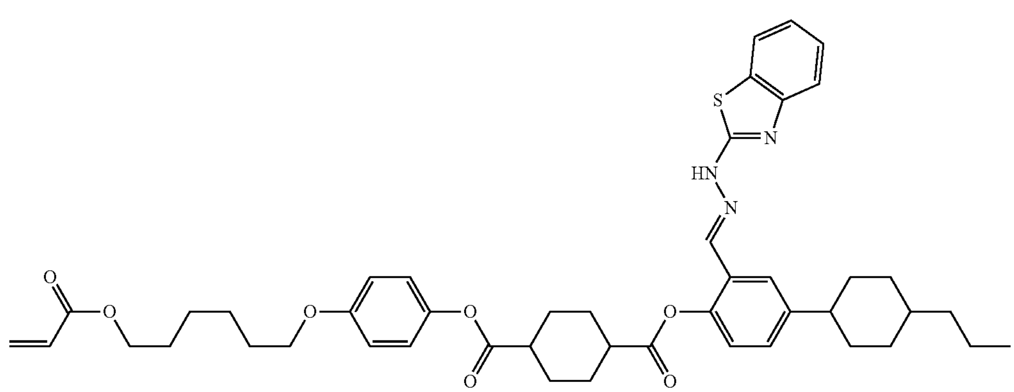

-continued
(1-a-94)
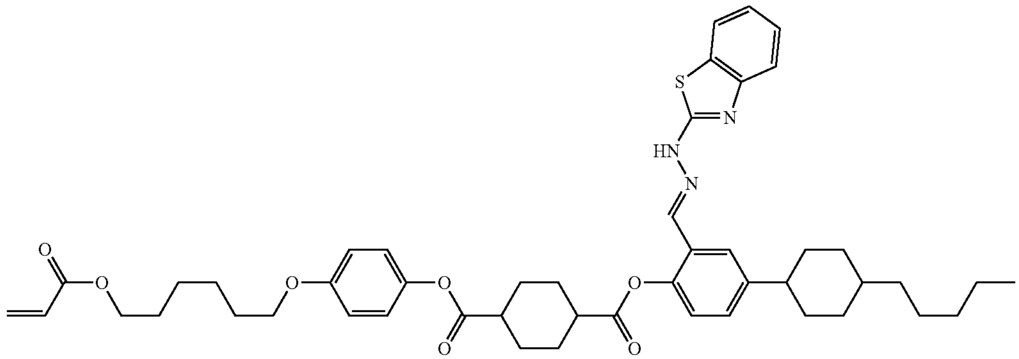
(1-a-95)
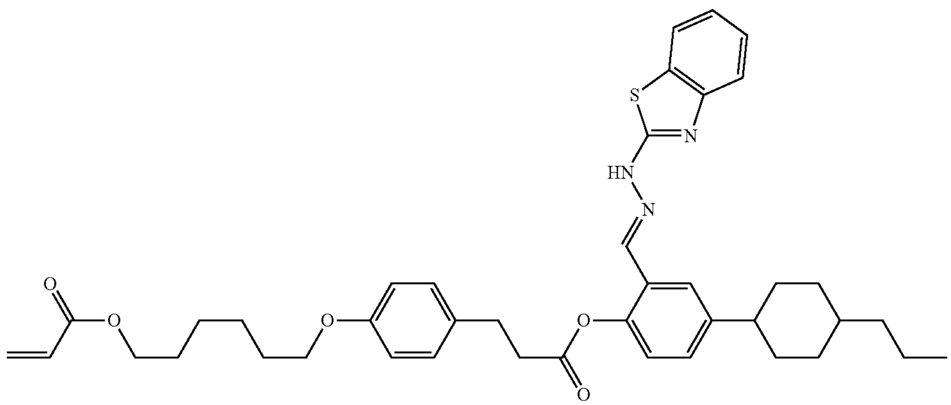
[Chem. 54]
(1-a-96)
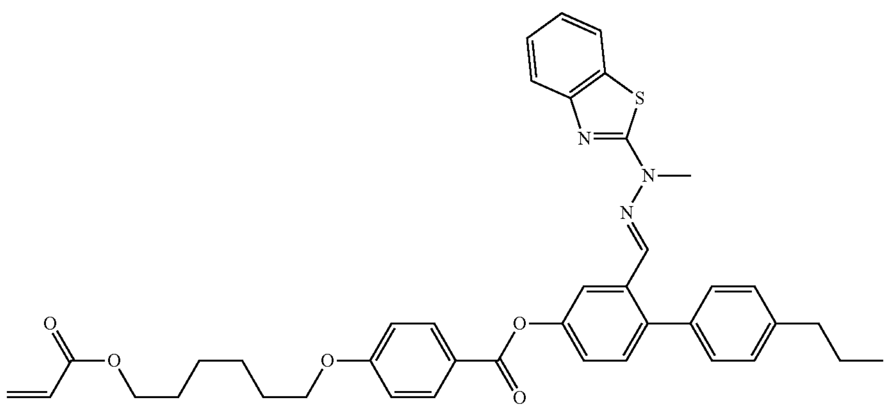
(1-a-97)
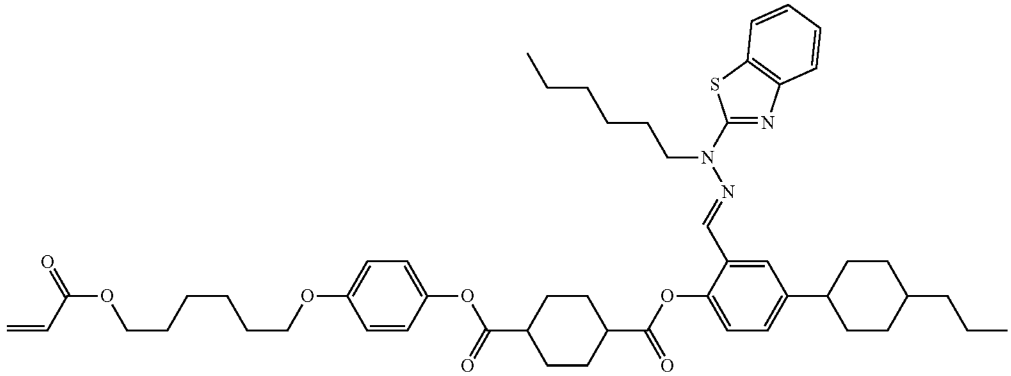

-continued
[Chem. 55]
(1-a-98)
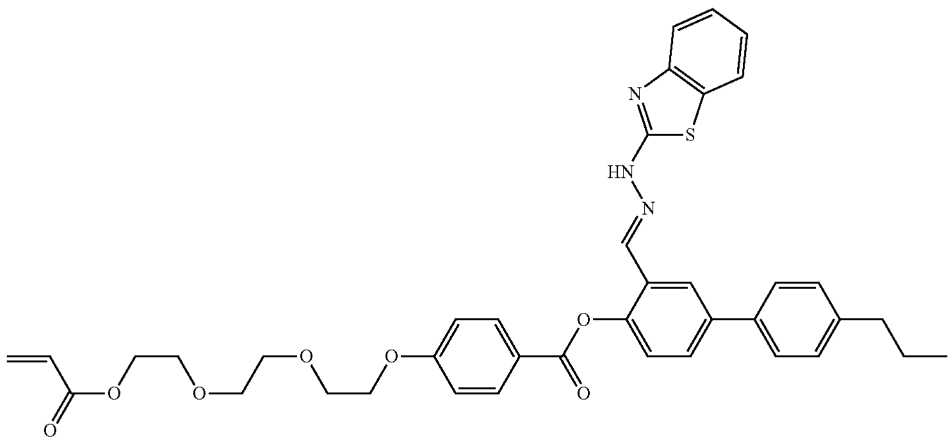
(1-a-99)
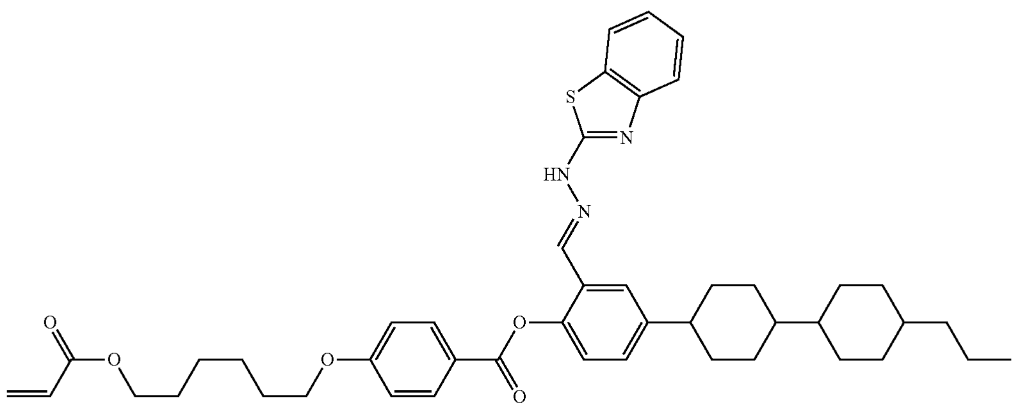
(1-a-100)
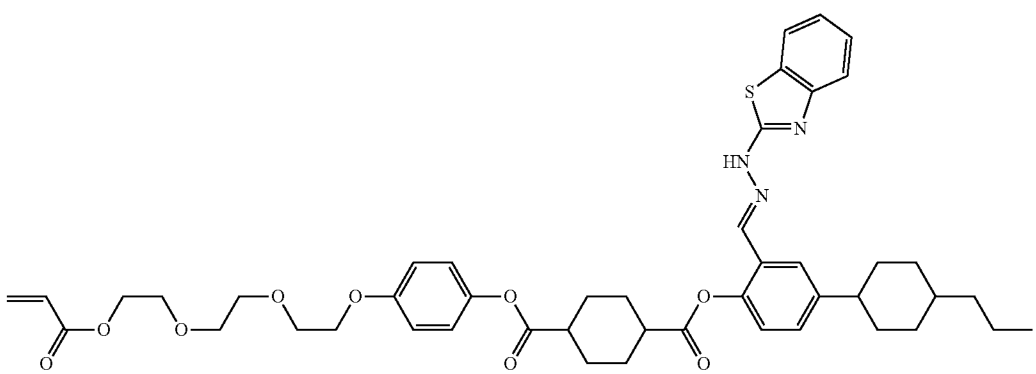
[Chem. 56]
(1-a-101)
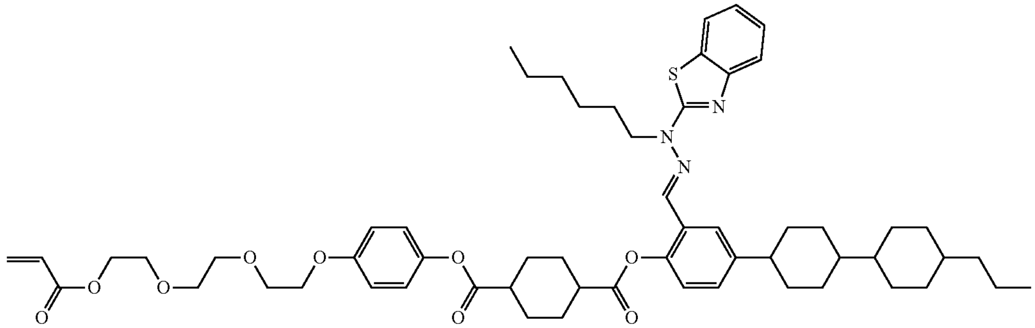

-continued
(1-a-102)
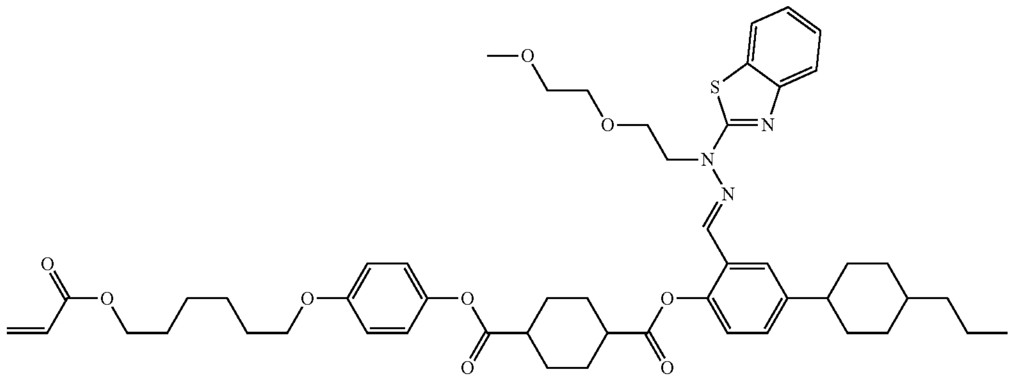
[Chem. 57]
(1-a-103)
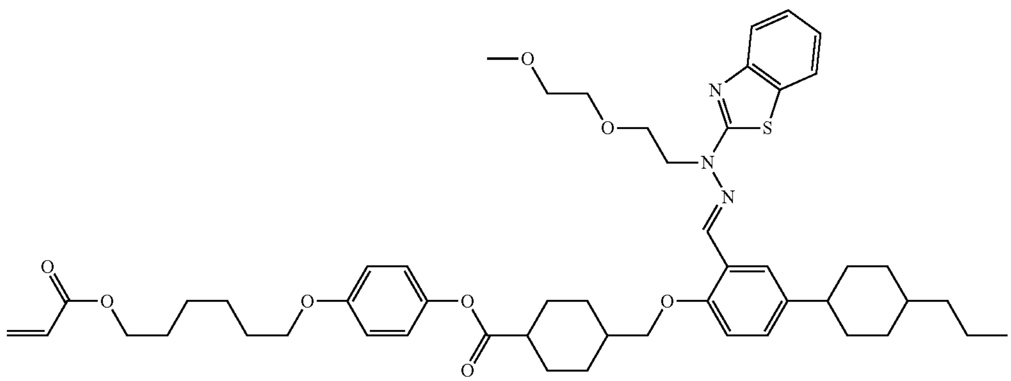
(1-a-104)
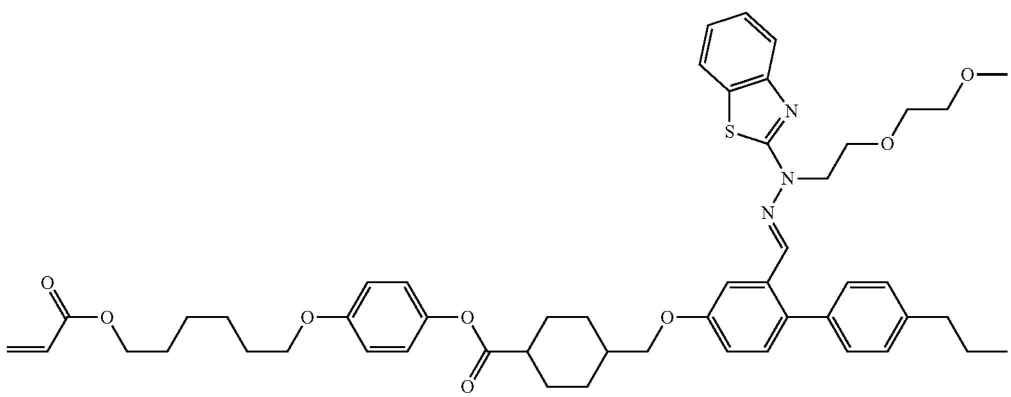
(1-a-105)
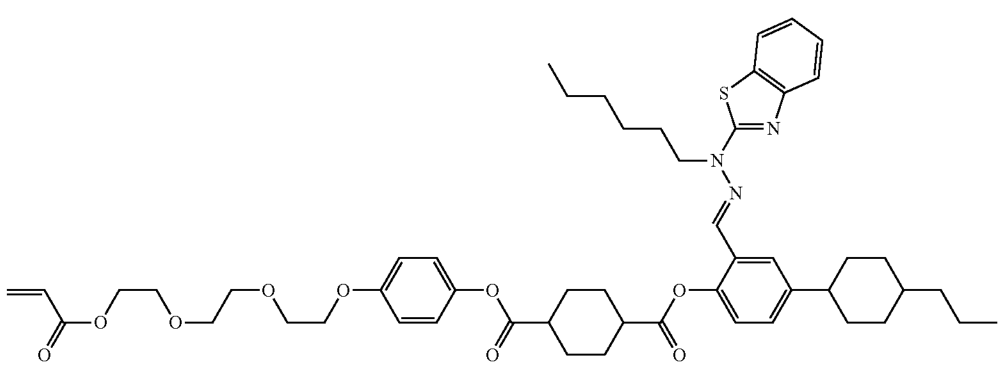

These liquid crystalline compounds may be used alone or as a mixture of two or more.
Specifically, the compound represented by general formula (2) is preferably compounds represented by the following formula (2-a-1) to formula (2-a-61):
[Chem. 58]
(2-a-1)
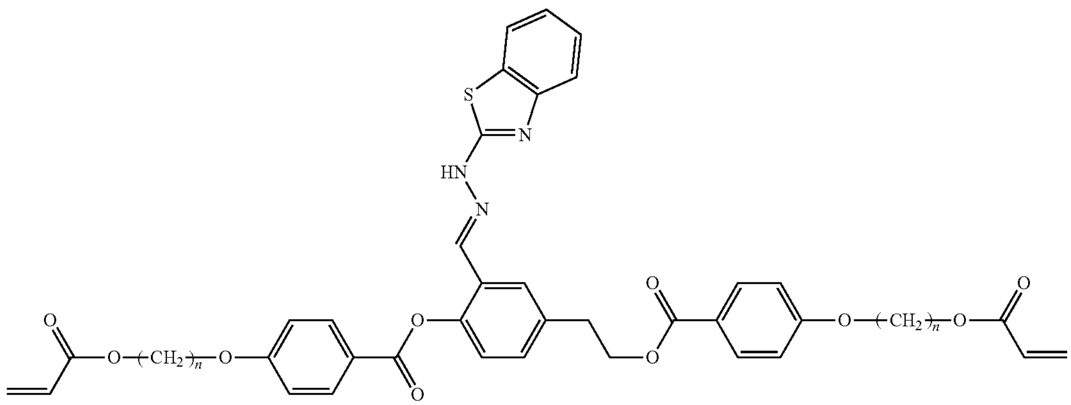
(2-a-2)
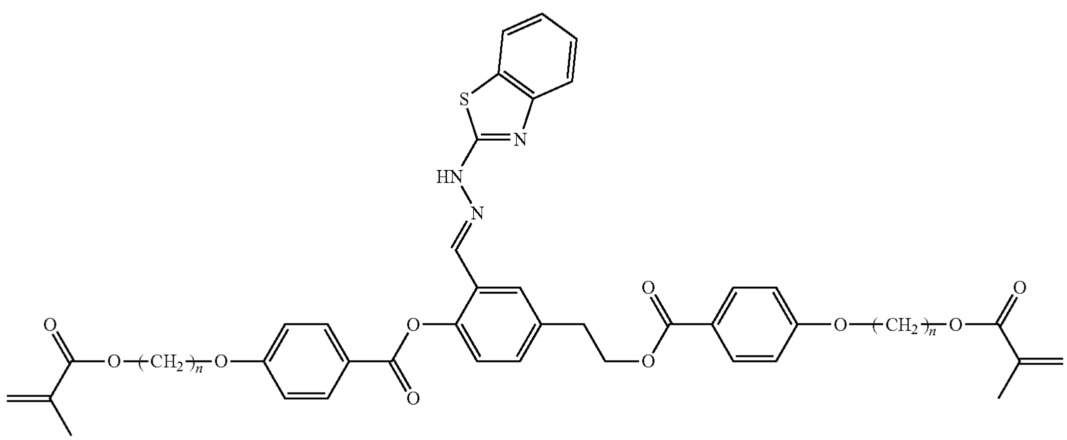
(2-a-3)
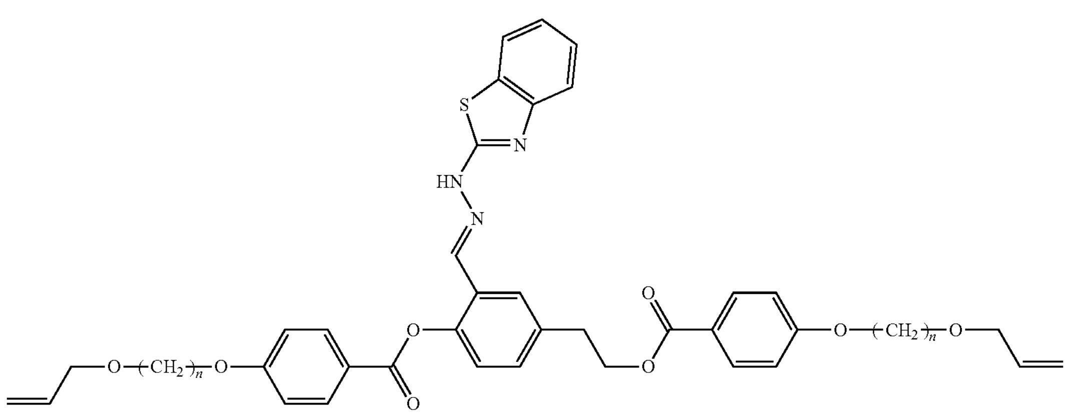

-continued
(2-a-4)
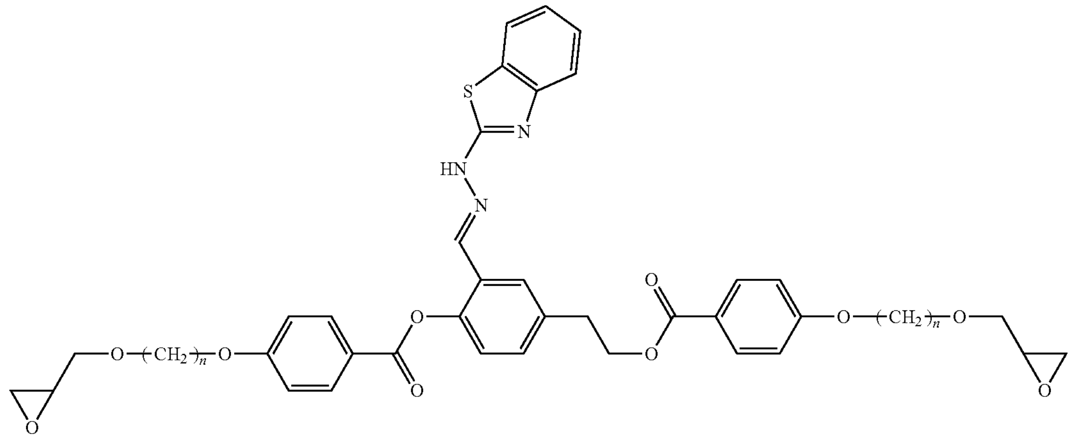
(2-a-5)
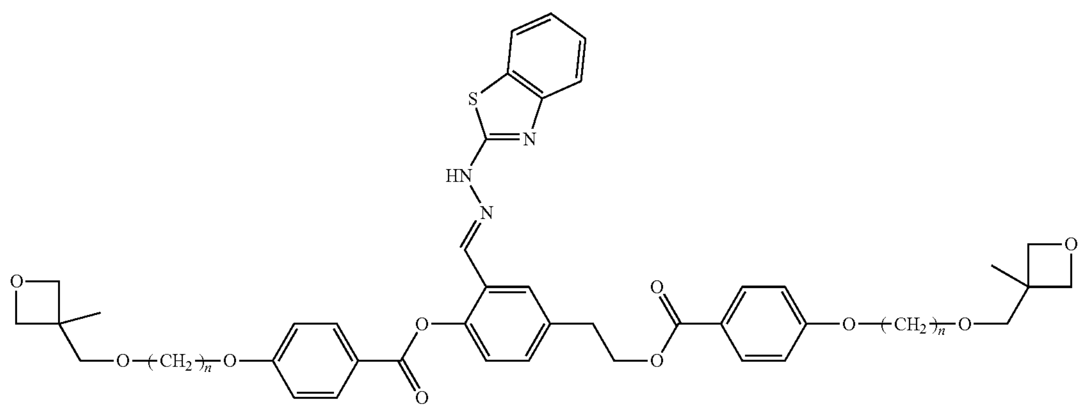
[Chem. 59]
(2-a-6)
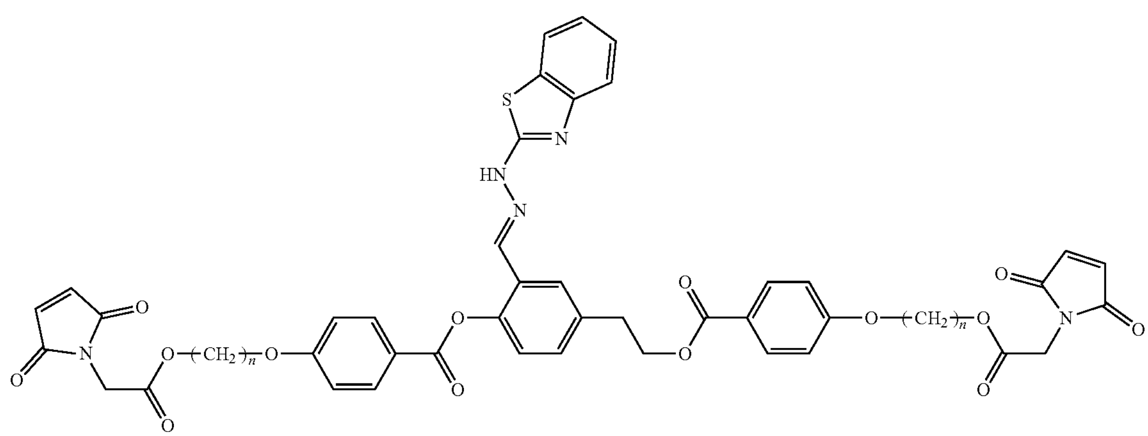

-continued
(2-a-7)
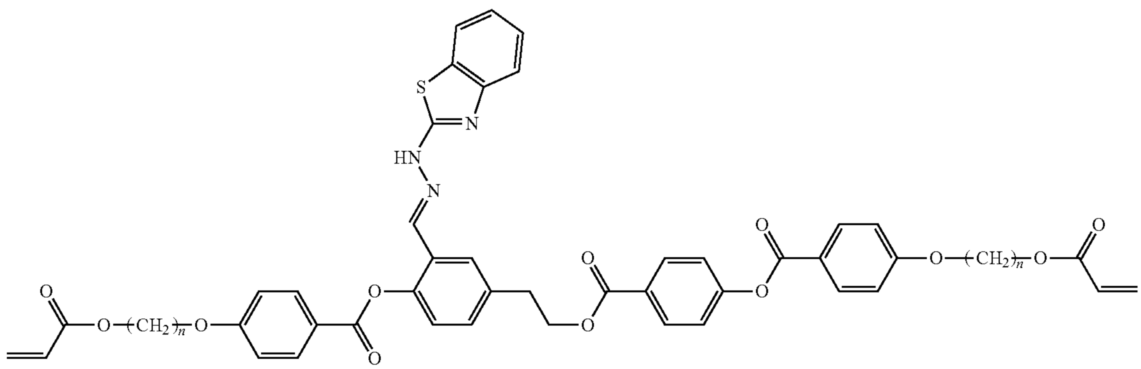
(2-a-8)
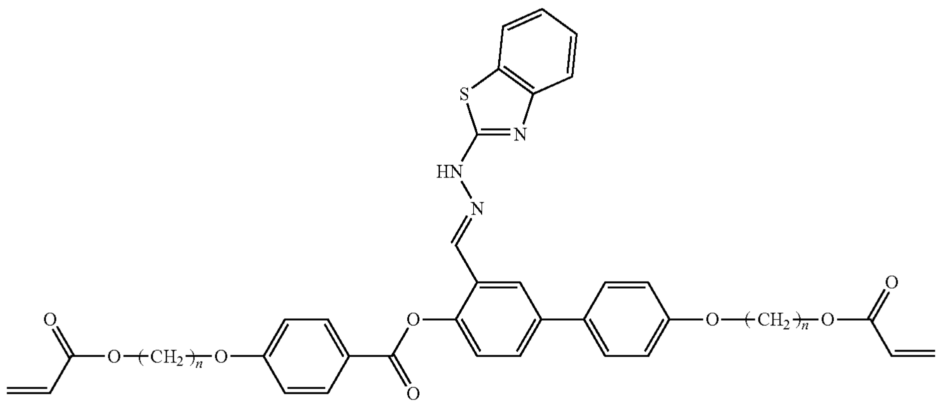
(2-a-9)
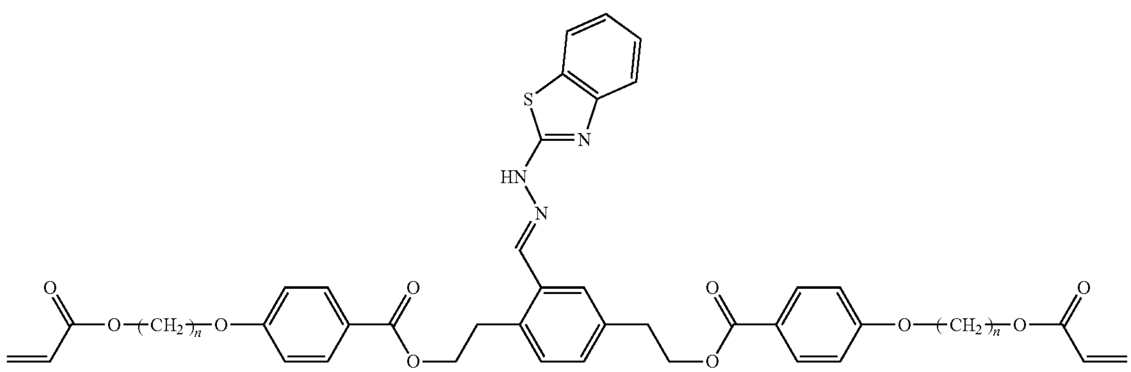
(2-a-10)
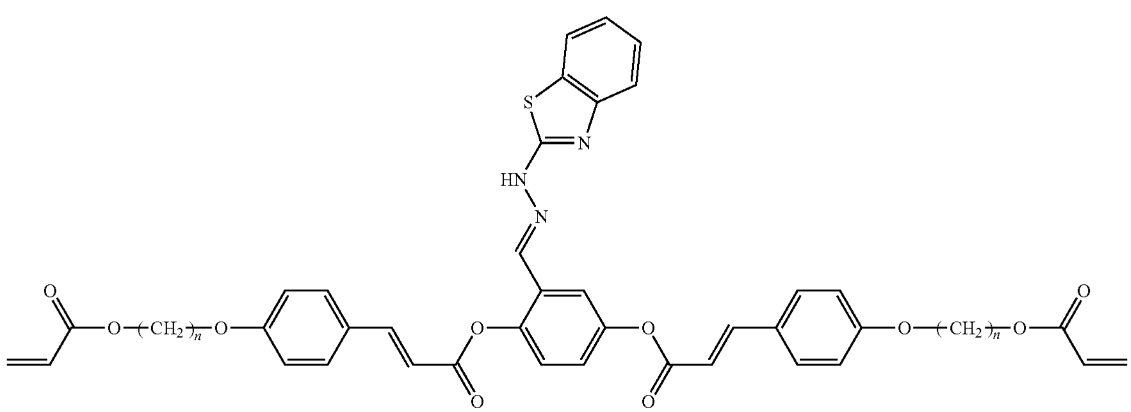

-continued
[Chem. 60]
(2-a-11)
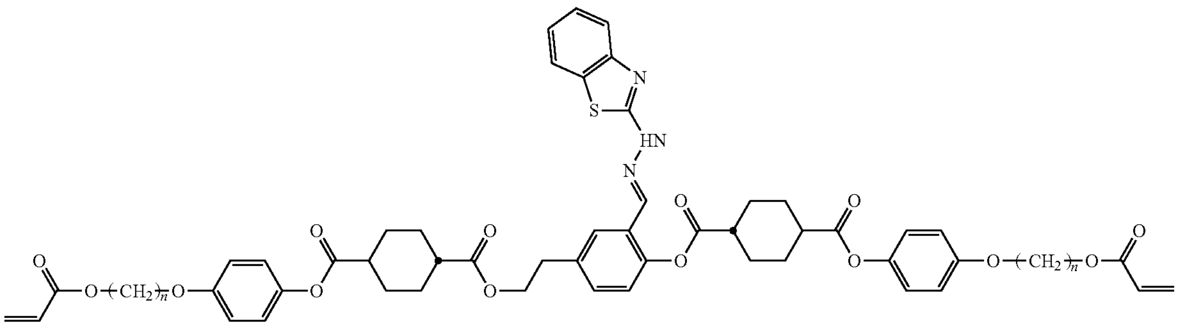
(2-a-12)
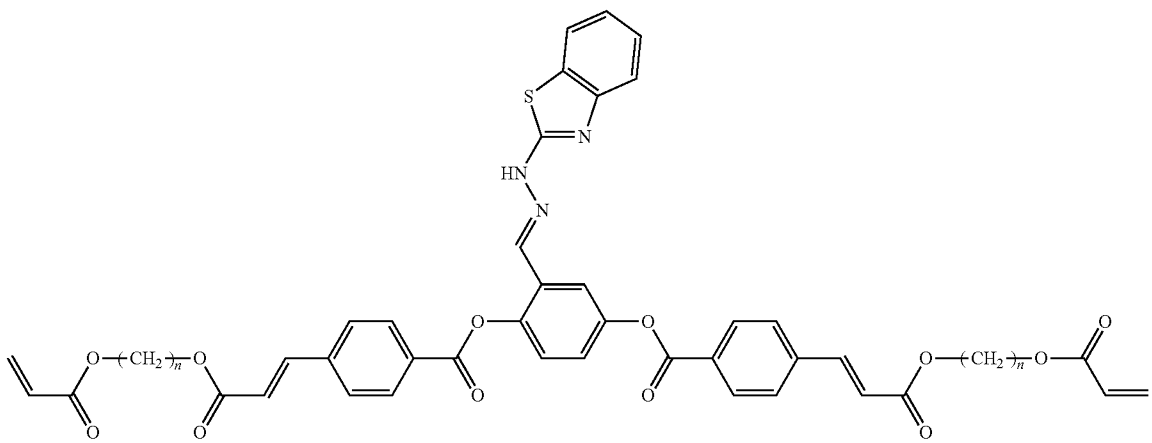
(2-a-13)
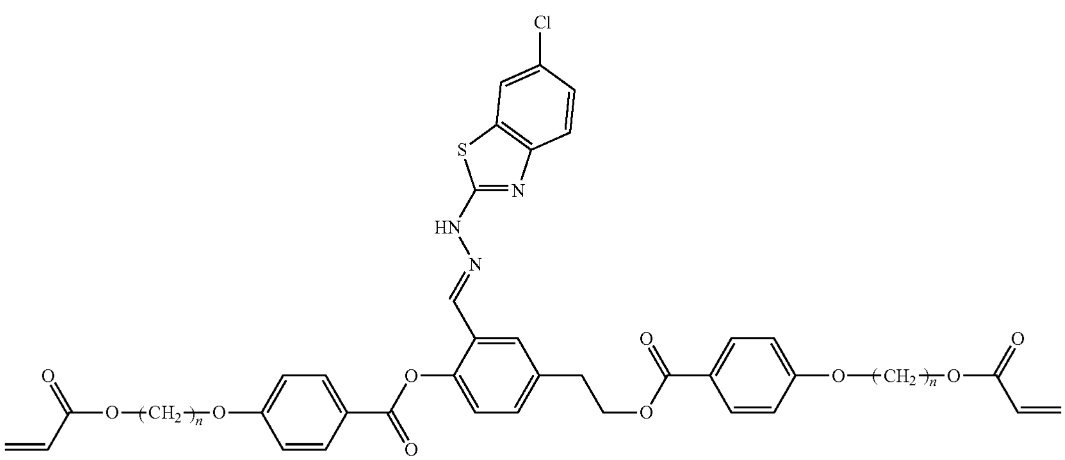

-continued
(2-a-14)
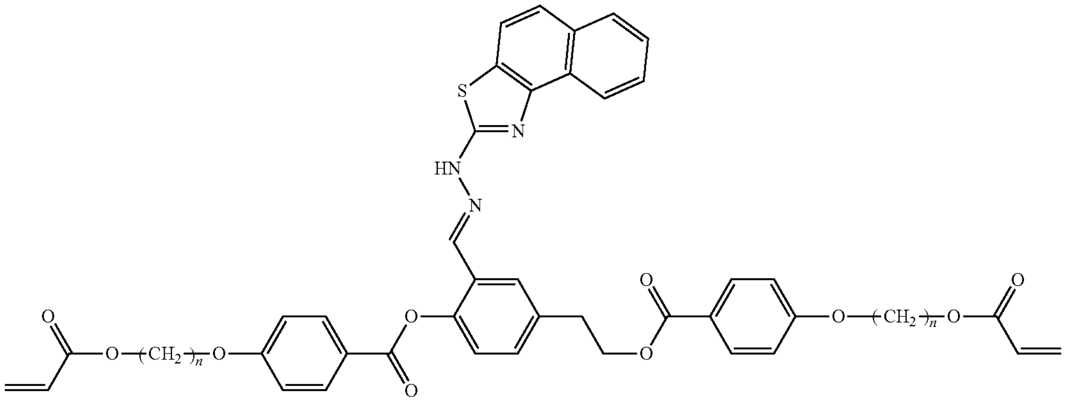
(2-a-15)
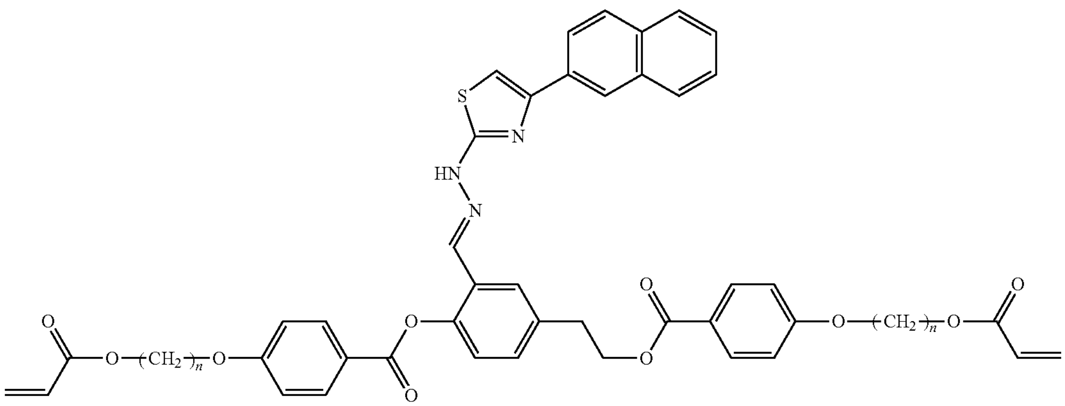
[Chem. 61]
(2-a-16)
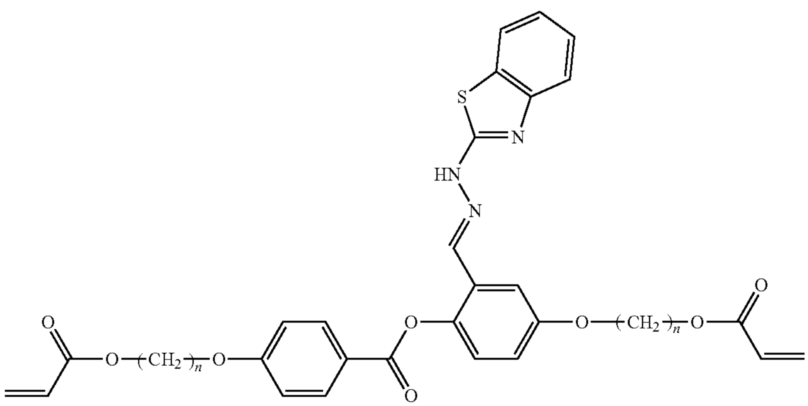
(2-a-17)
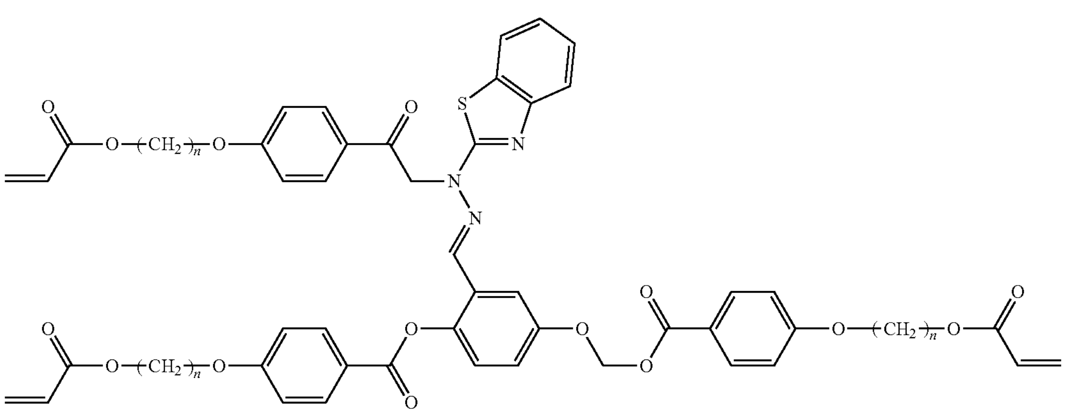

-continued
(2-a-18)
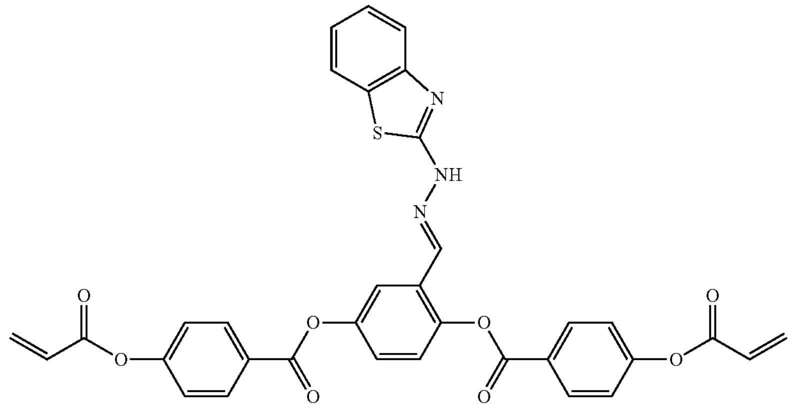
(2-a-19)
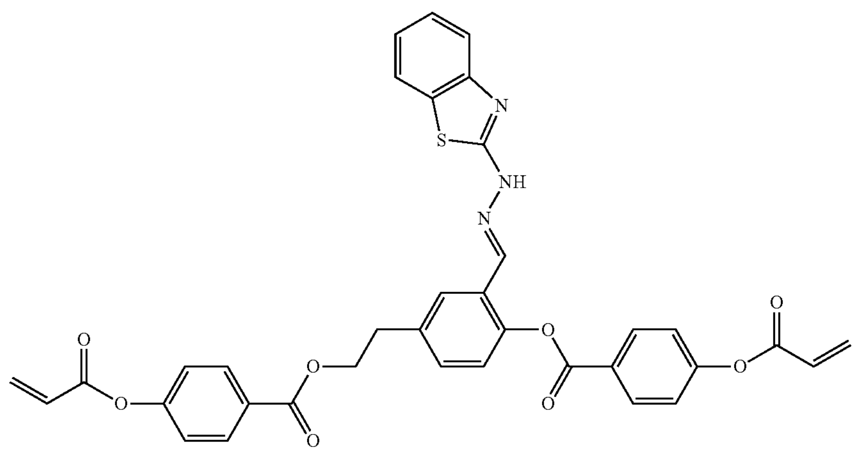
(2-a-20)
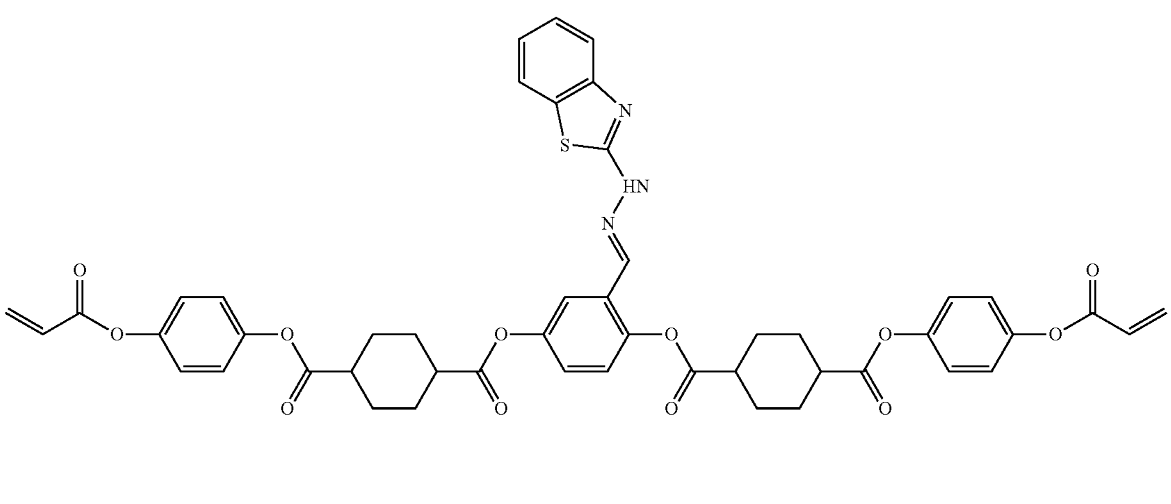

-continued
[Chem. 62]
(2-a-21)
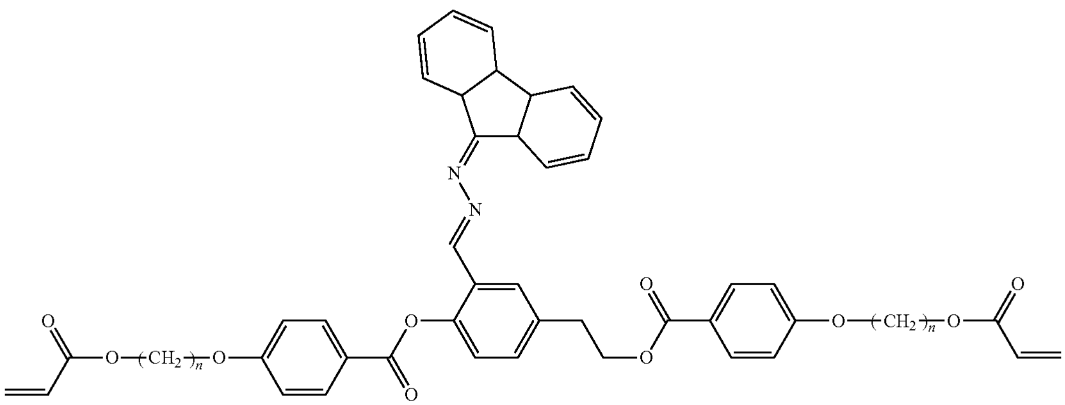
(2-a-22)
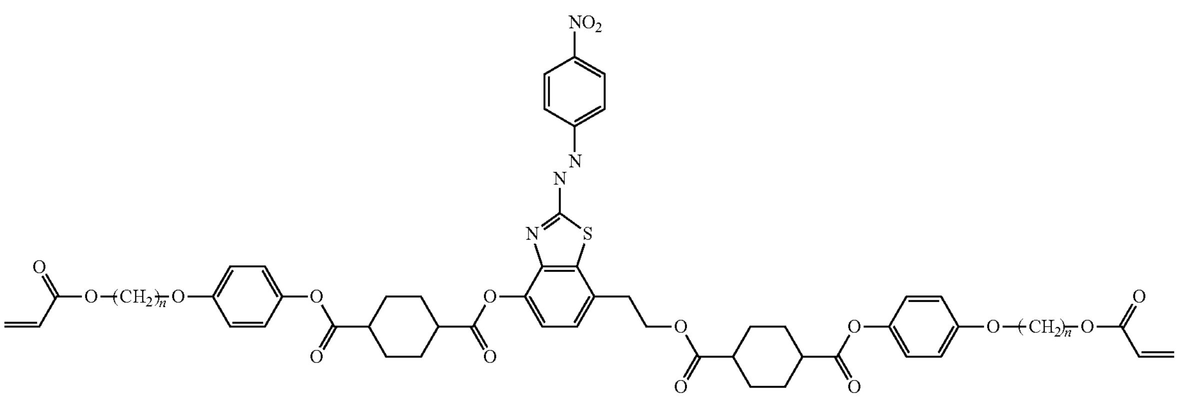
(2-a-23)
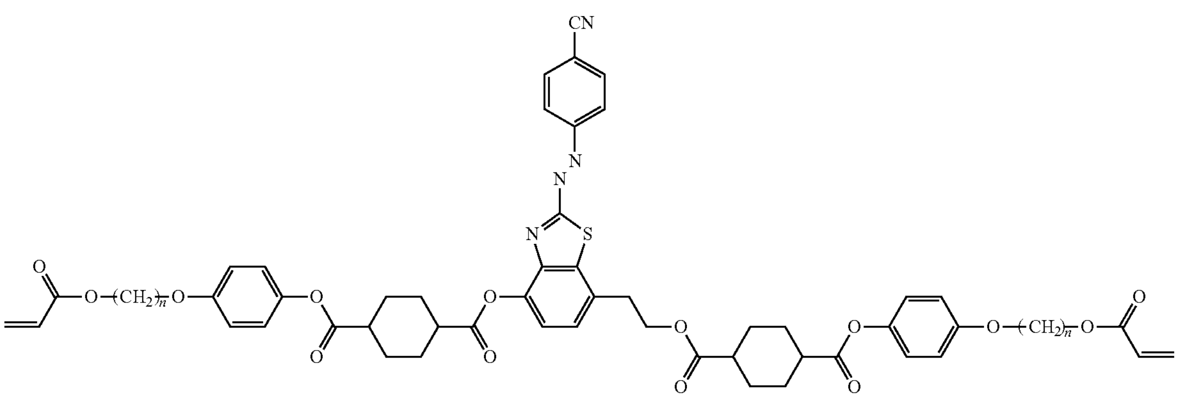
(2-a-24)
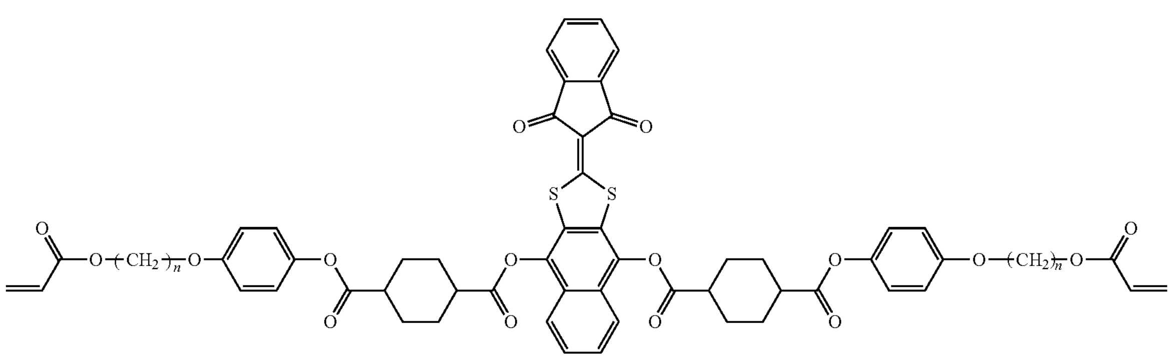

-continued
(2-a-25)
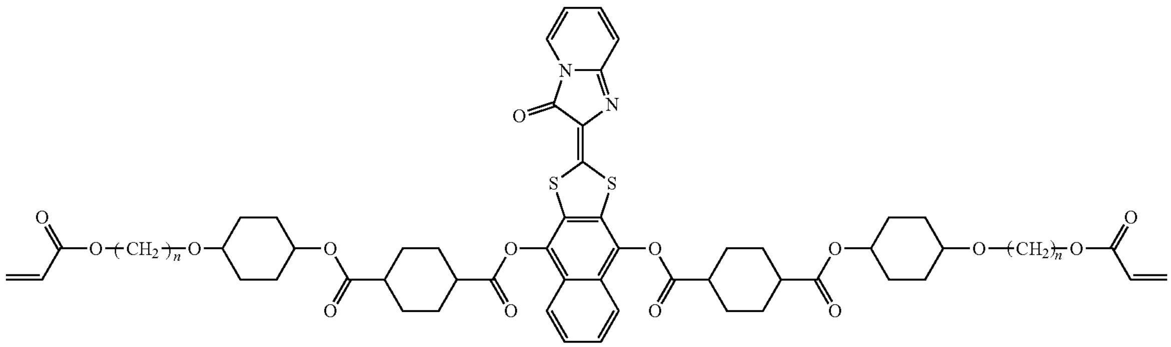
[Chem. 63]
(2-a-26)
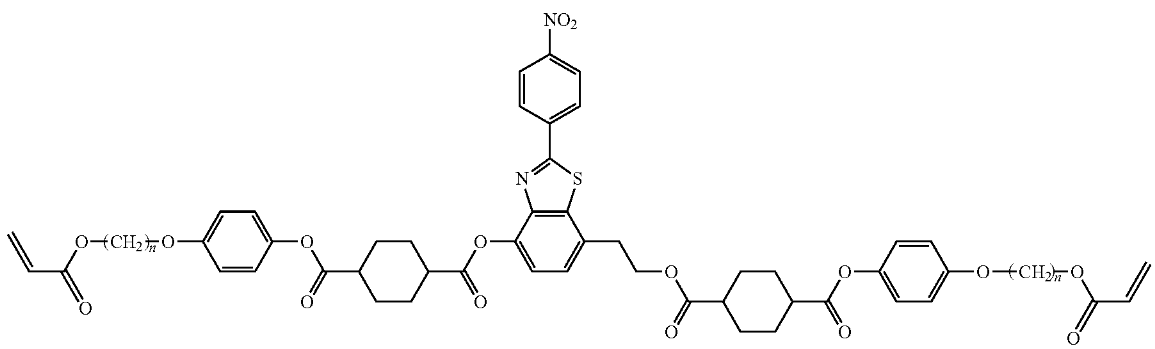
(2-a-27)
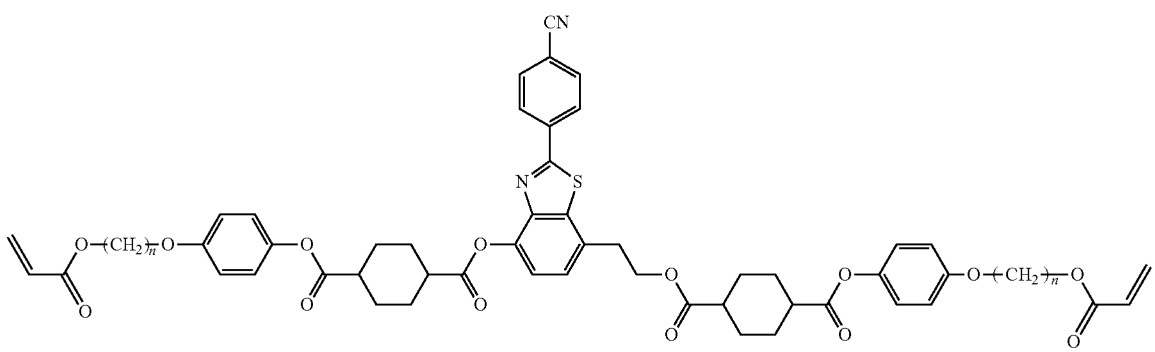
(2-a-28)
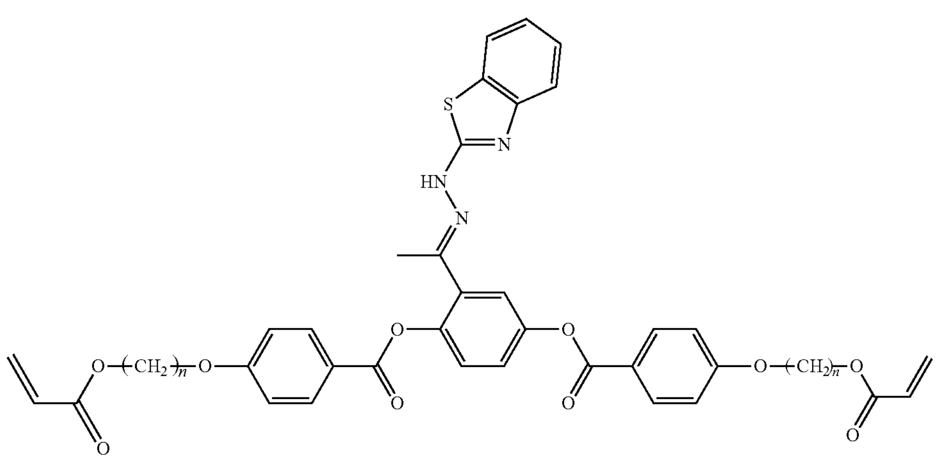

-continued
(2-a-29)
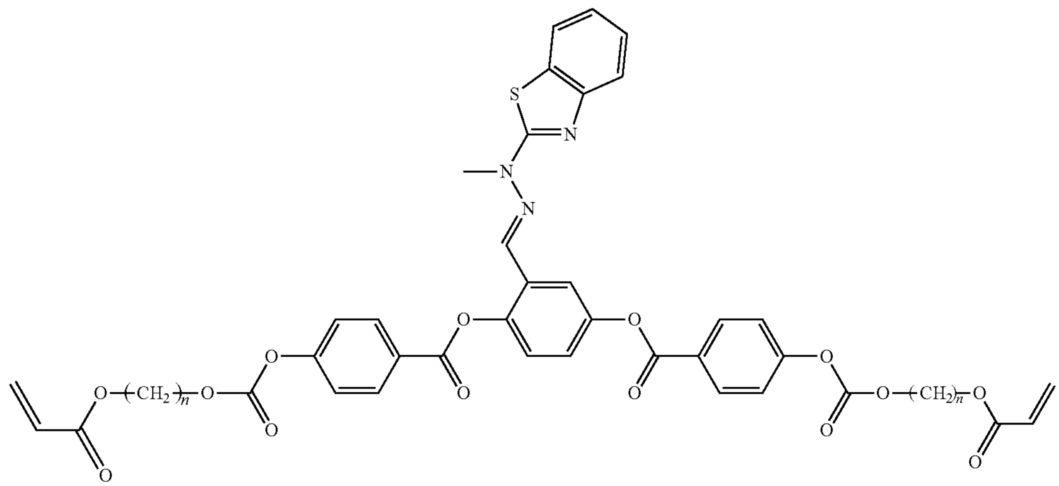
[Chem. 64]
(2-a-30)
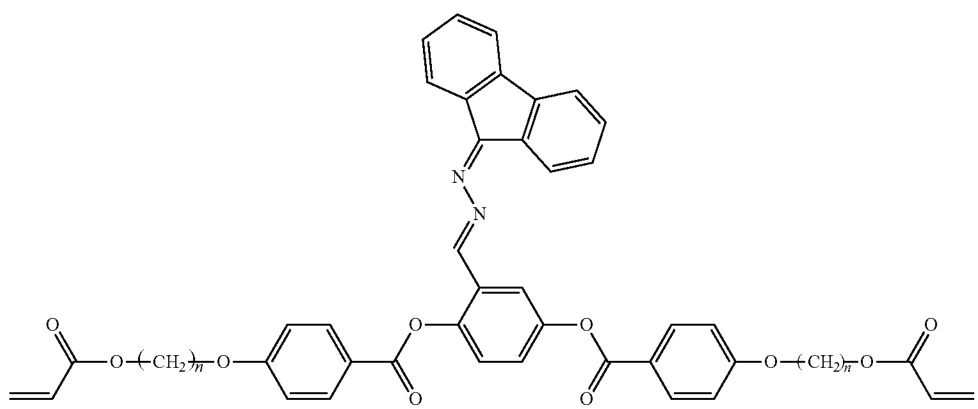
(2-a-31)
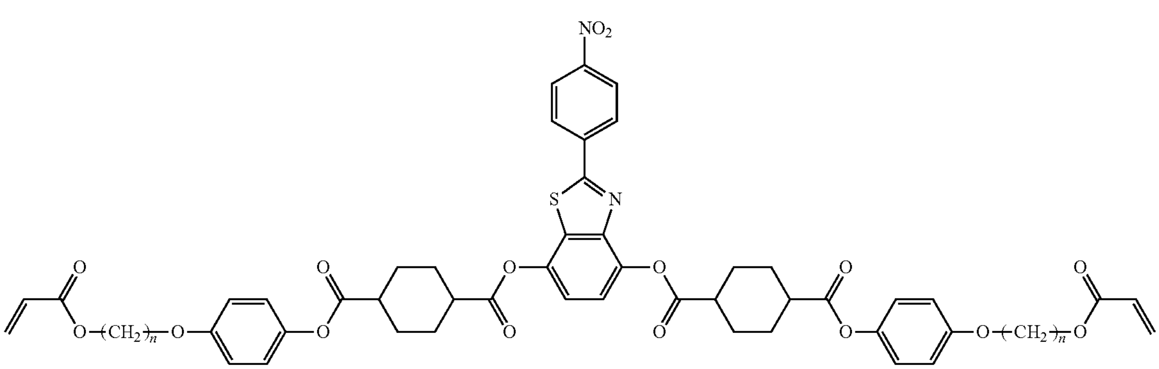

-continued
(2-a-32)
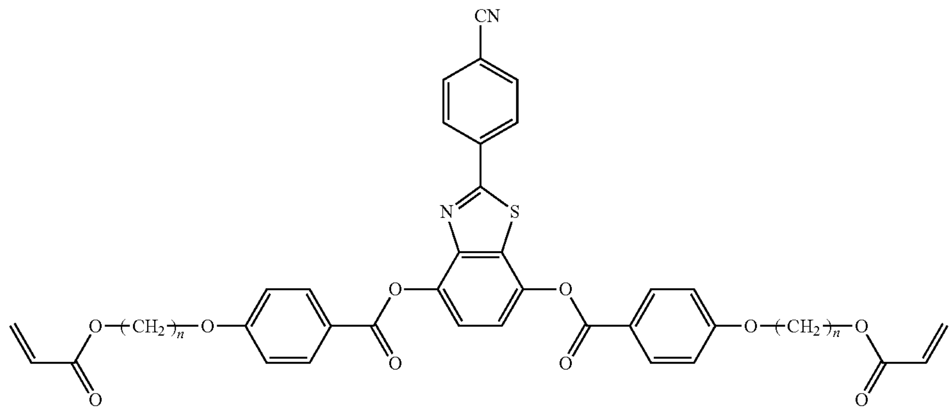
[Chem. 65]
(2-a-33)
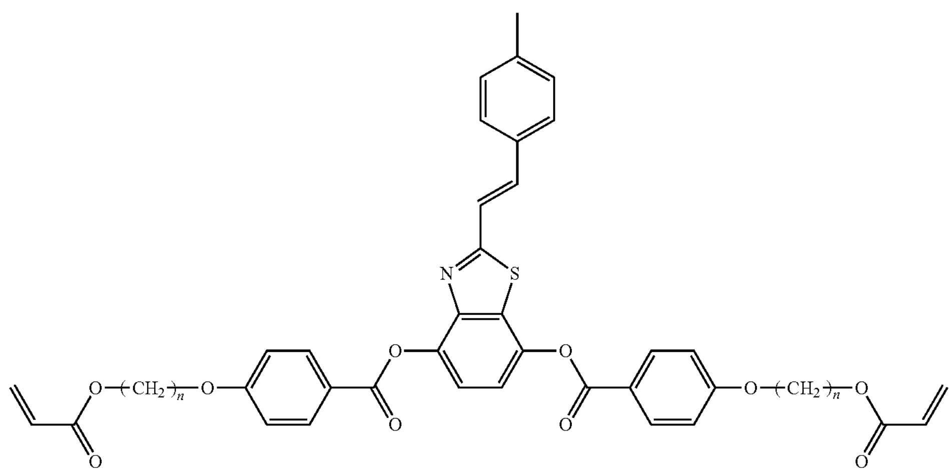
(2-a-34)
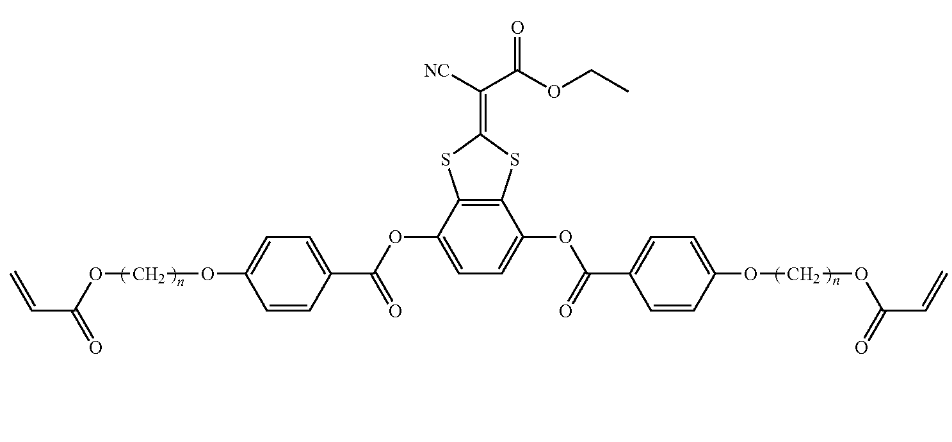

-continued
(2-a-35)
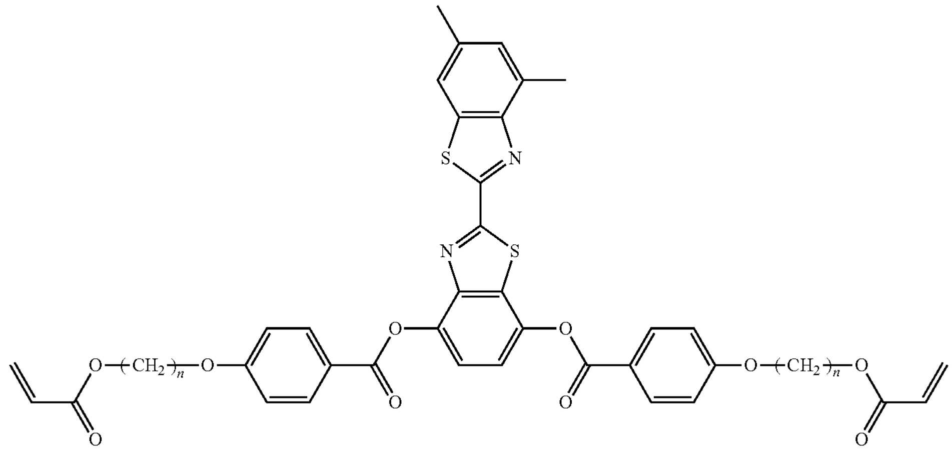
(2-a-36)
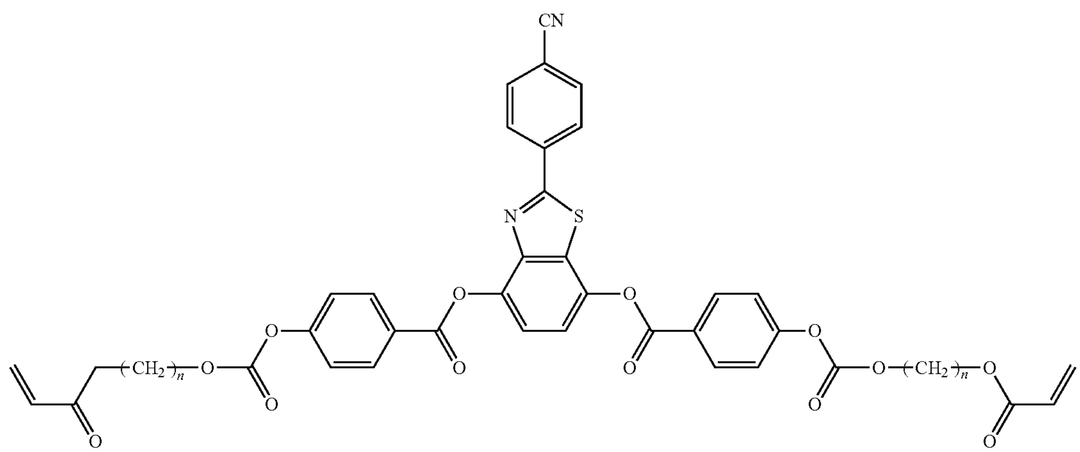
[Chem. 66]
(2-a-37)
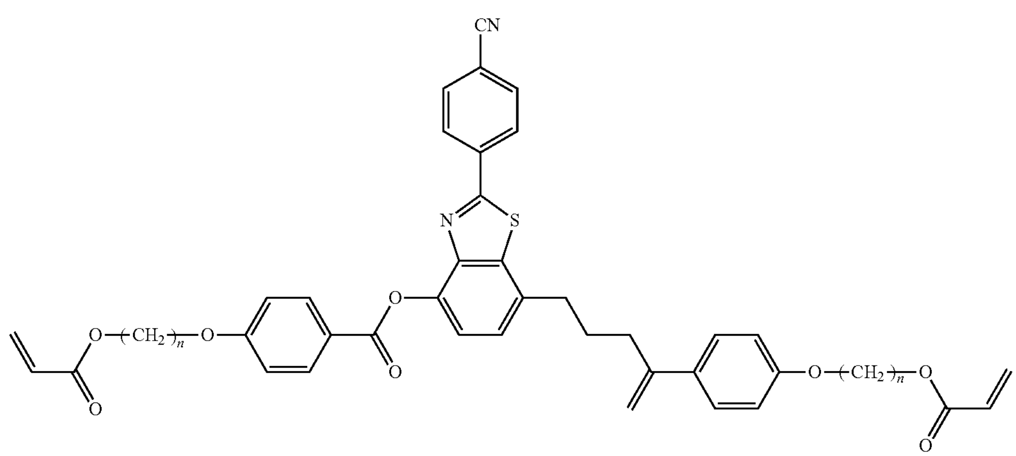

-continued
(2-a-38)
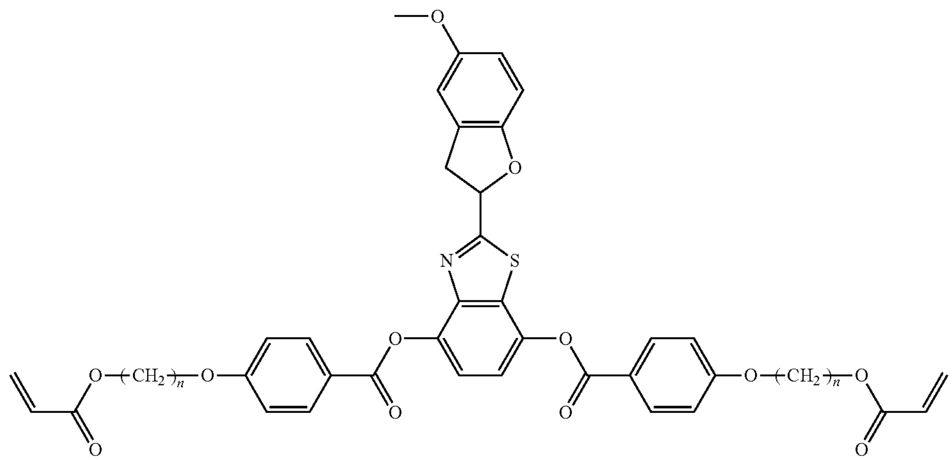
(2-a-39)
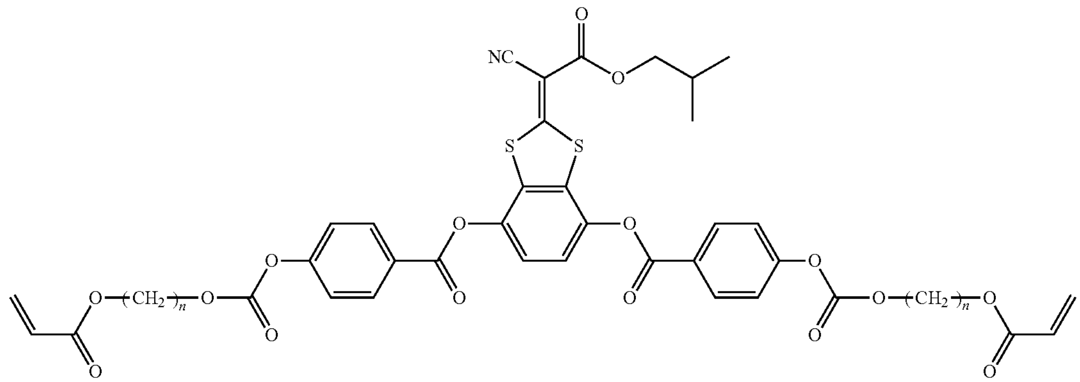
(2-a-40)
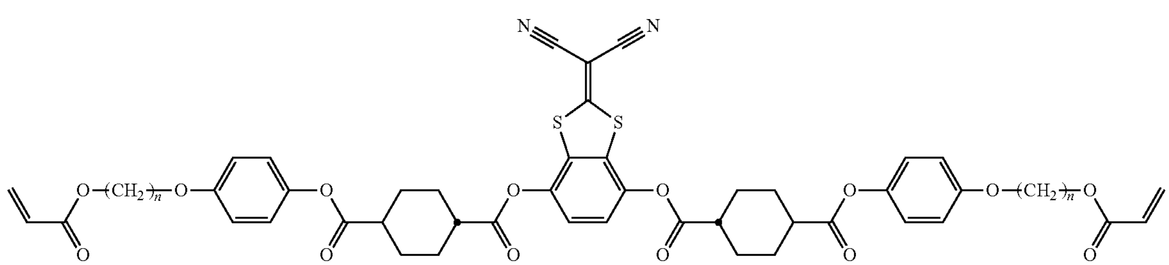
[Chem. 67]
(2-a-41)
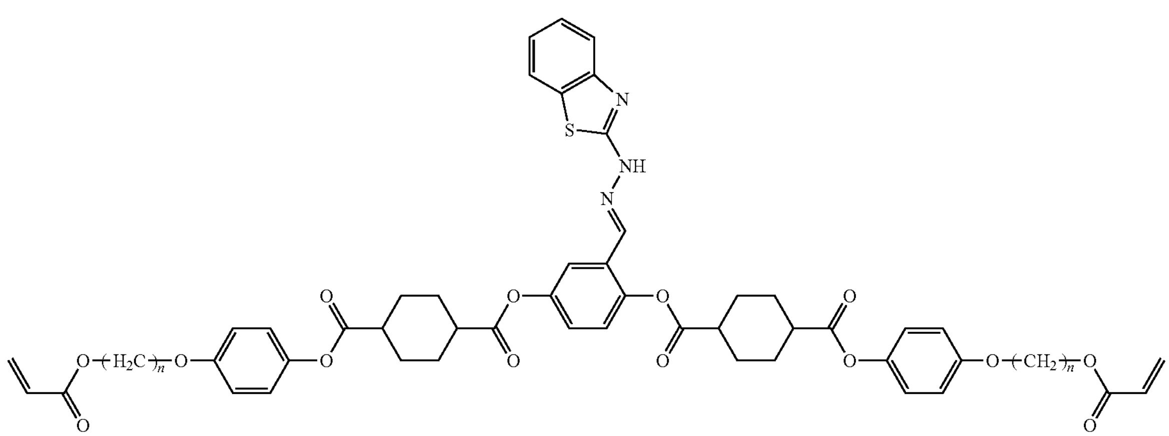

-continued
(2-a-42)
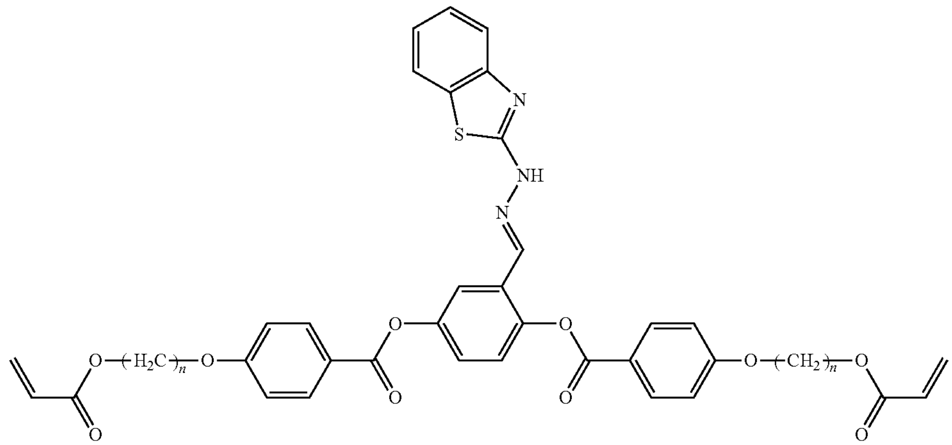
(2-a-43)
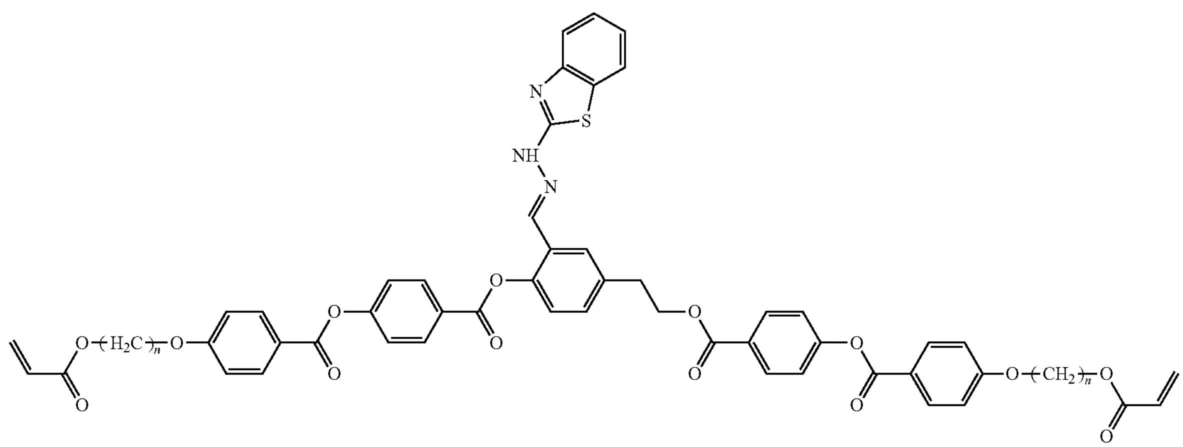
(2-a-44)
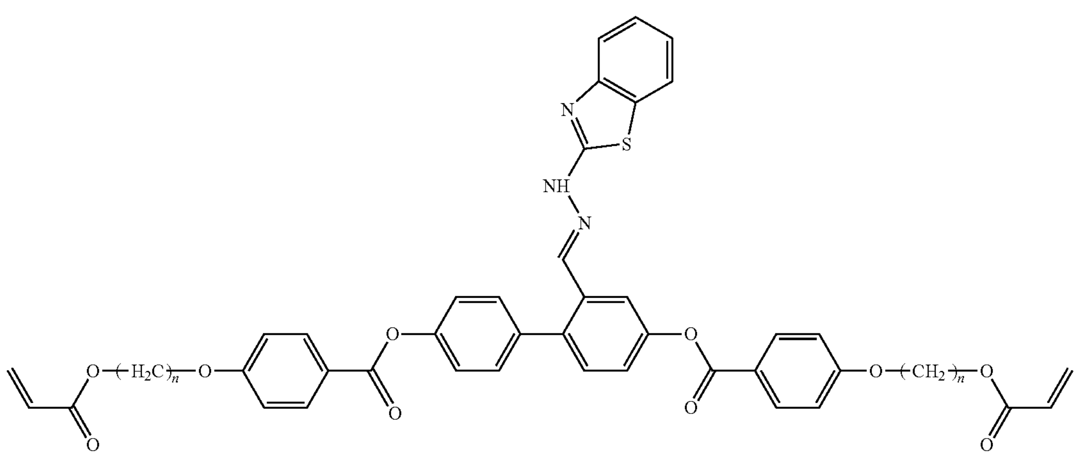

-continued
[Chem. 68]
(2-a-45)
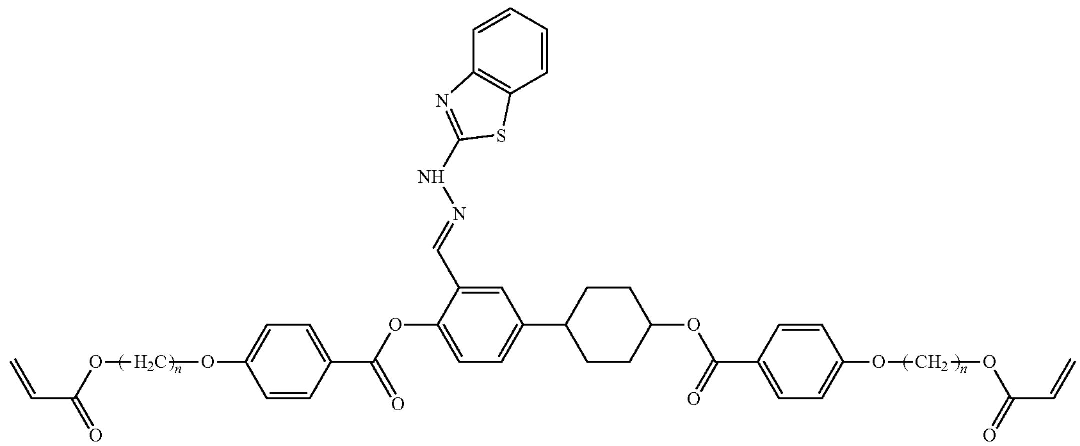
(2-a-46)
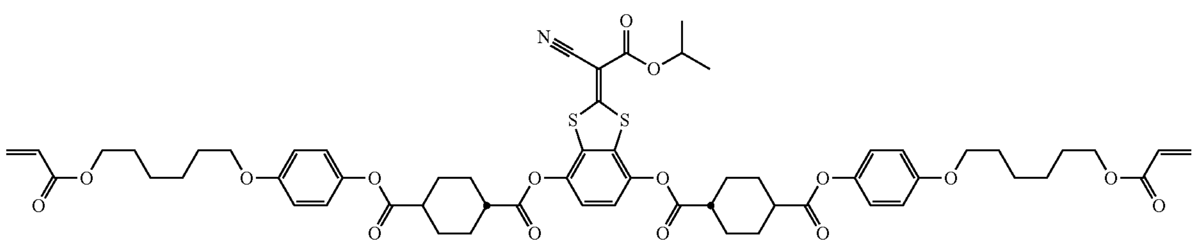
[Chem. 69]
(2-a-47)
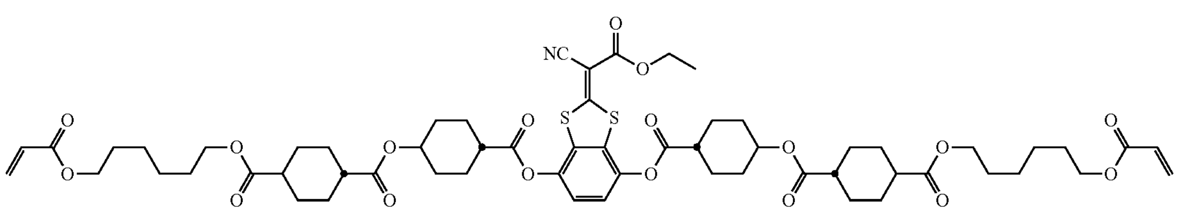
(2-a-48)
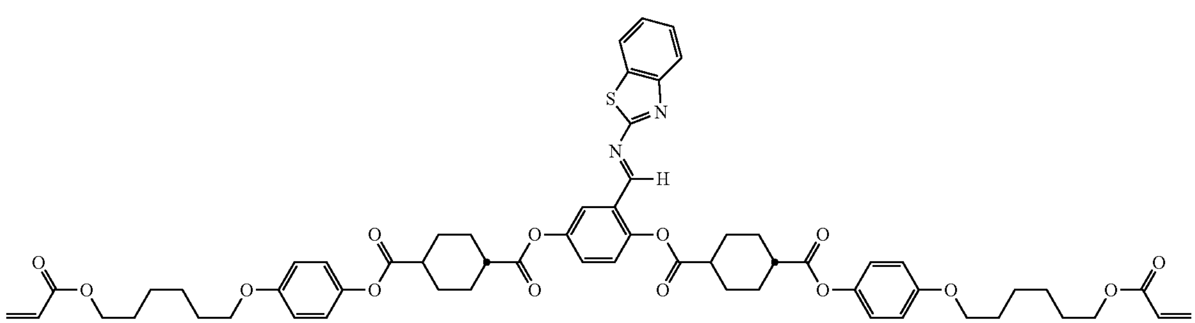
(2-a-49)
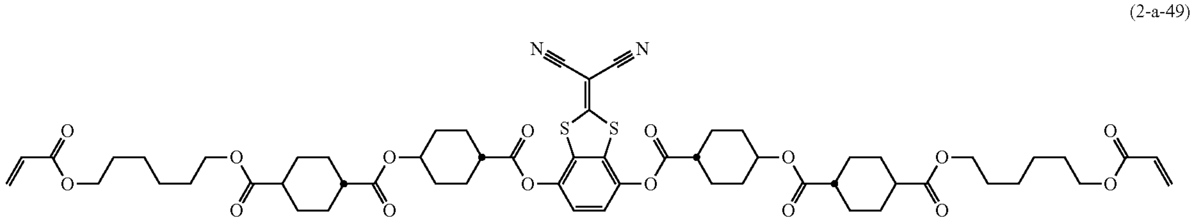

-continued
[Chem. 70]
(2-a-50)
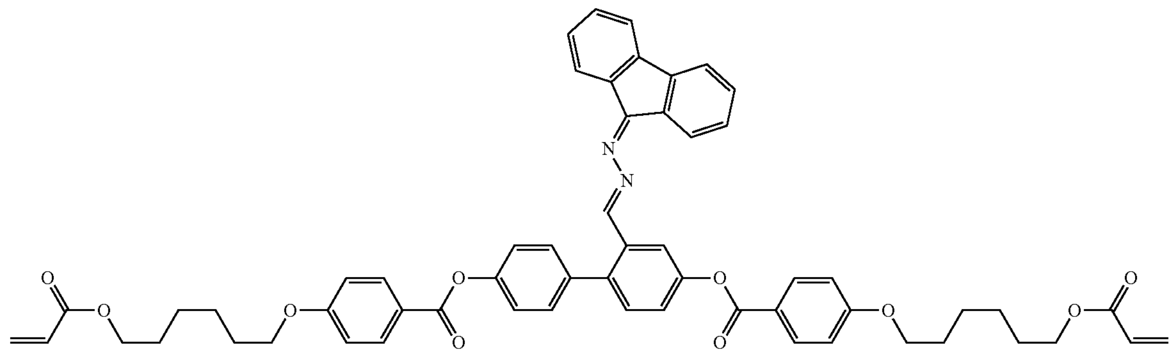
(2-a-51)
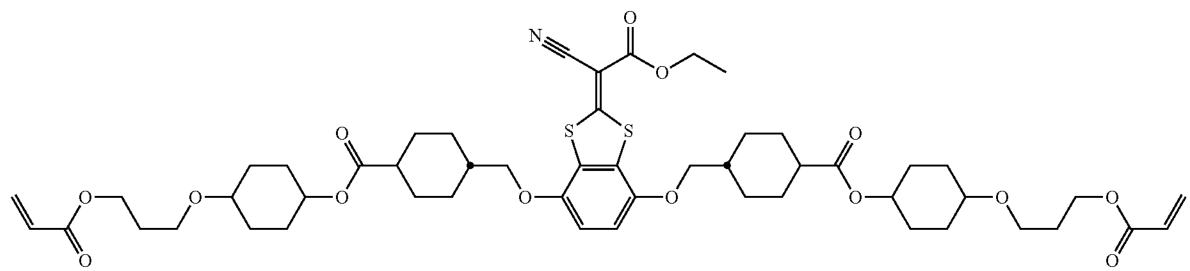
(2-a-52)
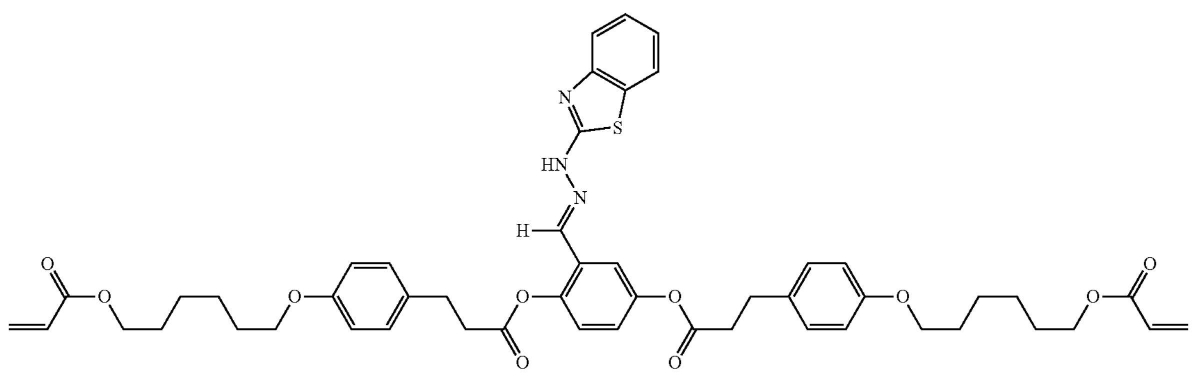
[Chem. 71]
(2-a-53)
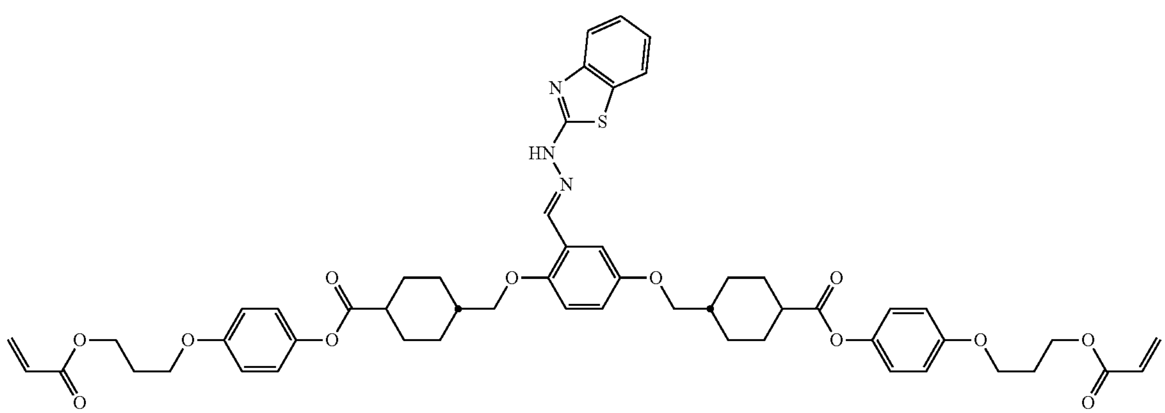

-continued
(2-a-54)
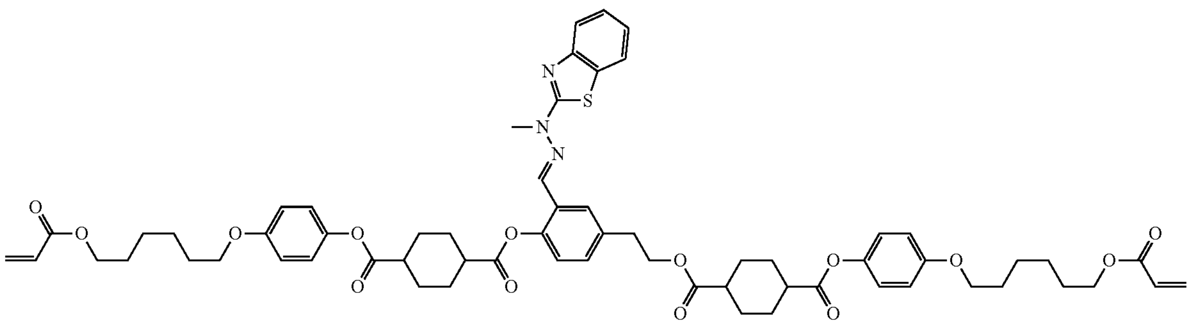
(2-a-55)
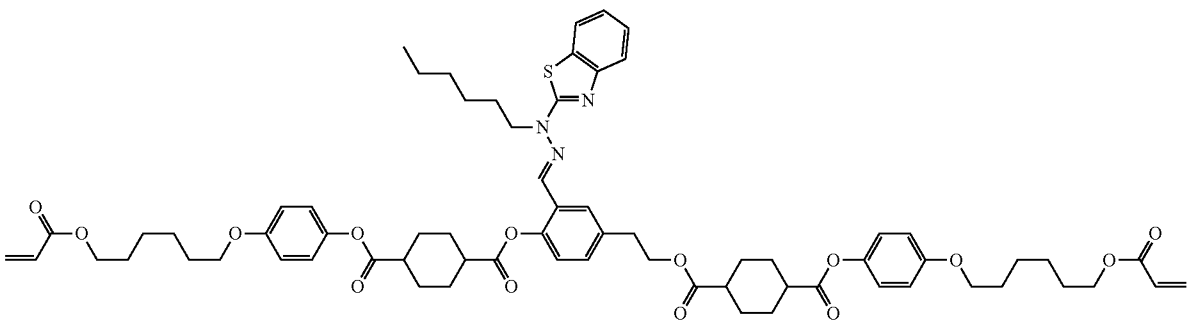
[Chem. 72]
(2-a-56)
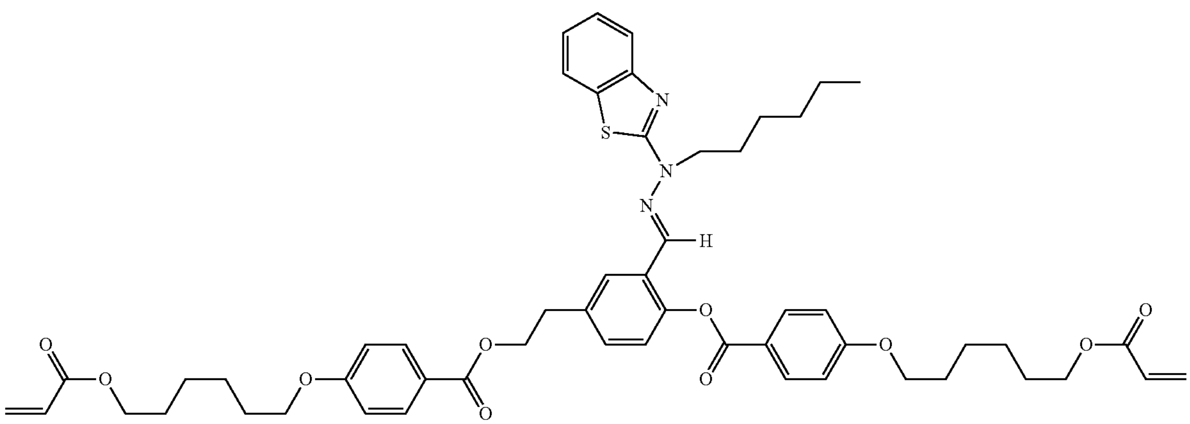
(2-a-57)
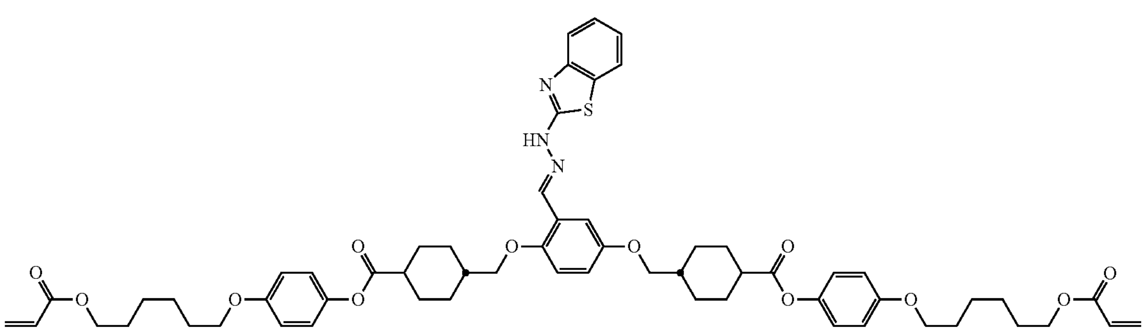

-continued
(2-a-58)
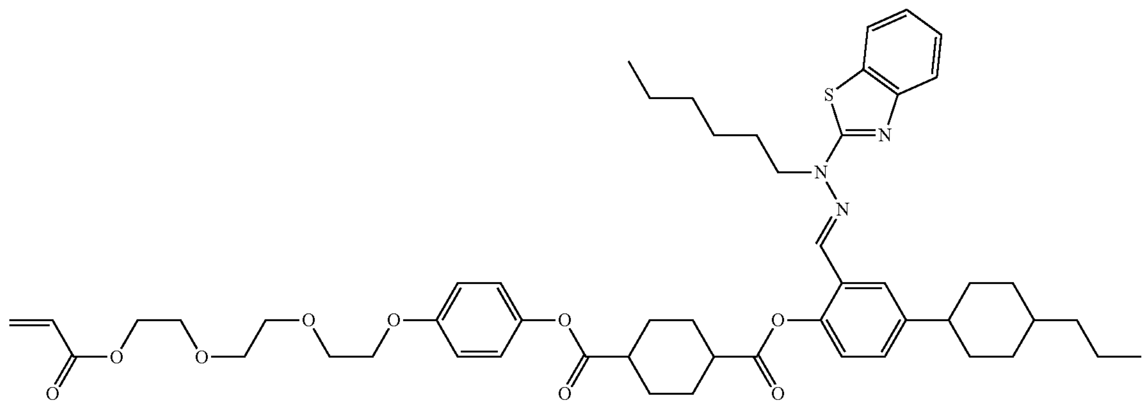
[Chem. 73]
(2-a-59)
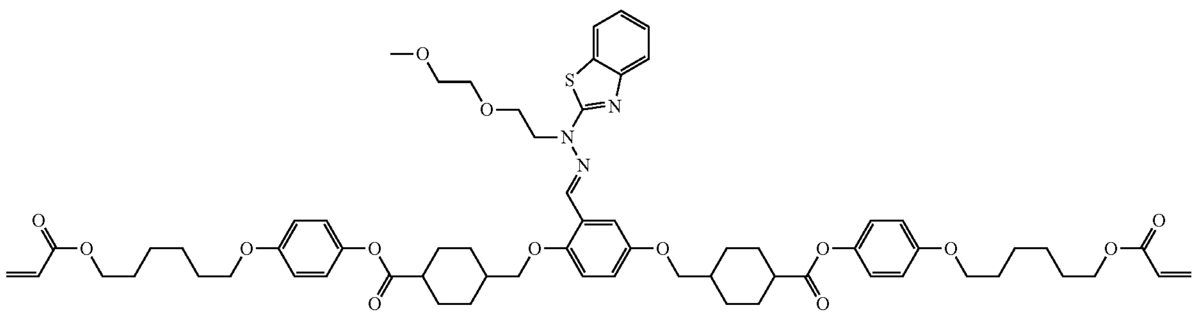
(2-a-60)
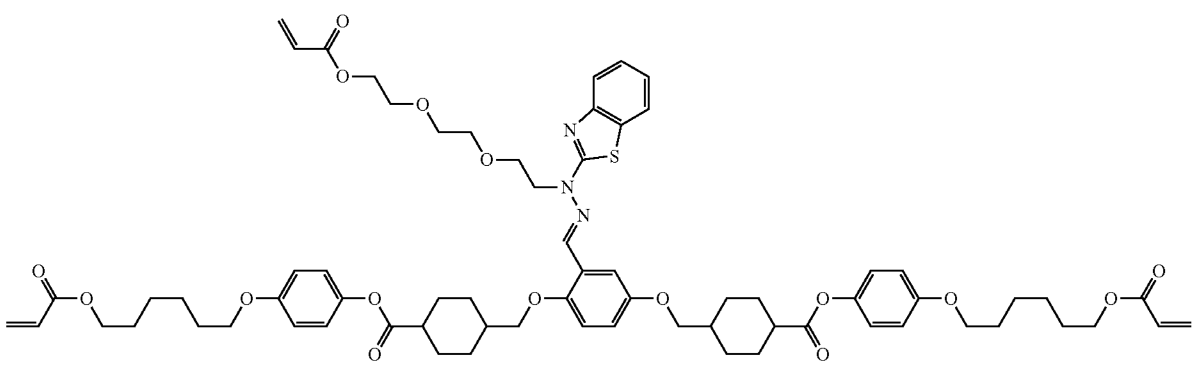
(2-a-61)
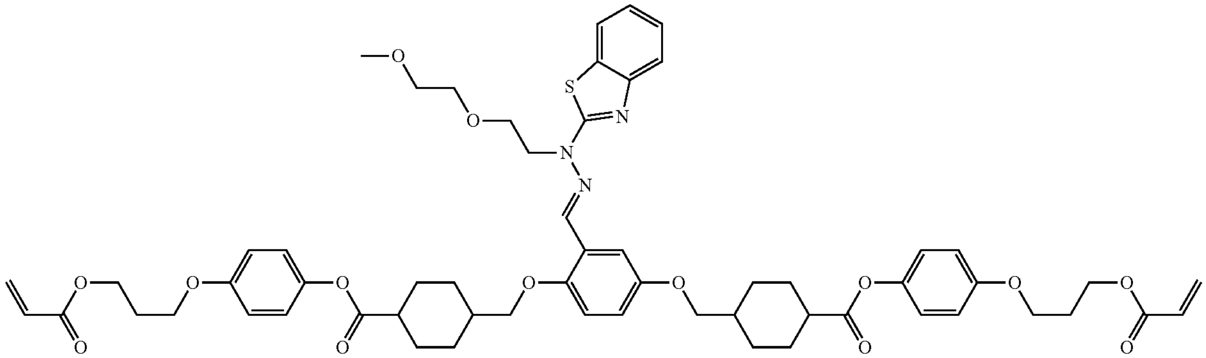

(in the above formulas, n represents an integer of 1 to 10). These liquid crystalline compounds may be used alone or as a mixture of two or more.
Specifically, the compound represented by general formula (3) is preferably compounds represented by the following formula (3-a-1) to formula (3-a-17):
[Chem. 74]
(3-a-1)
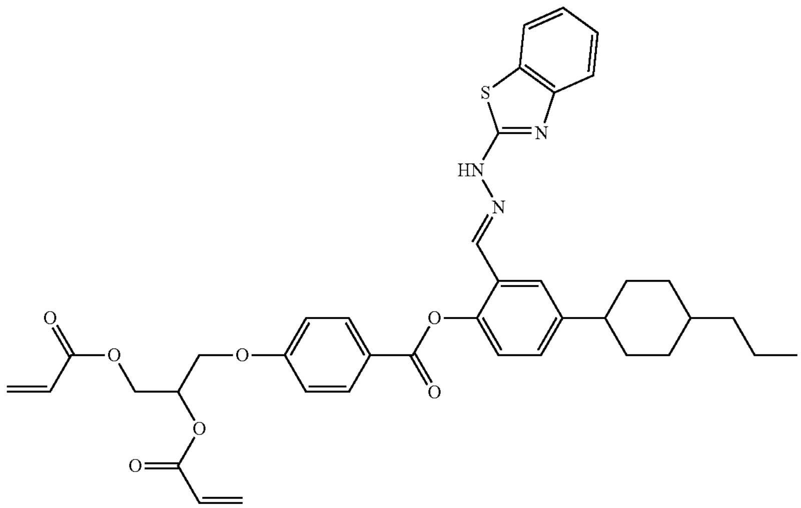
(3-a-2)
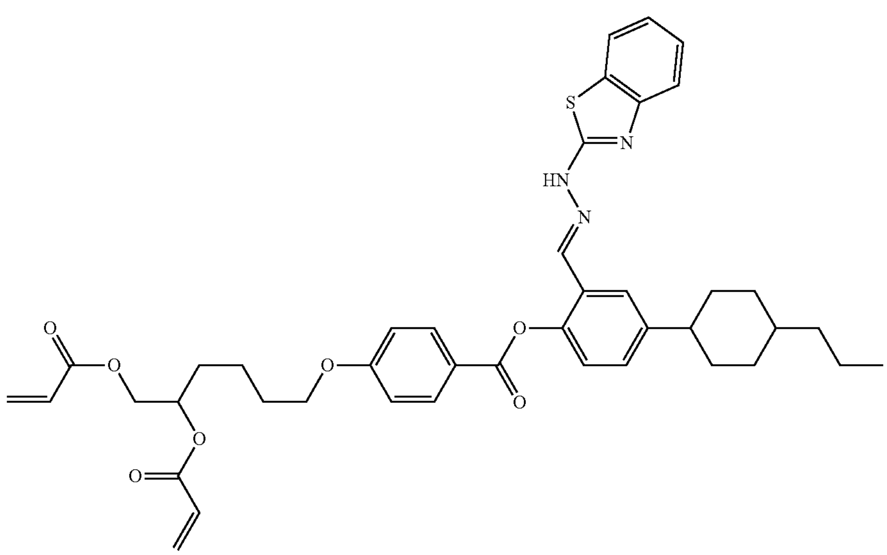

-continued
(3-a-3)
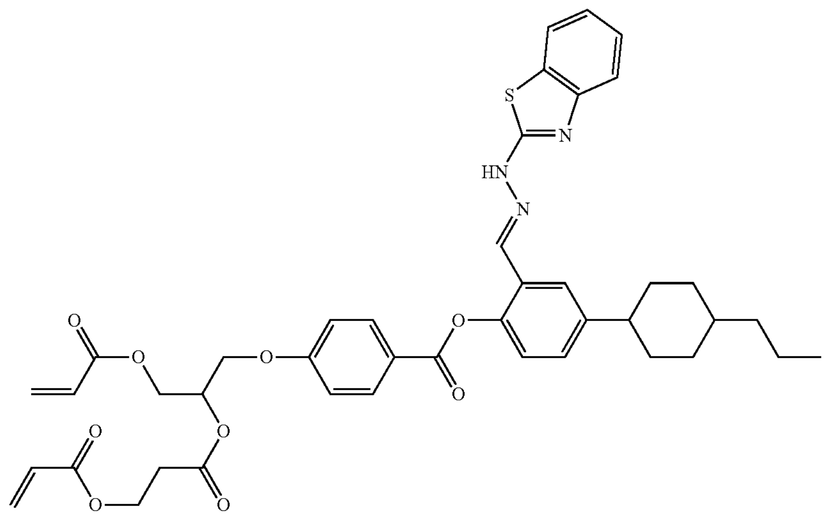
(3-a-4)
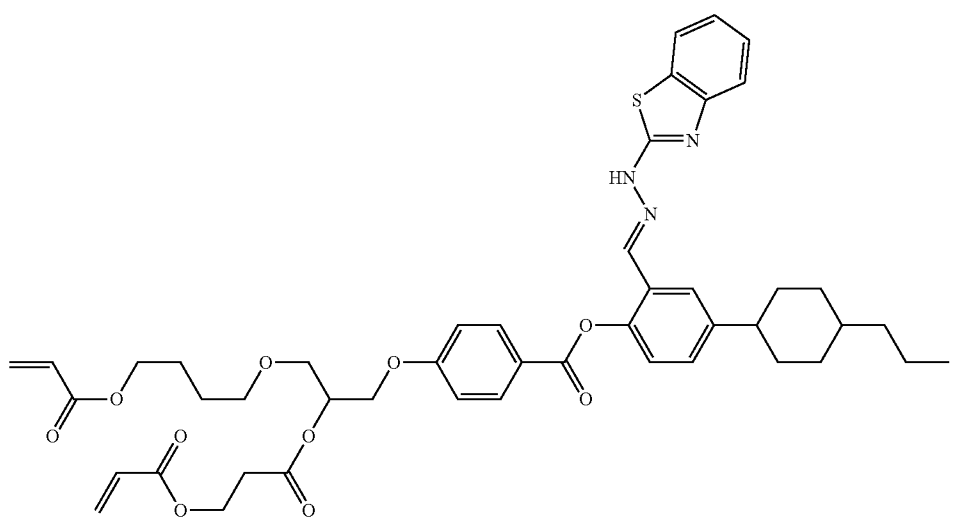
[Chem. 75]
(3-a-5)
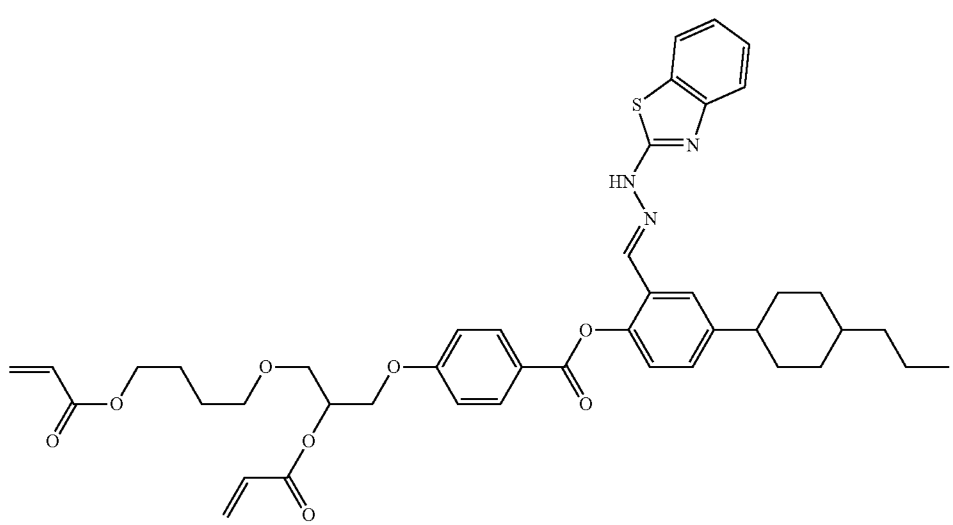

-continued
(3-a-6)
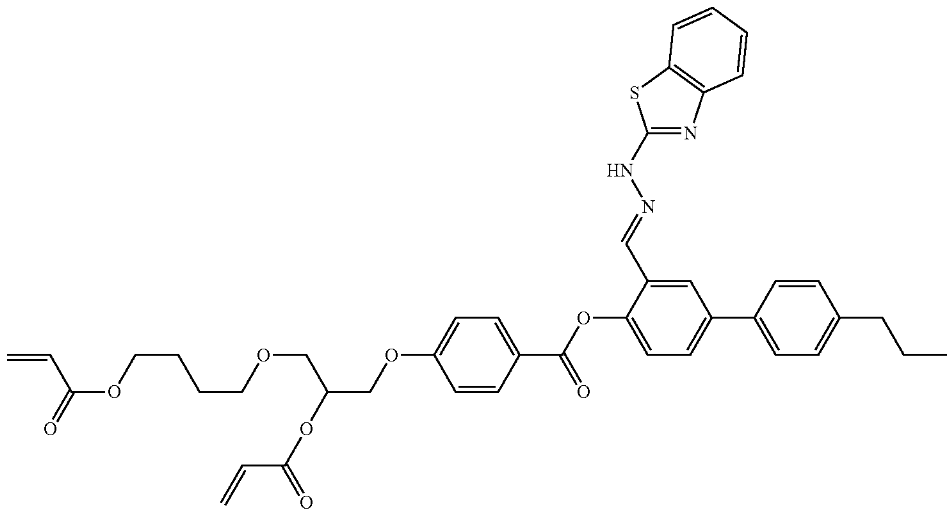
(3-a-7)
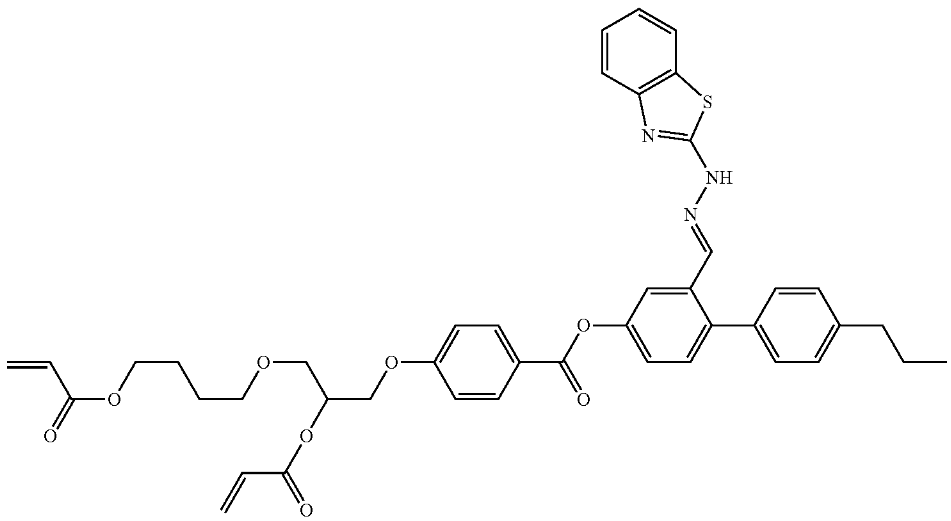
(3-a-8)
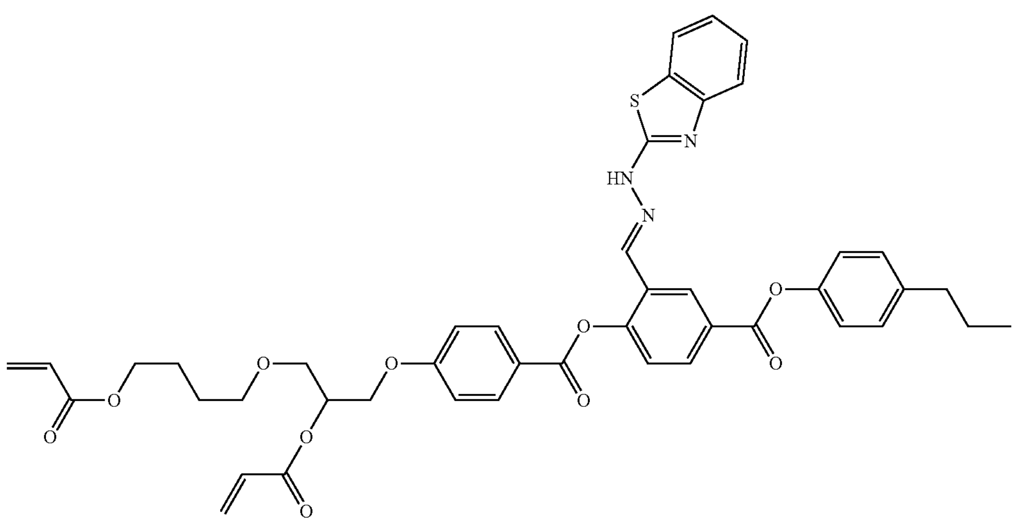

-continued
[Chem. 76]
(3-a-9)
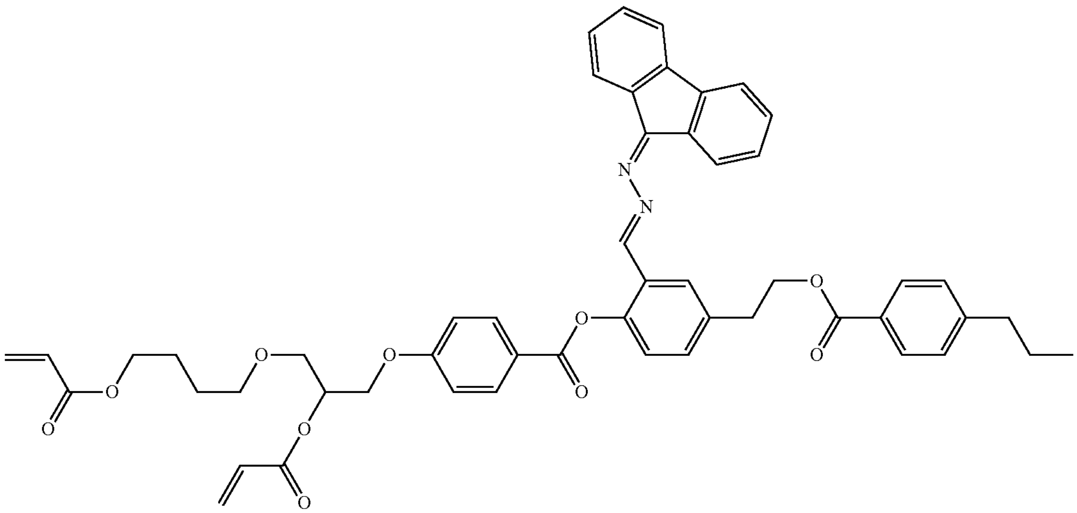
(3-a-10)
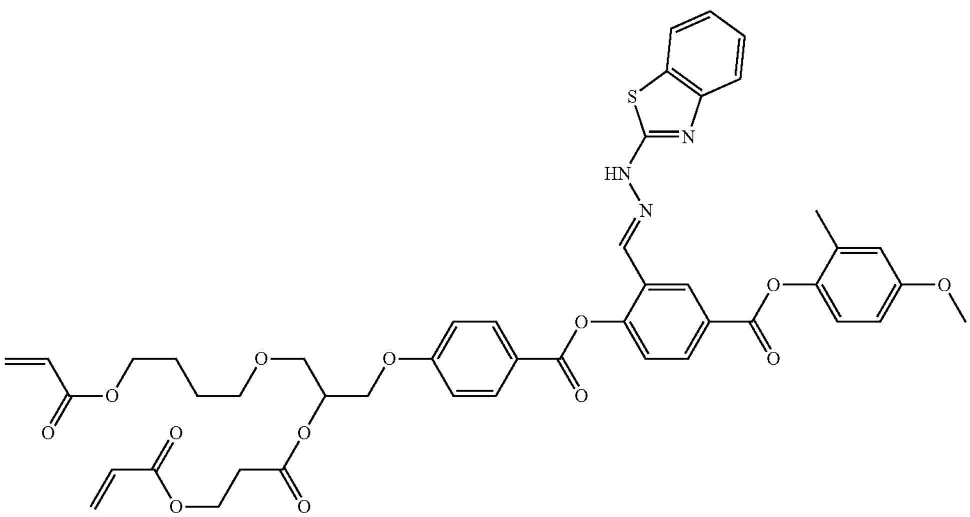
(3-a-11)
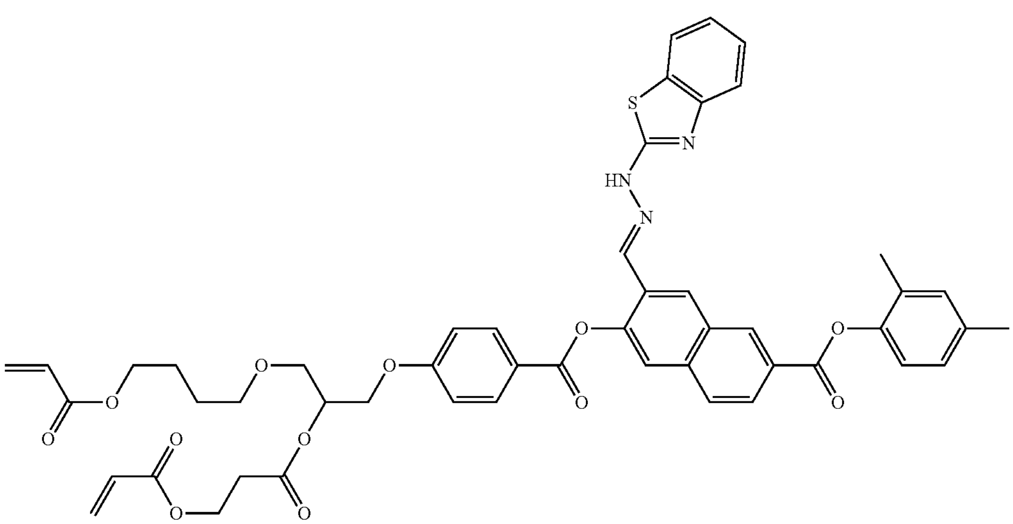

-continued
(3-a-12)
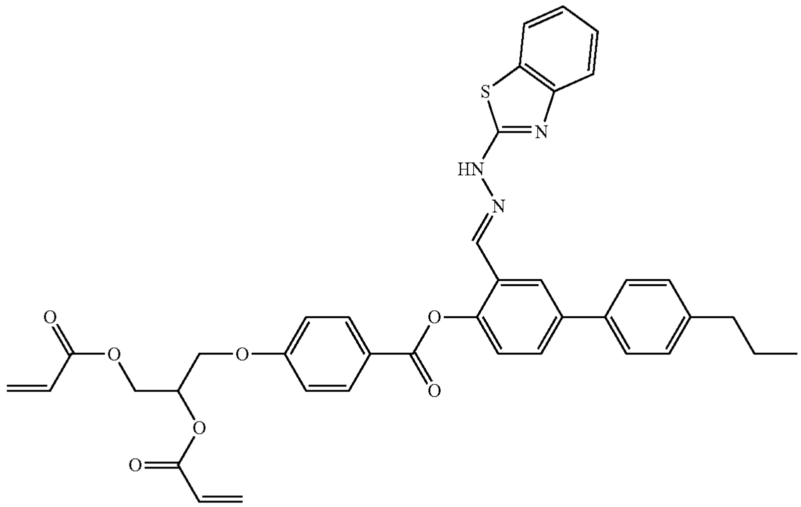
[Chem. 77]
(3-a-13)
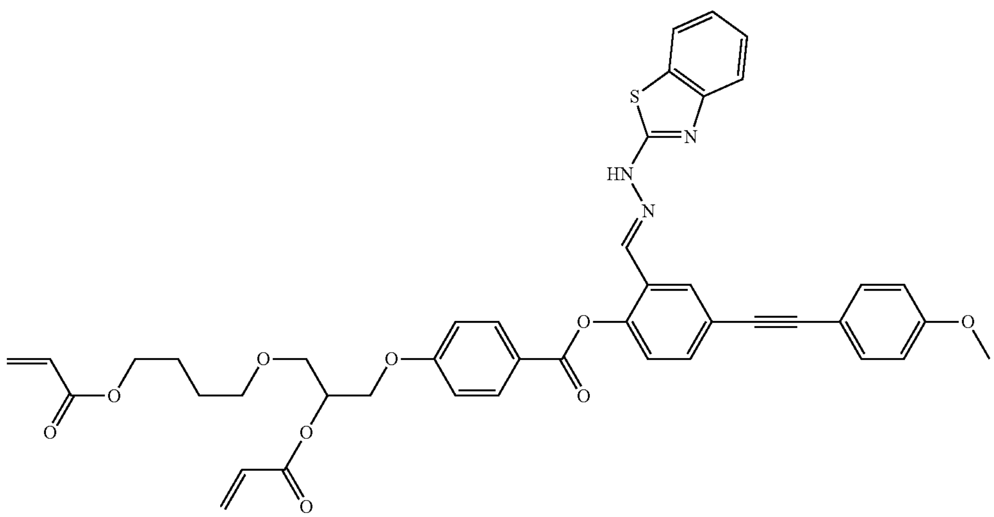
(3-a-14)
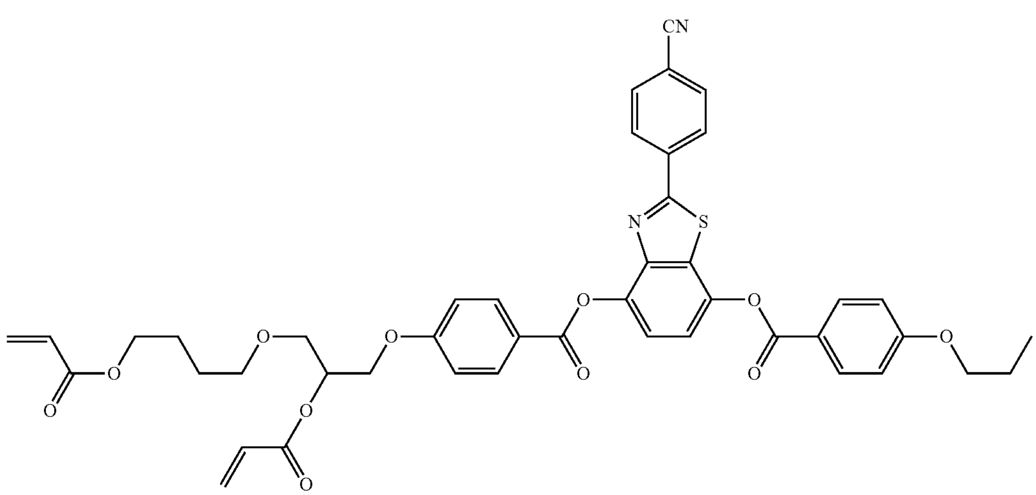

-continued
(3-a-15)
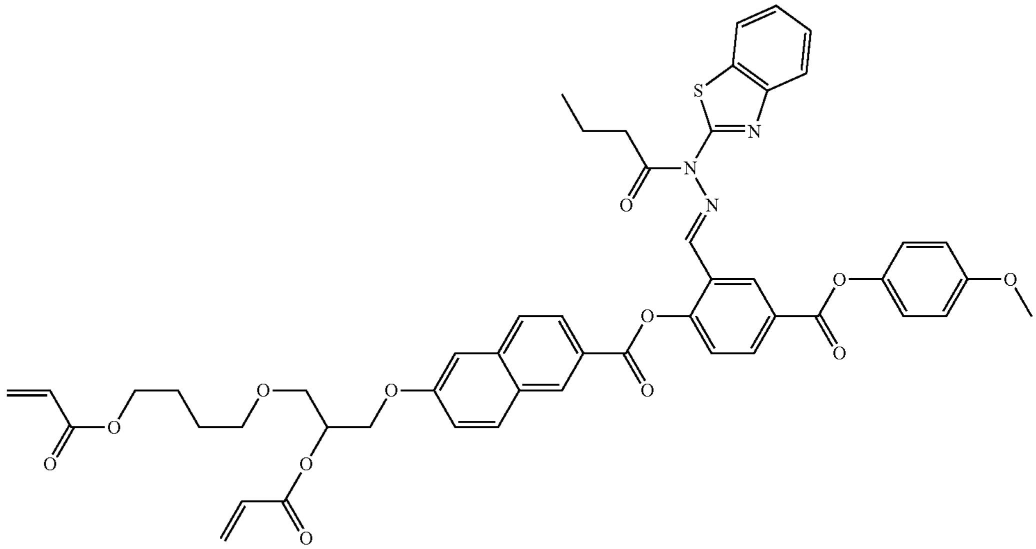
(3-a-16)
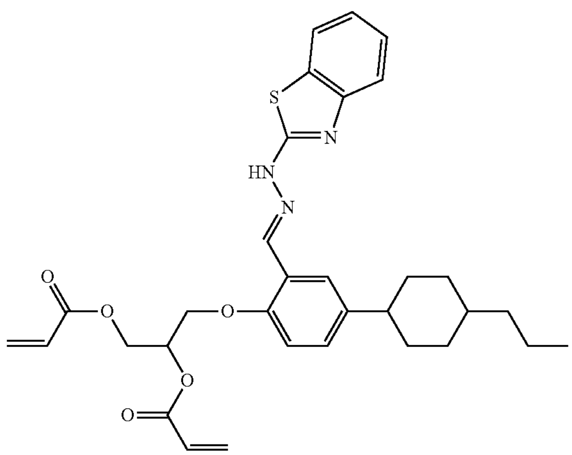
(3-a-17)
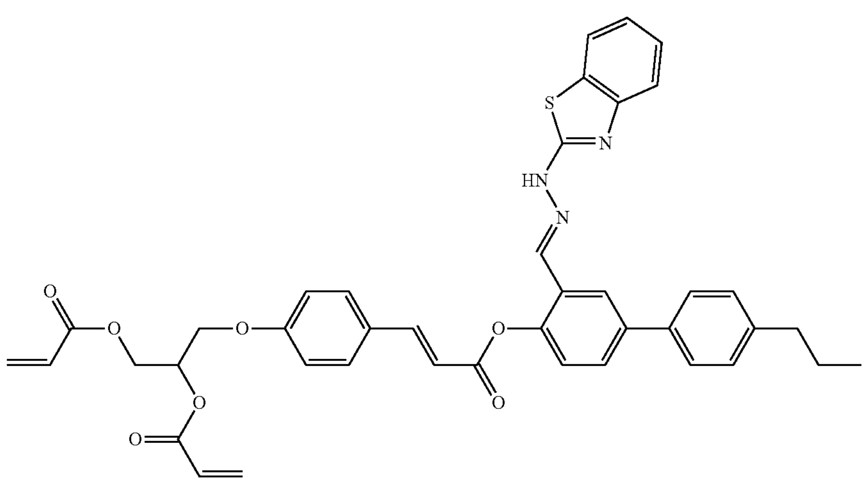

These liquid crystalline compounds may be used alone or as a mixture of two or more.
In general formula (4), the group represented by $P^{43}$—$(S^{43}$—$X^{43})_{14}$— is bonded to $A^{11}$ or $A^{12}$ in general formula (a).
Specifically, the compound represented by general formula (4) is preferably compounds represented by the following formula (4-a-1) to formula (4-a-26):
[Chem. 78]
(4-a-1)
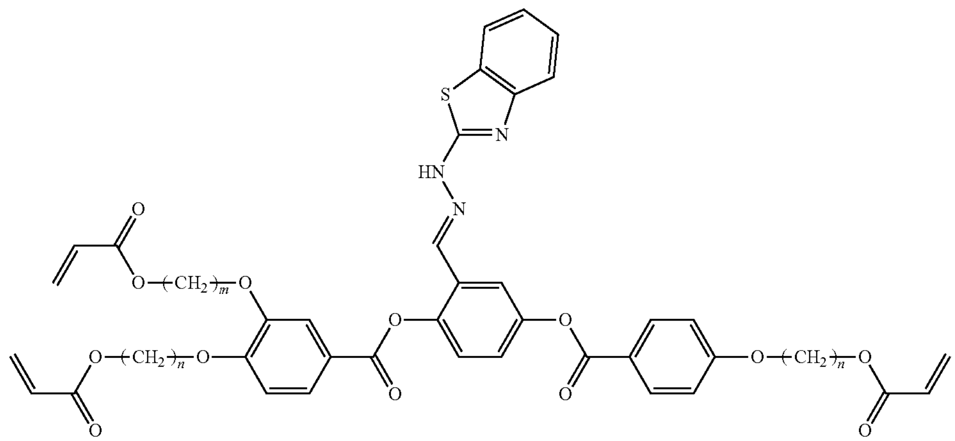
(4-a-2)
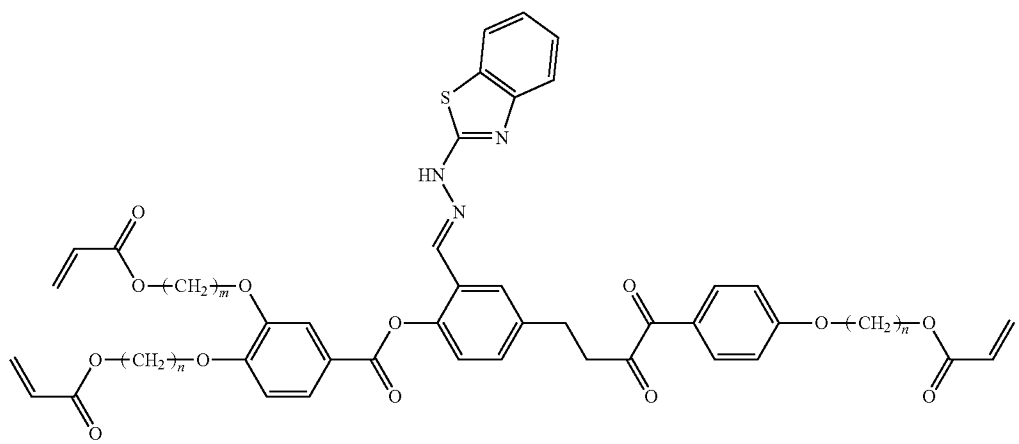
(4-a-3)
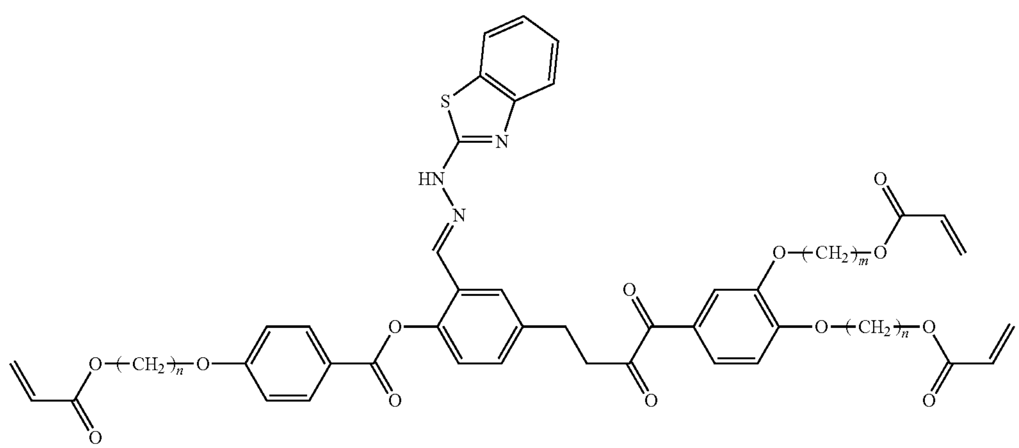

-continued
(4-a-4)
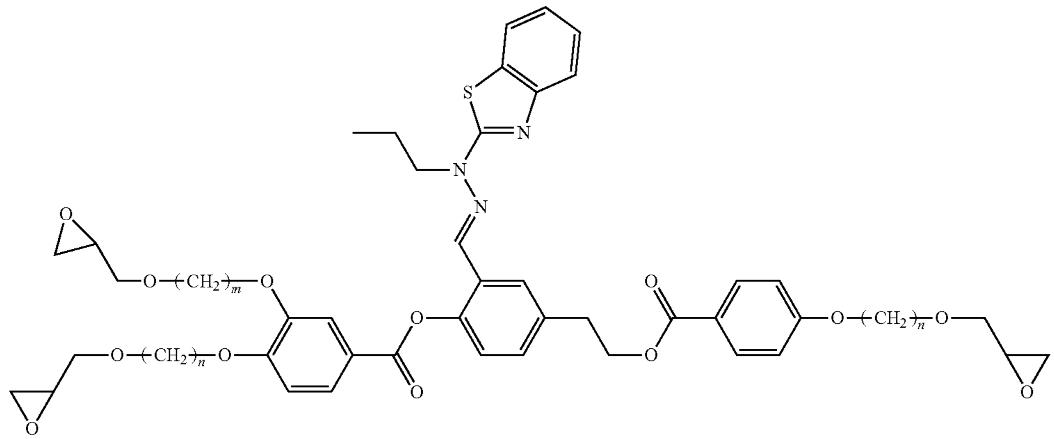
[Chem. 79]
(4-a-5)
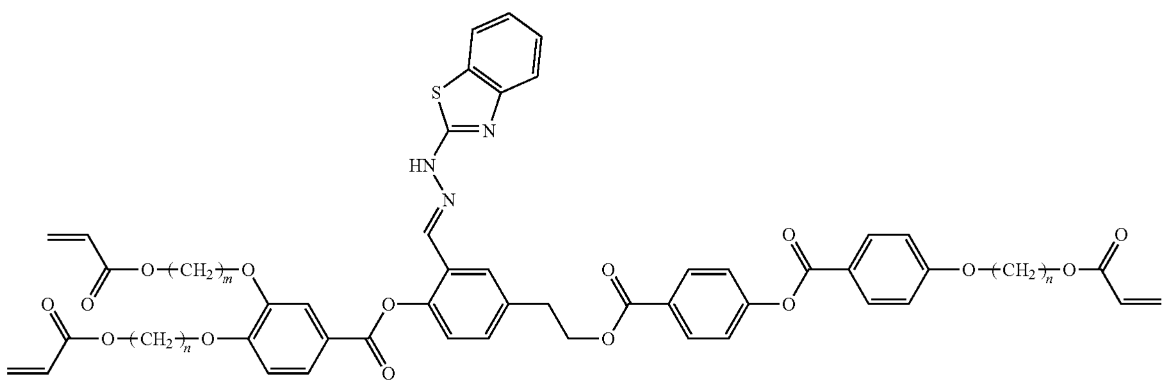
(4-a-6)
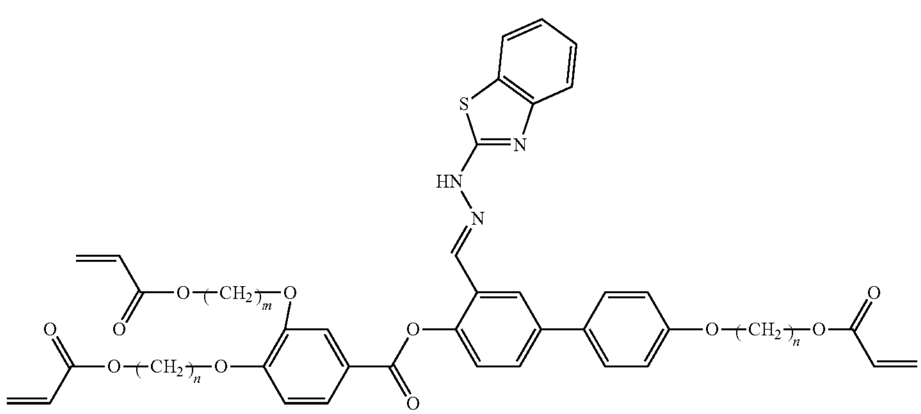

-continued
(4-a-7)
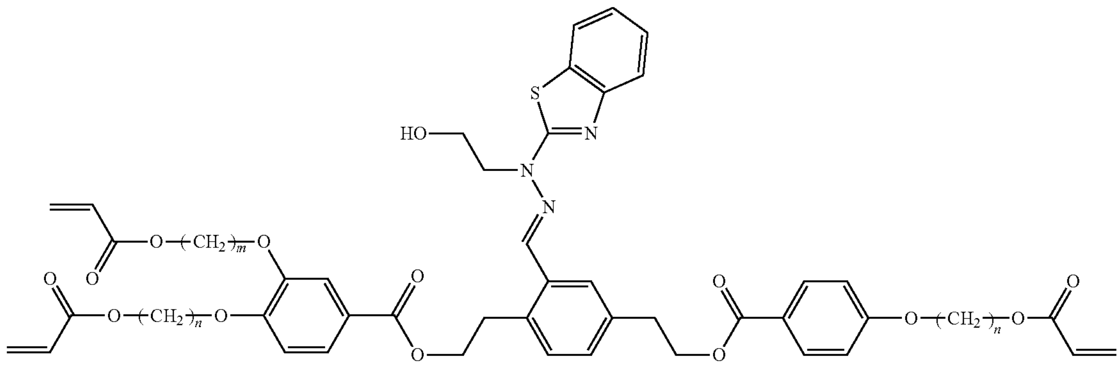
(4-a-8)
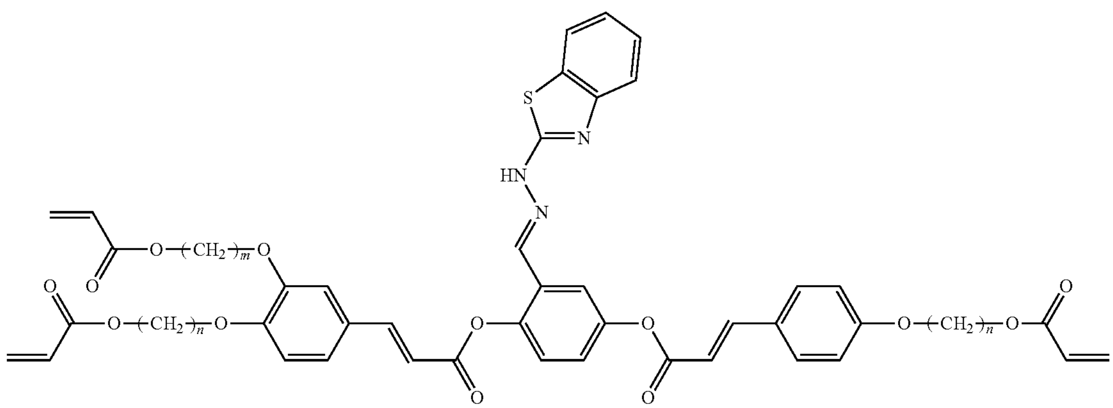
[Chem. 80]
(4-a-9)
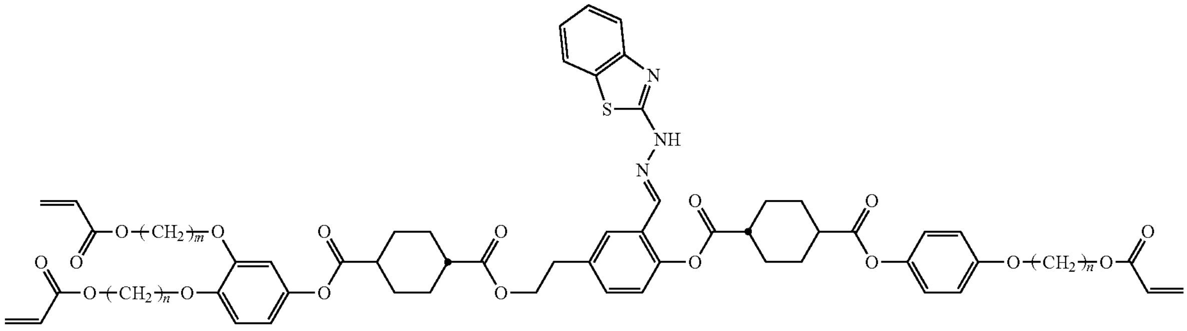

-continued
(4-a-10)
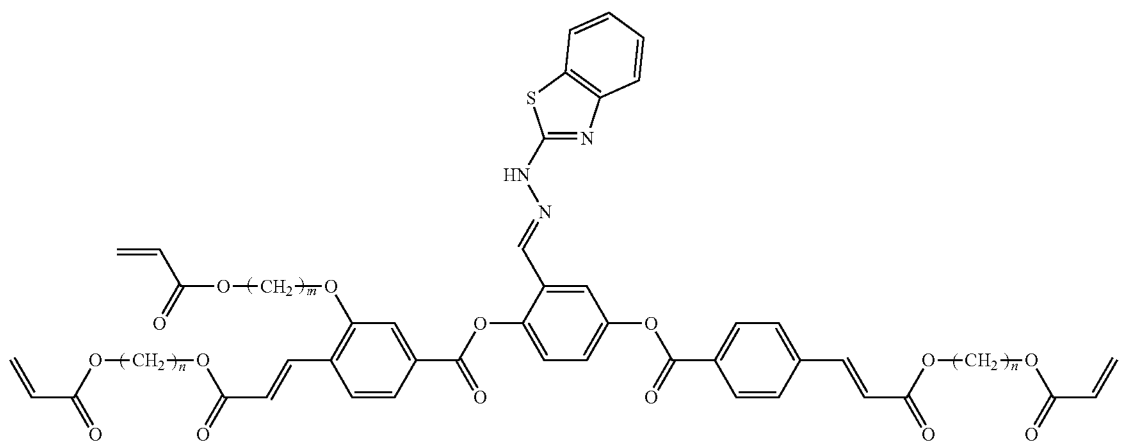
(4-a-11)
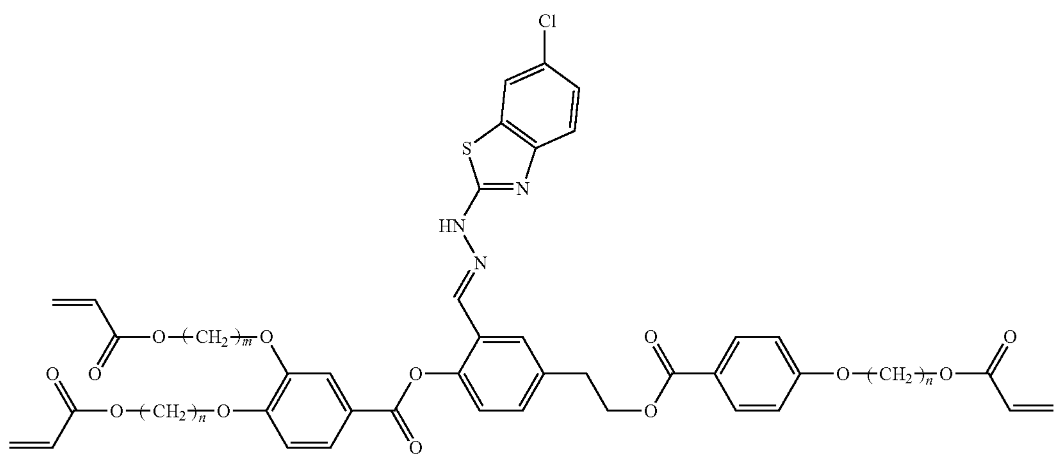
(4-a-12)
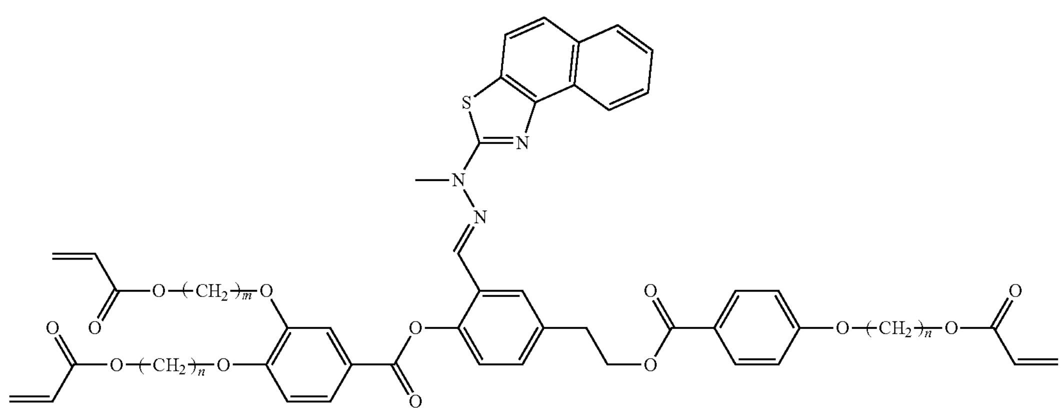

-continued
[Chem. 81]
(4-a-13)
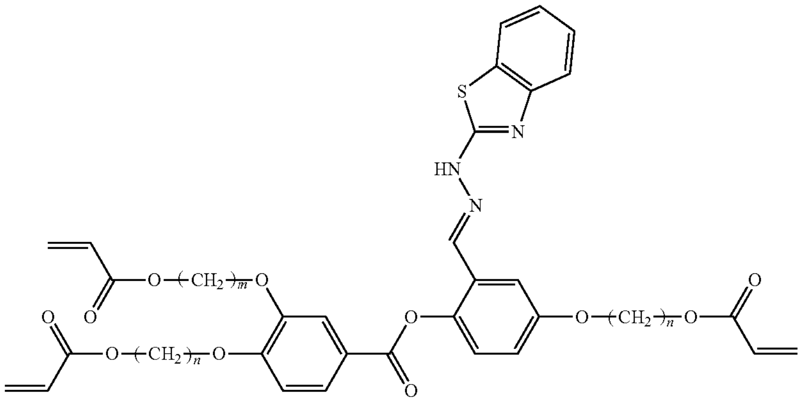
(4-a-14)
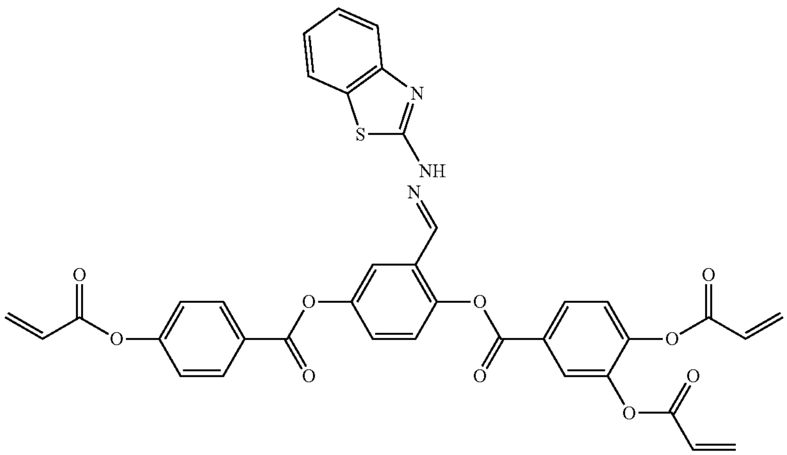
(4-a-15)
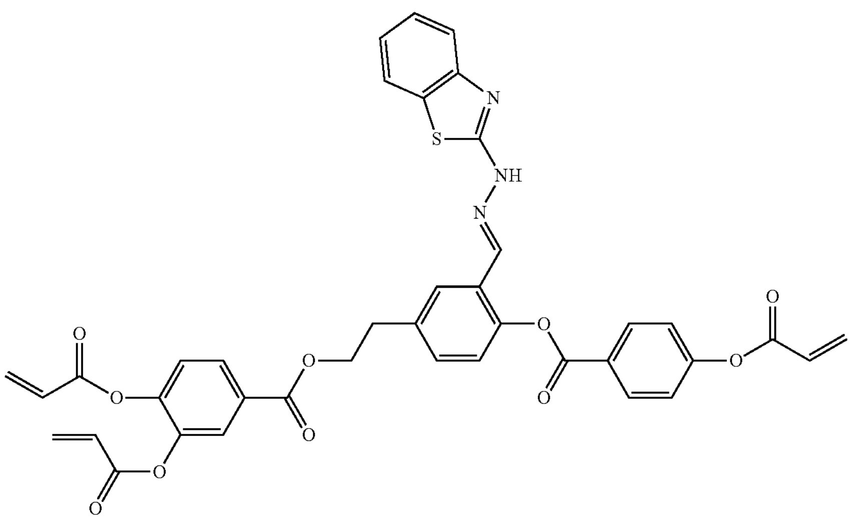

-continued
(4-a-16)
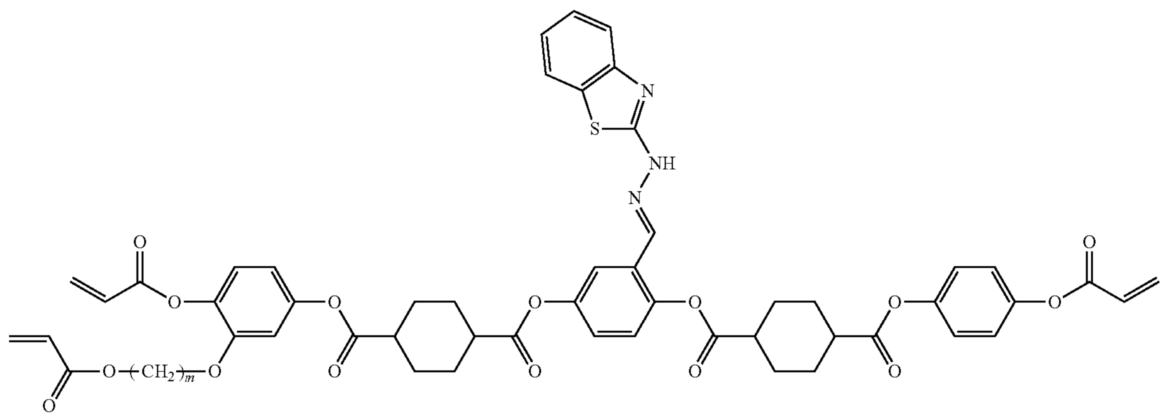
[Chem. 82]
(4-a-17)
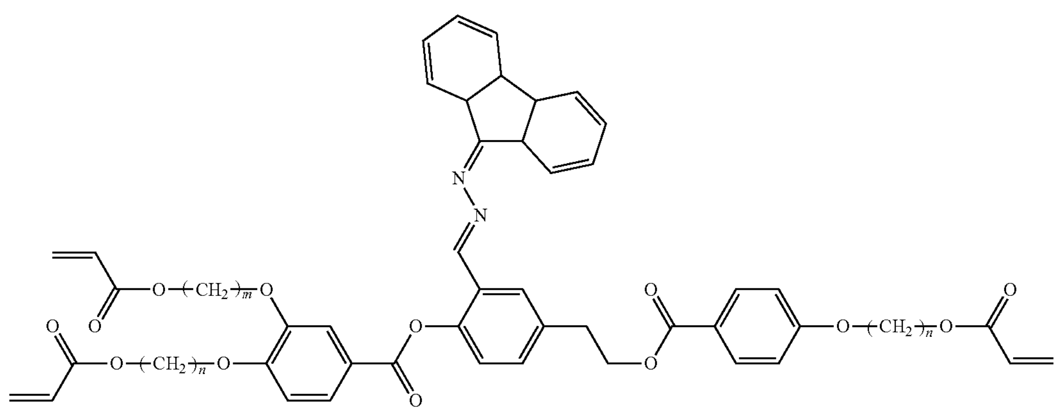
(4-a-18)
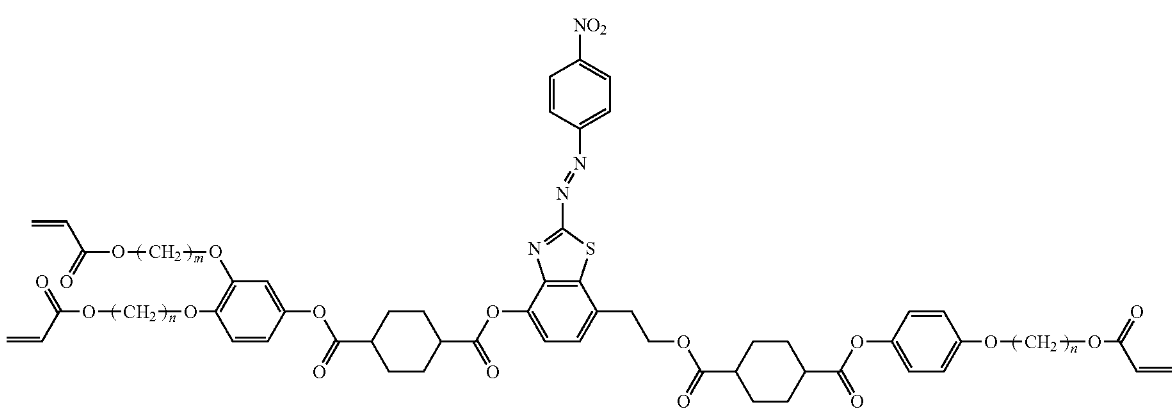

-continued
(4-a-19)
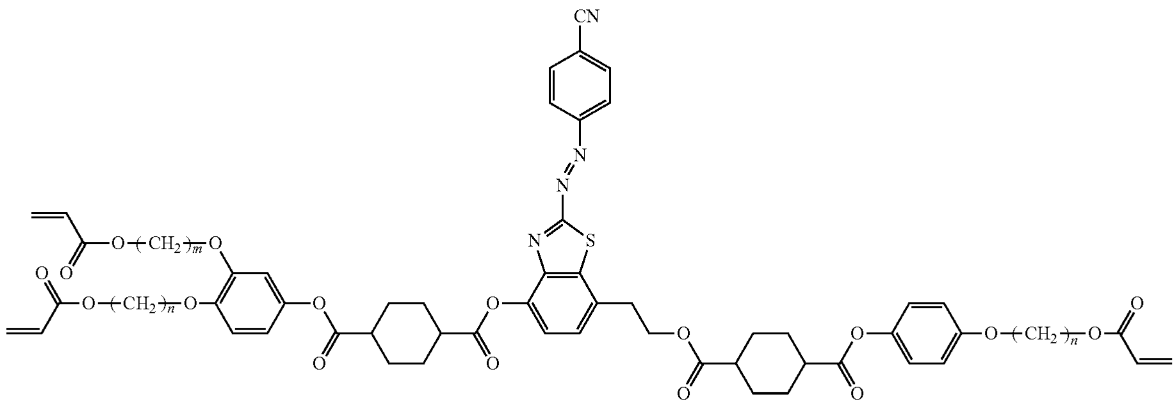
(4-a-20)
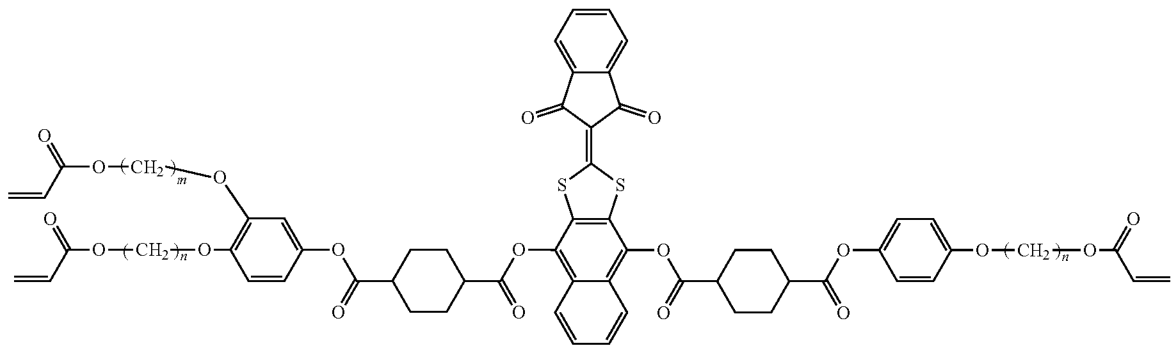
[Chem. 83]
(4-a-21)
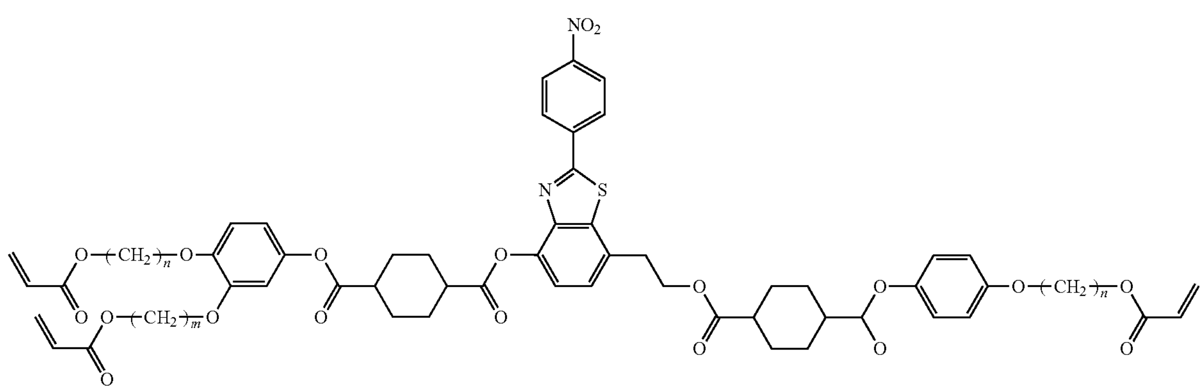
(4-a-22)
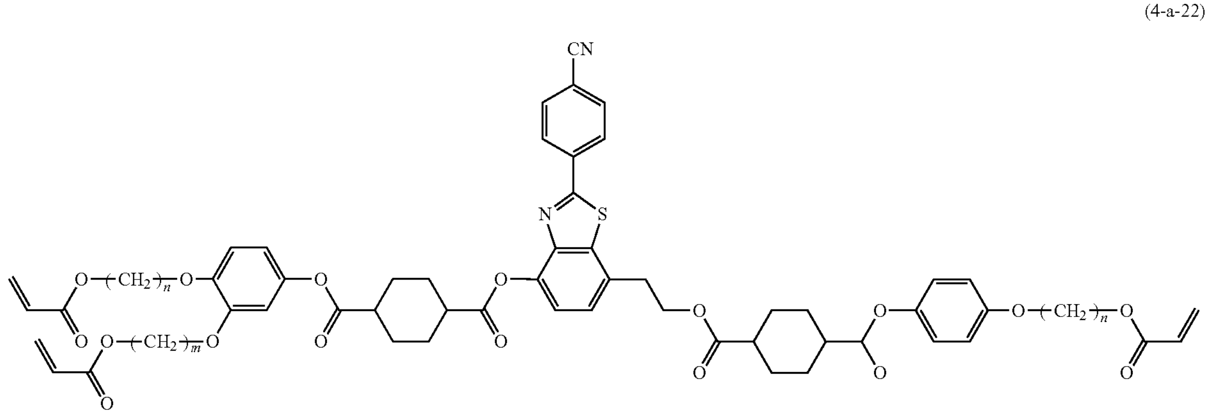

-continued
(4-a-23)
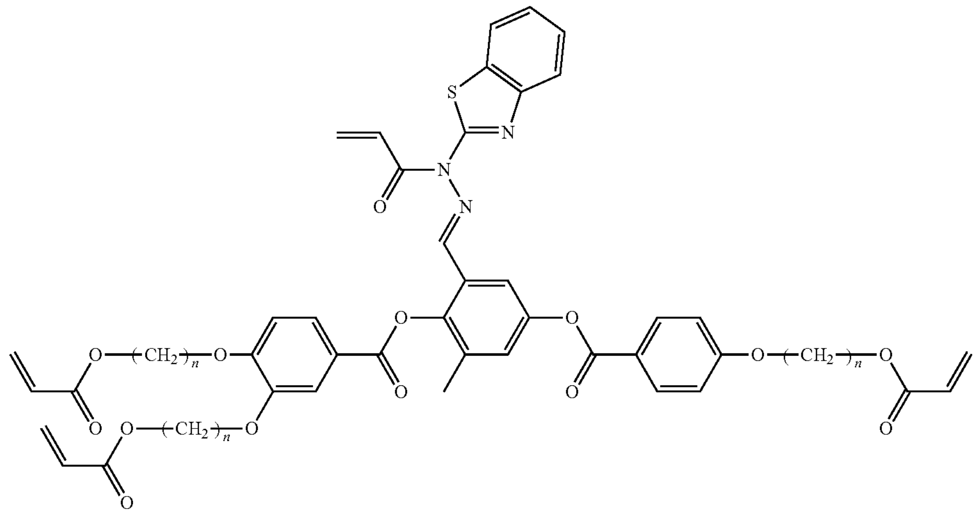
[Chem. 84]
(4-a-24)
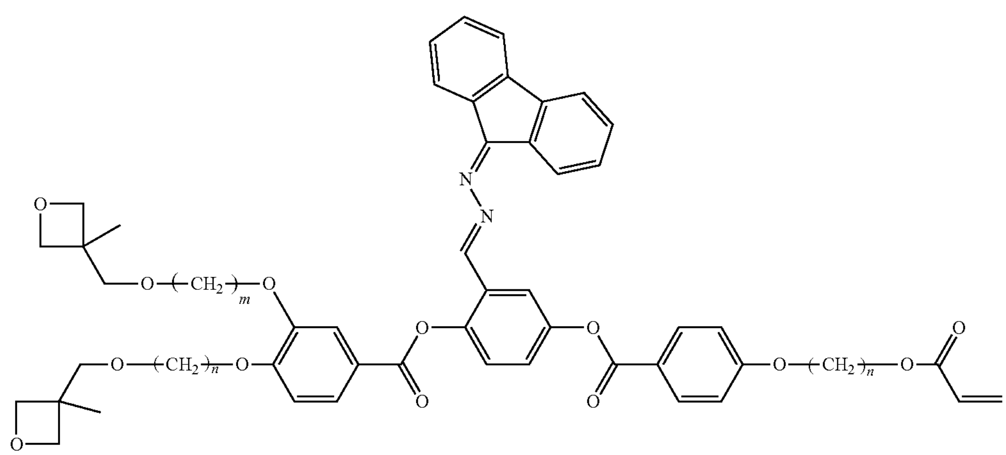

-continued
(4-a-25)
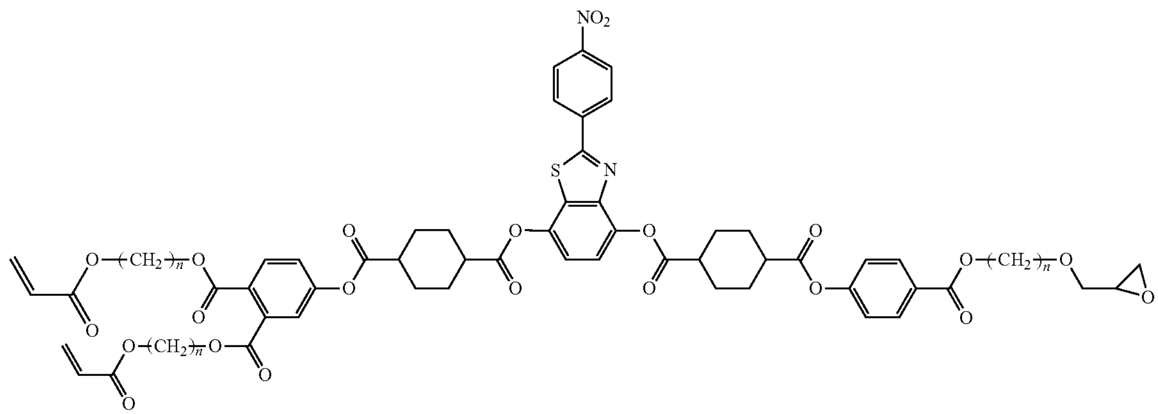
(4-a-26)
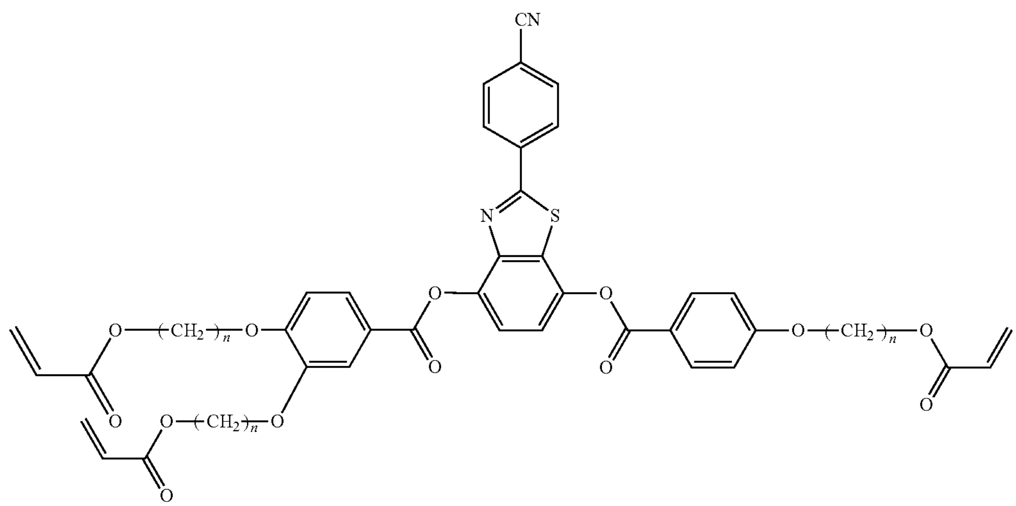
(in the above formulas, m and n each independently represent an integer of 1 to 10). These liquid crystalline compounds may be used alone or as a mixture of two or more.
Specifically, the compound represented by general formula (5) is preferably compounds represented by the following formula (5-a-1) to formula (5-a-29):
[Chem. 85]
(5-a-1)
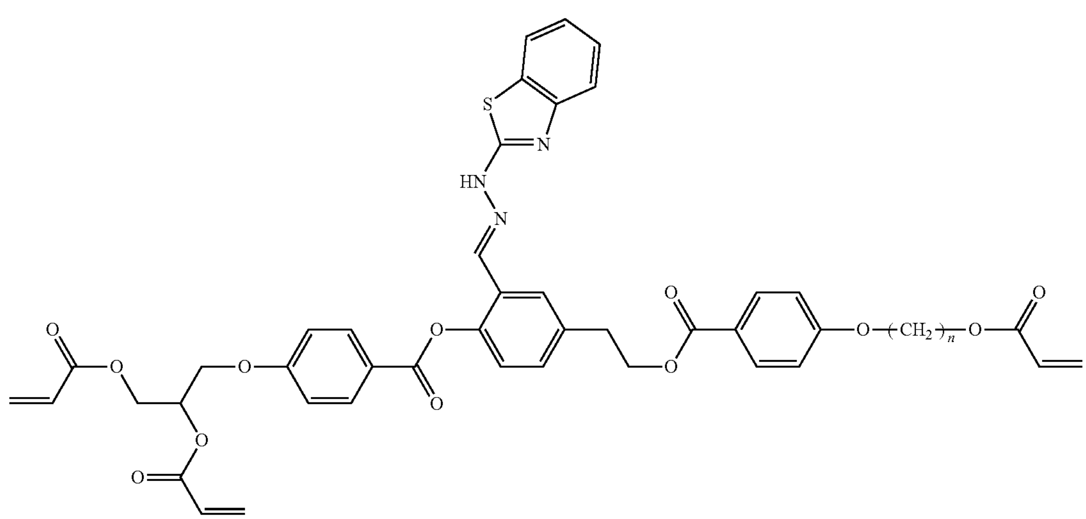

-continued
(5-a-2)
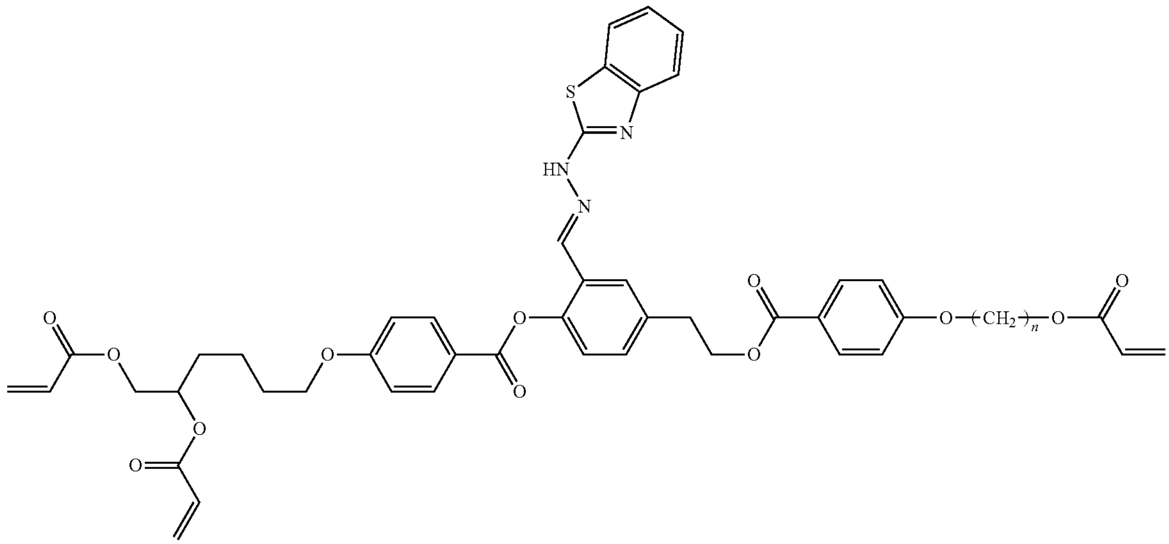
(5-a-3)
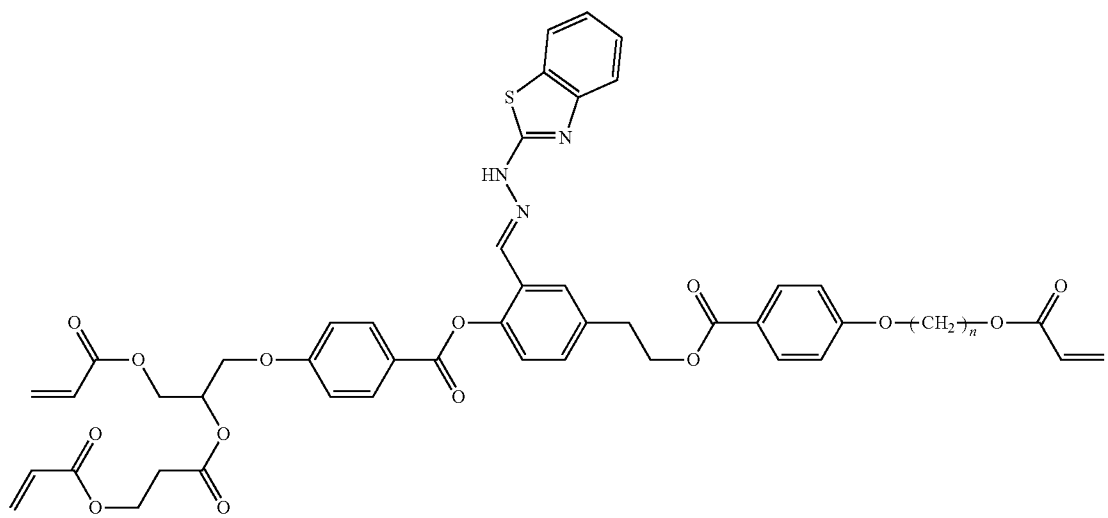
(5-a-4)
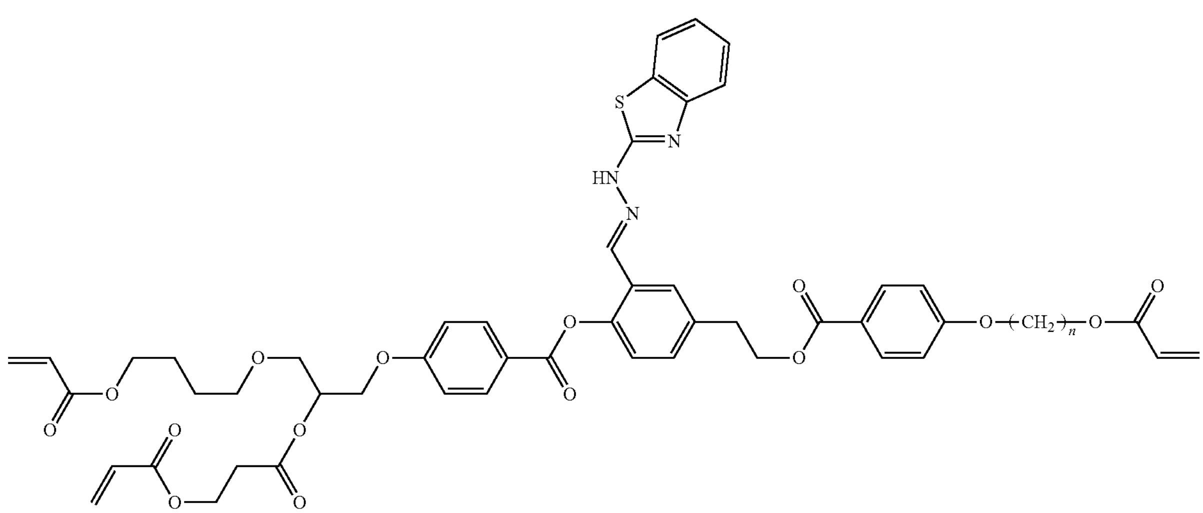

-continued
[Chem. 86]
(5-a-5)
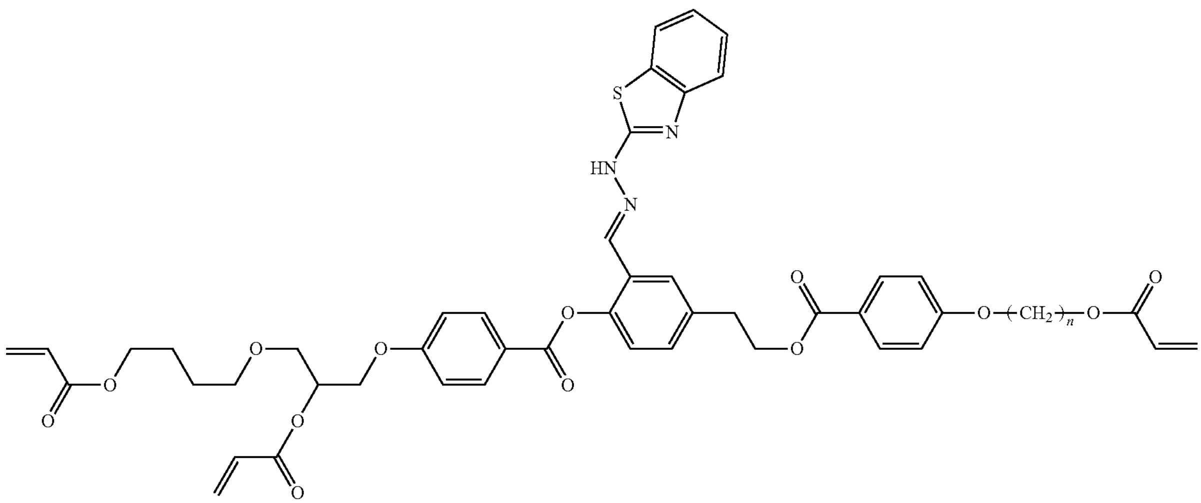
(5-a-6)
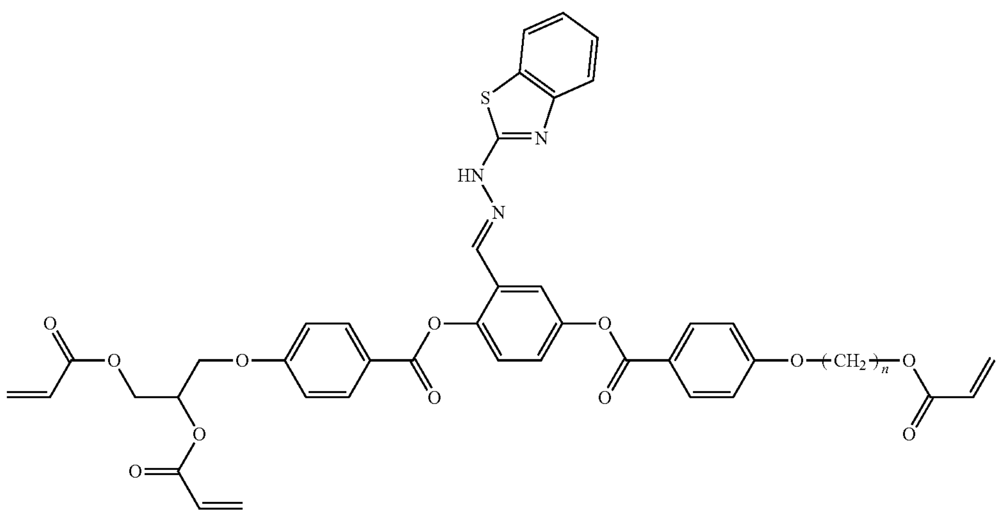
(5-a-7)
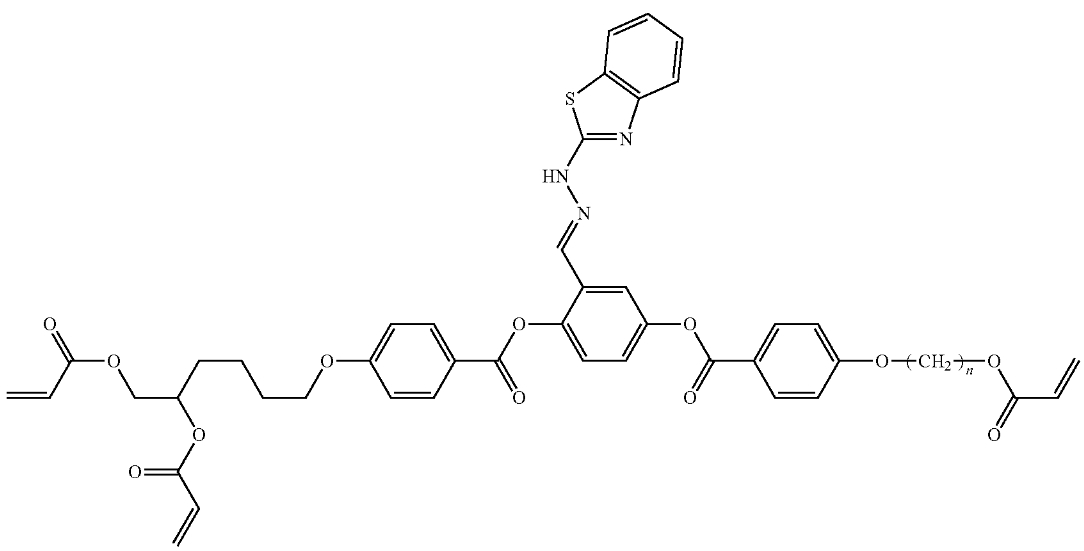

-continued
(5-a-8)
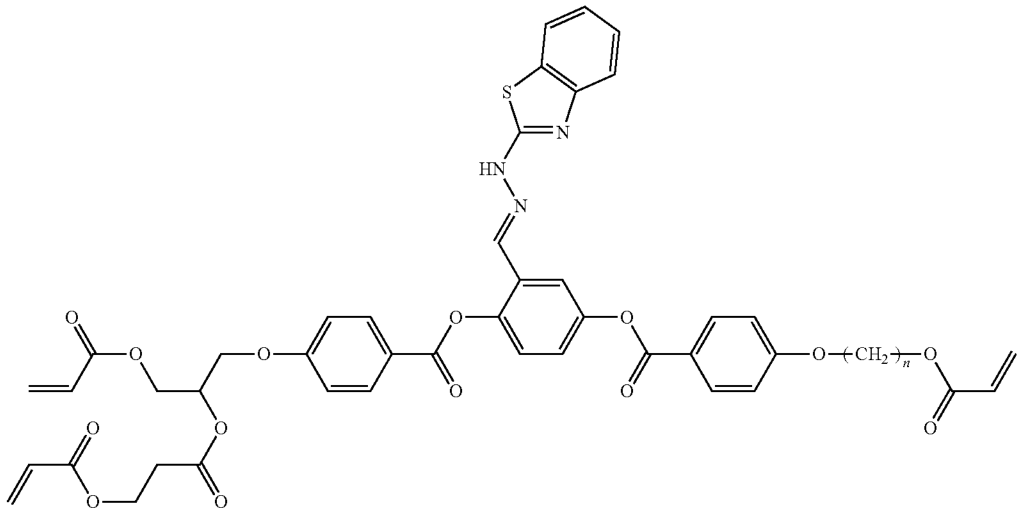
[Chem. 87]
(5-a-9)
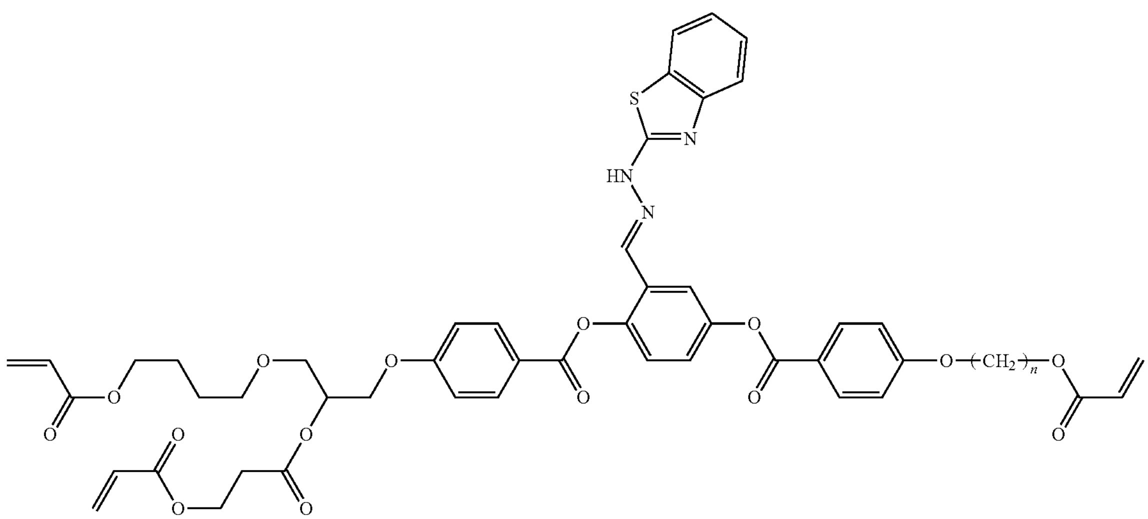
(5-a-10)
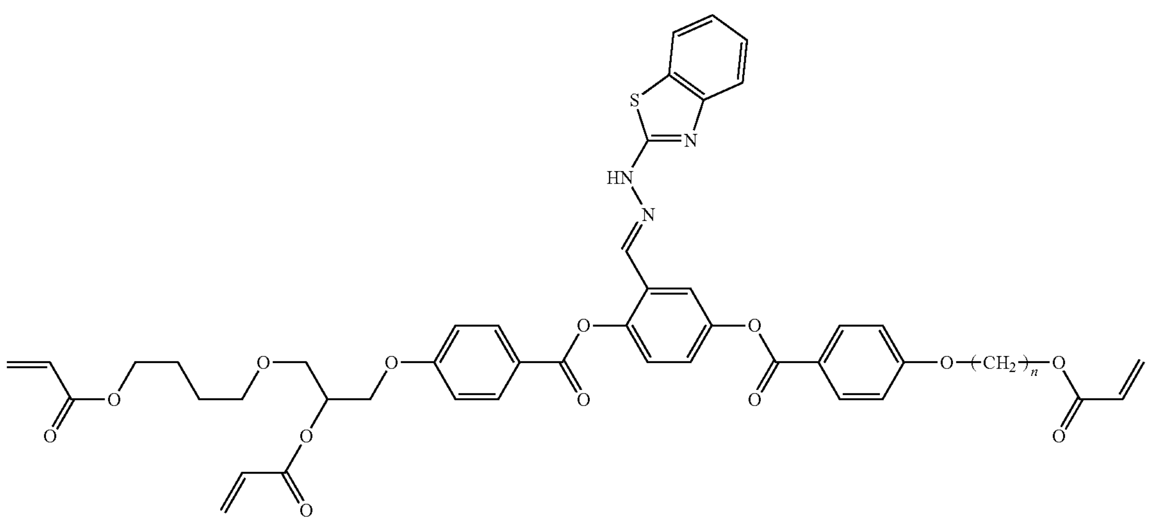

-continued
(5-a-11)
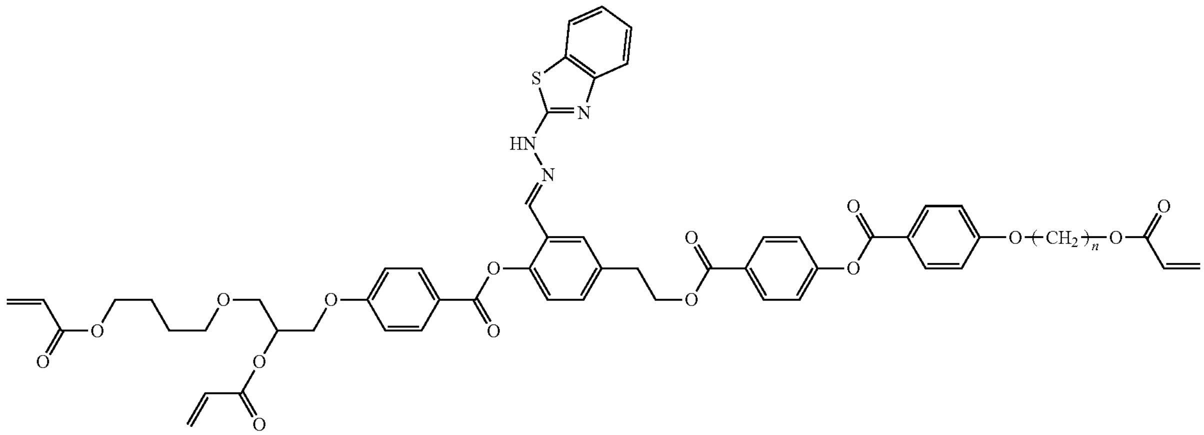
(5-a-12)
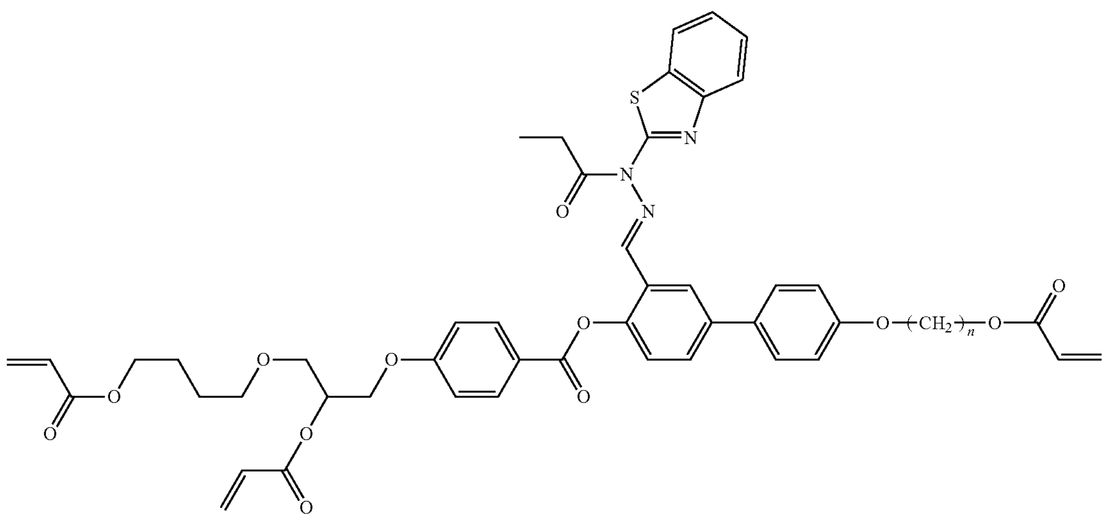
[Chem. 88]
(5-a-13)
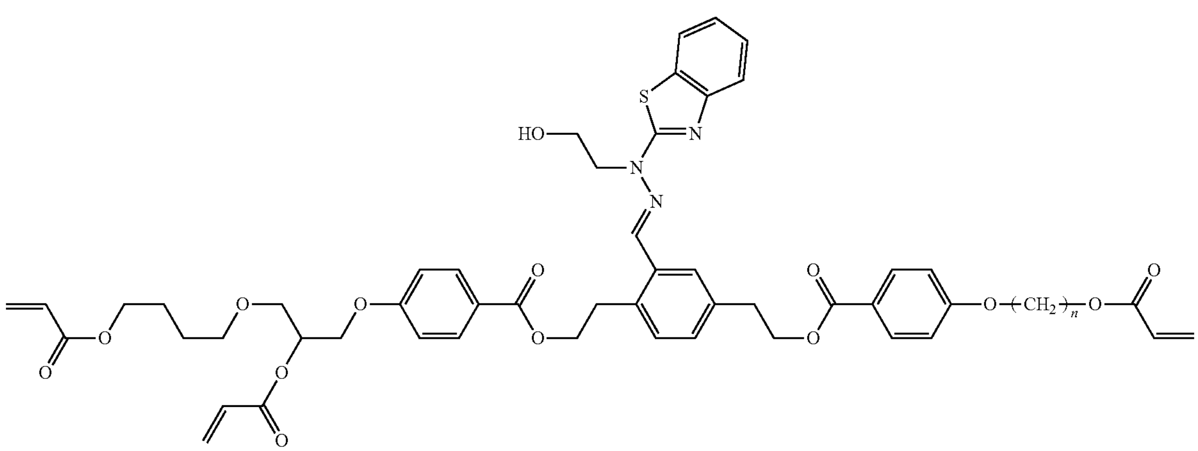

-continued
(5-a-14)
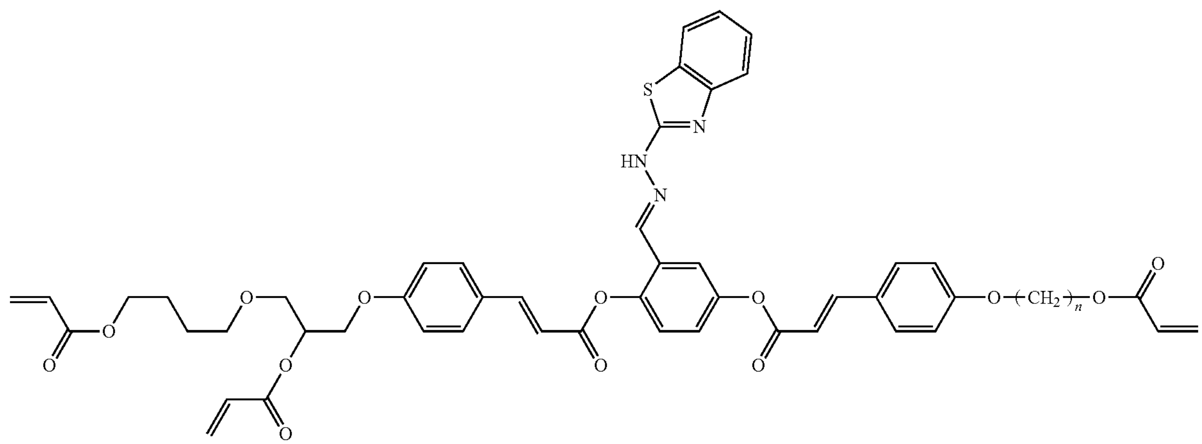
(5-a-15)
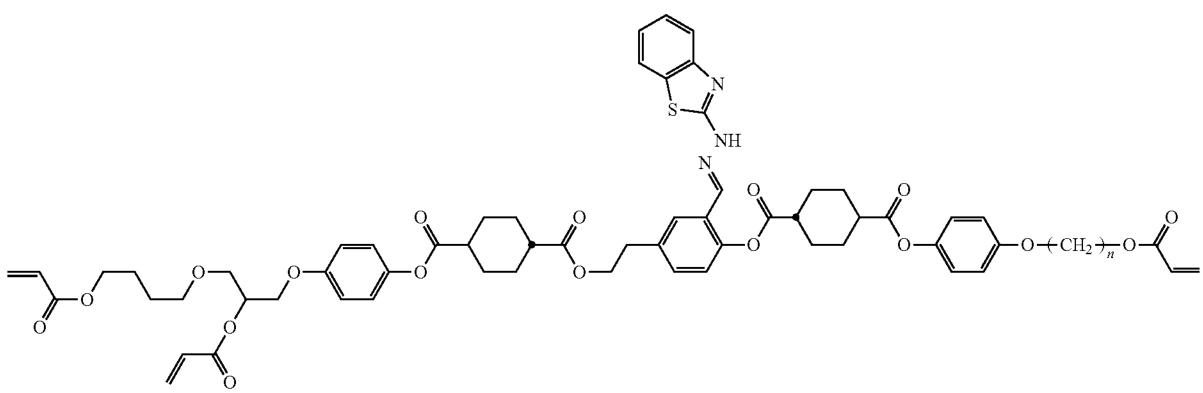
(5-a-16)
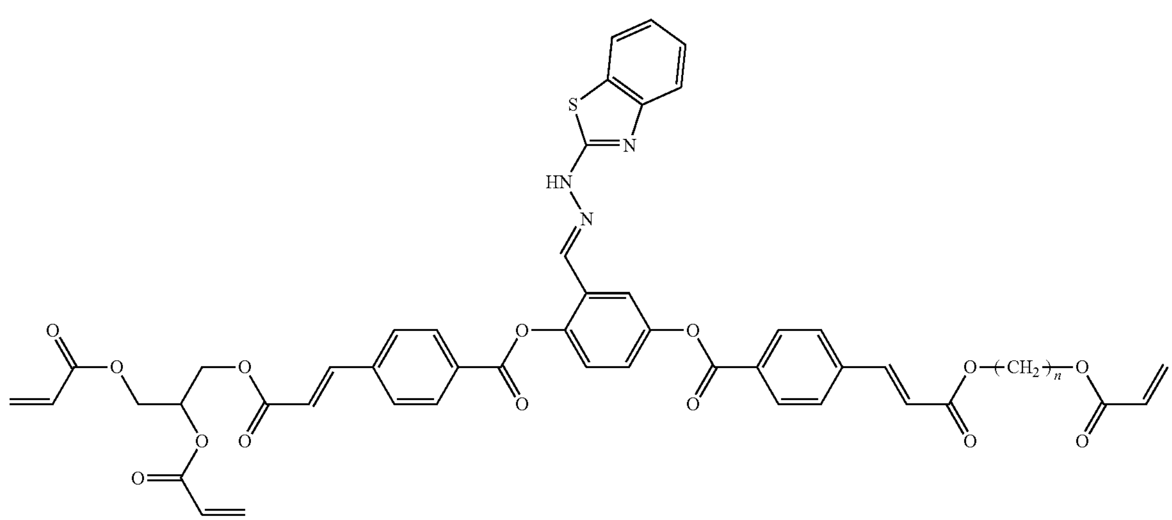

-continued
[Chem. 89]
(5-a-17)
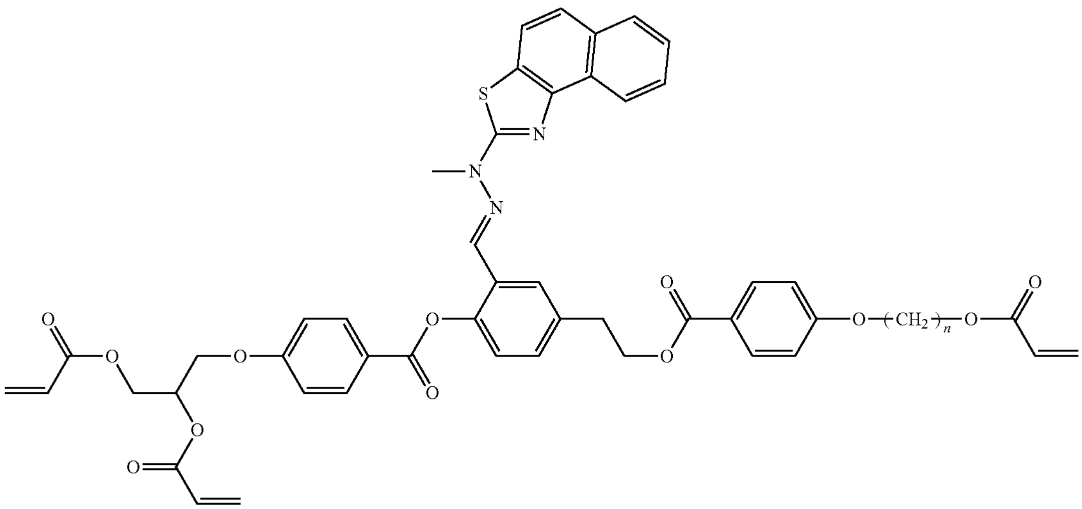
(5-a-18)
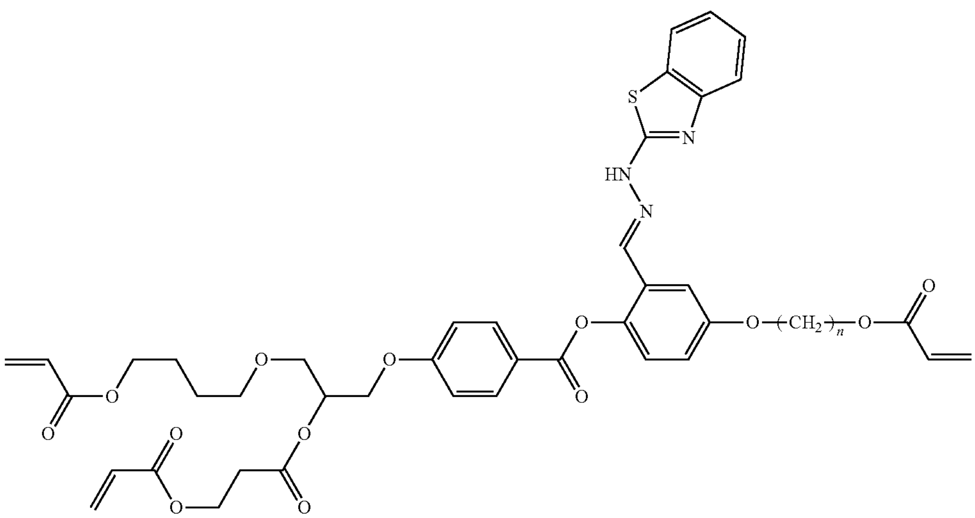
(5-a-19)
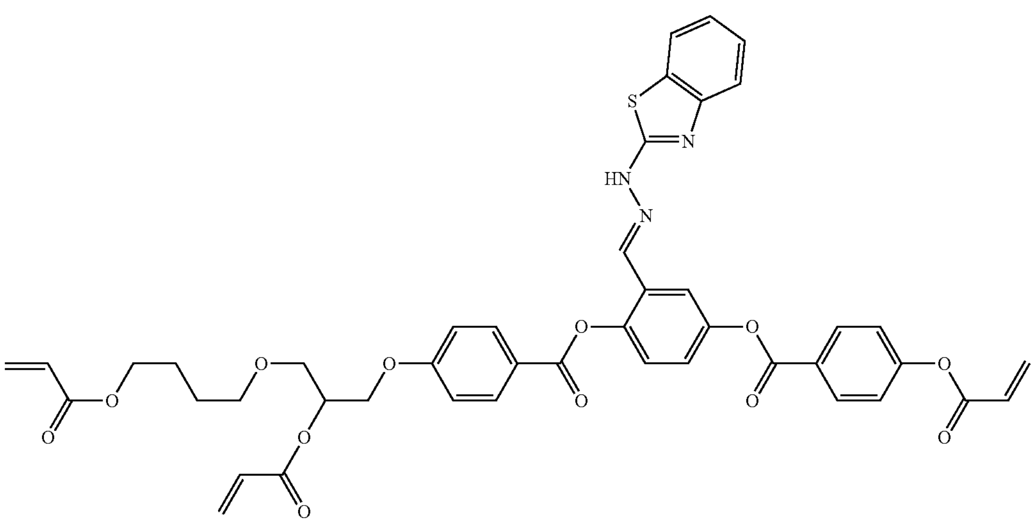

-continued
(5-a-20)
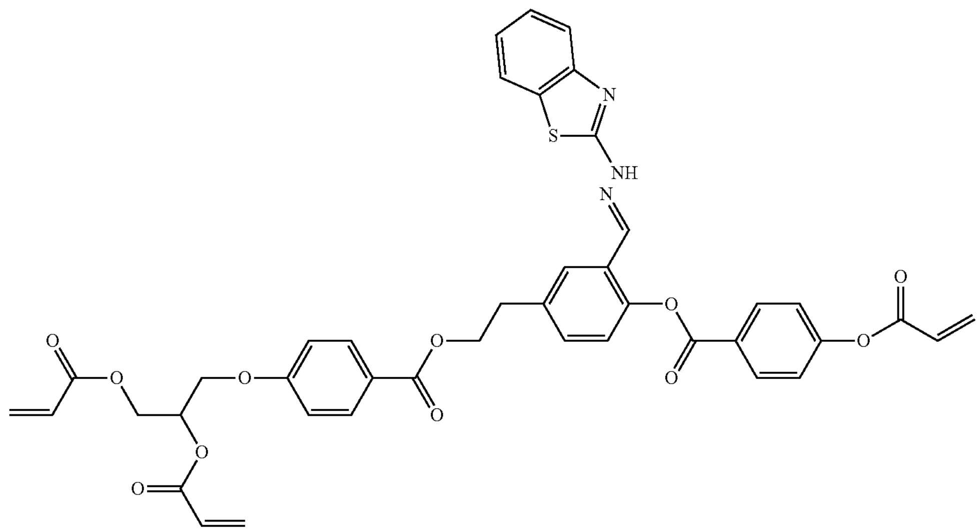
[Chem. 90]
(5-a-21)
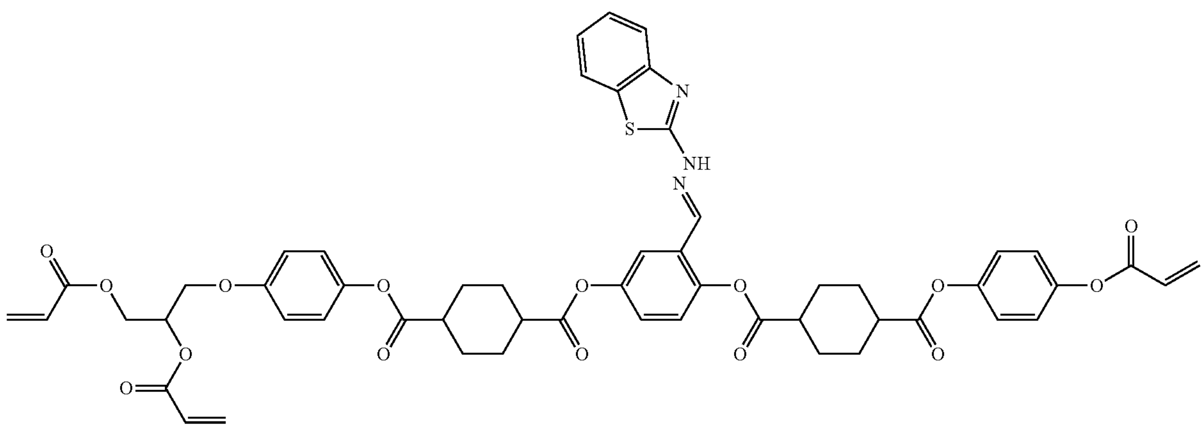
(5-a-22)
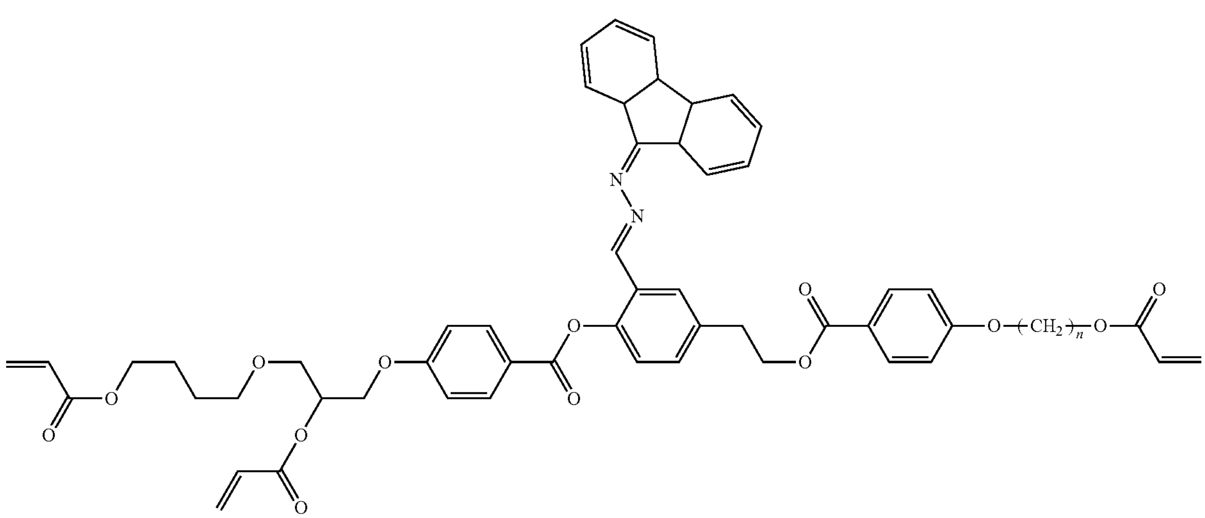

-continued
[Chem. 91]
(5-a-23)
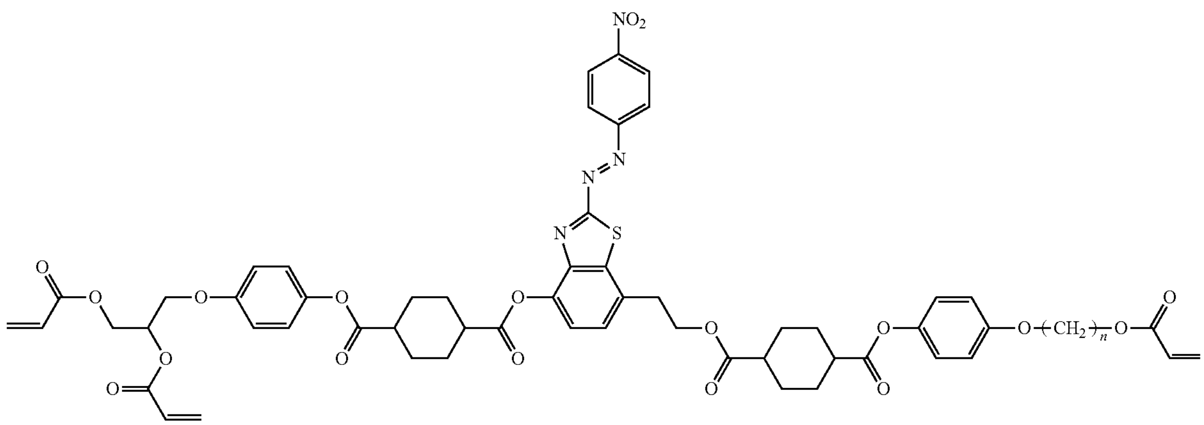
(5-a-24)
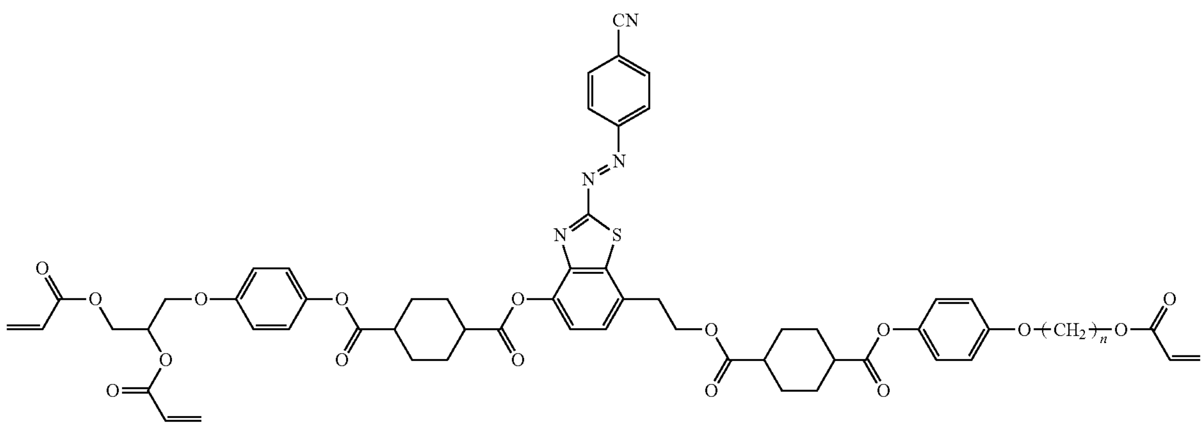
[Chem. 92]
(5-a-25)
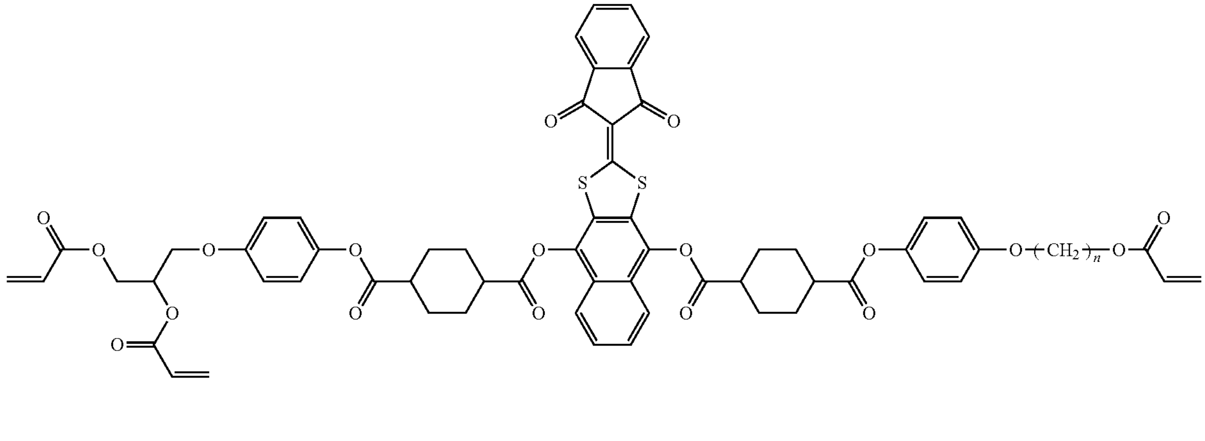

-continued
(5-a-26)
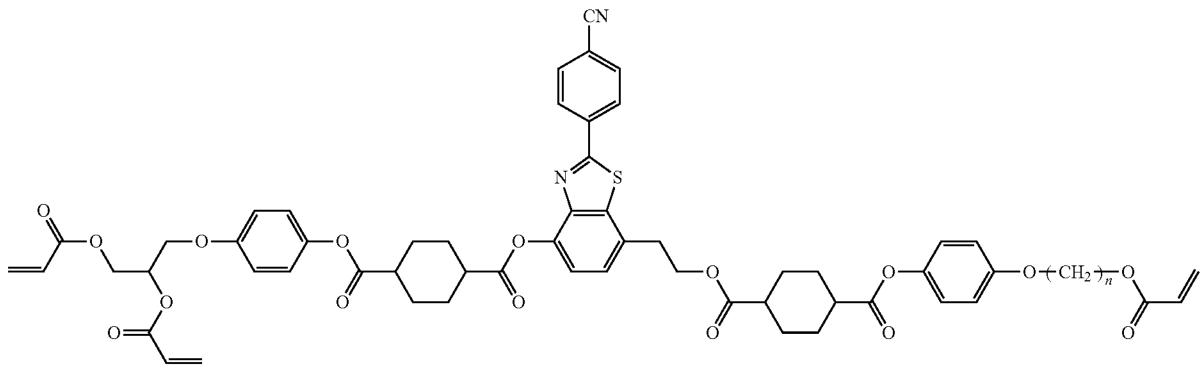
[Chem. 93]
(5-a-27)
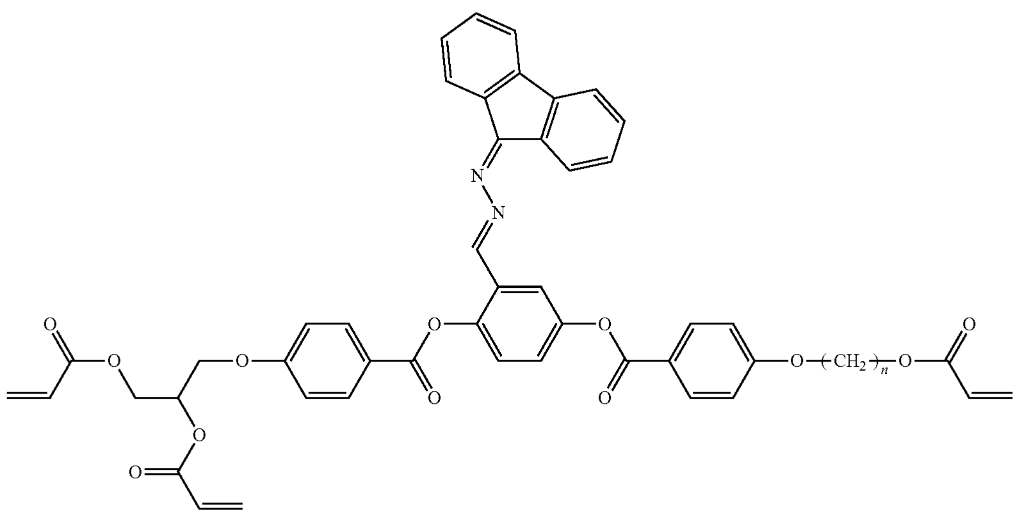
(5-a-28)
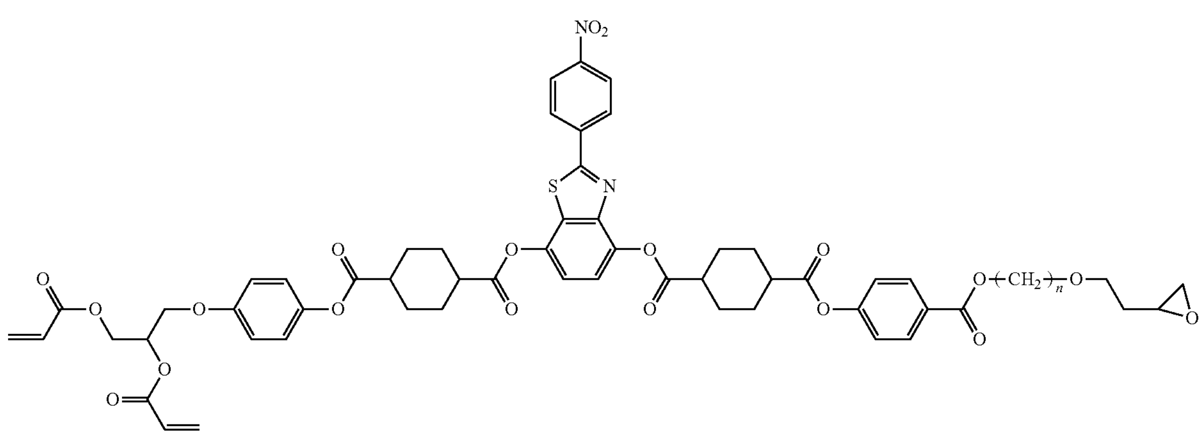

-continued (5-a-29)

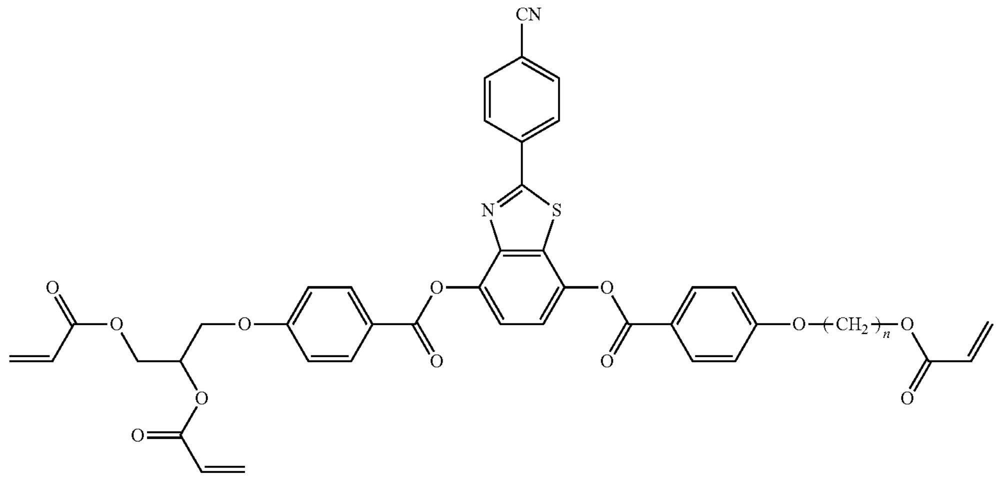

(in these formulas, n represents the number of carbon atoms and is 1 to 10). These liquid crystalline compounds may be used alone or as a mixture of two or more.

In general formula (6), the group represented by $P^{63}$—$(S^{63}$—$X^{63})_{16}$— and the group represented by $P^{64}$—$(S^{64}$—$X^{64})_{k6}$— are bonded to $A^{11}$ or $A^{12}$ in general formula (a).

Specifically, the compound represented by general formula (6) is preferably compounds represented by the following formula (6-a-1) to formula (6-a-25):

[Chem. 94]

(6-a-1)

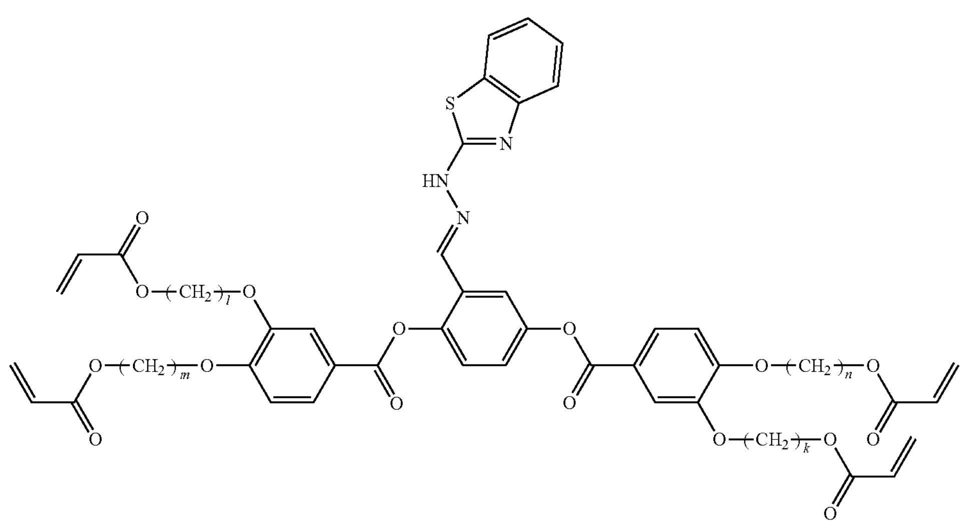

-continued
(6-a-2)
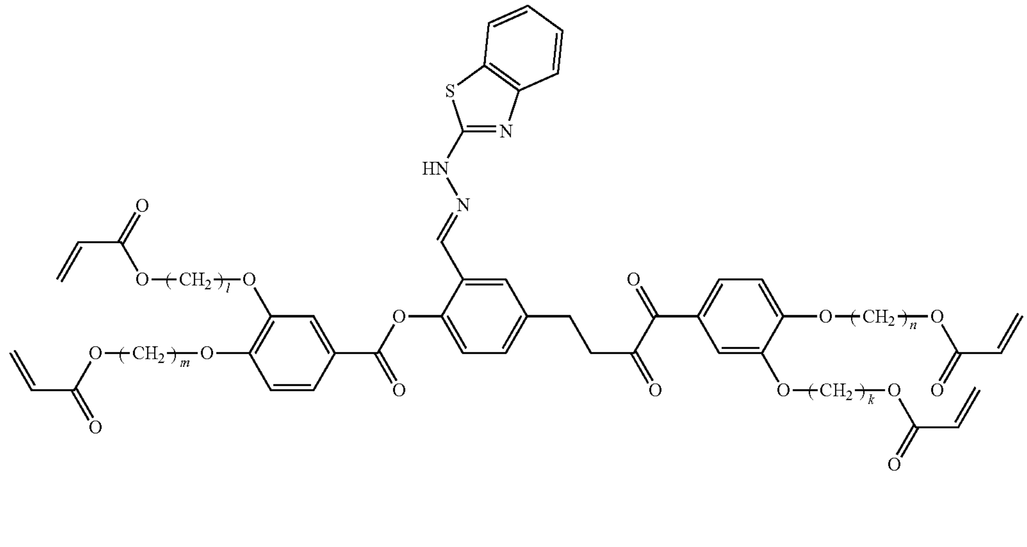
(6-a-3)
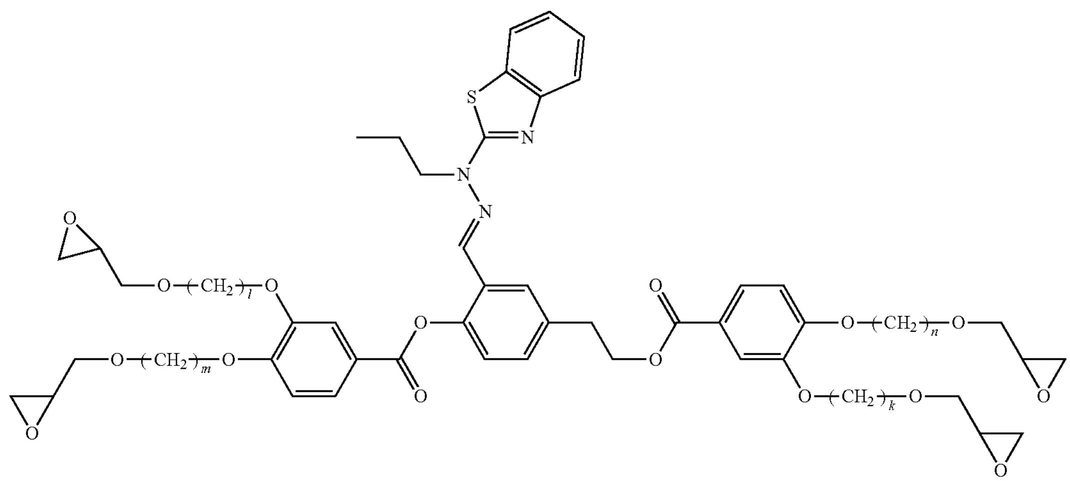
(6-a-4)
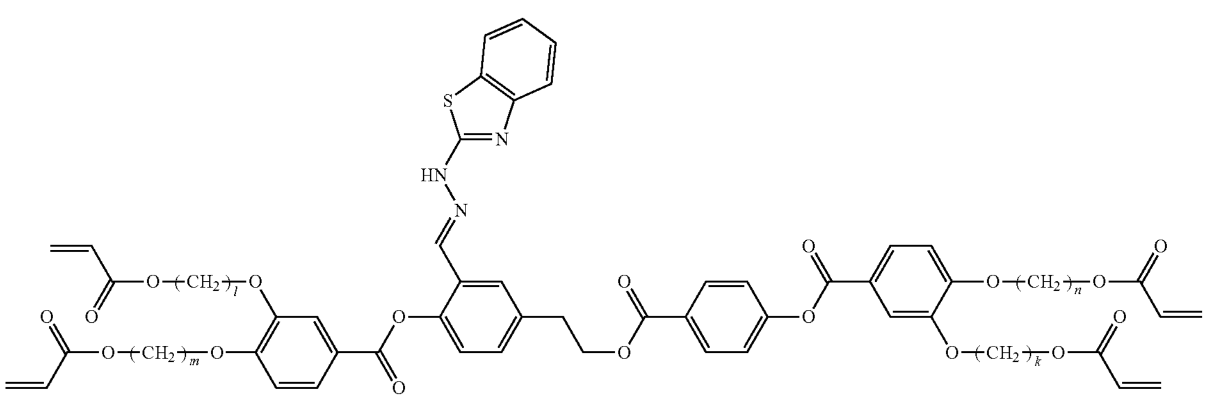

-continued
[Chem. 95]
(6-a-5)
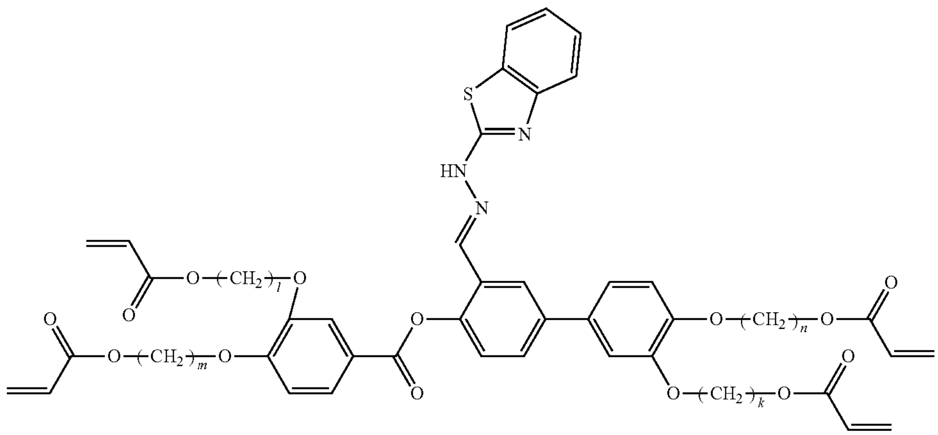
(6-a-6)
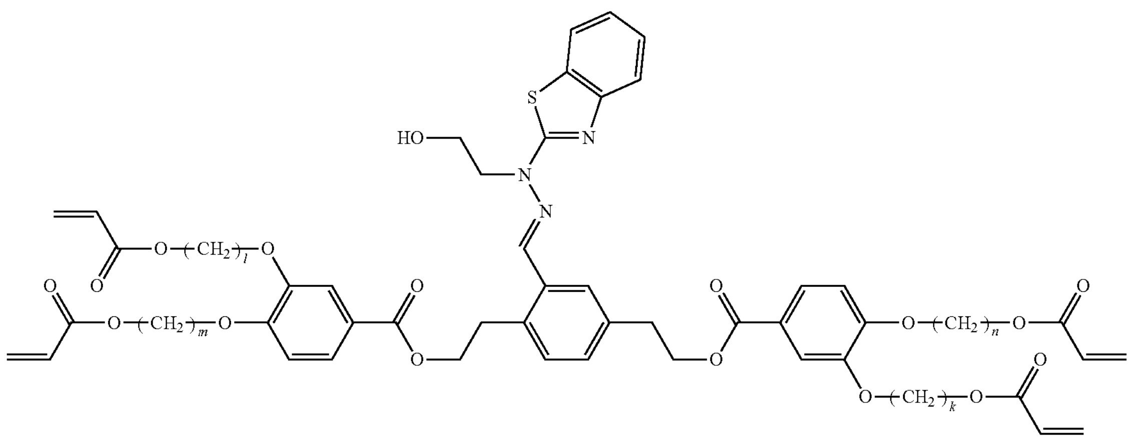
(6-a-7)
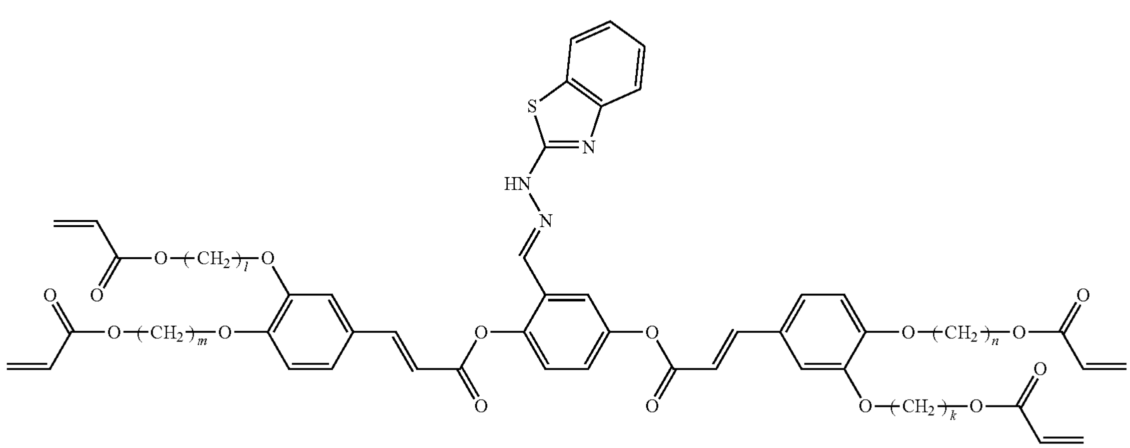

-continued
(6-a-8)
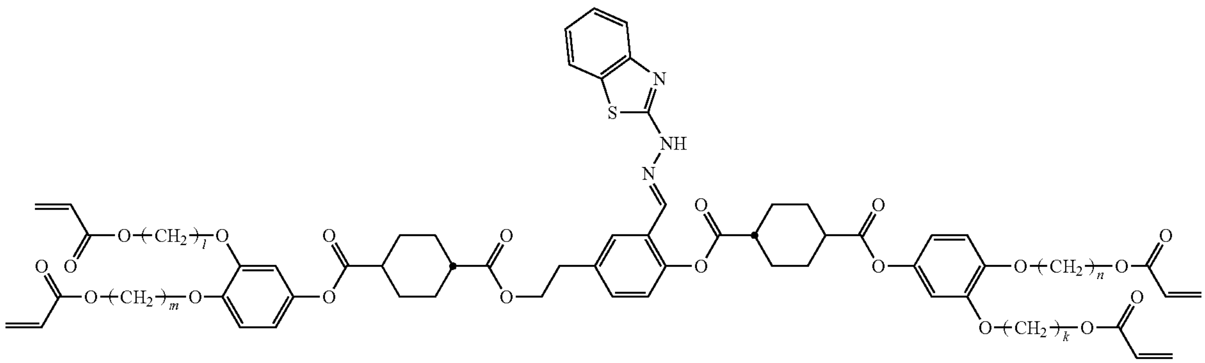
(6-a-9)
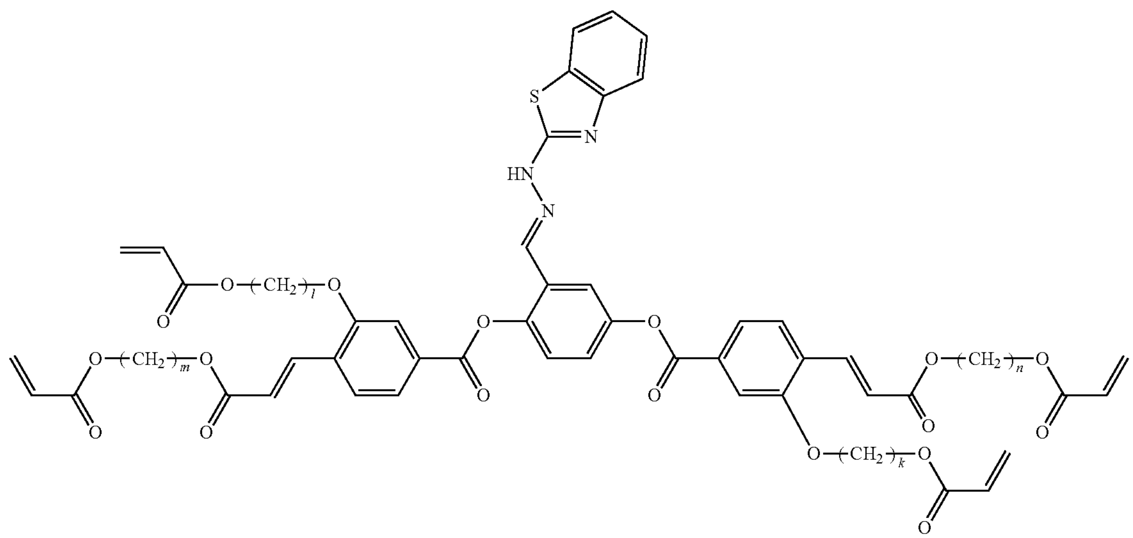
[Chem. 96]
(6-a-10)
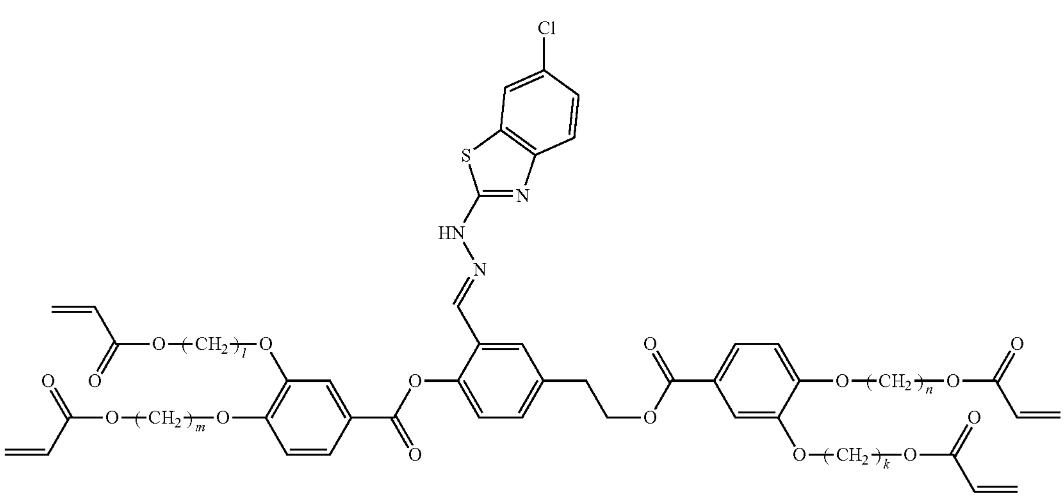

-continued
(6-a-11)
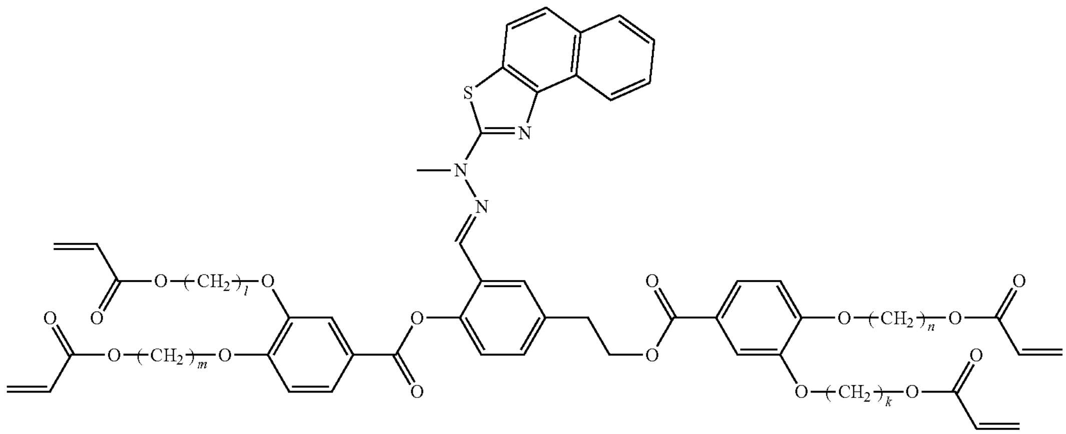
(6-a-12)
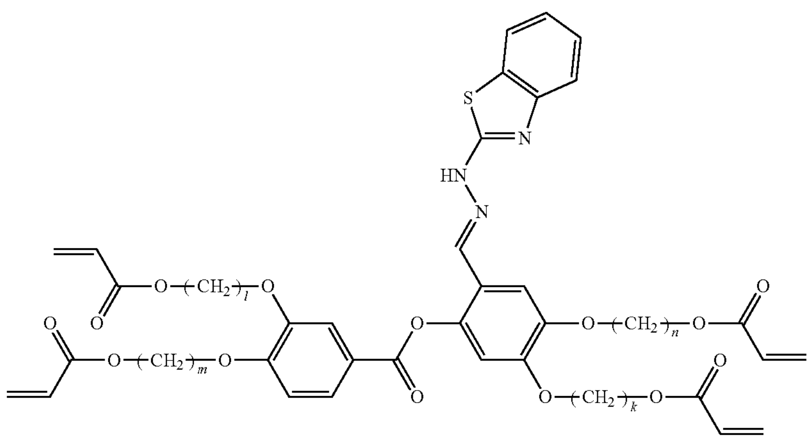
(6-a-13)
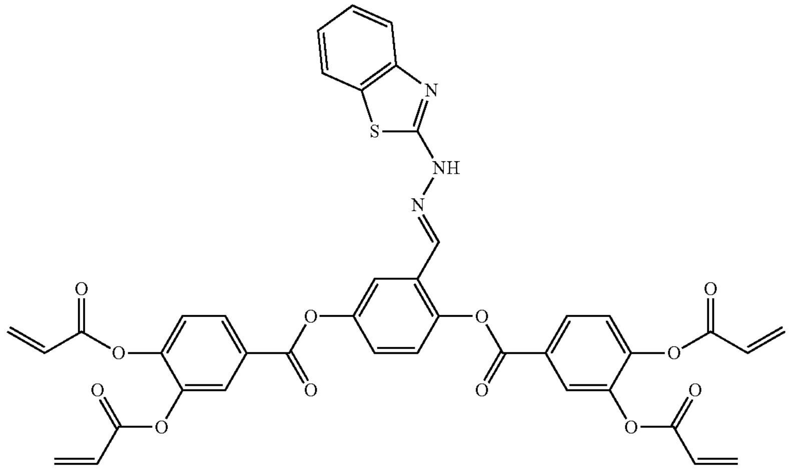

-continued
(6-a-14)
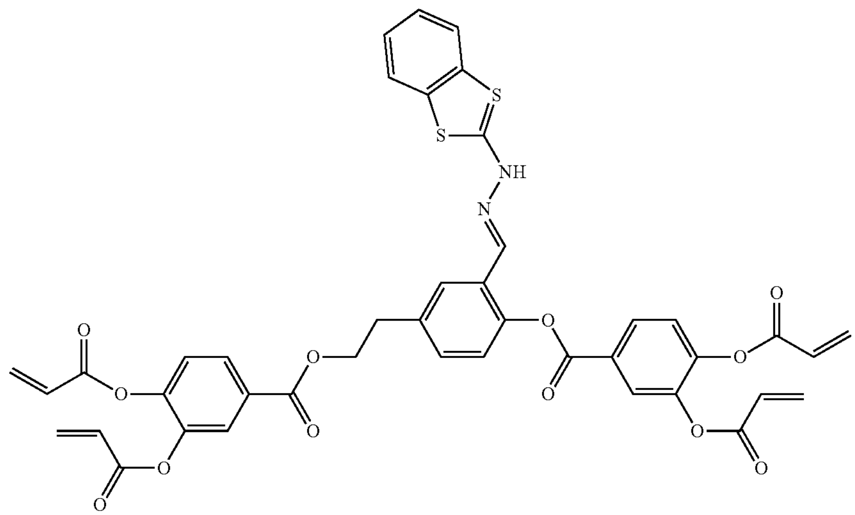
[Chem. 97]
(6-a-15)
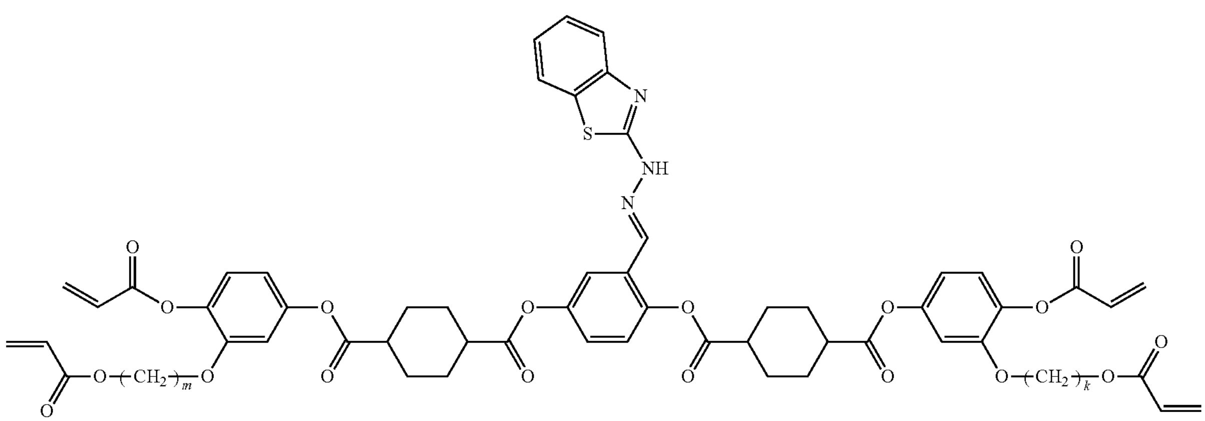
(6-a-16)
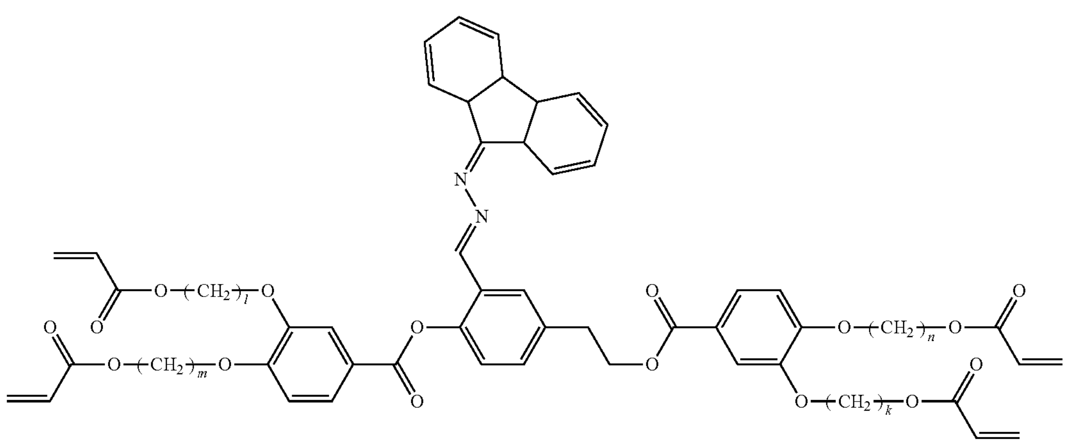

-continued
(6-a-17)
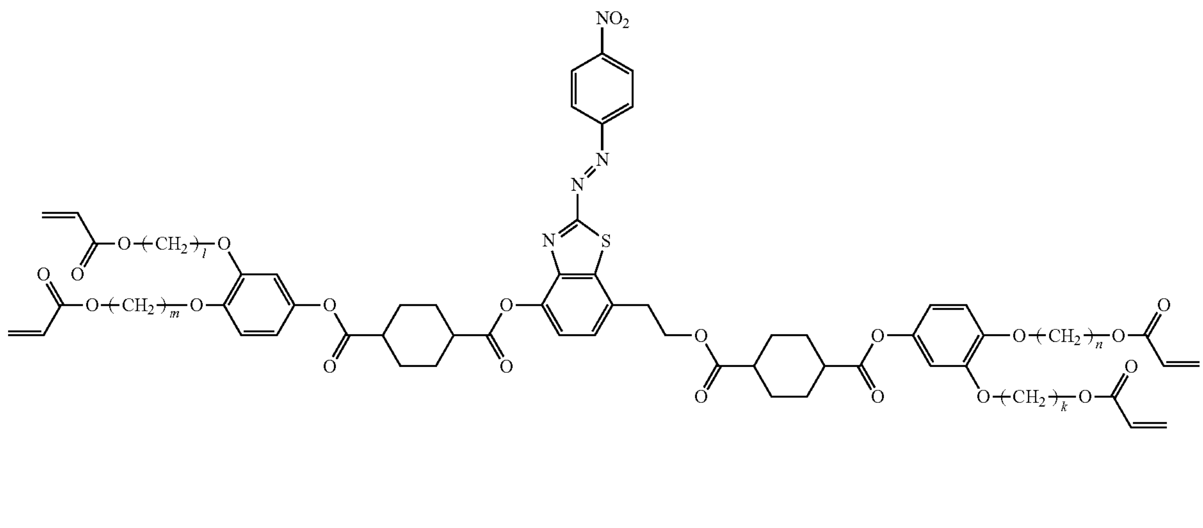
(6-a-18)
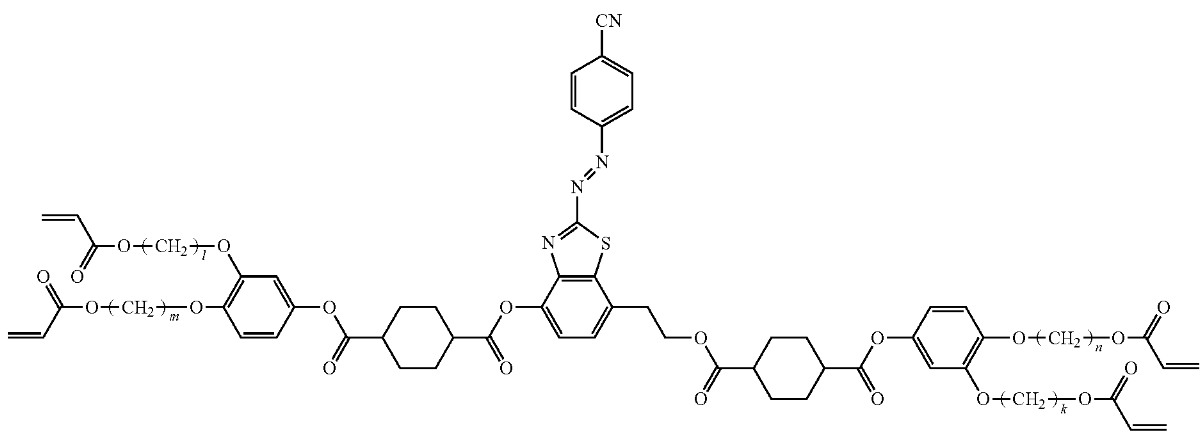
[Chem. 98]
(6-a-19)
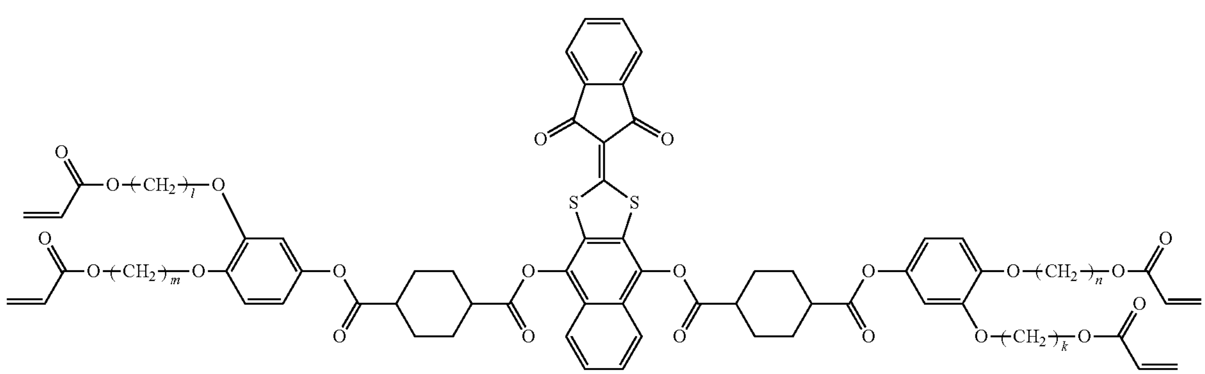

-continued
(6-a-20)
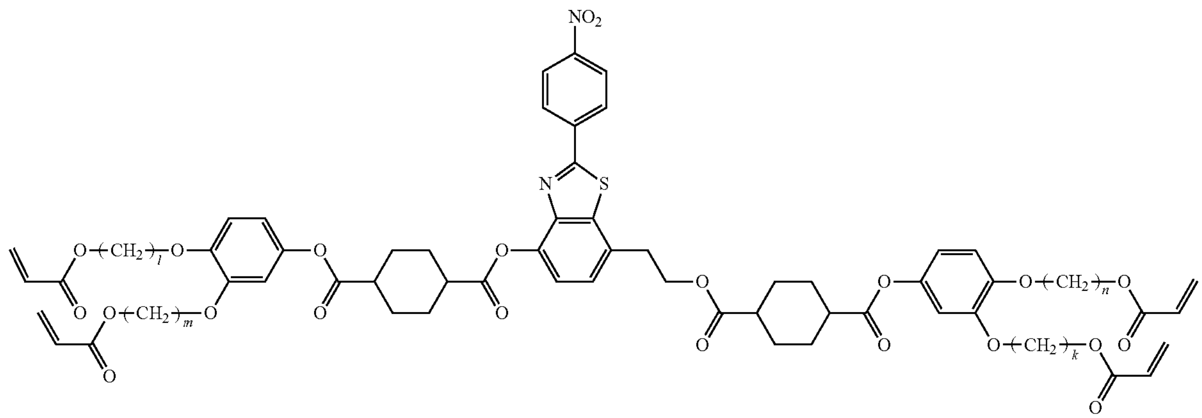
(6-a-21)
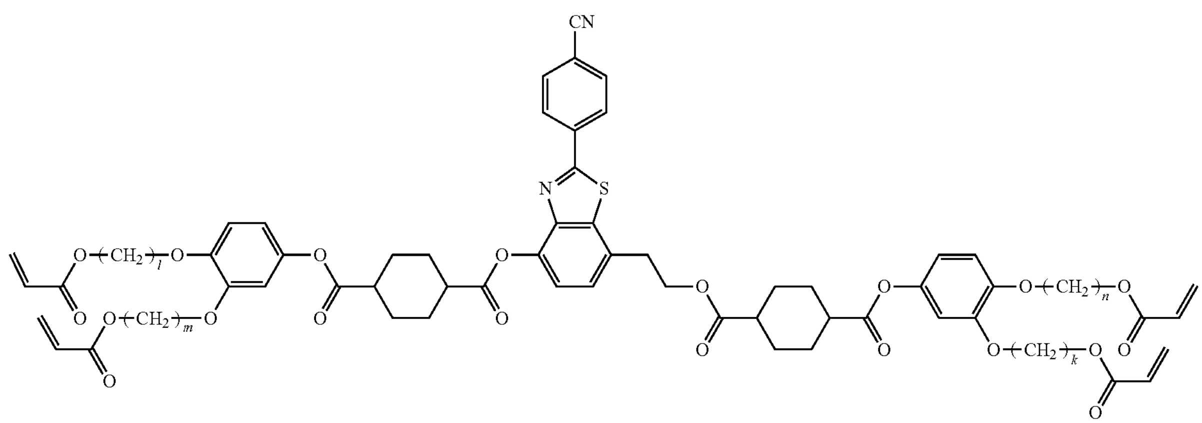
(6-a-22)
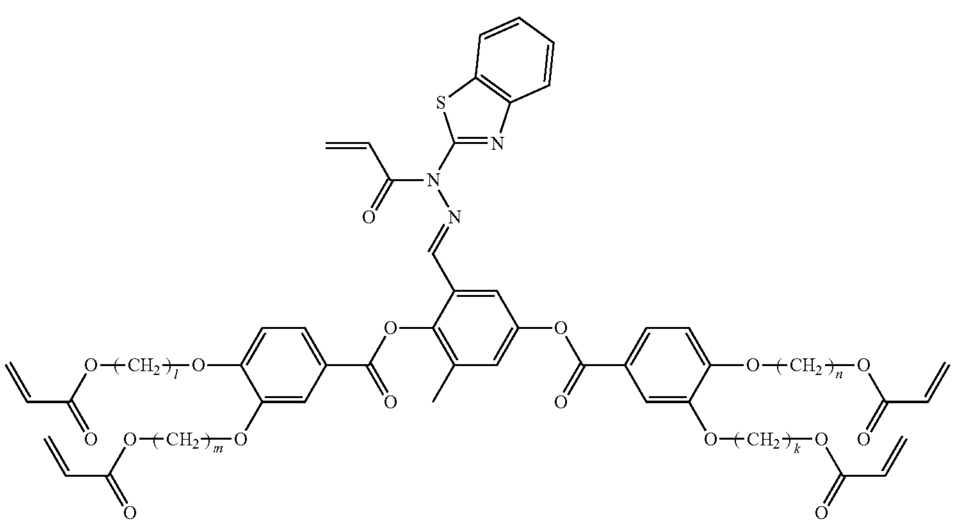

-continued
[Chem. 99]
(6-a-23)
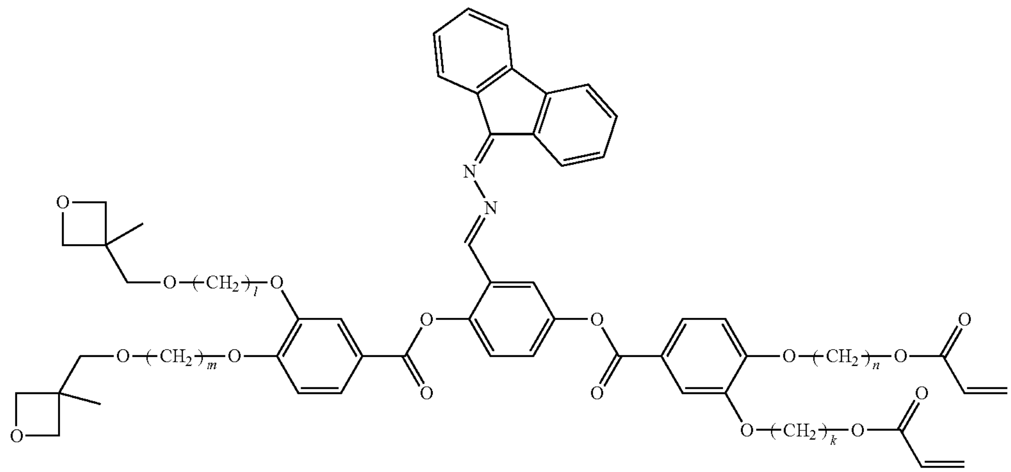
(6-a-24)
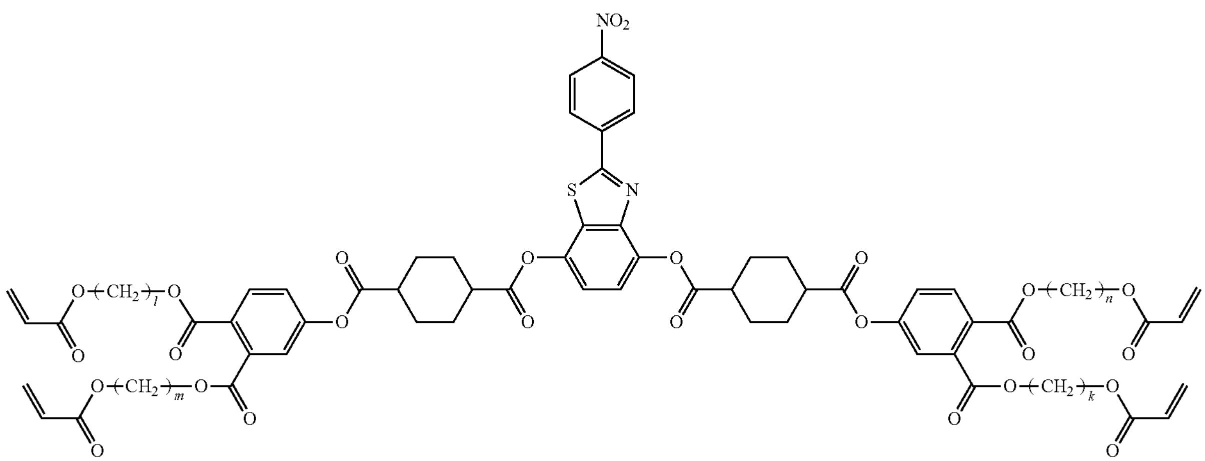
(6-a-25)
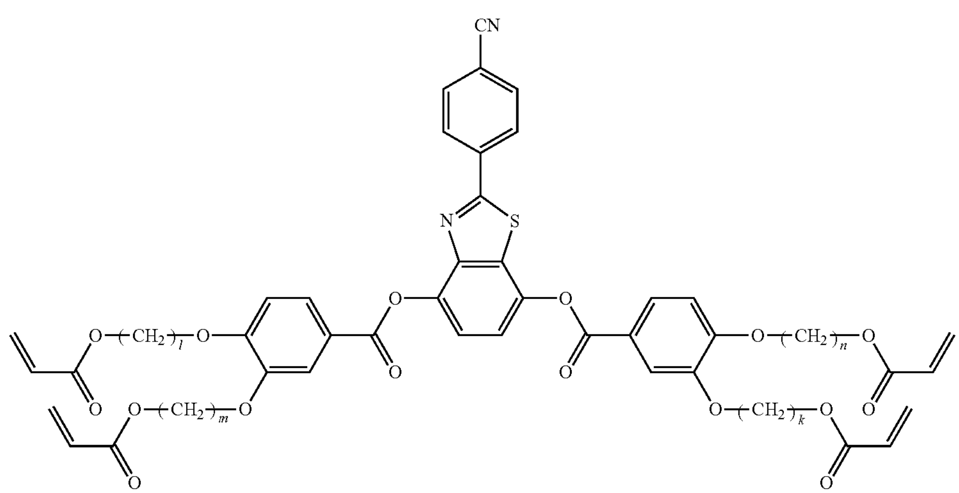
(in the above formulas, k, l, m, and n each independently represent the number of carbon atoms and are 1 to 10). These liquid crystalline compounds may be used alone or as a mixture of two or more.
Specifically, the compound represented by general formula (7) is preferably compounds represented by the following formula (7-a-1) to formula (7-a-26):

[Chem. 100]
(7-a-1)
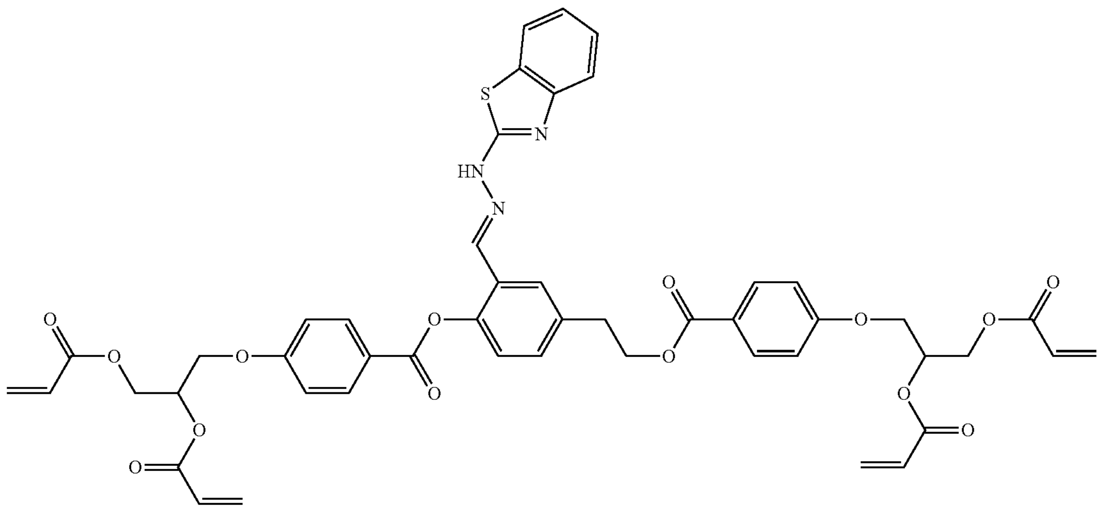
(7-a-2)
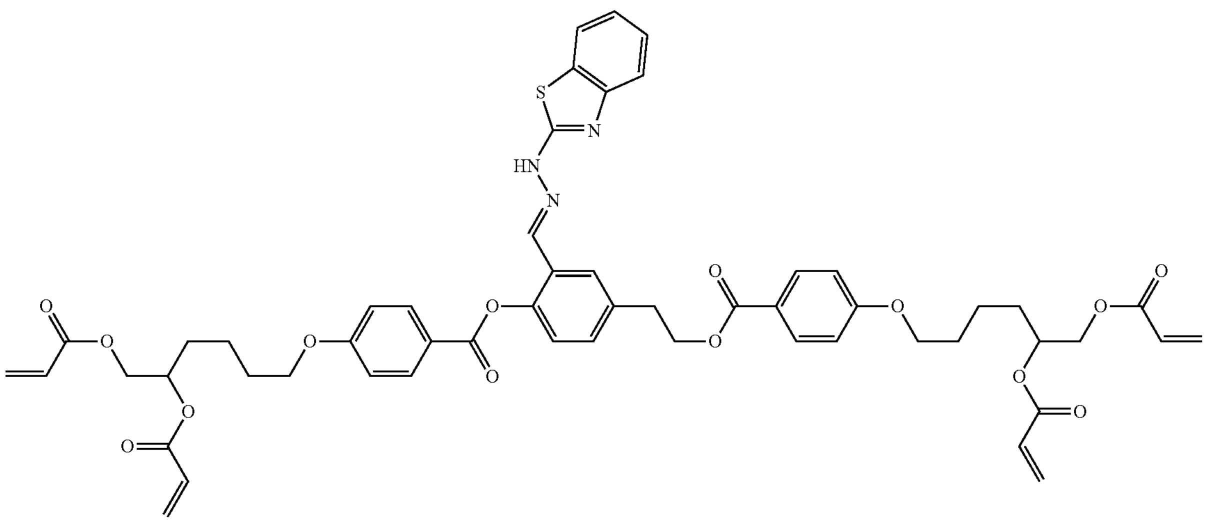
(7-a-3)
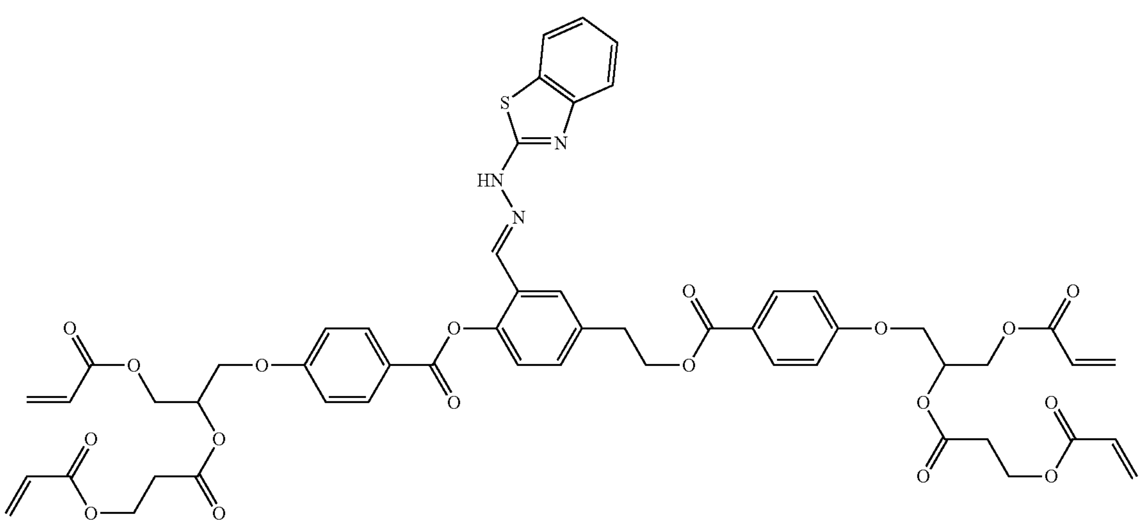

-continued
(7-a-4)
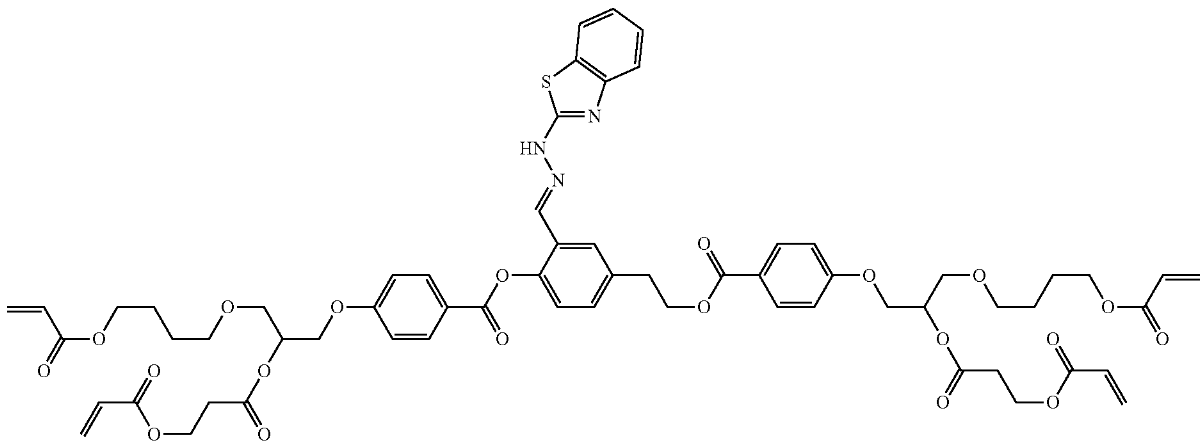
(7-a-5)
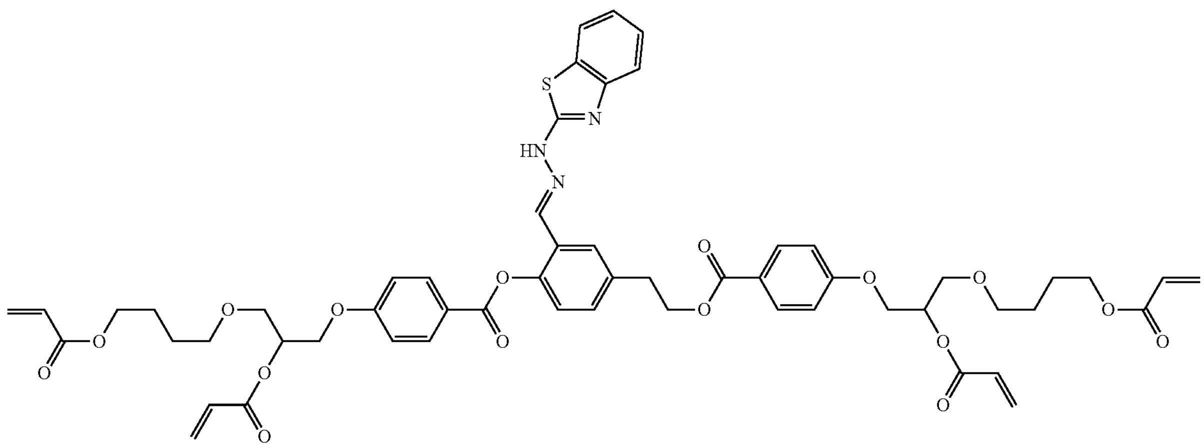
[Chem. 101]
(7-a-6)
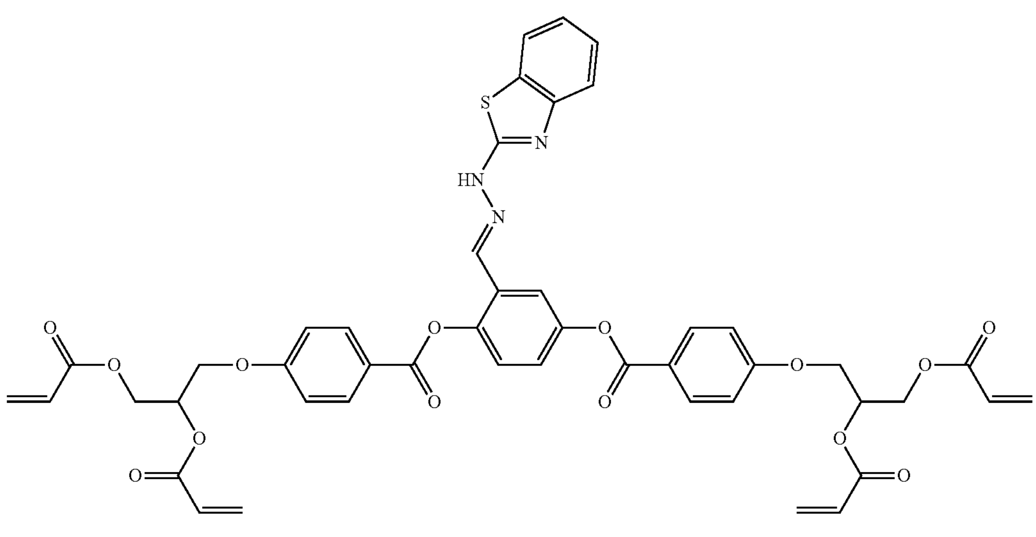

-continued
(7-a-7)
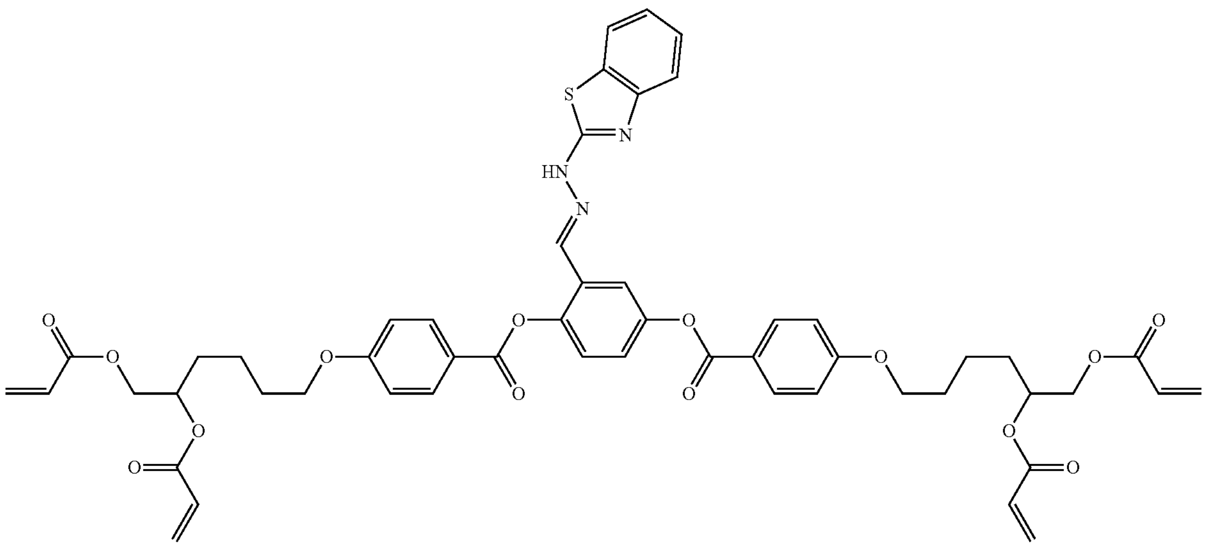
(7-a-8)
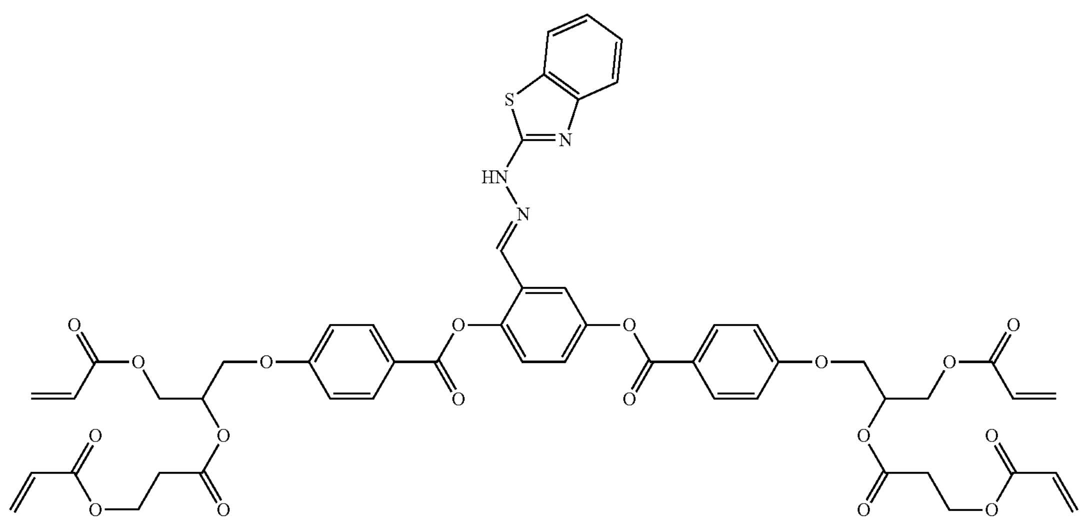
(7-a-9)
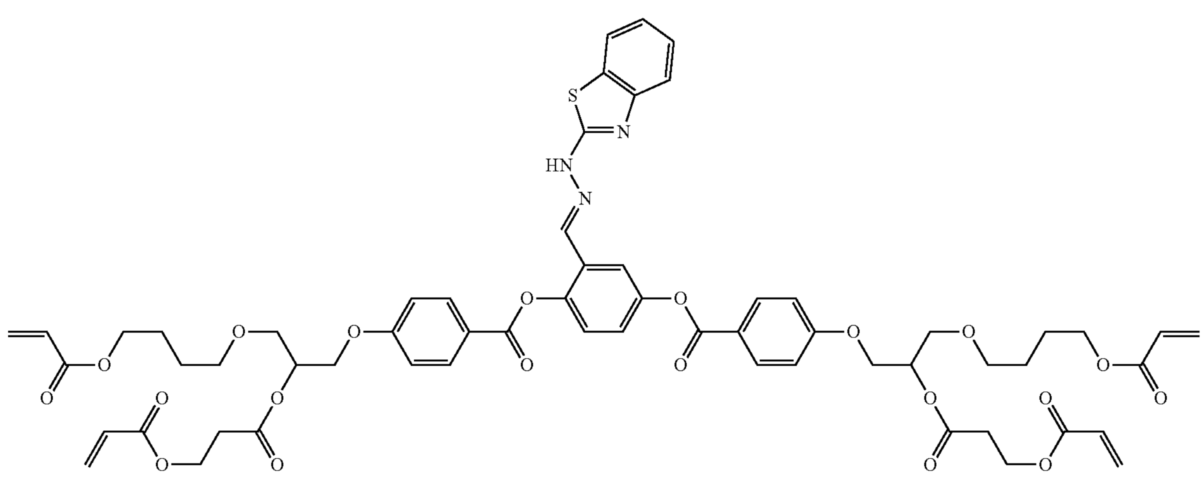

-continued
[Chem. 102]
(7-a-10)
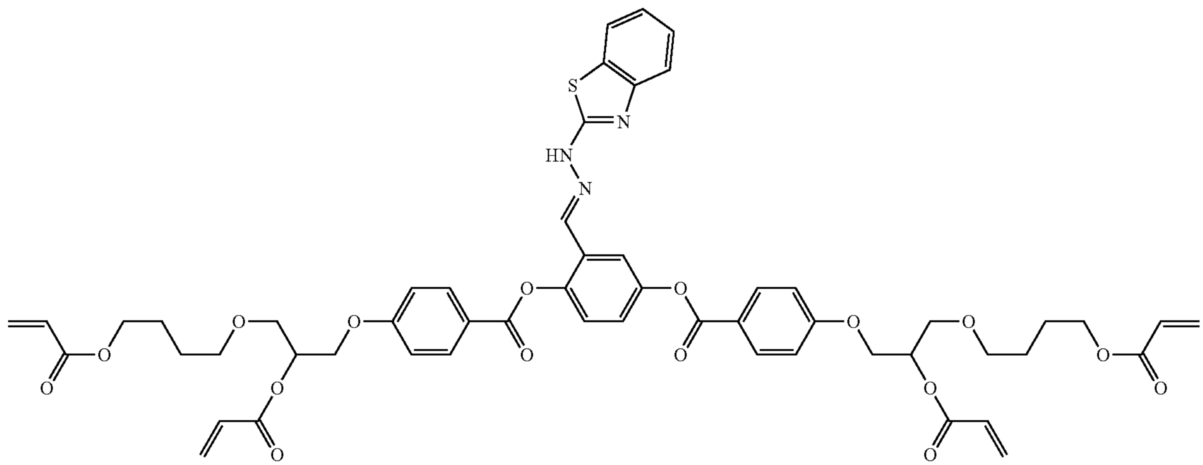
(7-a-11)
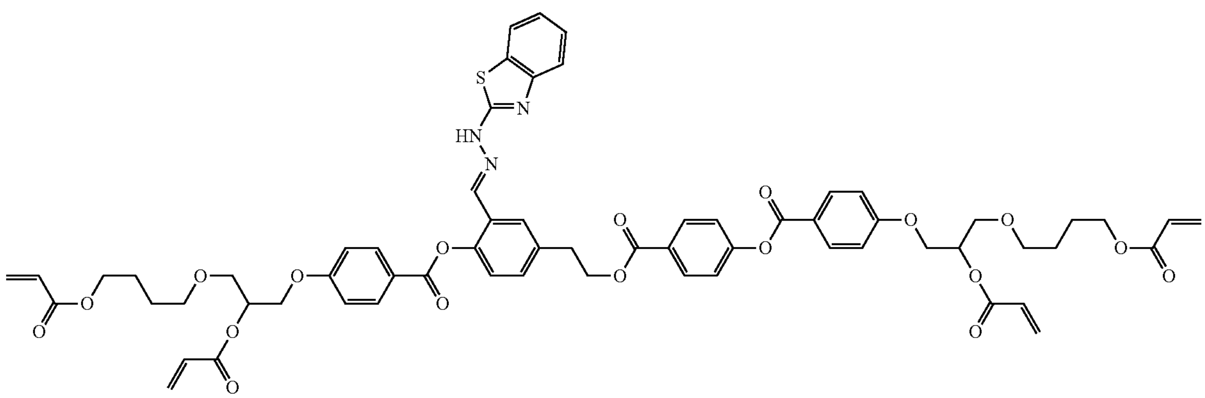
(7-a-12)
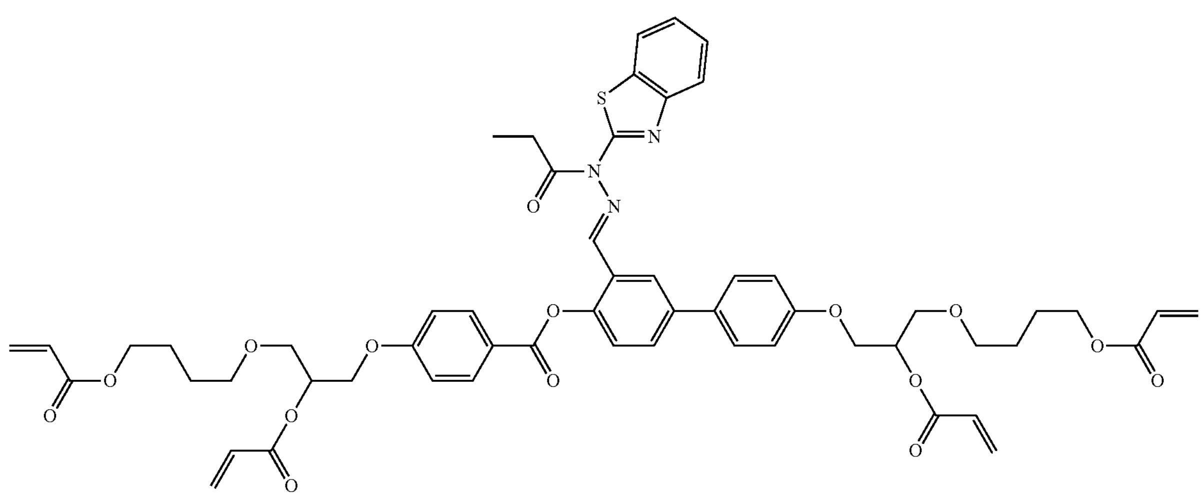

-continued
(7-a-13)
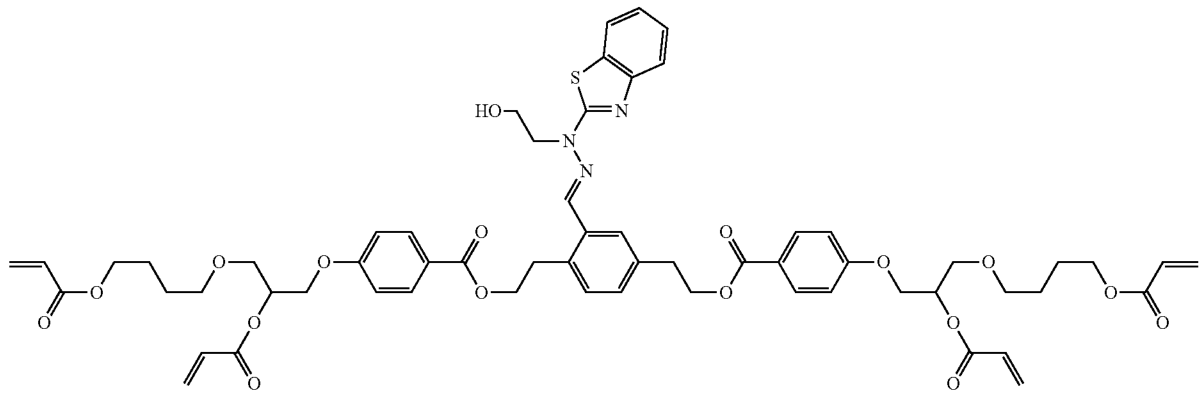
[Chem. 103]
(7-a-14)
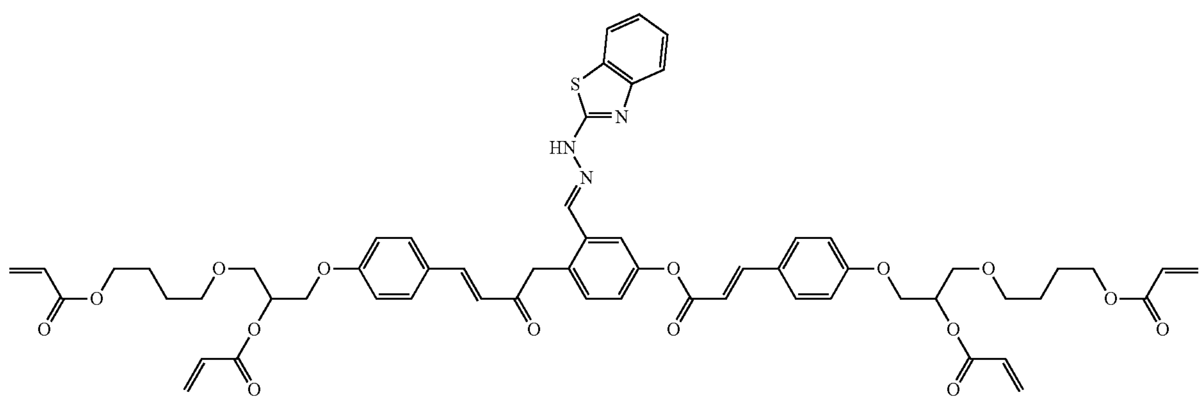
(7-a-15)
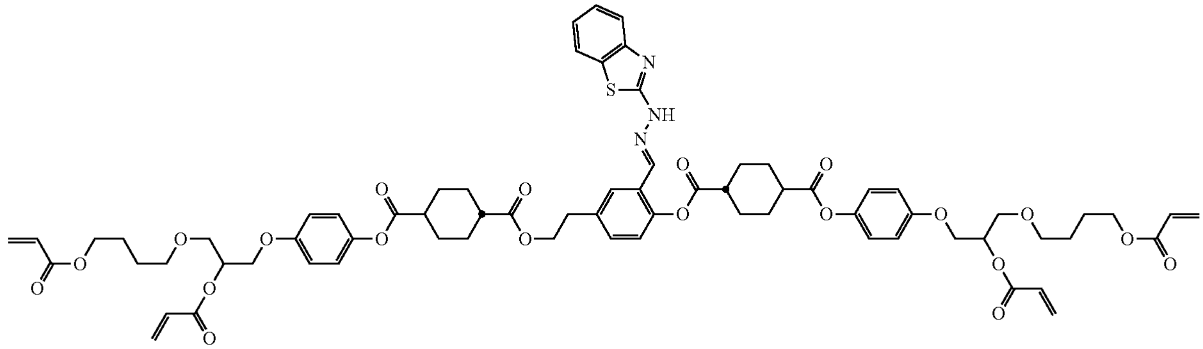

-continued
(7-a-16)
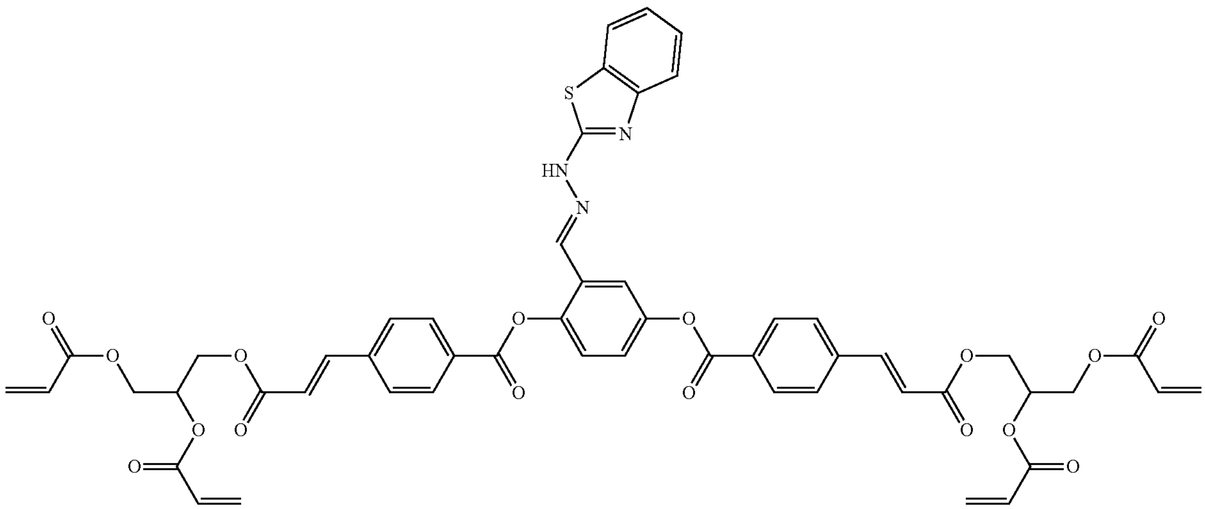
(7-a-17)
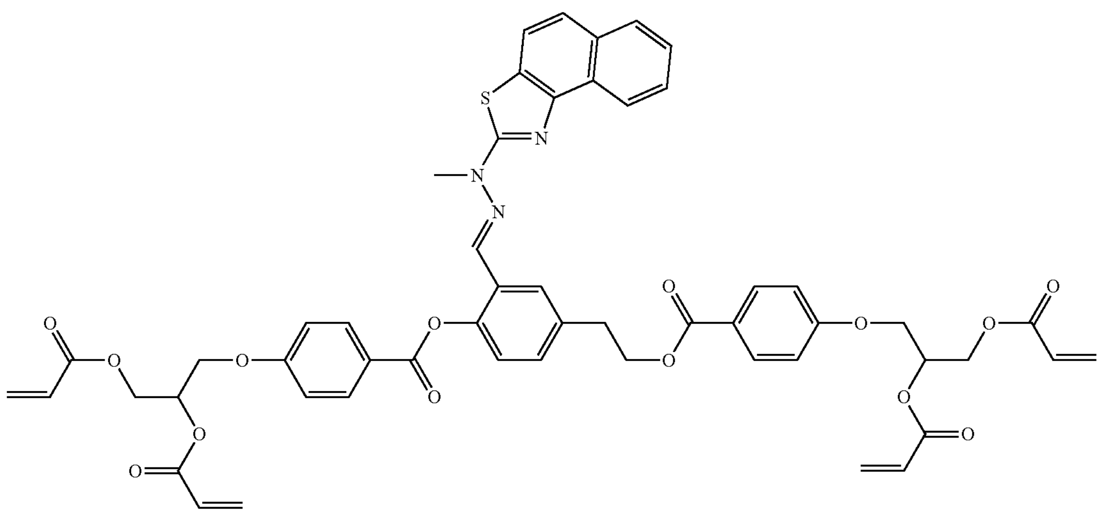
[Chem. 104]
(7-a-18)
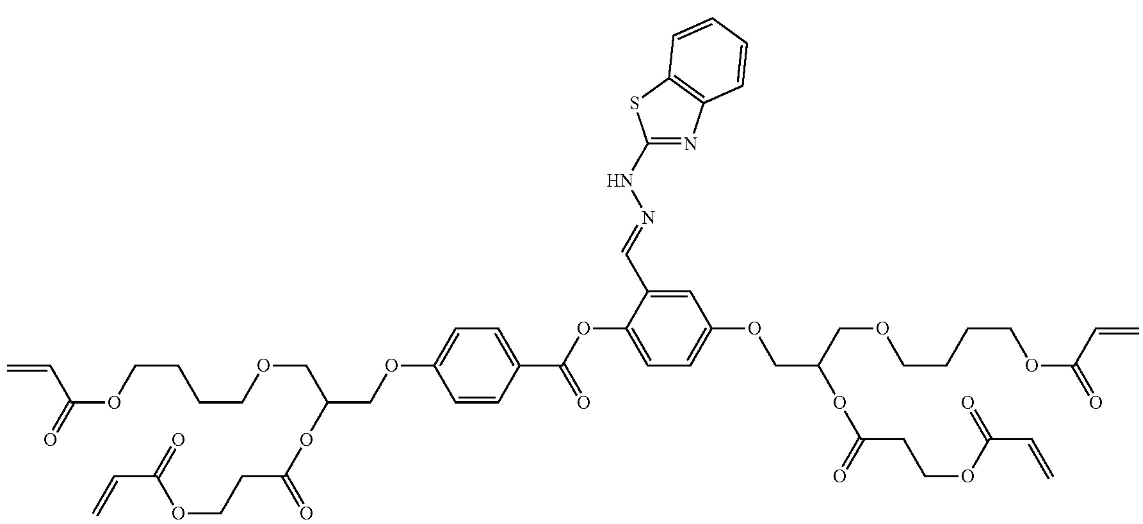

-continued
(7-a-19)
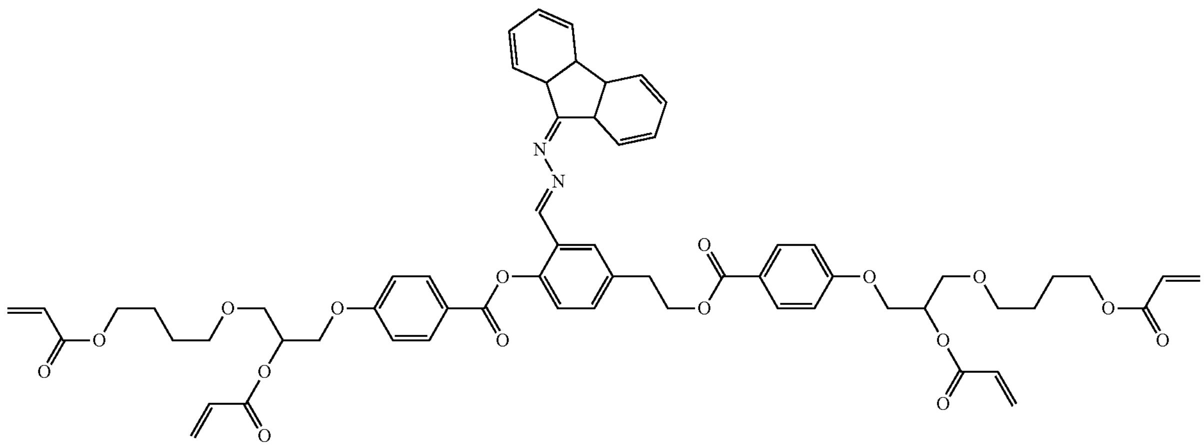
(7-a-20)
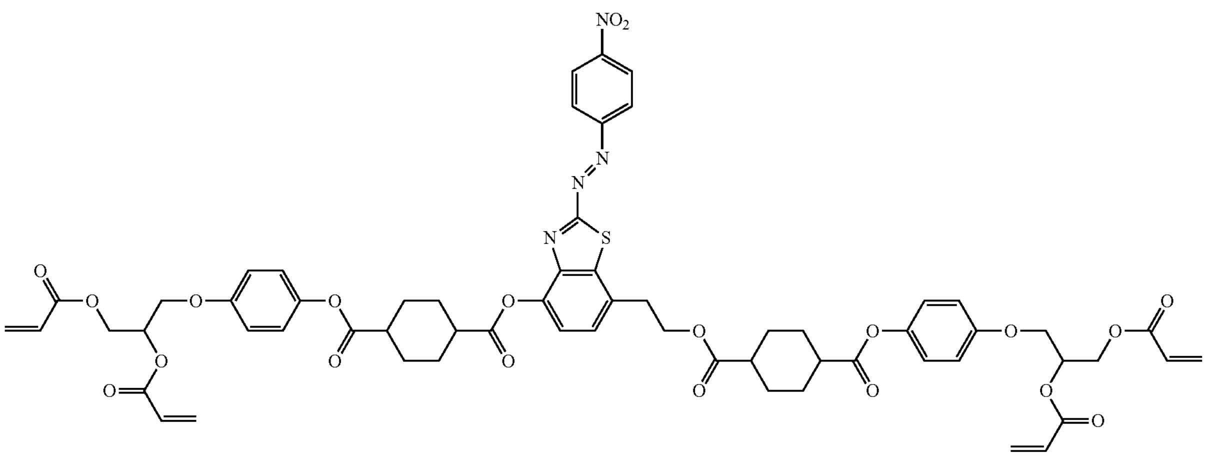
(7-a-21)
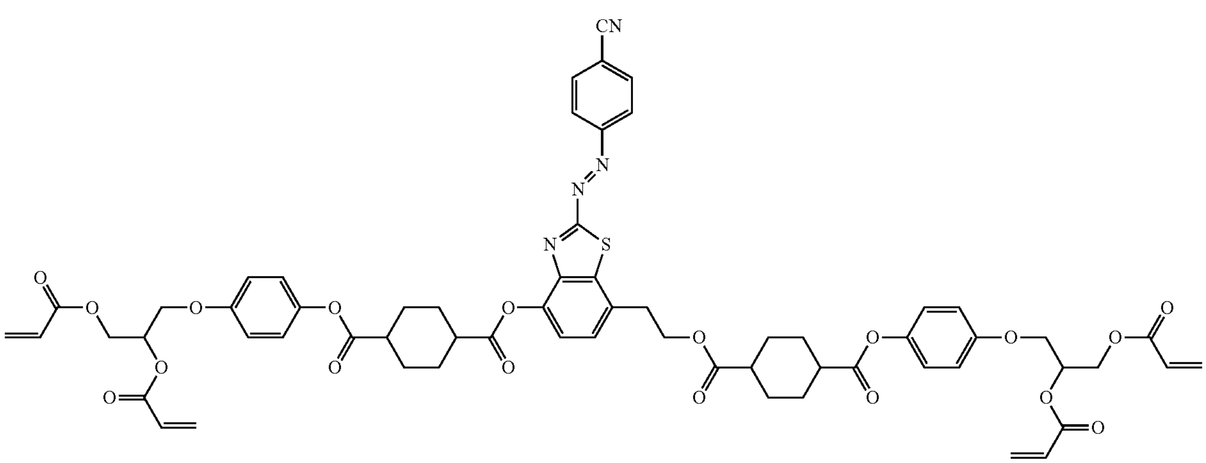

-continued
[Chem. 105]
(7-a-22)
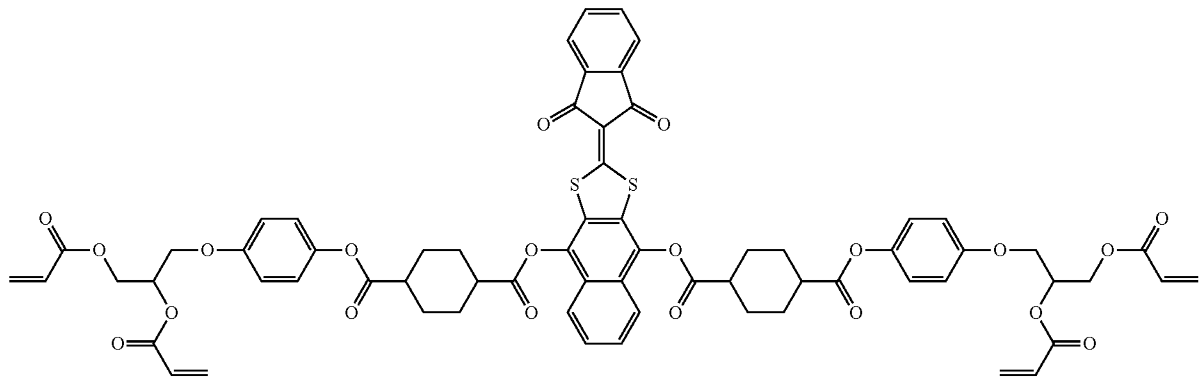
(7-a-23)
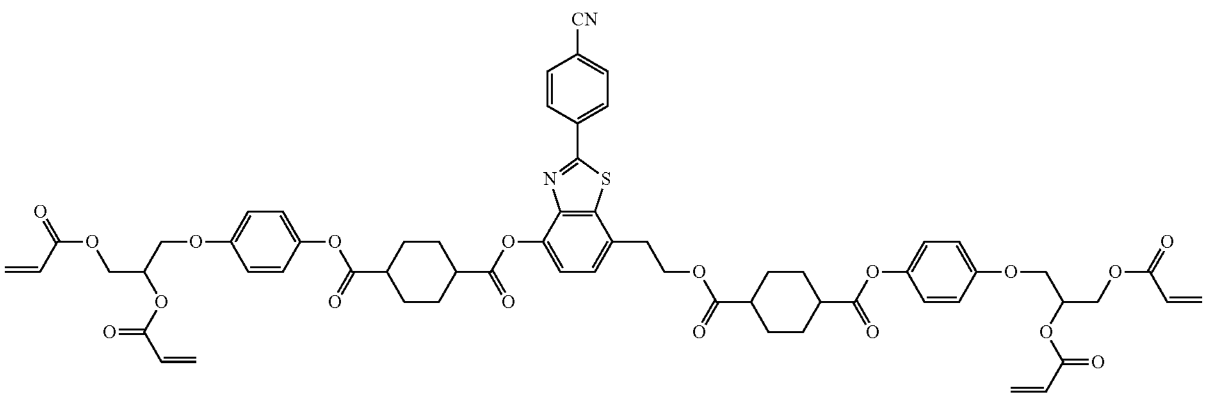
(7-a-24)
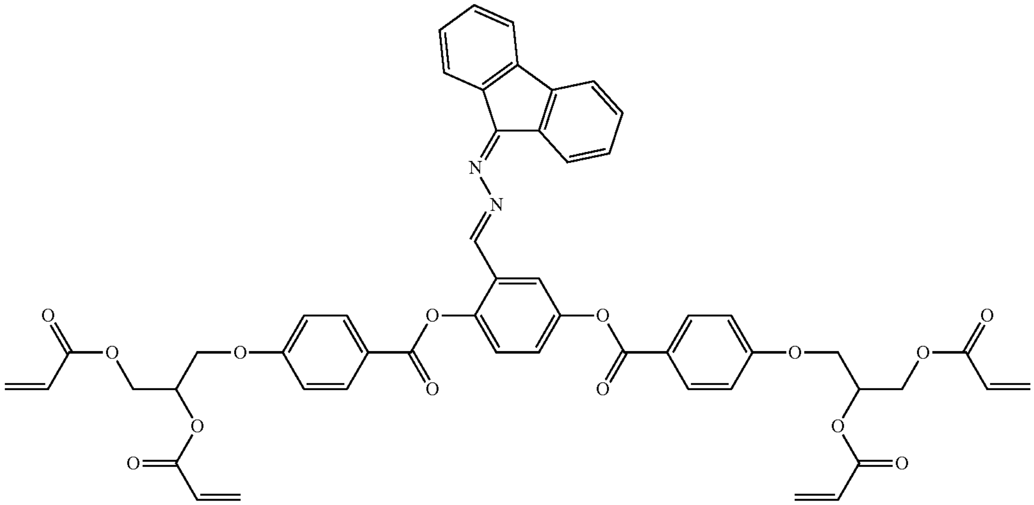

-continued

[Chem. 106]

(7-a-25)

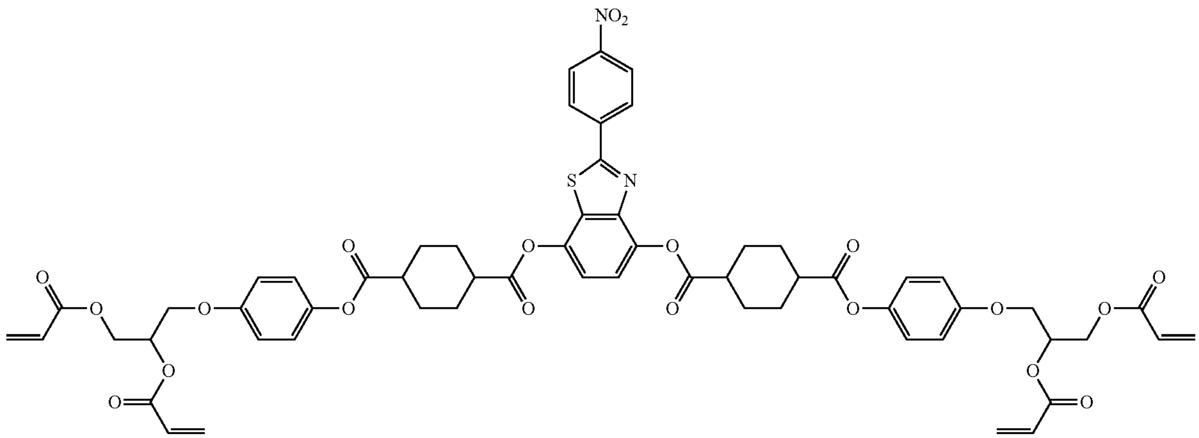

(7-a-26)

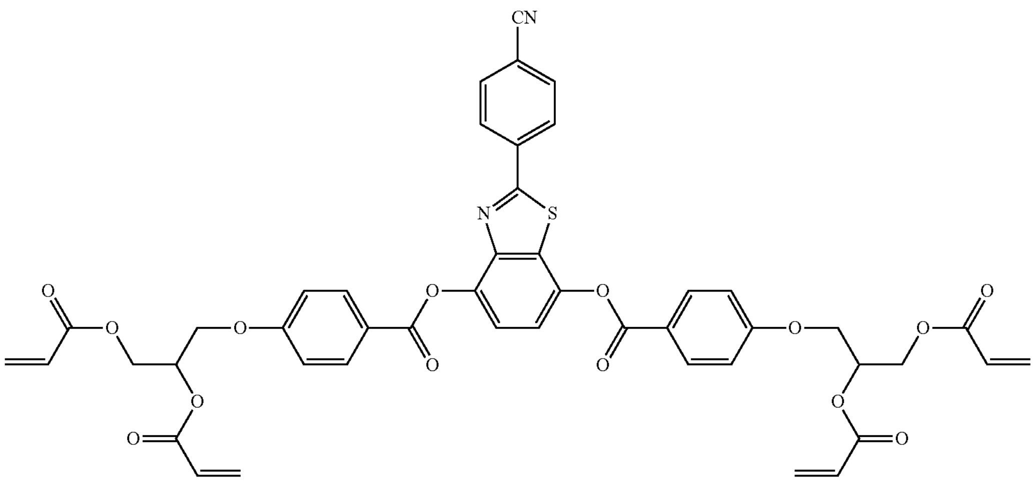

These liquid crystalline compounds may be used alone or as a mixture of two or more.

The total content of polymerizable compounds having one or two or more polymerizable groups is preferably 60 to 100% by mass, more preferably 65 to 98% by mass, and particularly preferably 70 to 95% by mass with respect to the total mass of polymerizable compounds used for the polymerizable composition.

(Fluorosurfactant)

The polymerizable composition of the present invention contains at least one fluorosurfactant selected from the group consisting of copolymers (III) having a weight average molecular weight of 2,500 to 30,000 and each obtained by copolymerizing essential monomers including a polymerizable monomer containing a fluorine atom and a polymerizable monomer represented by general formula (B), having a solubility parameter (SP value) of 8.9 to 10.5 $(cal/cm^3)^{0.5}$, and satisfying the following formula (1A):

$$1.00<100\times(s+t+u)/MB<2.10 \quad (1A)$$

(wherein s is an integer of 1 or more; t and u are each an integer of 0 or 1 or more; and MB is the molecular weight of the polymerizable monomer represented by general formula (B)).

[Chem. 107]

(B)

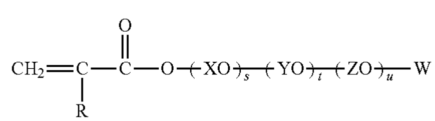

(wherein R is a hydrogen atom or a methyl group; X, Y, and Z are each independently an alkylene group; s is an integer of 1 or more; t and u are each an integer of 0 or 1 or more; and W is a hydrogen atom, an alkyl group having 1 to 6 carbon atoms, or an aryl group).

The use of the fluorosurfactant allows the polymerizable composition of the present invention to have excellent solution stability because the fluorosurfactant has good compatibility with the polymerizable compounds and also allows an optically anisotropic body formed of the polymerizable composition to have improved surface leveling properties (cissing resistance).

Preferably, the fluorosurfactant is composed only of carbon atoms, hydrogen atoms, oxygen atoms, fluorine atoms, and nitrogen atoms. These atoms forming the surfactant are the same as atoms forming the structures of portions (spacer (Sp) portions and mesogenic (MG) portions other than terminal portions (terminal groups)) of polymerizable compounds used in the present invention, and this may be the reason for the increased compatibility with the polymerizable compounds.

Preferably, the fluorosurfactant has a group represented by —$(XO)_s$— (X is an alkylene group having 1 to 10 carbon atoms, and s is an integer of 1 or more) because an optically anisotropic body to be formed can have excellent surface smoothness (cissing resistance). X represents an alkylene group and is preferably an ethylene group, a propylene group, a butylene group, or a tetramethylene group and more preferably an ethylene group, a propylene group, or a butylene group. In the present invention, "butylene" is a branched alkylene having 4 carbon atoms, and "tetramethylene" is a linear alkylene having 4 carbon atoms.

(Polymerizable Monomer Represented by General Formula (B))

The polymerizable monomer represented by general formula (B) is as follows:

[Chem. 108]

(B)

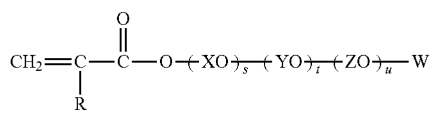

(wherein R is a hydrogen atom or a methyl group; X, Y, and Z are each independently an alkylene group; s is an integer of 1 or more; t and u are each an integer of 0 or 1 or more; and W is a hydrogen atom, an alkyl group having 1 to 6 carbon atoms, or an aryl group).

In the above general formula (B), X, Y, and Z are each an alkylene group. The alkylene group may have a substituent. Specific examples of the moiety —O—$(XO)_s$—$(YO)_t$—$(ZO)_u$— include: polyoxypropylene in which the number s of repeating units is an integer of 3 or more, t and u are 0, and X is propylene; polyoxybutylene in which the number s of repeating units is an integer of 3 or more, t and u are 0, and X is butylene; polyoxytetramethylene in which the number s of repeating units is an integer of 3 or more, t and u are 0, and X is tetramethylene; polyoxyalkylene which is a copolymer of ethylene oxide and propylene oxide and in which the number s of repeating units and the number t of repeating units are each an integer of 1 or more, u is 0, one of X and Y is ethylene, and the other one is propylene; polyoxyalkylene which is a copolymer of propylene oxide and butylene oxide and in which the number s of repeating units and the number t of repeating units are each an integer of 1 or more, u is 0, one of X and Y is propylene, and the other one is butylene; polyoxyalkylene which is a copolymer of ethylene oxide and tetrahydrofuran and in which the number s of repeating units and the number t of repeating units are each an integer of 1 or more, u is 0, one of X and Y is ethylene, and the other one is tetramethylene; polyoxyalkylene which is a copolymer of propylene oxide and tetrahydrofuran and in which the number s of repeating units and the number t of repeating units are each an integer of 1 or more, u is 0, one of X and Y is propylene, and the other one is tetramethylene; and polyoxyalkylene which is a copolymer of ethylene oxide, propylene oxide, and ethylene oxide and in which the number s of repeating units, the number t of repeating units, and the number u of repeating units are each an integer of 1 or more, X and Z are ethylene, and Y is propylene.

The degree of polymerization of each polyoxyalkylene, i.e., the sum of s, t, and u in general formula (B), is preferably 3 to 50, more preferably 3 to 45, and particularly preferably 3 to 40. Repeating units including X, repeating units including Y, and repeating units including Z may be arranged randomly or in blocks.

Preferably, the polyoxyalkylene chains contained in the polymerizable monomer represented by general formula (B) include at least a polyoxypropylene chain, a polyoxybutylene chain, or a polyoxytetramethylene chain because, when the fluorosurfactant is added to the polymerizable composition of the present invention, better cissing resistance is achieved. The polymerizable monomer having at least a polyoxypropylene chain, a polyoxybutylene chain, or a polyoxytetramethylene chain may have only any of these polyoxyalkylene chains or may be a copolymer with another polyoxytetramethylene chain.

Examples of the polymerizable monomer represented by general formula (B) in which the number s of repeating units is an integer of 3 or more and t and u are 0 include: mono(meth)acrylates of polyalkylene glycols such as polypropylene glycol, polybutylene glycol, and polytetramethylene glycol; and polyalkylene glycol mono(meth)acrylates in which a terminal end that is not the terminal end of the mono(meth)acrylate is capped with an alkyl group having 1 to 6 carbon atoms.

More specific examples of the polymerizable monomer represented by general formula (B) include polypropylene glycol mono(meth)acrylate, polytetramethylene glycol (meth)acrylate, poly(ethylene glycol-propylene glycol) mono(meth)acrylate, polyethylene glycol-polypropylene glycol mono(meth)acrylate, poly(ethylene glycol-tetramethylene glycol) mono(meth)acrylate, polyethylene glycol-polytetramethylene glycol mono(meth)acrylate, poly(propylene glycol-tetramethylene glycol) mono(meth)acrylate, polypropylene glycol-polytetramethylene glycol mono (meth)acrylate, poly(propylene glycol-butylene glycol) mono(meth)acrylate, polypropylene glycol-polybutylene glycol mono(meth)acrylate, poly(ethylene glycol-butylene glycol) mono(meth)acrylate, polyethylene glycol-polybutylene glycol mono(meth)acrylate, poly(tetraethylene glycol-butylene glycol) mono(meth)acrylate, polytetraethylene glycol-polybutylene glycol mono(meth)acrylate, polybutylene glycol mono(meth)acrylate, poly(ethylene glycol-trimethylene glycol) mono(meth)acrylate, polyethylene glycol-polytrimethylene glycol mono(meth)acrylate, poly(propylene glycol-trimethylene glycol) mono(meth)acrylate, polypropylene glycol-polytrimethylene glycol mono(meth)acrylate, poly(trimethylene glycol-tetramethylene glycol) mono (meth)acrylate, polytrimethylene glycol-polytetramethylene glycol mono(meth)acrylate, poly(butylene glycol-trimethylene glycol) mono(meth)acrylate, and polybutylene glycol-polytrimethylene glycol mono(meth)acrylate.

Only one of these polymerizable monomers represented by general formula (B) may be used, or a combination of two or more may be used. The "poly(ethylene glycol-propylene glycol)" means a random copolymer of ethylene glycol and propylene glycol, and the "polyethylene glycol-polypropylene glycol" means a block copolymer of ethylene glycol and propylene glycol. The same applies to others.

The solubility parameter (hereinafter abbreviated as SP value) of the polymerizable monomer represented by general formula (B) is 8.9 to 10.5 $(cal/cm^3)^{0.5}$. When the SP value is within the above range, the compatibility of the fluorosurfactant containing the polymerizable monomer represented by general formula (B) as one component when the fluorosurfactant is added to the polymerizable compounds is maintained, and the fluorosurfactant can be distributed uniformly in a coating film. Specifically, for the same reason as described above, the SP value of the polymerizable monomer represented by general formula (B) is more preferably within the range of 9.0 to 10.4 $(cal/cm^3)^{0.5}$ and particularly preferably within the range of 9.1 to 10.3 $(cal/cm^3)^{0.5}$.

The SP value (solubility parameter/unit: $((cal/cm^3)^{0.5})$ in the present invention is computed by the Fedors method.

The polymerizable monomer represented by general formula (B) satisfies formula (1A) below. In this case, the compatibility of the fluorosurfactant containing the polymerizable monomer represented by general formula (B) as one component when the fluorosurfactant is added to the polymerizable compounds is maintained, and the fluorosurfactant can be distributed uniformly in the coating film.

$$1.00<100\times(s+t+u)/MB<2.10 \quad (1A)$$

(wherein s is an integer of 1 or more; t and u are each an integer of 0 or 1 or more; and MB represents the molecular weight of the polymerizable monomer represented by general formula (B).)

Specifically, for the same reason as described above, the above value of the polymerizable monomer represented by formula (1) is more preferably within the range of 1.10 to 2.10 and particularly preferably within the range of 1.20 to 2.10.

(Polymerizable Monomer Containing Fluorine Atom)

Examples of the polymerizable monomer containing a fluorine atom include acrylates and methacrylates each having a fluorine atom-containing alkyl or alkylene ether group at their ester moiety. In particular, a polymerizable monomer (A) having a fluoroalkyl group having 4 to 6 carbon atoms (provided that the alkyl group may contain an oxygen atom that forms an ether bond within the alkyl group) is preferable.

(Polymerizable Monomer (A))

Examples of the polymerizable monomer (A) include monomers represented by general formula (A1) below:

[Chem. 109]

$$CH_2{=}C(R^4)-C(=O)-L-Rf \quad (A1)$$

(in general formula (A1), $R^4$ represents a hydrogen atom, a fluorine atom, a methyl group, a cyano group, a phenyl group, a benzyl group, or $-C_nH_{2n}-Rf'$ (n represents an integer of 1 to 8, and Rf' represents any one of groups represented by formulas (Rf-1) to (Rf-7) below); L represents any one of groups represented by formulas (L-1) to (L-10) below; and Rf represents any one of groups represented by formulas (Rf-1) to (Rf-7) below):

[Chem. 110]

$$-OC_nH_{2n}- \quad (L-1)$$

$$-OCH_2CH_2OCH_2- \quad (L-2)$$

$$-OCH_2CH_3NC(=O)O-C_nH_{2n}- \quad (L-3)$$

-continued $$-OCH_2C(OH)CH_2OH-C_nH_{2n}- \quad (L-4)$$

$$-OCH_2CH(OH)-C_nH_{2n}- \quad (L-5)$$

$$-OCH_2CH_2NHC(=O)O-CH(CH_2OC_nH_{2n}Rf'')CH_2OC_nH_{2n}- \quad (L-6)$$

$$-OCH(CH_2OC_nH_{2n}Rf'')CH_2OC_nH_{2n}- \quad (L-7)$$

$$-OC_mH_{2m}N(C_nH_{2n+1})SO_2- \quad (L-8)$$

$$-N(C_nH_{2n+1})C_mH_{2m}- \quad (L-9)$$

$$-OC_mH_{2m}N(C_nH_{2n+1})CO- \quad (L-10)$$

(In formulas (L-1), (L-3), (L-5), (L-6) and (L-7) above, n represents an integer of 1 to 8. In formulas (L-8), (L-9), and (L-10) above, m represents an integer of 1 to 8, and n represents an integer of 0 to 8. In formulas (L-6) and (L-7) above, Rf" represents any one of groups represented by formulas (Rf-1) to (Rf-7) below.)

[Chem. 111]

$$-C_nF_{2n+1} \quad (Rf-1)$$

$$-C_nF_{2n}H \quad (Rf-2)$$

$$-C_nF_{2n-1} \quad (Rf-3)$$

$$-C_nF_{2n-3} \quad (Rf-4)$$

$$-C_mF_{2m}OC_nF_{2n}CF_3 \quad (Rf-5)$$

$$-C_mF_{2m}OC_nF_{2n}OC_pF_{2p}CF_3 \quad (Rf-6)$$

$$-CF_2OC_2F_4OC_2F_4OCF_3 \quad (Rf-7)$$

(In formulas (Rf-1) to (Rf-4) above, n represents an integer of 4 to 6. In formula (Rf-5) above, m is an integer of 1 to 5; n is an integer of 0 to 4; and the sum of m and n is 4 to 5. In formula (Rf-6) above, m is an integer of 0 to 4; n is an integer of 1 to 4; p is an integer of 0 to 4; and the sum of m, n, and p is 4 to 5.)

More preferred specific examples of the polymerizable monomer (A) include polymerizable monomers (A-1) to (A-15) below. Only one polymerizable monomer (A) may be used, or a combination of two or more may be used.

[Chem. 112]

$$CH_2{=}C(CH_3)-C(=O)-O-CH_2CH_2-(CF_2)_3-CF_3 \quad (A-1)$$

-continued (A-2)

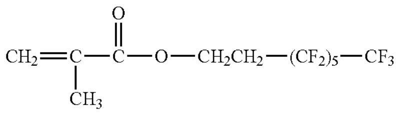

(A-3)

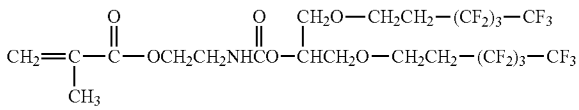

(A-4)

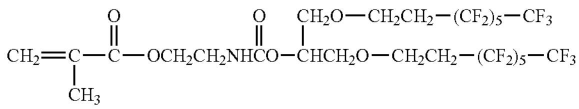

(A-5)

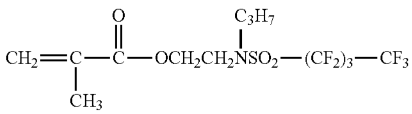

(A-6)

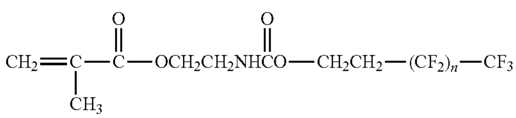

(A-7)

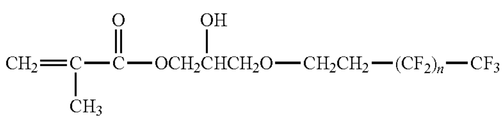

[Chem. 113]

(A-8)

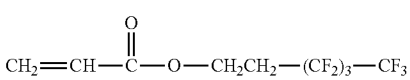

(A-9)

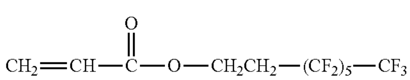

(A-10)

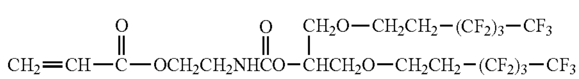

(A-11)

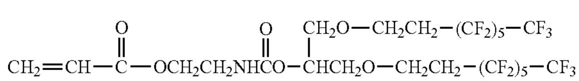

(A-12)

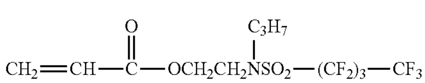

(A-13)

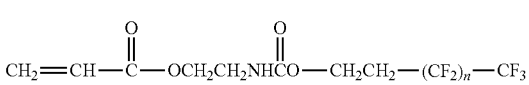

(A-14)

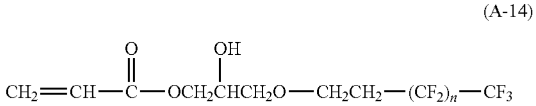

(A-15)

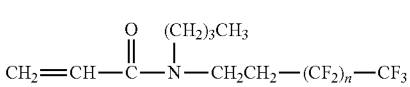

(Polymerizable Monomer (D))

The polymerizable monomer containing a fluorine atom is also preferably a polymerizable monomer (D) having a poly(perfluoroalkylene ether) chain and polymerizable unsaturated groups at its both ends.

Examples of the polymerizable monomer (D) include monomers having a structure in which oxygen atoms and divalent fluorocarbon groups having 1 to 3 carbon atoms are alternately bonded. One type of divalent fluorocarbon group having 1 to 3 carbon atoms may be used, or a mixture of a plurality of types may be used. Specific examples of the divalent fluorocarbon group having 1 to 3 carbon atoms include a group represented by structural formula (a1) below:

[Chem. 114]

$$-(X-O)_n-X- \quad \text{(a1)}$$

(In structural formula (a1) above, X is one of structural formulas (a1-1) to (a1-5) below; a plurality of Xs in structural formula (a1) may be the same or different; and a plurality of identical structures may be present randomly or in blocks. n represents the number of repeating units and is an integer of 1 or more).

[Chem. 115]

$$-CF_2- \quad \text{(a1-1)}$$

$$-CF_2CF_2- \quad \text{(a1-2)}$$

$$-CF_2CF_2CF_2- \quad \text{(a1-3)}$$

$$-CF_2CF(CF_3)- \quad \text{(a1-4)}$$

$$-CF(CF_3)CF_2- \quad \text{(a1-5)}$$

In particular, a monomer in which the perfluoromethylene structure represented by structural formula (a1-1) above and the perfluoroethylene structure represented by structural formula (a1-2) coexist is particularly preferred because the leveling properties of a coating composition to which the fluorosurfactant in the present invention is added is improved and a smooth coating film can be obtained. In terms of the leveling properties, the molar ratio of the perfluoromethylene structure represented by structural formula (a1-1) above to the perfluoroethylene structure represented by structural formula (a1-2) above, i.e., [the molar ratio of the structure (a1-1)/the structure (a1-2)], is preferably 1/10 to 10/1, more preferably 2/8 to 8/2, and particularly preferably 3/7 to 7/3. The value of n in structural formula (a1) above is within the range of 3 to 100 and particularly preferably within the range of 6 to 70.

In the poly(perfluoroalkylene ether) chain, the total number of fluorine atoms contained in one poly(perfluoroalkylene ether) chain is preferably within the range of 18 to 200 and more preferably within the range of 25 to 150 because the leveling properties of the coating composition and the solubility of the coating composition in a non-fluorine-based material can be achieved simultaneously.

Examples of a compound having no polymerizable unsaturated groups introduced into its both ends and used as a raw material of the polymerizable monomer (D) include general formulas (a2-1) to (a2-6) below. In the structural formulas below, "-PFPE-" represents the poly(perfluoroalkylene ether) chain described above.

[Chem. 116]

(a2-1)

(a2-2)

(a2-3)

(a2-4)

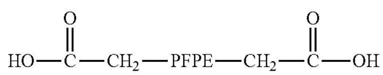

(a2-5)

(a2-6)

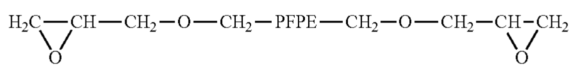

Examples of the polymerizable unsaturated groups at both ends of the poly(perfluoroalkylene ether) chain in the polymerizable monomer (D) include polymerizable unsaturated groups represented by structural formulas U-1 to U-5 below:

[Chem. 117]

U-1

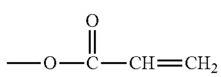

-continued

U-2

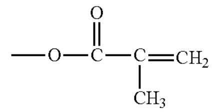

U-3

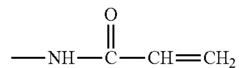

U-4

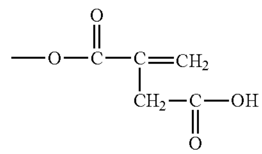

U-5

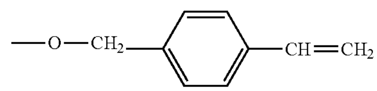

Among these polymerizable unsaturated groups, the acryloyloxy group represented by structural formula U-1 and the methacryloyloxy group represented by structural formula U-2 are particularly preferable in terms of the availability of the polymerizable monomer (D) itself, the ease of production, and the ease of copolymerization with the polymerizable monomer (B).

In the present invention, the term "(meth)acryloyl group" means one or both of a methacryloyl group and an acryloyl group, and the term "(meth)acrylate" means one or both of methacrylate and acrylate. The term "(meth)acrylic acid" means one or both of methacrylic acid and acrylic acid.

Specific examples of the polymerizable monomer (D) include those represented by structural formulas (D-1) to (D-13) below. The "-PFPE-" in the structural formulas below represents the poly(perfluoroalkylene ether) chain.

[Chem. 118]

(D-1)

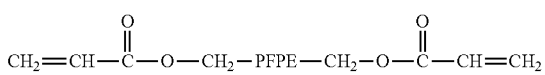

(D-2)

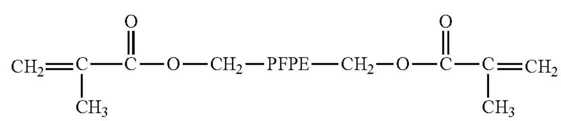

(D-3)

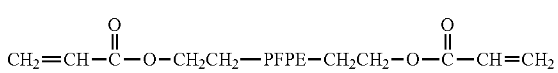

(D-4)

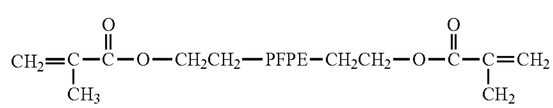

(D-5)

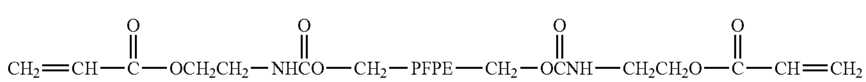

(D-6)

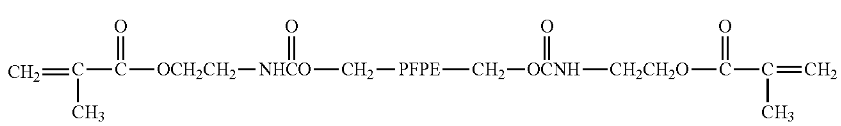

[Chem. 119]

(D-7)

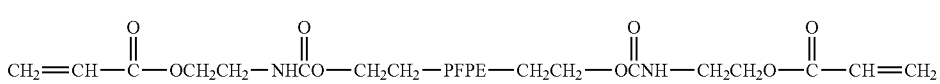

-continued (D-8)

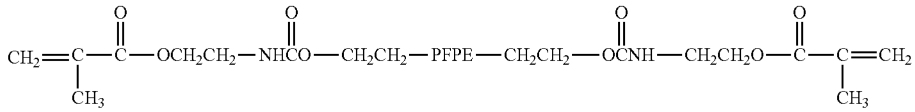

(D-9)

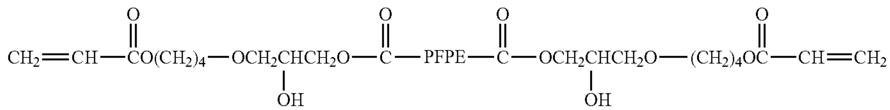

(D-10)

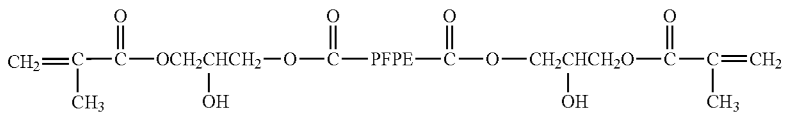

(D-11)

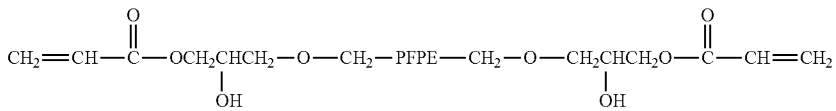

(D-12)

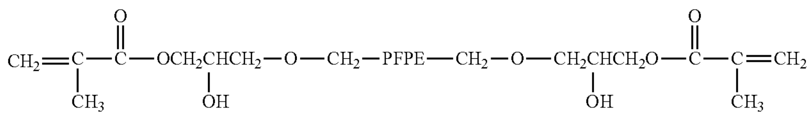

(D-13)

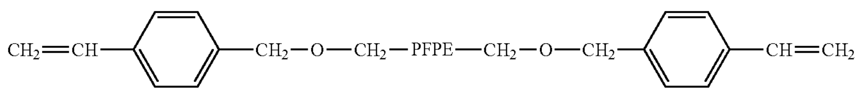

Of these, the monomers represented by structural formulas (D-1), (D-2), (D-5), and (D-6) above are preferred because these polymerizable monomers (D) are easily produced industrially. The monomer represented by structural formula (D-1) in which acryloyl groups are present at both ends of the poly(perfluoroalkylene ether) chain and the monomer represented by structural formula (D-2) in which methacryloyl groups are present at both ends of the poly (perfluoroalkylene ether) chain are more preferred because the performance of the leveling agent can be further improved.

To improve the leveling performance of the fluorosurfactant in the present invention, the mass ratio of the polymerizable monomer (X) containing a fluorine atom to the polymerizable monomer represented by general formula (B) which are raw materials of the fluorosurfactant, i.e., [(X)/(B)], is preferably within the range of 10/90 to 75/25, more preferably within the range of 15/85 to 70/30, and still more preferably within the range of 20/80 to 65/35. To reduce the transferability of the fluorosurfactant in the present invention, the mass ratio of the polymerizable monomer (X) containing a fluorine atom to the polymerizable monomer represented by general formula (B) which are raw materials of the fluorosurfactant, i.e., [(X)/(B)], is preferably within the range of 10/90 to 75/25, more preferably within the range of 15/85 to 70/30, and sill more preferably within the range of 20/80 to 65/35. When an additional polymerizable monomer other than the polymerizable monomer containing a fluorine atom and the polymerizable monomer represented by general formula (B) is used, the content of the additional polymerizable monomer is preferably 50% by mass or less with respect to the total mass of the polymerizable monomers.

(Additional Polymerizable Monomer)

The essential raw materials of the copolymers (III) in the present invention are the polymerizable monomer containing a fluorine atom and the polymerizable monomer represented by general formula (B). In addition to these monomers, a polymerizable monomer (C) having an alkyl group may also be used as an additional polymerizable monomer. Examples of the polymerizable monomer (C) include a monomer represented by general formula (C-1) below:

[Chem. 120]

(C-1)

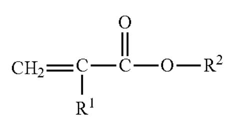

(wherein $R^1$ is a hydrogen atom or a methyl group, and $R^2$ is a linear, branched, or cyclic alkyl group having 1 to 18 carbon atoms).

$R^2$ in general formula (C-1) above is a linear, branched, or cyclic alkyl group having 1 to 18 carbon atoms, and the alkyl group may have a substituent such as an aliphatic or aromatic hydrocarbon group or a hydroxyl group. Specific examples of the ethylenically unsaturated monomer having the above alkyl group include: C1 to C18 alkyl esters of (meth)acrylic acid such as methyl (meth)acrylate, ethyl (meth)acrylate, propyl (meth)acrylate, butyl (meth)acrylate, octyl (meth)acrylate, 2-ethylhexyl (meth)acrylate, decyl (meth)acrylate, dodecyl (meth)acrylate, and stearyl (meth) acrylate; and C1 to C18 bridged cycloalkyl esters of (meth) acrylic acid such as dicyclopentanyloxylethyl (meth)acrylate, isobornyloxylethyl (meth)acrylate, isobornyl (meth)

acrylate, adamantyl (meth)acrylate, dimethyladamantyl (meth)acrylate, dicyclopentanyl (meth)acrylate, and dicyclopentenyl (meth)acrylate. Only one of these polymerizable monomers (C) may be used, or a combination of two or more may be used.

An additional polymerizable monomer other than the polymerizable monomer containing a fluorine atom, the polymerizable monomer represented by general formula (B), and the polymerizable monomer (C) may also be used as a raw material of the fluorosurfactant in the present invention, and examples of such an additional polymerizable monomer include: aromatic vinyls such as styrene, α-methylstyrene, p-methylstyrene, and p-methoxystyrene; and maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

Moreover, aromatic vinyls such as styrene, α-methylstyrene, p-methylstyrene, and p-methoxystyrene and maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide may be used. In addition, a polymerizable monomer having a fluoroalkyl group having 1 to 6 carbon atoms may be used.

(Copolymers (III))

The fluorosurfactant used in the present invention is selected from the group consisting of the copolymers (III) each obtained by copolymerizing essential monomers including the polymerizable monomer represented by general formula (B) and the polymerizable monomer containing a fluorine atom. The weight average molecular weight (Mw) of each copolymer (III) is 2,500 to 35,000 and is preferably 2,500 to 33,000 and more preferably 2,500 to 30,000. If a copolymer having a weight average molecular weight of less than 2,500 is used, its effect of improving the surface smoothness (cissing) of an optically anisotropic body prepared by applying the polymerizable composition containing the copolymer compound to a substrate is not large. A copolymer having a weight average molecular weight of more than 35,000 has low compatibility in the polymerizable composition, and the use of such a monomer may adversely affect the surface smoothness. If a copolymer having a weight average molecular weight of less than 2,500 is used to prepare an optically anisotropic body by applying a polymerizable composition containing the copolymer composition to a substrate, a large amount of the surfactant compound component transfers from the coating surface to the substrate when the substrate is wound into a roll because of the small molecular weight of the copolymer. If a copolymer having a weight average molecular weight of 35,000 or more is used, the copolymer is localized on the surface of the coating film because the compatibility of the copolymer in the polymerizable composition is low, so that the copolymer may transfer from the surface of the coating film to the substrate. Preferably, a molecular weight distribution (Mw/Mn) represented by the ratio of the weight average molecular weight (Mw) to the number average molecular weight (Mn) is 1.05 to 5.00. The weight average molecular weight (Mw) and the number average molecular weight (Mn) are polystyrene-equivalent values based on GPC (gel permeation chromatography) measurement. The conditions of the GPC measurement are as follows.

[GPC Measurement Conditions]

Measurement device: "HLC-8220 GPC" manufactured by TOSOH Corporation, Columns: guard column "HHR-H" (6.0 mm I.D.×4 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation+"TSK-GEL GMHHR-N" (7.8 mm I.D.×30 cm) manufactured by TOSOH Corporation Measurement conditions: Column temperature 40° C., Eluent: tetrahydrofuran (THF), Flow rate 1.0 mL/minute Sample: A solution (5 μL) prepared by filtrating a tetrahydrofuran solution with a concentration of 1.0% by mass in terms of resin solid content through a microfilter.

Standard samples: The following monodispersed polystyrenes with known molecular weights are used in accordance with the measurement manual of the "GPC-8020 model II data analysis version 4.30."

[Dispersed Polystyrenes]

"A-500" manufactured by TOSOH Corporation, "A-1000" manufactured by TOSOH Corporation, "A-2500" manufactured by TOSOH Corporation "A-5000" manufactured by TOSOH Corporation, "F-1" manufactured by TOSOH Corporation, "F-2" manufactured by TOSOH Corporation "F-4" manufactured by TOSOH Corporation, "F-10" manufactured by TOSOH Corporation, "F-20" manufactured by TOSOH Corporation "F-40" manufactured by TOSOH Corporation, "F-80" manufactured by TOSOH Corporation, "F-128" manufactured by TOSOH Corporation "F-288" manufactured by TOSOH Corporation, "F-550" manufactured by TOSOH Corporation The amount of the fluorosurfactant added is preferably 0.005 to 5% by mass, more preferably 0.01 to 3% by mass, and still more preferably 0.05 to 2.0% by mass with respect to the total mass of the polymerizable compounds and a chiral compound. Preferably, the amount of the fluorosurfactant added is appropriately controlled in consideration of the molecular weight of the fluorosurfactant added. When a fluorosurfactant having a low molecular weight is used, it is generally preferable that the amount of the surfactant added is larger than that when a fluorosurfactant having a large molecular weight is used. When the fluorosurfactant used has a weight average molecular weight (Mw) of 2,500 to 30,000 as described above, the amount added is preferably within the above range.

Preferably, the copolymers (III) have an oxyalkylene group represented by $—(XO)_s—$ (X is an alkylene group having 1 to 10 carbon atoms, and s is an integer of 1 or more). The oxyalkylene group is preferably an oxyethylene group, an oxypropylene group, an oxybutylene group, or an oxytetramethylene group.

The fluorosurfactant (III) may have a fluoroalkyl group, a fluoroalkenyl group and/or a fluoroalkylene ether group. The fluoroalkyl group, the fluoroalkenyl group and/or the fluoroalkylene ether group may be linear or branched, partially or fully fluorinated, and have about 3 to about 12 carbon atoms.

(Polymerization Initiator)

The polymerizable composition used in the present invention may optionally contain an initiator. The polymerization initiator used for the polymerizable composition of the present invention is used for polymerization of the polymerizable composition of the present invention. No particular limitation is imposed on the photopolymerization initiator used when the polymerizable composition is polymerized by irradiation with light. A commonly used photopolymerization initiator may be used so long as the aligned state of the polymerizable compounds in the polymerizable composition of the present invention is not inhibited.

Examples of the photopolymerization initiator include: 1-hydroxycyclohexyl phenyl ketone "IRGACURE 184," 1-(4-isopropylphenyl)-2-hydroxy-2-methylpropan-1-one "DAROCUR 1116," 2-methyl-1-[(methylthio)phenyl]-2-morpholinopropan-1 "IRGACURE 907," 2,2-dimethoxy-1,2-diphenylethan-1-one "IRGACURE 651," 2-benzyl-2-dimethylamino-1-(4-morpholinophenyl)-butanone "IRGACURE 369"), 2-dimethylamino-2-(4-methylbenzyl)-1-(4-morpholino-phenyl)butan-1-one "IRGACURE 379," 2,2-dimethoxy-1,2-diphenylethan-1-one, bis(2,4,6-trimethylbenzoyl)-diphenylphosphine oxide "LUCIRIN TPO," 2,4,6-trimethylbenzoyl-phenyl-phosphine oxide "IRGACURE 819," 1,2-octanedione, 1-[4-(phenylthio)-2-(O-benzoyloxime)], ethanone "IRGACURE OXE 01"), and 1-[9-ethyl-6-(2-methylbenzoyl)-9H-carbazole-3-yl], 1-(O-acetyloxime) "IRGACURE OXE 02" (these are manufactured by BASF.; a mixture of 2,4-diethylthioxanthone ("KAYACURE DETX" manufactured by Nippon Kayaku Co., Ltd.) and p-dimethylaminobenzoic acid ethyl ester ("KAYACURE EPA" manufactured by Nippon Kayaku Co., Ltd.); a mixture of isopropylthioxanthone ("QUANTACURE-ITX" manufactured by Ward Blenkinsop) and p-dimethylaminobenzoic acid ethyl ester; "Esacure ONE," "Esacure KIP150," "Esacure KIP160," "Esacure 1001M," "Esacure A198," "Esacure KIP IT," "Esacure KT046," and "Esacure TZT" (manufactured by Lamberti); and "Speedcure BMS," "Speedcure PBZ," and "Benzophenone" from LAMBSON. A photo-acid generator may be used as a photo-cationic initiator. Examples of the photo-acid generator include diazodisulfone-based compounds, triphenylsulfonium-based compounds, phenylsulfone-based compounds, sulfonylpyridine-based compounds, triazine-based compounds, and diphenyliodonium compounds.

The content of the photopolymerization initiator is preferably 0.1 to 10% by mass and particularly preferably 1 to 6% by mass with respect to the total mass of the polymerizable compounds contained in the polymerizable composition. One photopolymerization initiator may be used, or a mixture of two or more may be used.

A commonly used thermal polymerization initiator may be used for thermal polymerization. Examples of the thermal polymerization initiator that can be used include: organic peroxides such as methyl acetoacetate peroxide, cumene hydroperoxide, benzoyl peroxide, bis(4-t-butylcyclohexyl) peroxydicarbonate, t-butylperoxybenzoate, methyl ethyl ketone peroxide, 1,1-bis(t-hexylperoxy)3,3,5-trimethylcyclohexane, p-pentahydroperoxide, t-butyl hydroperoxide, dicumyl peroxide, isobutyl peroxide, di(3-methyl-3-methoxybutyl)peroxydicarbonate, and 1,1-bis(t-butylperoxy)cyclohexane; azonitrile compounds such as 2,2'-azobisisobutyronitrile and 2,2'-azobis(2,4-dimethylvaleronitrile); azoamidine compounds such as 2,2'-azobis(2-methyl-N-phenylpropione-amidine)dihydrochloride; azoamide compounds such as 2,2'azobis(2-methyl-N-[1,1-bis(hydroxymethyl)-2-hydroxyethyl]propionamide); and alkylazo compounds such as 2,2'azobis(2,4,4-trimethylpentane). The content of the thermal polymerization initiator is preferably 0.1 to 10 mass and particularly preferably 1 to 6% by mass. These may be used alone or as a mixture of two or more.

(Organic Solvent)

The polymerizable composition used in the present invention may optionally contain an organic solvent. No particular limitation is imposed on the organic solvent used. However, it is preferable that the polymerizable compound exhibits high solubility in the organic solvent used. It is also preferable that the organic solvent used can be dried at a temperature equal to or lower than 100° C. Examples of such a solvent include: aromatic hydrocarbons such as toluene, xylene, cumene, and mesitylene; ester-based solvents such as methyl acetate, ethyl acetate, propyl acetate, butyl acetate, cyclohexyl acetate, 3-butoxymethyl acetate, and ethyl lactate; ketone-based solvents such as methyl ethyl ketone, methyl isobutyl ketone, cyclohexanone, and cyclopentanone; ether-based solvents such as tetrahydrofuran, 1,2-dimethoxyethane, and anisole; amide-based solvents such as N,N-dimethylformamide and N-methyl-2-pyrrolidone; ethylene glycol monomethyl ether acetate; propylene glycol monomethyl ether acetate; propylene glycol monomethyl ether; propylene glycol diacetate; propylene glycol monomethyl propyl ether; diethylene glycol monomethyl ether acetate; γ-butyrolactone; and chlorobenzene. These may be used alone or as a mixture of two or more. In terms of solution stability, it is preferable to use at least one of the ketone-based solvents, the ether-based solvents, the ester-based solvents, and aromatic hydrocarbon-based solvents.

The polymerizable composition used in the present invention is generally used for coating. No particular limitation is imposed on the ratio of the organic solvent used so long as the coated state is not significantly impaired. The ratio of the total mass of polymerizable compounds in the polymerizable composition is preferably 0.1 to 99% by mass, more preferably 5 to 60% by mass, and particularly preferably 10 to 50% by mass.

When the polymerizable compounds are dissolved in the organic solvent, it is preferable to dissolve the compounds under heating and stirring in order to dissolve them uniformly. The heating temperature during the heating and stirring may be appropriately controlled in consideration of the solubility of the polymerizable liquid crystalline compounds used in the organic solvent. In terms of productivity, the heating temperature is preferably 15° C. to 130° C., more preferably 30° C. to 110° C., and particularly preferably 50° C. to 100° C.

(Additives)

In the polymerizable composition used in the present invention, general-purpose additives may be used according to the intended purpose. For example, additives such as a polymerization inhibitor, an antioxidant, an ultraviolet absorber, an alignment controlling agent, a chain transfer agent, an infrared absorber, a thixotropic agent, an antistatic agent, a pigment, a filler, a chiral compound, a non-liquid crystalline compound having a polymerizable group, other liquid crystal compounds, and an alignment material may be added so long as the alignment of the liquid crystal is not significantly impaired.

(Polymerization Inhibitor)

The polymerizable composition used in the present invention may optionally contain a polymerization inhibitor. No particular limitation is imposed on the polymerization inhibitor used, and a commonly used polymerization inhibitor may be used.

Examples of the polymerization inhibitor include: phenol-based compounds such as p-methoxyphenol, cresol, t-butylcatechol, 3.5-di-t-butyl-4-hydroxytoluene, 2.2'-methylene bis(4-methyl-6-t-butylphenol), 2.2'-methylene bis(4-ethyl-6-t-butylphenol), 4.4'-thio bis(3-methyl-6-t-butylphenol), 4-methoxy-1-naphthol, and 4,4'-dialkoxy-2,2'-bi-1-naphthol; quinone-based compounds such as hydroquinone, methylhydroquinone, tert-butylhydroquinone, p-benzoquinone, methyl-p-benzoquinone, tert-butyl-p-benzoquinone, 2,5-diphenylbenzoquinone, 2-hydroxy-1,4-naphthoquinone, 1,4-naphthoquinone, 2,3-dichloro-1,4-naphthoquinone, anthraquinone, and diphenoquinone; amine-based compounds such as p-phenylenediamine, 4-aminodiphenylamine, N,N'-diphenyl-p-phenylenediamine, N-i-propyl-N'-phenyl-p-phenylenediamine, N-(1,3-dimethylbutyl)-N'-phenyl-p-phenylenediamine, N.N'-di-2-naphthyl-p-phenylenediamine, diphenylamine, N-phenyl-β-naphthylamine, 4,4'-dicumyl-diphenylamine, and 4.4'-dioctyl-diphenylamine; thioether-based compounds such as phenothiazine and distearyl thiodipropionate; and nitroso-based compounds such as N-nitrosodiphenylamine, N-nitrosophenylnaphthylamine, N-nitrosodinaphthylamine, p-nitrosophenol, nitrosobenzene, p-nitrosodiphenylamine, α-nitroso-β-naphthol, etc., N,N-dimethyl-p-nitrosoaniline, p-nitrosodiphenylamine, p-nitrosodimethylamine, p-nitroso-N,N-diethylamine, N-nitrosoethanolamine, N-nitrosodi-n-butylamine, N-nitroso-N-n-butyl-4-butanolamine, N-nitroso-diisopropanolamine, N-nitroso-N-ethyl-4-butanolamine, 5-nitroso-8-hydroxyquinoline, N-nitrosomorpholine, N-nitroso-N-phenylhydroxylamine ammonium salt, nitrosobenzene, 2,4.6-tri-tert-butylnitrosobenzene, N-nitroso-N-methyl-p-toluenesulfonamide, N-nitroso-N-ethylurethane, N-nitroso-N-n-propylurethane, 1-nitroso-2-naphthol, 2-nitroso-1-naphthol, sodium 1-nitroso-2-naphthol-3,6-sulfonate, sodium 2-nitroso-1-naphthol-4-sulfonate, 2-nitroso-5-methylaminophenol hydrochloride, and 2-nitroso-5-methylaminophenol hydrochloride.

The amount of the polymerization inhibitor added is preferably 0.01 to 1.0% by mass and more preferably 0.05 to 0.5% by mass with respect to the total mass of the polymerizable compounds contained in the polymerizable composition.

(Antioxidant)

The polymerizable composition used in the present invention may optionally contain an antioxidant etc. Examples of such compounds include hydroquinone derivatives, nitrosoamine-based polymerization inhibitors, and hindered phenol-based antioxidants. More specific examples of such compounds include: tert-butylhydroquinone; "Q-1300" and "Q-1301" available from Wako Pure Chemical Industries, Ltd.; pentaerythritol tetrakis[3-(3,5-di-tert-butyl-4-hydroxyphenyl)propionate "IRGANOX 1010," thiodiethylene bis[3-(3,5-di-tert-butyl-4-hydroxyphenyl)propionate "IRGANOX 1035," octadecyl-3-(3,5-di-tert-butyl-4-hydroxyphenyl)propionate "IRGANOX 1076," "IRGANOX 1135," "IRGANOX 1330," 4,6-bis(octylthiomethyl)-o-cresol "IRGANOX 1520L," "IRGANOX 1726," "IRGANOX 245," "IRGANOX 259," "IRGANOX 3114," "IRGANOX 3790," "IRGANOX 5057," and "IRGANOX 565" (these are manufactured by BASF); ADEKA STAB AO-20, AO-30, AO-40, AO-50, AO-60, and AO-80 manufactured by ADEKA CORPORATION; and SUMILIZER BHT, SUMILIZER BBM-S, and SUMILIZER GA-80 available from Sumitomo Chemical Co., Ltd.

The amount of the antioxidant added is preferably 0.01 to 2.0% by mass and more preferably 0.05 to 1.0% by mass with respect to the total mass of the polymerizable compounds contained in the polymerizable composition.

(Ultraviolet Absorber)

The polymerizable composition used in the present invention may optionally contain an ultraviolet absorber and a light stabilizer. No particular limitation is imposed on the ultraviolet absorber used and the light stabilizer used. It is preferable to use an ultraviolet absorber and a light stabilizer that can improve the light fastness of optically anisotropic bodies, optical films, etc.

Examples of the ultraviolet absorber include: 2-(2-hydroxy-5-t-butylphenyl)-2H-benzotriazole "TINUVIN PS," "TINUVIN 99-2," "TINUVIN 109," "TINUVIN 213," "TINUVIN 234," "TINUVIN 326," "TINUVIN 328," "TINUVIN 329," "TINUVIN 384-2," "TINUVIN 571," 2-(2H-benzotriazol-2-yl)-4,6-bis(1-methyl-1-phenylethyl) phenol "TINUVIN 900," 2-(2H-benzotriazol-2-yl)-6-(1-methyl-1-phenylethyl)-4-(1,1,3,3-tetramethylbutyl)phenol "TINUVIN 928," "TINUVIN 1130," "TINUVIN 400," "TINUVIN 405," 2,4-bis[2-hydroxy-4-butoxyphenyl]-6-(2,4-dibutoxyphenyl)-1,3,5-triazine "TINUVIN 460," "TINUVIN 479," and "TINUVIN 5236" (these are manufactured by BASF); and "ADEKA STAB LA-32," "ADEKA STAB LA-34," "ADEKA STAB LA-36," "ADEKA STAB LA-31," "ADEKA STAB 1413," and "ADEKA STAB LA-51" (these are manufactured by ADEKA CORPORATION).

Examples of the light stabilizer include: "TINUVIN 111FDL," "TINUVIN 123," "TINUVIN 144," "TINUVIN 152," "TINUVIN 292," "TINUVIN 622," "TINUVIN 770," "TINUVIN 765," "TINUVIN 780," "TINUVIN 905," "TINUVIN 5100," "TINUVIN 5050," "TINUVIN 5060," "TINUVIN 5151," "CHIMASSORB 119FL," "CHIMASSORB 944FL," and "CHIMASSORB 944LD" (these are manufactured by BASF); and "ADEKA STAB LA-52," "ADEKA STAB LA-57," "ADEKA STAB LA-62," "ADEKA STAB LA-67," "ADEKA STAB LA-63P," "ADEKA STAB LA-68LD," "ADEKA STAB LA-77," "ADEKA STAB LA-82," and "ADEKA STAB LA-87" (these are manufactured by ADEKA CORPORATION).

(Alignment Controlling Agent)

The polymerizable composition used in the present invention may contain an alignment controlling agent in order to control the alignment state of the liquid crystalline compound. Examples of the alignment controlling agent used include those that allow the liquid crystalline compound to align in a substantially horizontal manner, a substantially vertical manner, and a substantially hybrid manner with respect to a substrate. Examples of the alignment controlling agent used when a chiral compound is added include those that allow the liquid crystalline compound to align in a substantially planar manner. As described above, the surfactant may induce horizontal alignment or planar alignment. However, no particular limitation is imposed on the alignment controlling agent so long as the intended alignment state is induced, and a commonly used alignment controlling agent may be used.

Examples of such an alignment controlling agent include a compound having a repeating unit represented by general formula (8) below, having a weight average molecular weight of from 100 to 1,000,000 inclusive, and having the effect of effectively reducing the tilt angle of an optically anisotropic body to be formed at its air interface:

[Chem. 121]

$$-\!\!\left(CR^{11}R^{12}-CR^{13}R^{14}\right)\!\!- \qquad (8)$$

(wherein $R^{11}$, $R^{12}$, $R^{13}$, and $R^{14}$ each independently represent a hydrogen atom, a halogen atom, or a hydrocarbon group having 1 to 20 carbon atoms, and at least one hydrogen atom in the hydrocarbon group may be replaced by a halogen atom).

Other examples of the alignment controlling agent include rod-shaped liquid crystalline compounds modified with fluoroalkyl groups, disk-shaped liquid crystalline compounds, and polymerizable compounds having long-chain aliphatic alkyl groups optionally having a branch structure.

Examples of the compound having the effect of effectively increasing the tilt angle of an optically anisotropic body to be formed at its air interface include cellulose nitrate, cellulose acetate, cellulose propionate, cellulose butyrate, rod-shaped liquid crystalline compounds modified with heteroaromatic ring salts, and rod-shaped liquid crystalline compounds modified with cyano groups and cyanoalkyl groups.

(Chain Transfer Agent)

The polymerizable composition used in the present invention may contain a chain transfer agent in order to further improve adhesion of the polymer or the optically anisotropic body to a substrate. Examples of the chain transfer agent include: aromatic hydrocarbons; halogenated hydrocarbons such as chloroform, carbon tetrachloride, carbon tetrabromide, and bromotrichloromethane; mercaptan compounds such as octyl mercaptan, n-butyl mercaptan, n-pentyl mercaptan, n-hexadecyl mercaptan, n-tetradecyl mercaptan, n-dodecyl mercaptan, t-tetradecyl mercaptan, and t-dodecyl mercaptan; thiol compounds such as hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine; sulfide compounds such as dimethylxanthogen disulfide, diethylxanthogen disulfide, diisopropylxanthogen disulfide, tetramethylthiuram disulfide, tetraethylthiuram disulfide, and tetrabutylthiuram disulfide; N,N-dimethylaniline; N,N-divinylaniline; pentaphenylethane; an α-methylstyrene dimer; acrolein; allyl alcohol; terpinolene; α-terpinene, γ-terpinene, and dipentene. Of these, 2,4-diphenyl-4-methyl-1-pentene and thiol compounds are more preferred.

Specifically, compounds represented by general formulas (9-1) to (9-12) below are preferred:

[Chem. 122]

(9-1)

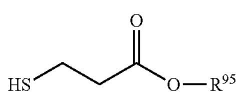

(9-2)

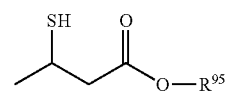

(9-3)

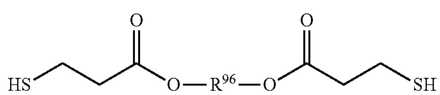

(9-4)

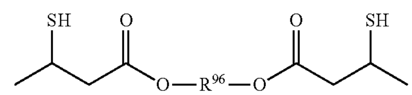

(9-5)

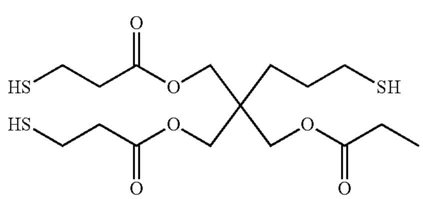

(9-6)

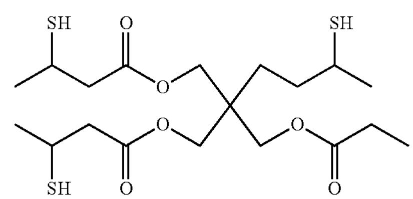

(9-7)

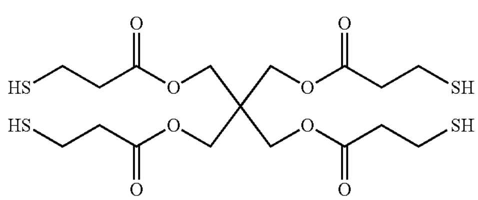

(9-8)

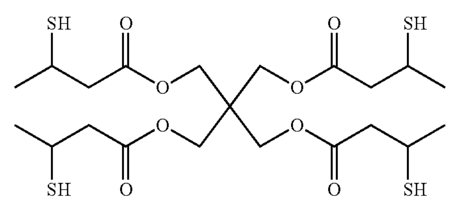

[Chem. 123]

(9-9)

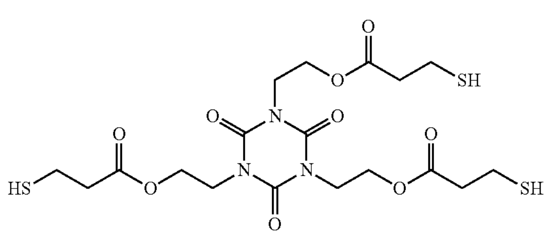

(9-10)

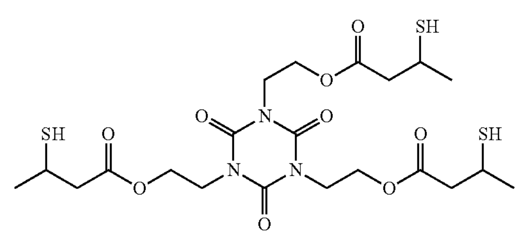

(9-11)

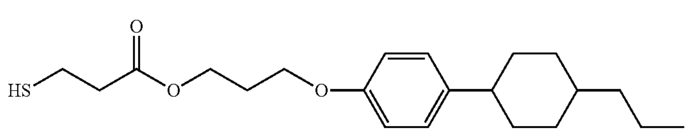

-continued (9-12)

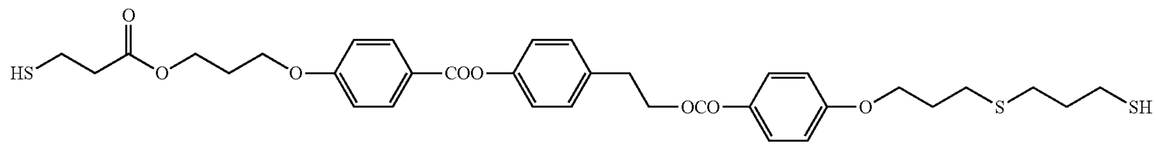

In these formulas, $R^{95}$ represents an alkyl group having 2 to 18 carbon atoms. The alkyl group may be linear or branched, and at least one methylene group in the alkyl group is optionally replaced by an oxygen atom, a sulfur atom, —CO—, —OCO—, —COO—, or —CH═CH—, provided that no oxygen atom is bonded directly to a sulfur atom. $R^{96}$ represents an alkylene group having 2 to 18 carbon atoms, and at least one methylene group in the alkylene group is optionally replaced by an oxygen atom, a sulfur atom, —CO—, —OCO—, —COO—, or —CH═CH—, provided that no oxygen atom is bonded directly to a sulfur atom.

Preferably, the chain transfer agent is added in the step of mixing the polymerizable compounds with the organic solvent under heating and stirring to prepare a polymerizable solution. However, the chain transfer agent may be added in the subsequent step of mixing the polymerization initiator with the polymerizable solution or in both the steps.

The amount of the chain transfer agent added is preferably 0.5 to 10% by mass and more preferably 1.0 to 5.0% by mass with respect to the total mass of the polymerizable compounds contained in the polymerizable composition.

To control physical properties, a non-polymerizable liquid crystal compound etc. may also be added optionally. Preferably, the non-liquid crystalline polymerizable compound is added in the step of mixing the polymerizable compounds with the organic solvent under heating and stirring to prepare a polymerizable solution. However, the non-polymerizable liquid crystal compound etc. may be added in the subsequent step of mixing the polymerization initiator with the polymerizable solution or in both the steps. The amount of these compounds added is preferably 20% by mass or less, more preferably 10% by mass or less, and still more preferably 5% by mass or less with respect to the mass of the polymerizable composition.

(Infrared Absorber)

The polymerizable composition used in the present invention may optionally contain an infrared absorber. No particular limitation is imposed on the infrared absorber used, and a commonly used infrared absorber may be contained so long as the alignment is not disturbed. Examples of the infrared absorber include cyanine compounds, phthalocyanine compounds, naphthoquinone compounds, dithiol compounds, diimmonium compounds, azo compounds, and aluminum salts.

Specific examples include: a diimmonium salt-type infrared absorber "NIR-IM1" and an aluminum salt-type infrared absorber "NIR-AM1" (manufactured by Nagase ChemteX Corporation); "Karenz IR-T" and "Karenz IR-13F" (manufactured by Showa Denko K.K.); "YKR-2200" and "YKR-2100" (manufactured by Yamamoto Chemicals, Inc.); and "IRA 908," "IRA 931," "IRA 955," and "IRA 1034" (INDECO).

(Antistatic Agent)

The polymerizable composition used in the present invention may optionally contain an antistatic agent. No particular limitation is imposed on the antistatic agent used, and a commonly used antistatic agent may be contained so long as the alignment is not disturbed. Examples of the antistatic agent include macromolecular compounds having at least one sulfonate group or phosphate group in their molecule, compounds including a quaternary ammonium salt, and surfactants having a polymerizable group.

Of these, surfactants having a polymerizable group are preferred. Examples of anionic surfactants having a polymerizable group include: alkyl ether-based surfactants such as "Antox SAD," "Antox MS-2N" (manufactured by Nippon Nyukazai Co., Ltd.), "AQUALON KH-05," "AQUALON KH-10," "AQUALON KH-20," "AQUALON KH-0530," "AQUALON KH-1025" (manufactured by DAI-ICHI KOGYO SEIYAKU Co., Ltd.), "ADEKA REASOAP SR-10N," "ADEKA REASOAP SR-20N" (manufactured by ADEKA CORPORATION), and "LATEMUL PD-104" (manufactured by Kao Corporation); sulfosuccinate-based surfactants such as "LATEMUL S-120," "LATEMUL S-120A," "LATEMUL S-180P," "LATEMUL S-180A" (manufactured by Kao Corporation), and "ELEMINOL JS-2" (manufactured by Sanyo Chemical Industries, Ltd.); alkyl phenyl ether- and alkyl phenyl ester-based surfactants such as "AQUALON H-2855A," "AQUALON H-3855B," "AQUALON H-3855C," "AQUALON H-3856," "AQUALON HS-05," "AQUALON HS-10," "AQUALON HS-20," "AQUALON HS-30," "AQUALON HS-1025," "AQUALON BC-05," "AQUALON BC-10," "AQUALON BC-20," "AQUALON BC-1025," "AQUALON BC-2020" (manufactured by DAI-ICHI KOGYO SEIYAKU Co., Ltd.) "ADEKA REASOAP SDX-222," "ADEKA REASOAP SDX-223," "ADEKA REASOAP SDX-232," "ADEKA REASOAP SDX-233," "ADEKA REASOAP SDX-259," "ADEKA REASOAP SE-10N," and "ADEKA REASOAP SE-20N" (manufactured by ADEKA CORPORATION); (meth)acrylate sulfate-based surfactants such as "Antox MS-60," "Antox MS-2N" (manufactured by Nippon Nyukazai Co., Ltd.), and "ELEMINOL RS-30" (manufactured by Sanyo Chemical Industries, Ltd.); and phosphate-based surfactants such as "H-3330P" (manufactured by DAI-ICHI KOGYO SEIYAKU Co., Ltd.) and "ADEKA REASOAP PP-70" (manufactured by ADEKA CORPORATION).

Examples of nonionic surfactants having a polymerizable group include: alkyl ether-based surfactants such as "Antox LMA-20," "Antox LMA-27," "Antox EMH-20," "Antox LMH-20, "Antox SMH-20" (manufactured by Nippon Nyukazai Co., Ltd.), "ADEKA REASOAP ER-10," "ADEKA REASOAP ER-20," "ADEKA REASOAP ER-30," "ADEKA REASOAP ER-40" (manufactured by ADEKA CORPORATION), "LATEMUL PD-420," "LATEMUL PD-430," and "LATEMUL PD-450" (manufactured by Kao Corporation); alkyl phenyl ether- and alkyl phenyl ester-based surfactants such as "AQUALON RN-10," "AQUALON RN-20," "AQUALON RN-30," "AQUALON RN-50," "AQUALON RN-2025" (manufactured by DAI-ICHI KOGYO SEIYAKU Co., Ltd.), "ADEKA REASOAP NE-10," "ADEKA REASOAP NE-20," "ADEKA REASOAP NE-30," and "ADEKA REASOAP NE-40" (manufactured by ADEKA CORPORATION); and (meth)acrylate sulfate-based surfactants such as "RMA-564," "RMA-568," and "RMA-1114" (manufactured by Nippon Nyukazai Co., Ltd.).

Other examples of the antistatic agent include polyethylene glycol (meth)acrylate, methoxypolyethylene glycol (meth)acrylate, ethoxypolyethylene glycol (meth)acrylate, propoxypolyethylene glycol (meth)acrylate, n-butoxypolyethylene glycol (meth)acrylate, n-pentoxypolyethylene glycol (meth)acrylate, phenoxypolyethylene glycol (meth)acrylate, polypropylene glycol (meth)acrylate, methoxypolypropylene glycol (meth)acrylate, ethoxypolypropylene glycol (meth)acrylate, propoxypolypropylene glycol (meth)acrylate, n-butoxypolypropylene glycol (meth) acrylate, n-pentoxypolypropylene glycol (meth)acrylate, phenoxypolypropylene glycol (meth)acrylate, polytetramethylene glycol (meth)acrylate, methoxypolytetramethylene glycol (meth)acrylate, phenoxytetraethylene glycol (meth) acrylate, hexaethylene glycol (meth)acrylate, and methoxyhexaethylene glycol (meth)acrylate.

Only one antistatic agent may be used, or a combination of two or more antistatic agents may be used. The amount of the antistatic agent added is preferably 0.001 to 10% by weight and more preferably 0.01 to 5% by weight with respect to the total weight of the polymerizable compounds contained in the polymerizable composition.

(Pigment)

The polymerizable composition used in the present invention may optionally contain a pigment. No particular limitation is imposed on the pigment used, and a commonly used pigment may be used so long as the alignment is not disturbed. Examples of the pigment include dichroic pigments and fluorescent pigments. Examples of the dichroic and fluorescent pigments include polyazo pigments, anthraquinone pigments, cyanine pigments, phthalocyanine pigments, perylene pigments, perinone pigments, and squarylium pigments. From the viewpoint of addition, the pigment is preferably a pigment having liquid crystallinity.

Examples of the pigment that can be used include pigments described in U.S. Pat. No. 2,400,877, pigments described in Dreyer J. F., Phys. and Colloid Chem., 1948, 52, 808., "The Fixing of Molecular Orientation," pigments described in Dreyer J. F., Journal de Physique, 1969, 4, 114., "Light Polarization from Films of Lyotropic Nematic Liquid Crystals," pigments described in J. Lydon, "Chromonics" in "Handbook of Liquid Crystals Vol. 2B: Low Molecular Weight Liquid Crystals II," D. Demus, J. Goodby, G. W. Gray, H. W. Spiessm, V. Vill ed., Willey-VCH, P. 981-1007 (1998), pigments described in Dichroic Dyes for Liquid Crystal Display, A. V. lvashchenko, CRC Press, 1994, and pigments described in "Novel Development of Functional Pigment Market," Chapter 1, p. 1, 1994, CMC Publishing Co., Ltd.

Examples of the dichroic pigments include formula (d-1) to formula (d-8) below:

[Chem. 124]

(d-1)

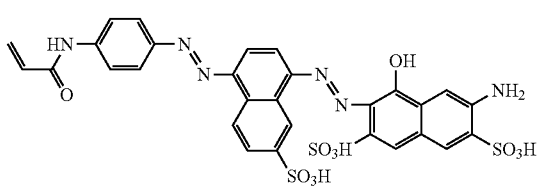

(d-2)

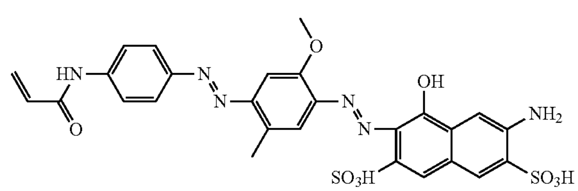

(d-3)

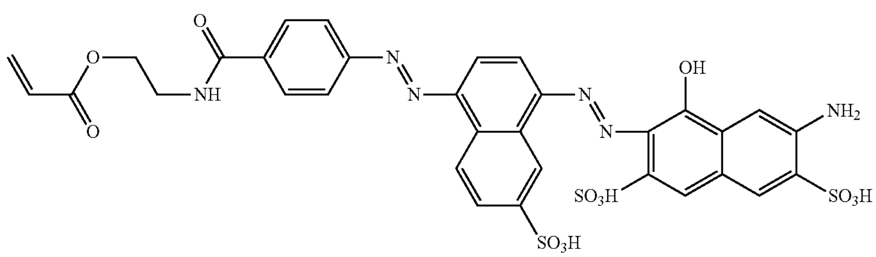

(d-4)

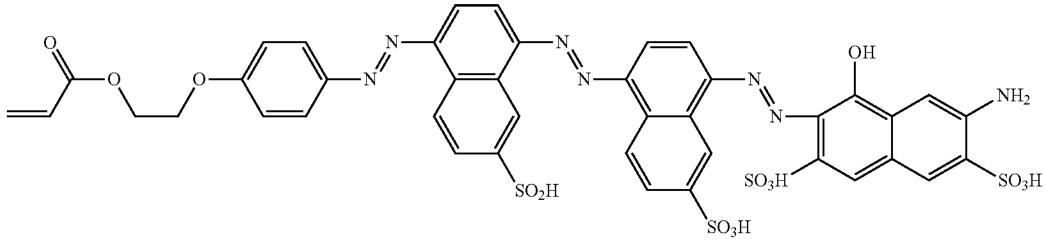

-continued

[Chem. 125]

(d-5)

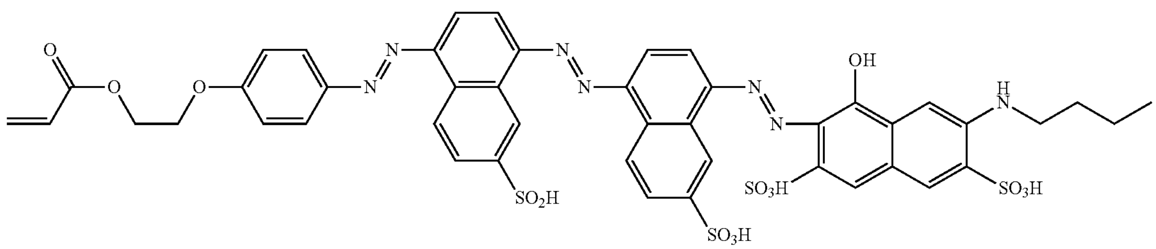

(d-6)

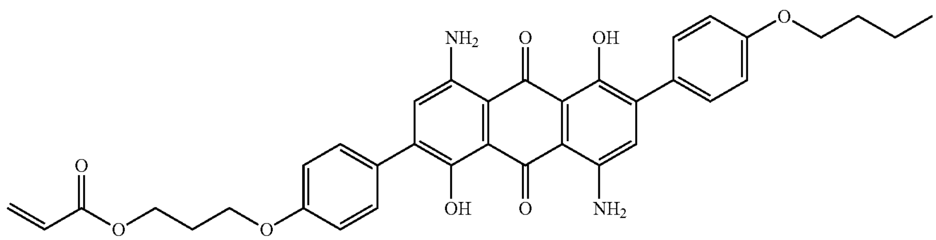

(d-7)

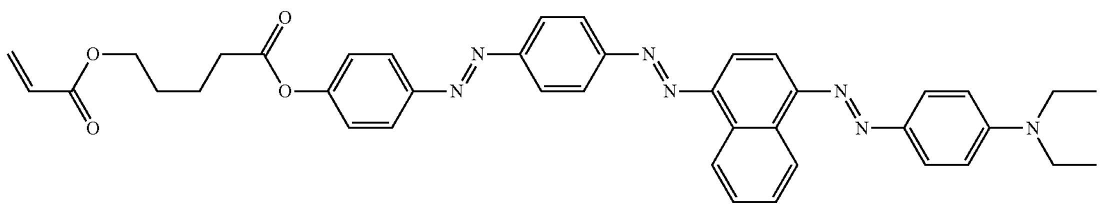

(d-8)

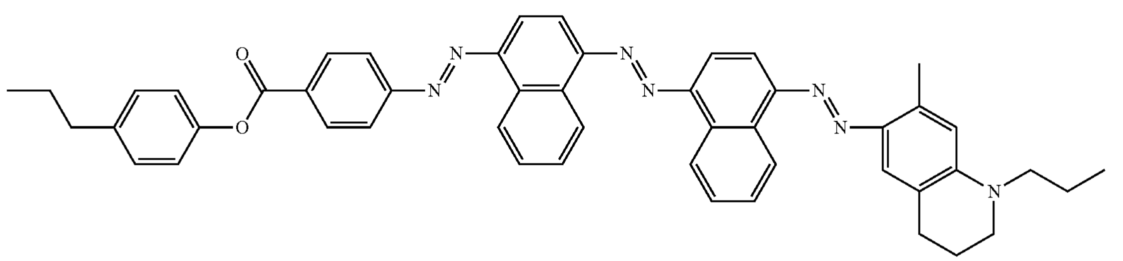

The amount of the pigment such as the dichroic pigment added is preferably 0.001 to 10% by weight and more preferably 0.01 to 5% by weight with respect to the total weight of the polymerizable compounds contained in the polymerizable composition.

(Filler)

The polymerizable composition used in the present invention may optionally contain a filler. No particular limitation is imposed on the filler used, and a commonly used filler may be used so long as the thermal conductivity of the polymer to be obtained is not impaired.

Examples of the filler include: inorganic fillers such as alumina, titanium white, aluminum hydroxide, talc, clay, mica, barium titanate, zinc oxide, and glass fibers; metal powders such as silver powder and copper powder; thermal conductive fillers such as aluminum nitride, boron nitride, silicon nitride, gallium nitride, silicon carbide, magnesia (aluminum oxide), alumina (aluminum oxide), crystalline silica (silicon oxide), and fused silica (silicon oxide); and silver nanoparticles.

(Chiral Compound)

The polymerizable composition of the present invention may contain a chiral compound for the purpose of obtaining a chiral nematic phase. It is unnecessary for the chiral compound itself to exhibit liquid crystallinity, and the chiral compound may or may not have a polymerizable group. The helical direction of the chiral compound may be appropriately selected according to the application purpose of the polymer.

No particular limitation is imposed on the chiral compound having a polymerizable group. A commonly used chiral compound may be used, but a chiral compound having a large helical twisting power (HTP) is preferred. The polymerizable group is preferably a vinyl group, a vinyloxy group, an allyl group, an allyloxy group, an acryloyloxy group, a methacryloyloxy group, a glycidyl group, or an oxetanyl group and particularly preferably an acryloyloxy group, a glycidyl group, or an oxetanyl group.

The amount of the chiral compound added must be appropriately controlled according to the helical twisting power of the compound. The amount of the chiral compound contained is preferably 0.5 to 80% by mass, more preferably 3 to 50% by mass, and particularly preferably 5 to 30% by mass with respect to the total mass of the chiral compound and the liquid crystalline compounds having a polymerizable group.

Specific examples of the chiral compound include compounds represented by general formula (10-1) to formula (10-4) below, but the chiral compound is not limited to the compounds represented by the general formulas below:

[Chem. 126]

(10-1)

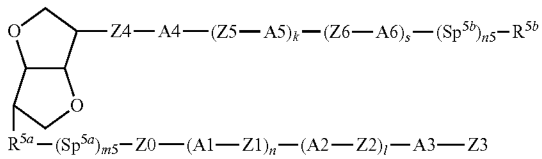

(10-2)

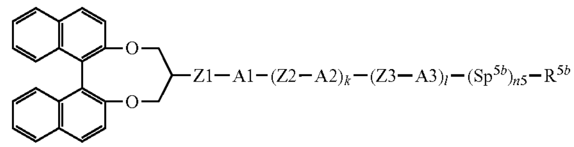

(10-3)

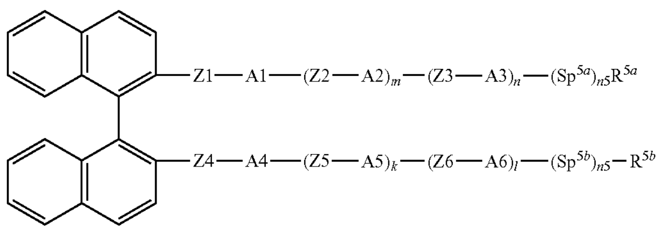

(10-4)

$$R^{5a}—(Sp^{5a})_{m5}—Z0—(A1—Z1)_n—(A2—Z2)_l—A3—Z3—A4—Z4—A5—Z5—CH_2\underset{*}{C}H(R^{5a})R^{5b}$$

In the above formulas, $Sp^{5a}$ and $Sp^{5b}$ each independently represent an alkylene group having 0 to 18 carbon atoms, and the alkylene group may be substituted by at least one halogen atom, a CN group, or an alkyl group having 1 to 8 carbon atoms and having a polymerizable functional group. One $CH_2$ group or two or more nonadjacent $CH_2$ groups in the alkyl group may be each independently replaced by —O—, —S—, —NH—, —N($CH_3$)—, —CO—, —COO—, —OCO—, —OCOO—, —SCO—, —COS—, or —C≡C—, provided that no oxygen atoms are mutually bonded. A1, A2, A3, A4, A5, and A6 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophen-2,7-diyl group, or a fluorene-2,7-diyl group. n, 1, and k each independently represent 0 or 1, provided that 0 n+1+k≤3. m5 represents 0 or 1, and Z1, Z1, Z2, Z3, Z4, Z5, and Z6 each independently represent —COO—, —OCO—, —$CH_2$ $CH_2$—, —$OCH_2$—, —$CH_2O$—, —CH═CH—, —C≡C—, —CH═CHCOO—, —OCOCH═CH—, —$CH_2CH_2COO$—, —$CH_2CH_2OCO$—, —$COOCH_2CH_2$—, —$OCOCH_2CH_2$—, —CONH—, —NHCO—, an alkyl group having 2 to 10 carbon atoms and optionally having a halogen atom, or a single bond. $R^{5a}$ and $R^{5b}$ each represent a hydrogen atom, a halogen atom, a cyano group, or an alkyl group having 1 to 18 carbon atoms, and the alkyl group may be substituted by at least one halogen atom or CN. One $CH_2$ group or two or more nonadjacent $CH_2$ groups in the alkyl group may be each independently replaced by —O—, —S—, —NH—, —N($CH_3$)—, —CO—, —COO—, —OCO—, —OCOO—, —SCO—, —COS—, or —C≡C—, provided that no oxygen atoms are mutually bonded. Alternatively, $R^{5a}$ and $R^{5b}$ each represent general formula (10-a):

[Chem. 127]

$$—P^{5a} \quad (10\text{-a})$$

(wherein $P^{5a}$ represents a polymerizable group, and the meaning of $Sp^{5a}$ is the same as the meaning of $Sp^1$).

$P^{5a}$ represents a substituent selected from polymerizable groups represented by formula (P-1) to formula (P-20) below:

[Chem. 128)

(P-1)

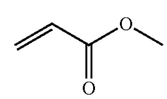

(P-2)

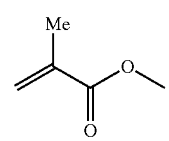

(P-3)

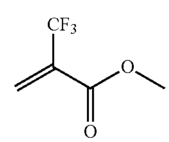

(P-4)

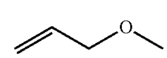

(P-5)

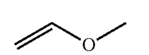

(P-6)

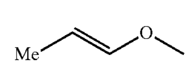

-continued
(P-7)
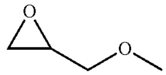
(P-8)
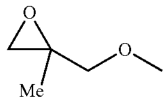
(P-9)
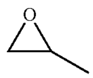
(P-10)
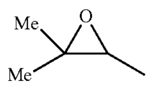
(P-11)
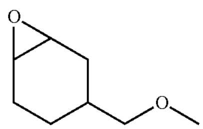
(P-12)
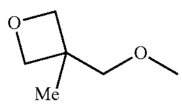
(P-13)
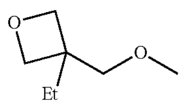
(P-14)
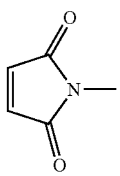
-continued
(P-15)
(P-16)
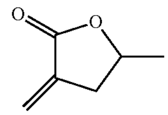
(P-17)
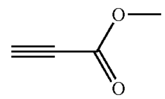
(P-18)
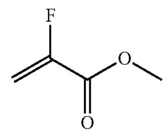
(P-19)
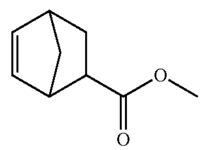
(P-20)
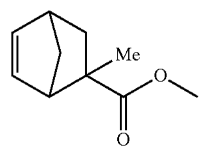
Other specific examples of the chiral compound include compounds represented by general formula (10-5) to formula (10-31) below:
[Chem. 129]
(10-5)
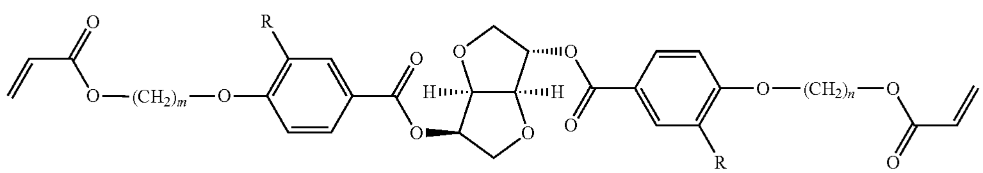
(10-6)
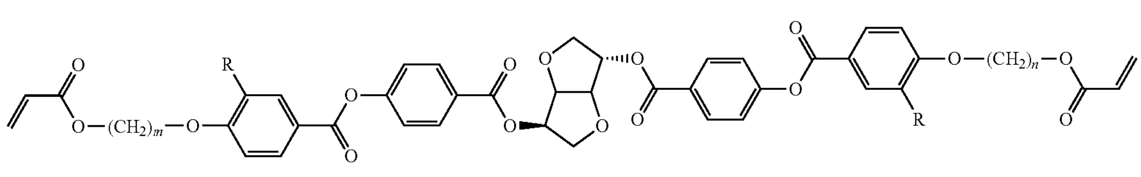

-continued
(10-7)
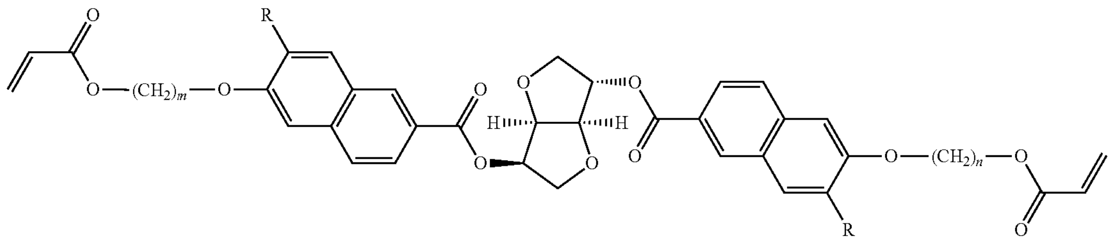
(10-8)
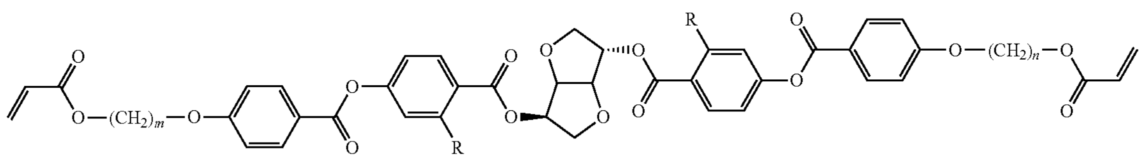
[Chem. 130]
(10-9)
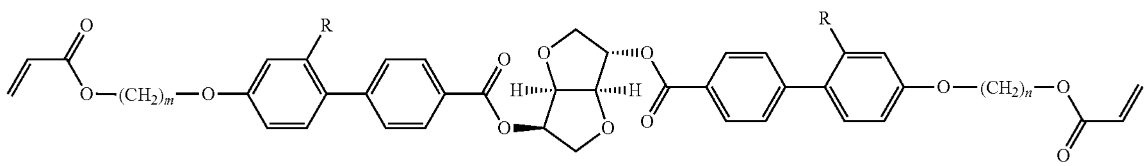
(10-10)
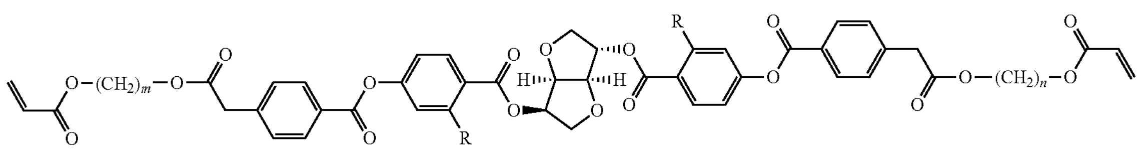
(10-11)
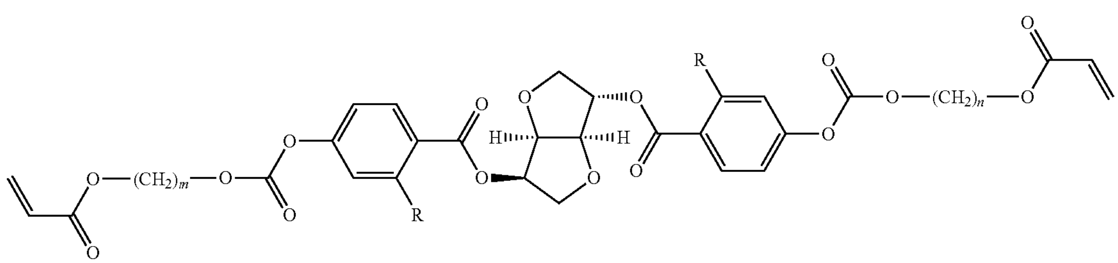
(10-12)
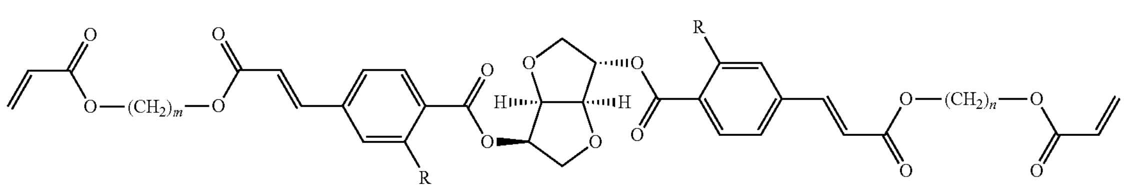
(10-13)
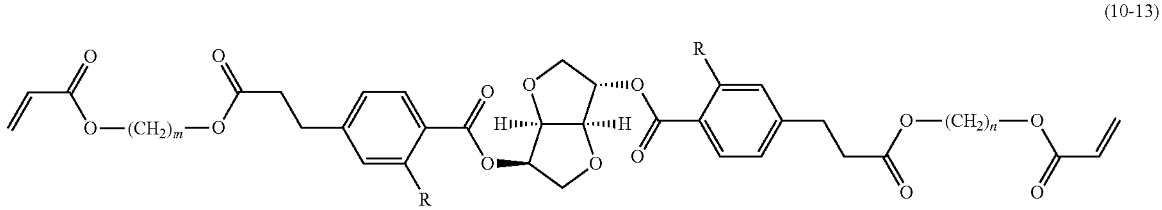

-continued
[Chem. 131]
(10-14)
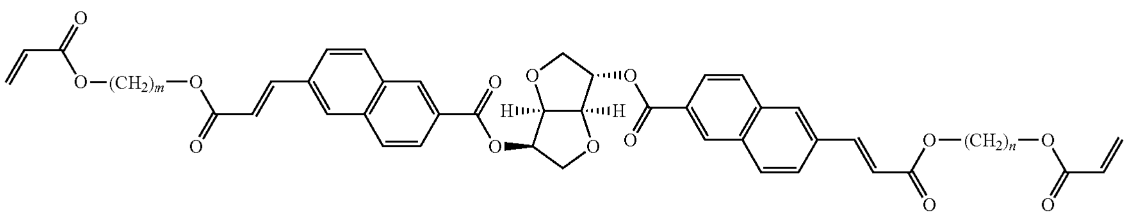
(10-15)
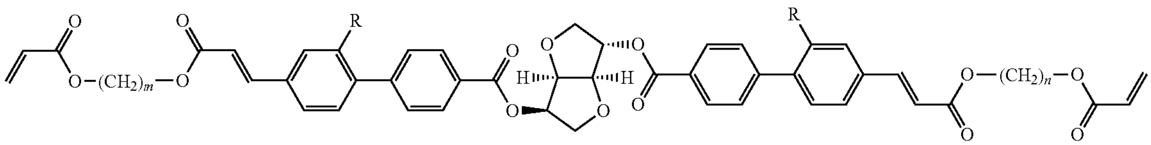
(10-16)
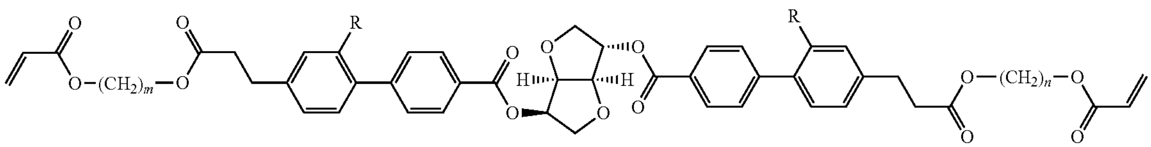
(10-17)
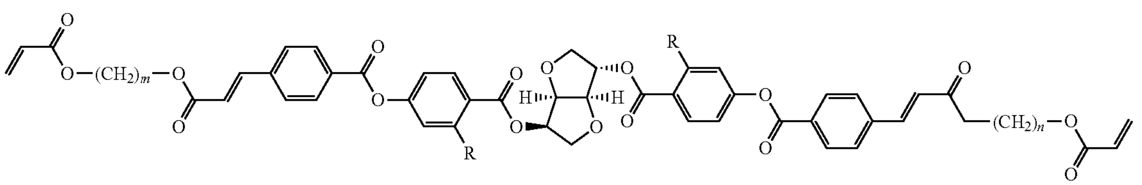
(10-18)
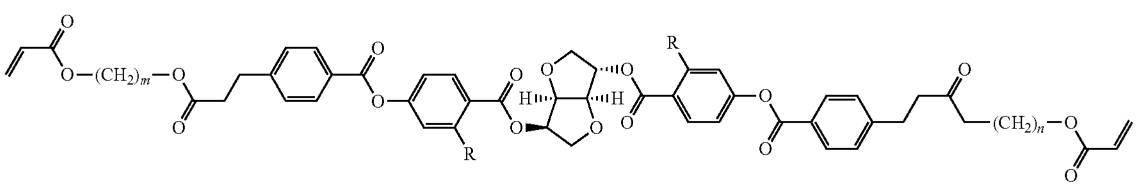
[Chem. 132]
(10-19)
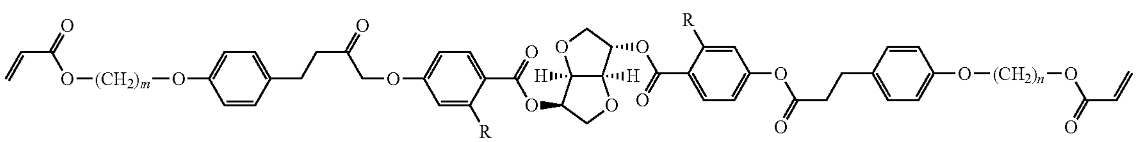
(10-20)
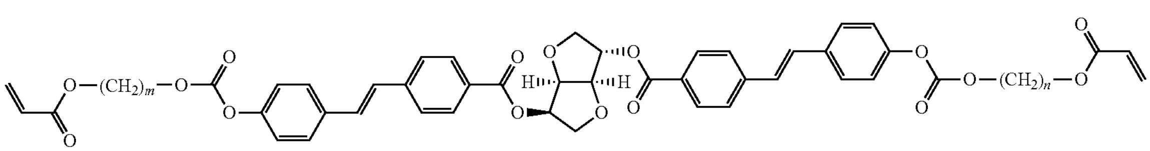
(10-21)
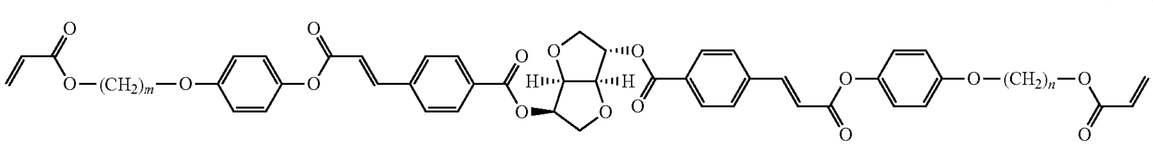

-continued
(10-22)
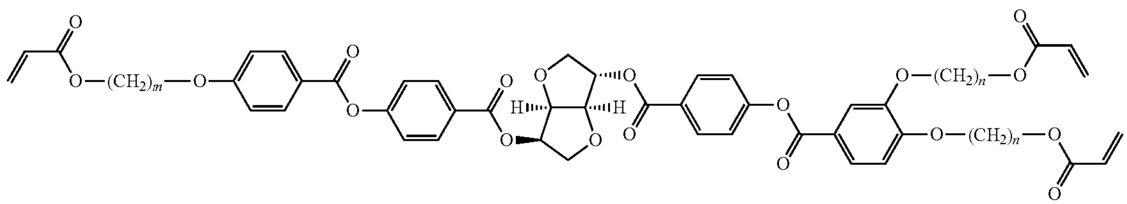
[Chem. 133]
(10-23)
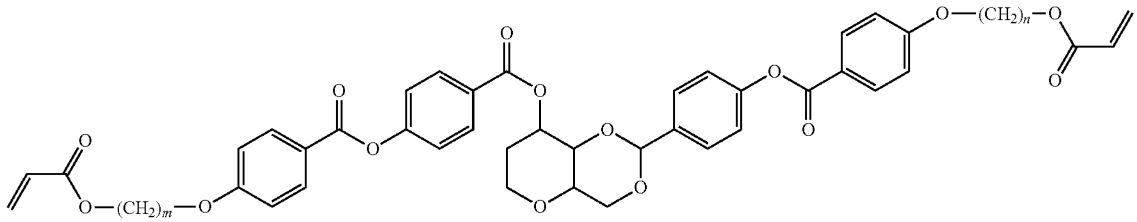
(10-24)
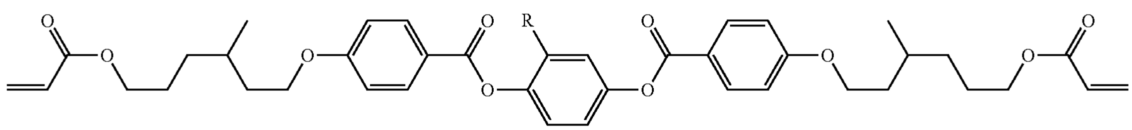
(10-25)
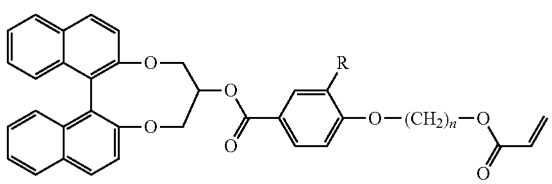
(10-26)
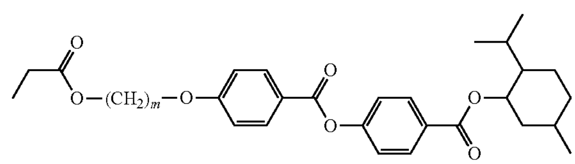
(10-27)
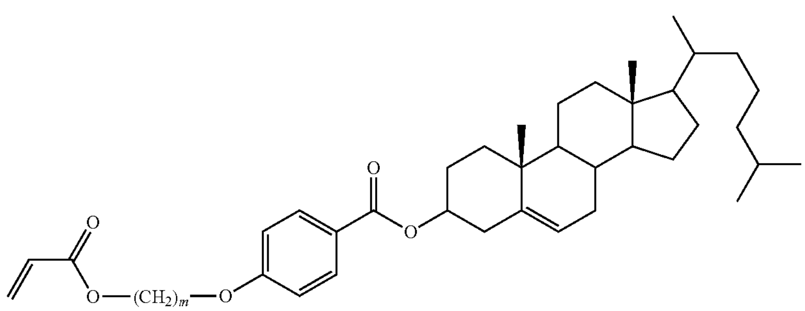
(10-28)
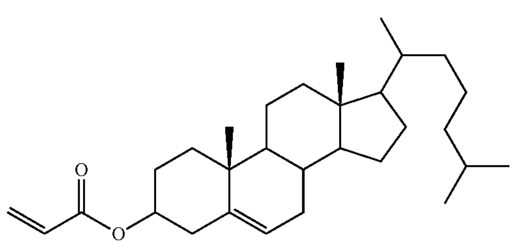

-continued

[Chem. 134]

(10-29)

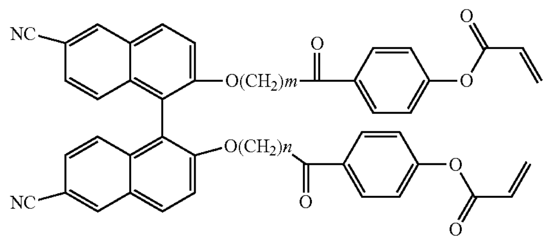

(10-30)

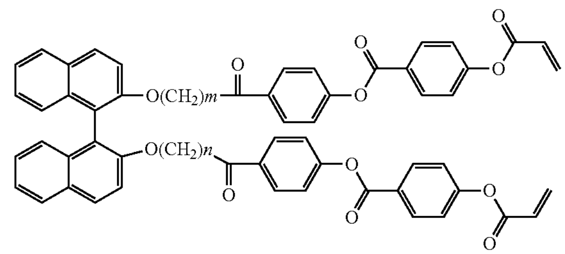

(10-31)

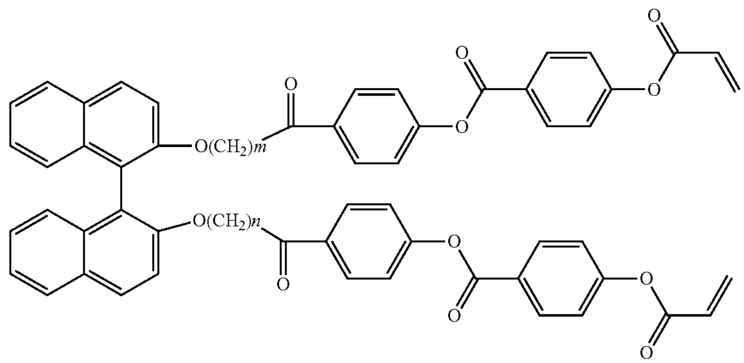

In the above formulas, m and n each independently represent an integer of 1 to 10, and R represents a hydrogen atom, an alkyl group having 1 to 10 carbon atoms, or a fluorine atom. When a plurality of Rs are present, they may be the same or different.

Specific examples of the chiral compound having no polymerizable group include: cholesterol pelargonate and cholesterol stearate that have a cholesteryl group as a chiral group; "CB-15" and "C-15" manufactured by BDH, "S-1082" manufactured by Merck, and "CM-19," "CM-20," and "CM" manufactured by Chisso Corporation, each of which has a 2-methylbutyl group as a chiral group; and "S-811" manufactured by Merck and "CM-21" and "CM-22" manufactured by Chisso Corporation, each of which has a 1-methylheptyl group as a chiral group.

When the chiral compound is added, the amount of the chiral compound added is controlled such that a value obtained by dividing the thickness (d) of the polymer to be obtained by the helix pitch (P) of the polymer, i.e., (d/P), is in the range of preferably 0.1 to 100 and more preferably 0.1 to 20, but this depends on the intended purpose of the polymer of the polymerizable composition of the present invention.

(Non-Liquid Crystalline Compound having Polymerizable Group)

A compound that has a polymerizable group but is not a liquid crystalline compound may be added to the polymerizable composition of the present invention. No particular limitation is imposed on the above compound, so long as the compound used is commonly recognized as a polymerizable monomer or a polymerizable oligomer in the present technical field. When the non-liquid crystalline compound is added, its amount is preferably 15% by mass or less and more preferably 10% by mass or less with respect to the total amount of the polymerizable compounds used in the polymerizable composition of the present invention.

Specific examples include: mono(meth)acrylates such as methyl (meth)acrylate, ethyl (meth)acrylate, 2-hydroxyethyl acrylate, propyl (meth)acrylate, 2-hydroxypropyl (meth) acrylate, butyl (meth)acrylate, isobutyl (meth)acrylate, 4-hydroxybutyl (meth)acrylate, 2-hydroxybutyl (meth)acrylate, octyl (meth)acrylate, 2-ethylhexyl (meth)acrylate, dodecyl (meth)acrylate, stearyl (meth)acrylate, cyclohexyl (meth)acrylate, dicyclopentanyloxylethyl (meth)acrylate, isobornyloxylethyl (meth)acrylate, isobornyl (meth)acrylate, adamantyl (meth)acrylate, dimethyladamantyl (meth) acrylate, dicyclopentanyl (meth)acrylate, dicyclopentenyl (meth)acrylate, methoxyethyl (meth)acrylate, ethylcarbitol (meth)acrylate, tetrahydrofurfuryl (meth)acrylate, benzyl (meth)acrylate, phenoxyethyl (meth)acrylate, 2-phenoxydiethylene glycol (meth)acrylate, 2-hydroxy-3-phenoxyethyl (meth)acrylate, (2-methyl-2-ethyl-1,3-dioxolan-4-yl)methyl (meth)acrylate, (3-ethyloxetan-3-yl)methyl (meth)acrylate, o-phenylphenolethoxy (meth)acrylate, dimethylamino (meth)acrylate, diethylamino (meth)acrylate, 2,2,3,3,3-pentafluoropropyl (meth)acrylate, 2,2,3,4,4,4-hexafluorobutyl (meth)acrylate, 2,2,3,3,4,4,4-heptafluorobutyl (meth)acrylate, 2-(perfluorobutyl)ethyl (meth)acrylate, 2-(perfluorohexyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H-1-(trifluoromethyl)trifluoroethyl (meth)acrylate, 1H,1H,3H-hexafluorobutyl (meth)acrylate, 1,2,2,2-tetrafluoro-1-(trifluoromethyl)ethyl (meth)acrylate, 1H,1H-pentadecafluorooctyl (meth)acrylate, 1H,1H,2H,2H-tridecafluorooctyl (meth)acrylate, 2-(meth)acryloyloxyethyl phthalate, 2-(meth)acryloyloxyethylhexahydro phthalate, glycidyl (meth)acrylate, 2-(meth)acryloyloxyethyl phosphate, acryloylmorpholine, dimethylacrylamide, dimethylaminopropylacrylamide, isopropylacrylamide, diethylacrylamide, hydroxyethylacrylamide, and N-acryloyloxyethylhexahydrophthalimide; diacrylates such as 1,4-butanediol di(meth)acrylate, 1,6-hexanediol di(meth) acrylate, 1,9-nonanediol di(meth)acrylate, neopentyldiol di(meth)acrylate, tripropylene glycol di(meth)acrylate, ethylene glycol di(meth)acrylate, diethylene glycol di(meth) acrylate, triethylene glycol di(meth)acrylate, ethylene oxide-modified bisphenol A di(meth)acrylate, tricyclodecanedimethanol di(meth)acrylate, 9,9-bis[4-(2-acryloyloxyethoxy)phenyl]fluorene, glycerin di(meth)acrylate, 2-hydroxy-3-acryloyloxypropyl methacrylate, an acrylic acid adduct of 1,6-hexanediol diglycidyl ether, and an acrylic acid adduct of 1,4-butanediol diglycidyl ether; tri(meth)acrylates such as trimethylolpropane tri(meth)acrylate, ethoxylated isocyanuric acid triacrylate, pentaerythritol tri(meth)acrylate, and ε-caprolactone-modified tris-(2-acryloyloxyethyl)isocyanurate; tetra(meth)acrylates such as pentaerythritol tetra(meth)acrylate and ditrimethylolpropane tetra(meth)acrylate; dipentaerythritol hexa(meth)acrylate; oligomer-type (meth)acrylates; various urethane acrylates; various macromonomers; epoxy compounds such as ethylene glycol diglycidyl ether, diethylene glycol diglycidyl ether, propylene glycol diglycidyl ether, neopentyl glycol diglycidyl ether, 1,6-hexanediol diglycidyl ether, glycerin diglycidyl ether, and bisphenol A diglycidyl ether; and maleimide. These may be used alone or may be used as a mixture of two or more.

(Other Liquid Crystalline Compounds)

The polymerizable composition used in the present invention may contain a liquid crystalline compound having at least one polymerizable group other than the liquid crystalline compounds of general formula (1) to general formula (7). If the amount of such a liquid crystalline compound added is excessively large, the retardation ratio of a retardation plate prepared using the polymerizable composition may become large. Therefore, when the above liquid crystalline compound is added, its amount is preferably 30% by mass or less, more preferably 10% by mass or less, and particularly preferably 5% by mass or less with respect to the total mass of the polymerizable compounds in the polymerizable composition of the present invention.

Examples of the above liquid crystalline compound include liquid crystalline compounds represented by general formula (1-b) to general formula (7-b):

[Chem. 135]

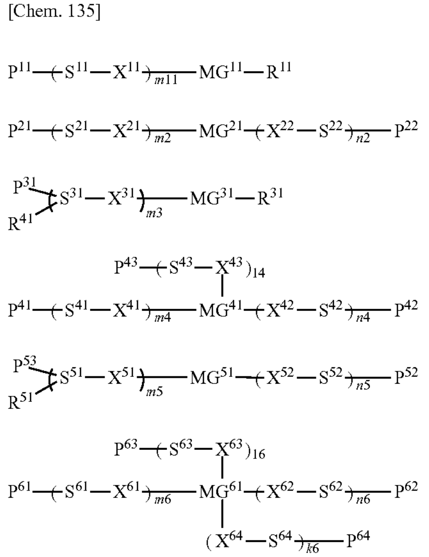

(1-b)

(2-b)

(3-b)

(4-b)

(5-b)

(6-b)

-continued

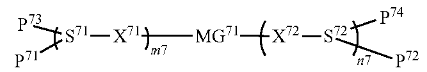

(7-b)

(wherein $P^{11}$ to $P^{74}$ each represent a polymerizable group; $S^{11}$ to $S^{72}$ each represent a spacer group or a single bond; when a plurality of $S^{11}$s to $S^{72}$s are present, they may be the same or different; $X^{11}$ to $X^{72}$ each represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond (provided that each P—(S—X)— bond contains no —O—O—); when a plurality of $X^{11}$s to $X^{72}$s are present, they may be the same or different; $MG^{11}$ to $MG^{71}$ each independently represent formula (b):

[Chem. 136]

$$-(A^{83}\text{-}Z^{83})_{j83}\text{-}M^{81}\text{-}(Z^{84}\text{-}A^{84})_{j''} \qquad \text{(b)}$$

(wherein $A^{83}$ and $A^{84}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, each of which may be unsubstituted or substituted by at least one $L^2$; when a plurality of $A^{83}$s and/or $A^{84}$s are present, they may be the same or different;

$Z^{83}$ and $Z^{84}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—, —N═CH—, —CH═N—N═CH—, —CF═CF—, —C≡C—, or a single bond; when a plurality of $Z^{83}$s and/or $Z^{84}$s are present, they may be the same or different;

M" is a group selected from a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2) octylene group, a decahydronaphthalene-2,6-diyl group, a pyridine-2,5-diyl group, a pyrimidine-2,5-diyl group, a pyrazine-2,5-diyl group, a thiophene-2,5-diyl group-, a 1,2,3,4-tetrahydronaphthalene-2,6-diyl group, a naphthylene-1,4-diyl group, a naphthylene-1,5-diyl group, a naphthylene-1,6-diyl group, a naphthylene-2,6-diyl group, a phenanthrene-2,7-diyl group, a 9,10-dihydrophenanthrene-2,7-diyl group, a 1,2,3,4,4a,9,10a-octahydrophenanthrene-2,7-diyl group, a benzo[1,2-b:4,5-b']dithiophene-2,6-diyl group, a benzo[1,2-b:4,5-b']diselenophen-2,6-diyl group, a [1]benzothieno[3,2-b]thiophene-2,7-diyl group, a [1]benzoselenopheno[3,2-b]selenophen-2,7-diyl group, and a fluorene-2,7-diyl group, each of which may be unsubstituted or substituted by at least one $L^2$;

$L^2$ represents a fluorine atom, a chlorine atom, a bromine atom, an iodine atom, a pentafluorosulfuranyl group, a nitro group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by a group selected from —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, and —C≡C—; when a plurality of $L^e$s are present in the compound, they may be the same or different; m represents an integer from 0 to 8; and j83 and j84 each independently represent an integer from 0 to 5 while j83+j84 represents an integer from 1 to 5); $R^{11}$ and $R''$ each represent a hydrogen atom, a fluorine atom, a chlorine atom, a bromine atom, an iodine atom, a pentafluorosulfuranyl group, a cyano group, a nitro group, an isocyano group, a thioisocyano group, or an alkyl group having 1 to 20 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by —O—, —S—, —CO—, —COO—, —OCO—, —CO—S—, —S—CO—, —O—CO—O—, —CO—NH—, —NH—CO—, or —C≡C—; m11 represents an integer of 0 to 8; m2 to m7, n2 to n7, 14 to 16, and k6 each independently represent an integer from 0 to 5; but general formula (1) to general formula (7) are excluded).

Specific examples of the compound represented by general formula (1-b) include compounds represented by formula (1-b-1) to formula (1-b-39) below:

[Chem. 137]

(1-b-1)

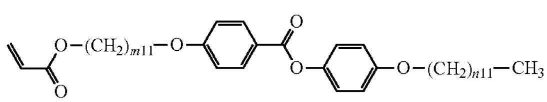

(1-b-2)

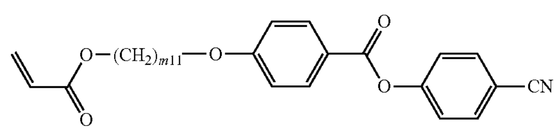

(1-b-3)

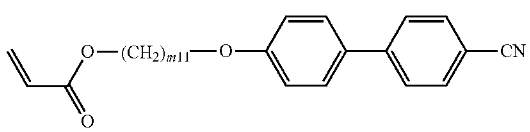

(1-b-4)

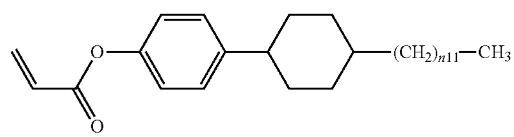

(1-b-5)

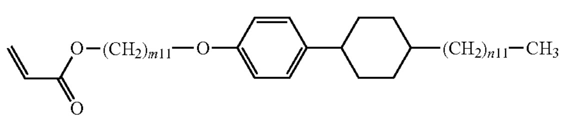

(1-b-6)

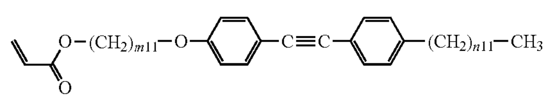

(1-b-7)

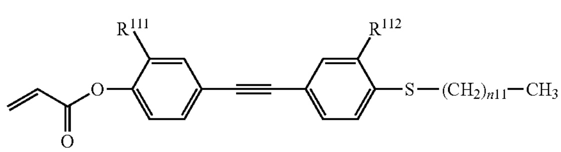

(1-b-8)

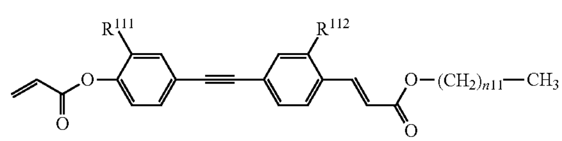

(1-b-9)

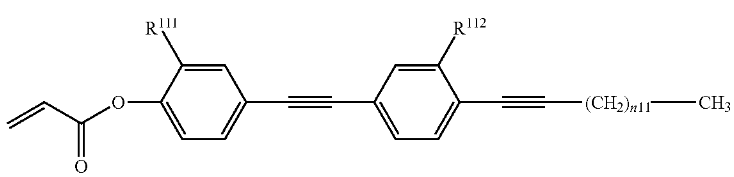

[Chem. 138]

(1-b-10)

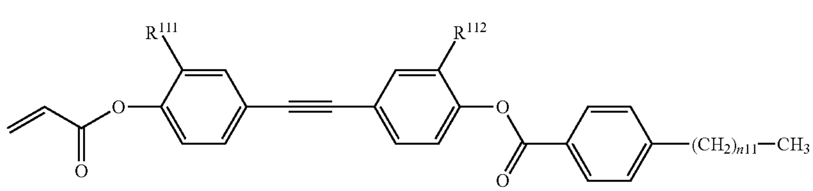

-continued
(1-b-11)
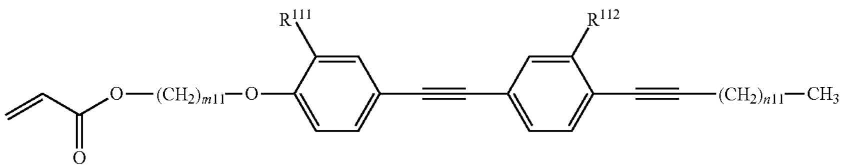
(1-b-12)
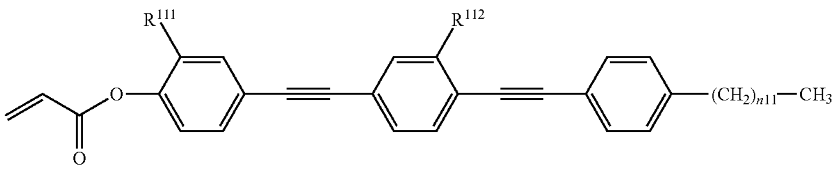
(1-b-13)
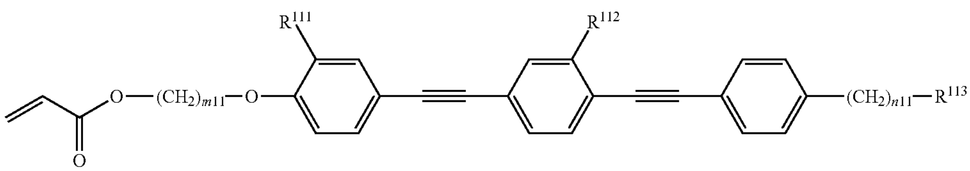
(1-b-14)
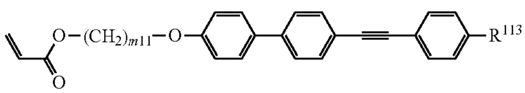
(1-b-15)
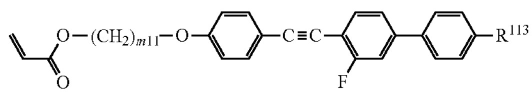
(1-b-16)
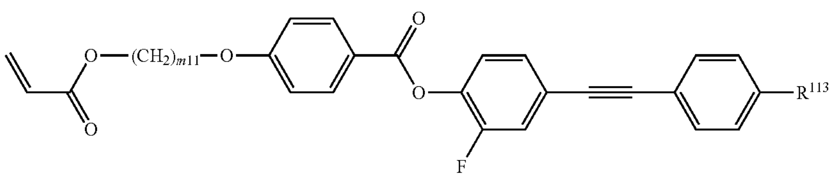
(1-b-17)
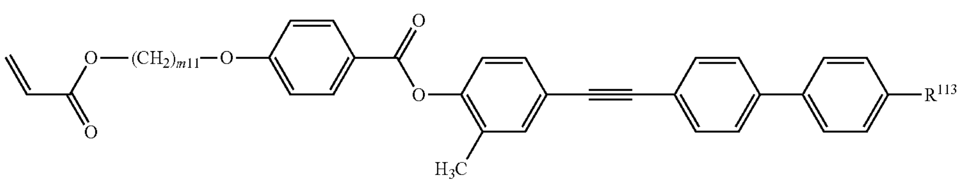
[Chem. 139]
(1-b-18)
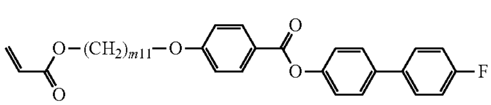
(1-b-19)
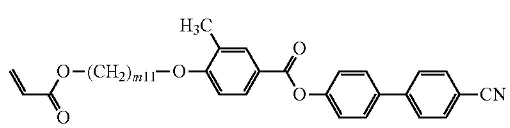
(1-b-20)
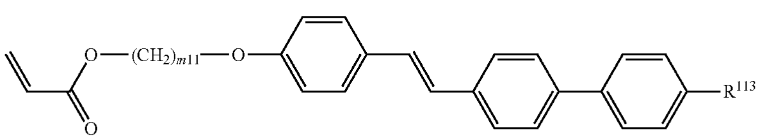
(1-b-21)
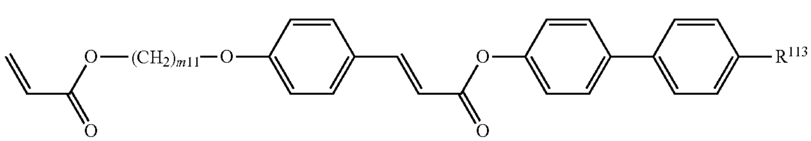

-continued
(1-b-22)
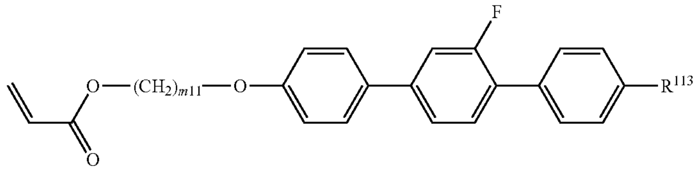
(1-b-23)
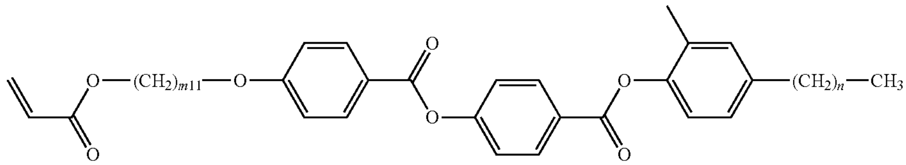
(1-b-24)
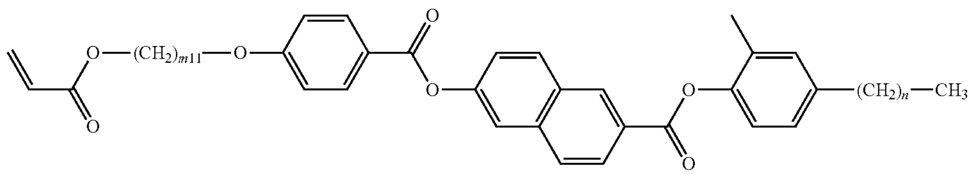
(1-b-25)
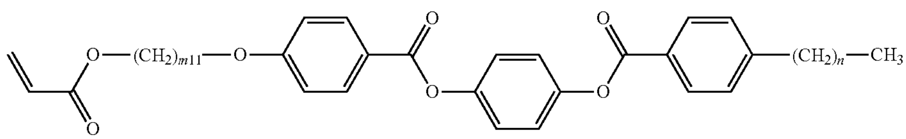
[Chem. 140]
(1-b-26)
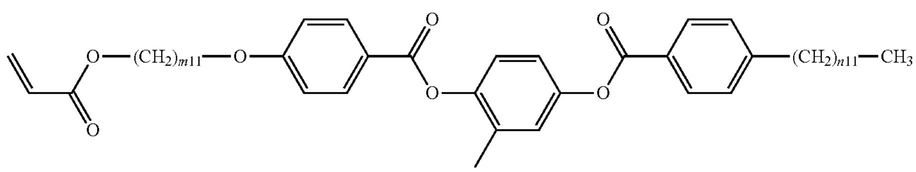
(1-b-27)
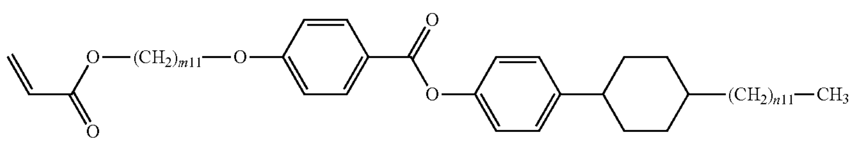
(1-b-28)
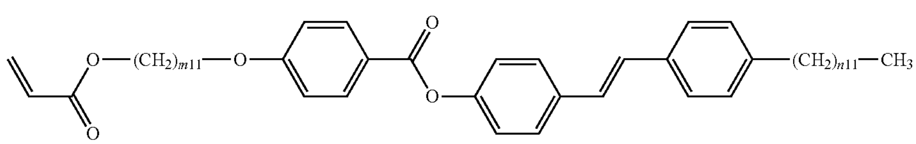
(1-b-29)
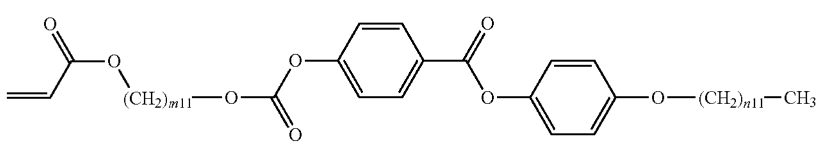
(1-b-30)
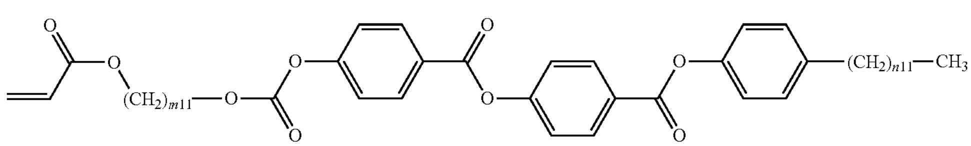
(1-b-31)
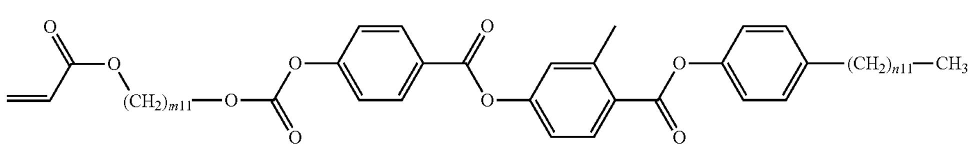

-continued (1-b-32)

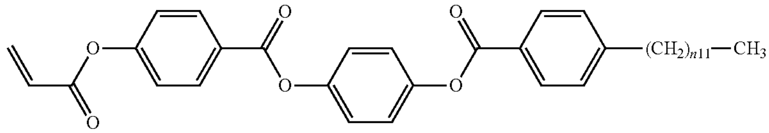

[Chem. 141]

(1-b-33)

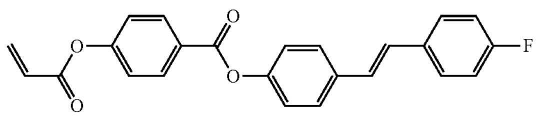

(1-b-34)

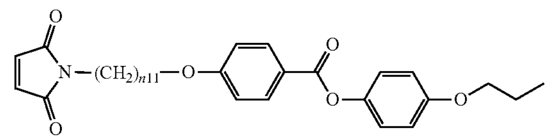

(1-b-35)

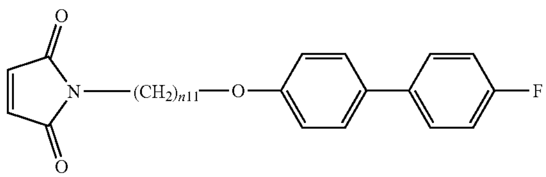

(1-b-36)

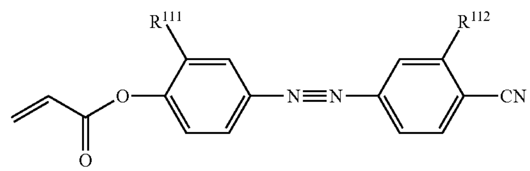

(1-b-37)

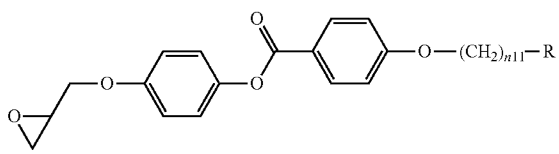

(1-b-38)

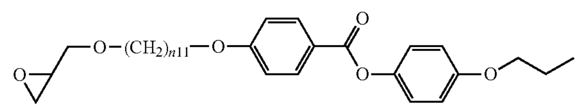

(1-b-39)

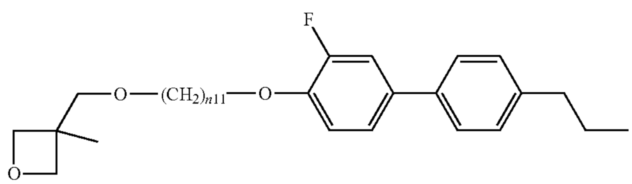

(wherein m11 and n11 each independently represent an integer of 1 to 10; $R^{111}$ and $R^{112}$ each independently represent a hydrogen atom, an alkyl group having 1 to 10 carbon atoms, or a fluorine atom; $R^{113}$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group which has 1 to 20 carbon atoms and in which one —$CH_2$— group or two or more nonadjacent —$CH_2$— groups may be each independently replaced by —O—, —S—, —CO—, —COO—, —OCO—, —CO—S—, —S—CO—, —O—CO—O—, —CO—NH—, —NH—CO—, or —C≡C—; and any hydrogen atom in the alkyl group may be replaced by a fluorine atom). These liquid crystalline compounds may be used alone or may be used as a mixture of two or more.

Specific examples of the compound represented by general formula (2-b) include compounds represented by formula (2-b-1) to formula (2-b-33) below:

[Chem. 142]

(2-b-1)

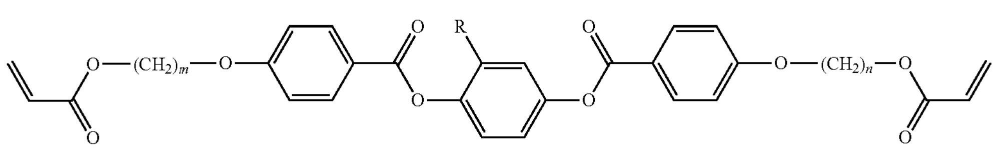

(2-b-2)

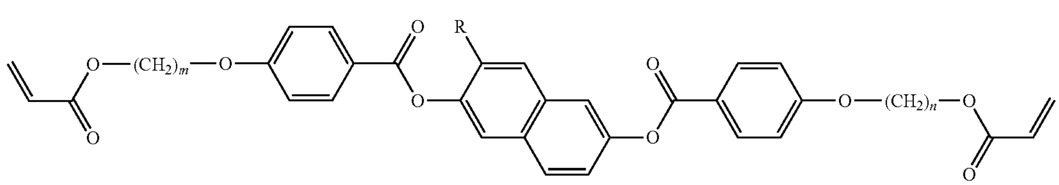

-continued
(2-b-3)
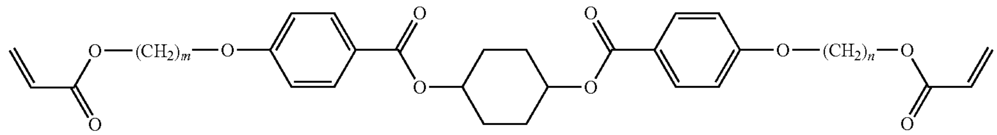
(2-b-4)
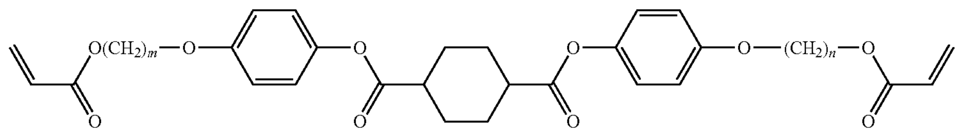
(2-b-5)
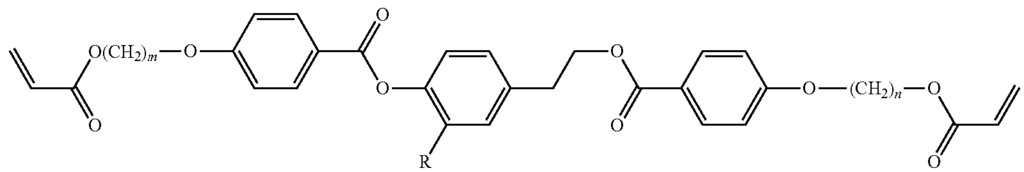
(2-b-6)
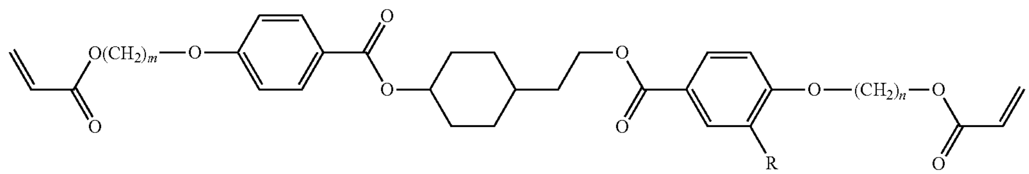
(2-b-7)
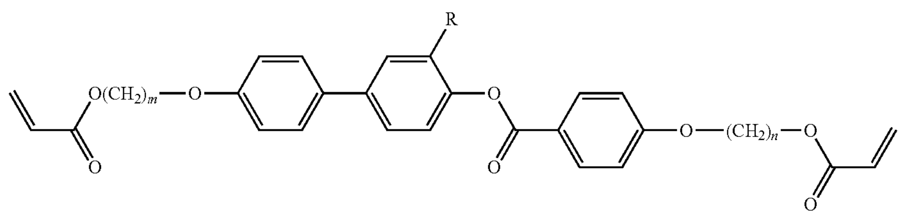
(2-b-8)
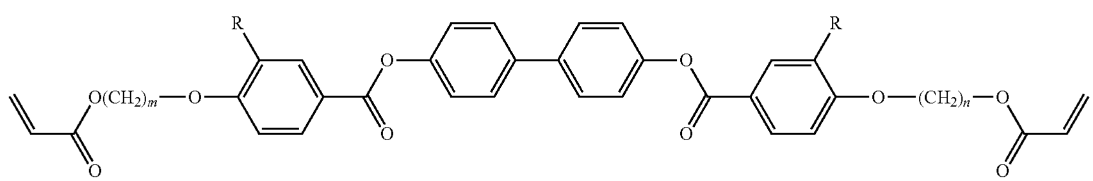
[Chem. 143]
(2-b-9)
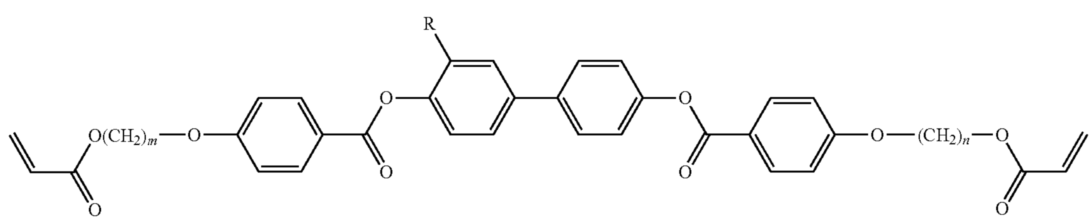
(2-b-10)
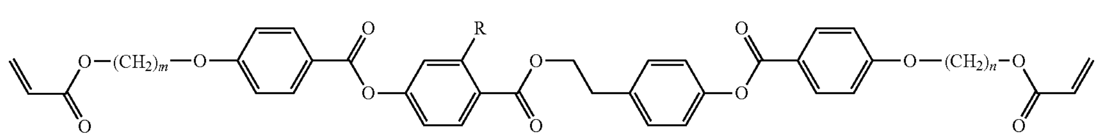
(2-b-11)
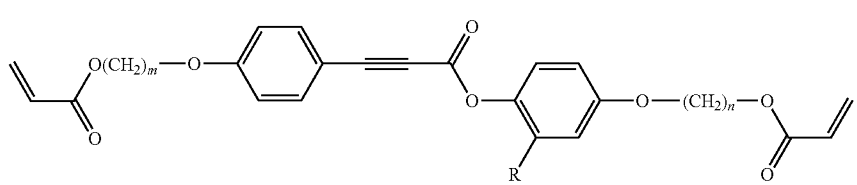

-continued
(2-b-12)
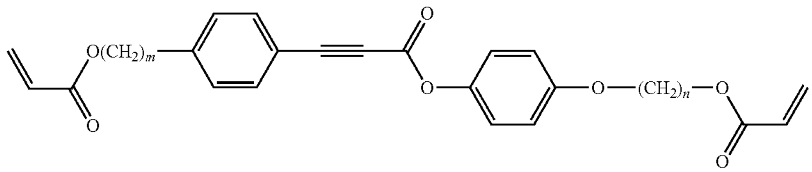
(2-b-13)
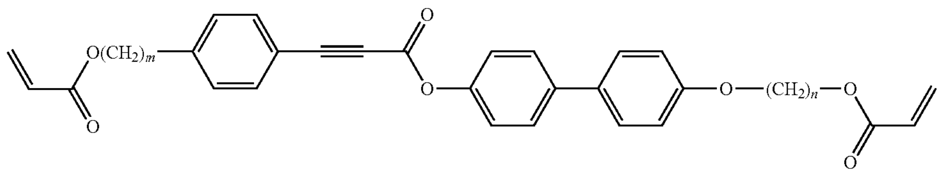
(2-b-14)
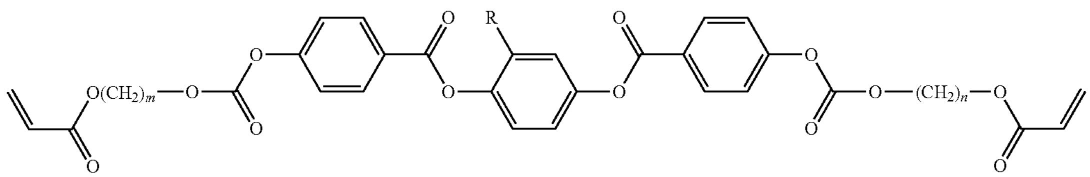
[Chem. 144]
(2-b-15)
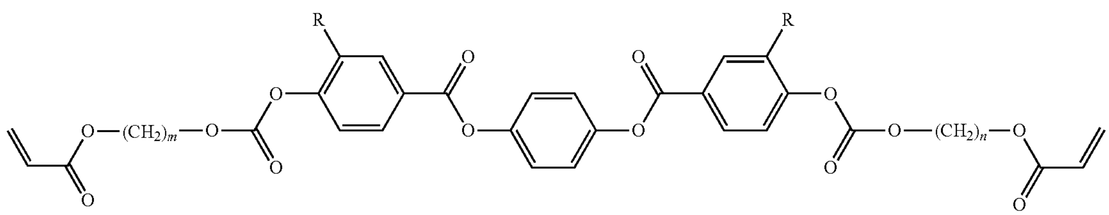
(2-b-16)
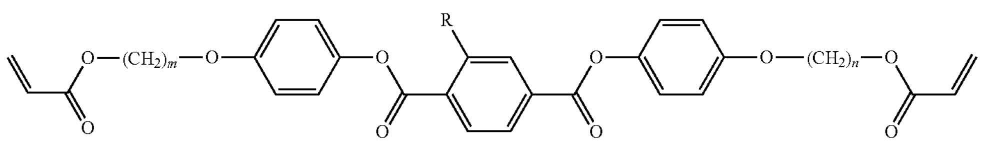
(2-b-17)
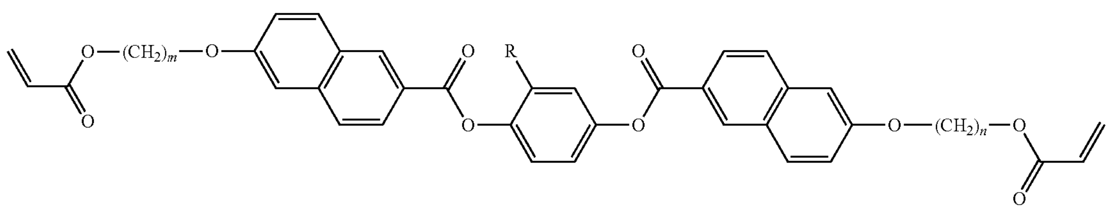
(2-b-18)
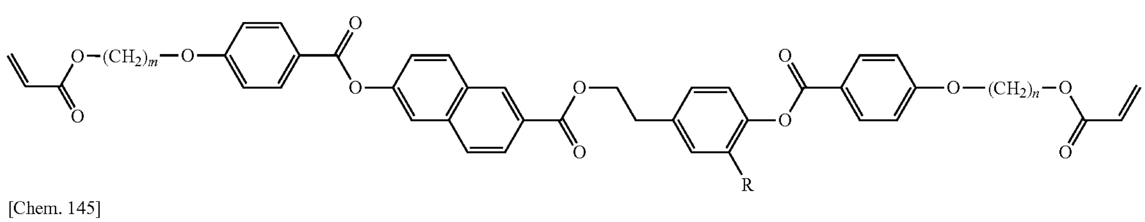
[Chem. 145]
(2-b-19)
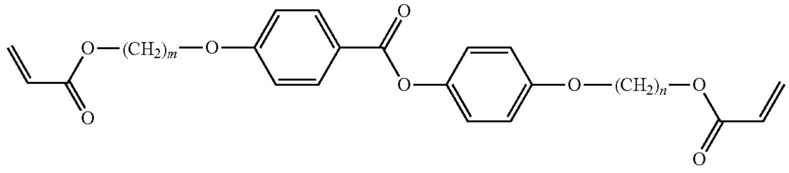

-continued
(2-b-20)
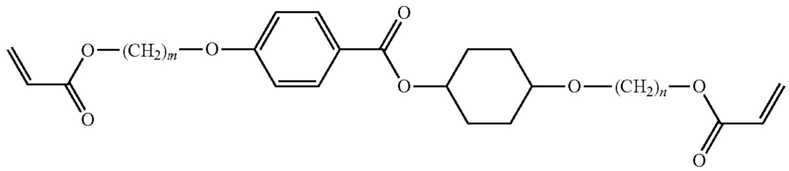
(2-b-21)
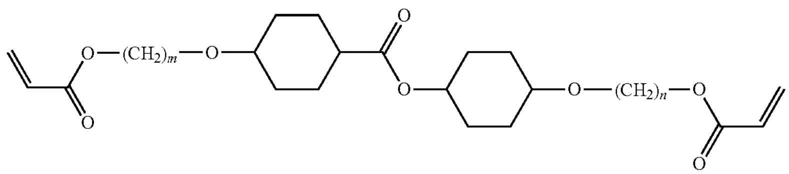
(2-b-22)
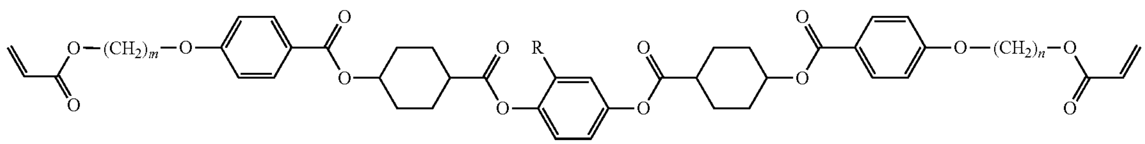
(2-b-23)
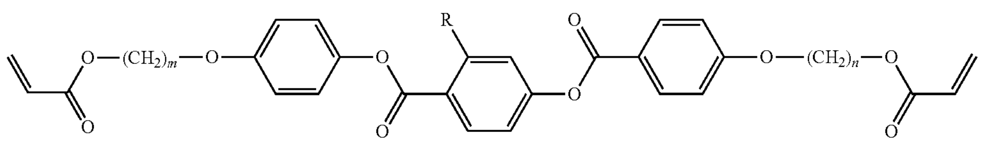
(2-b-24)
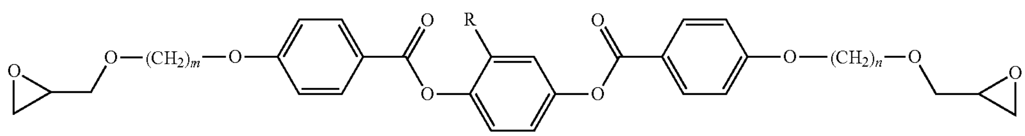
(2-b-25)
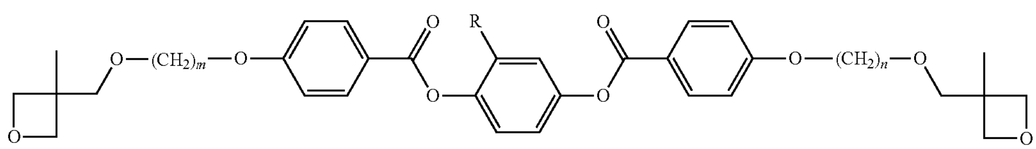
(2-b-26)
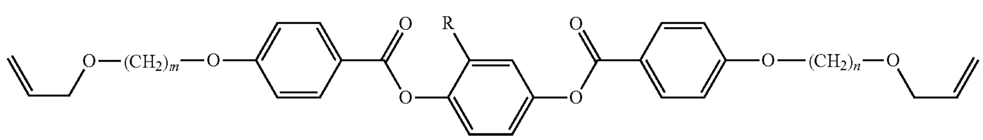
[Chem. 146]
(2-b-27)
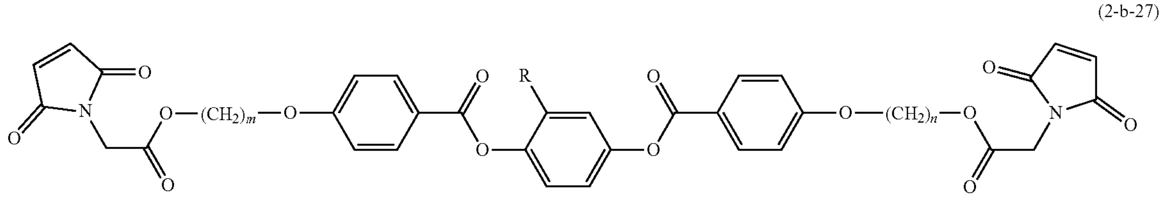
(2-b-28)
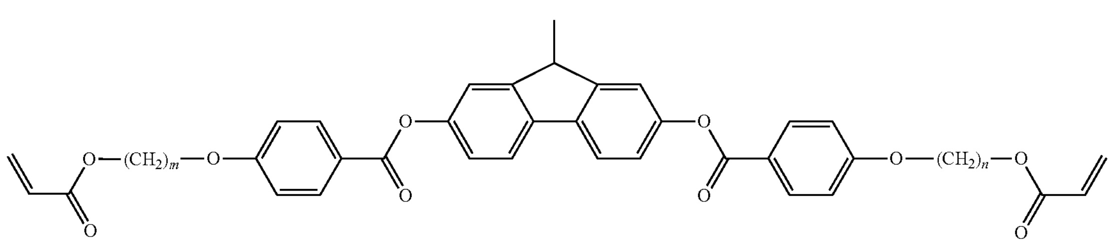

-continued (2-b-29)

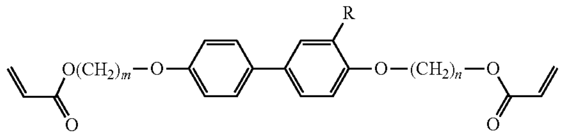

(2-b-30)

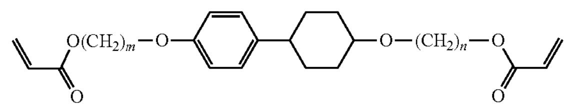

(2-b-31)

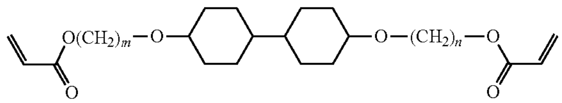

(2-b-32)

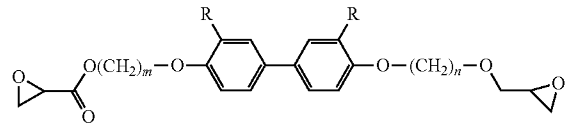

(2-b-33)

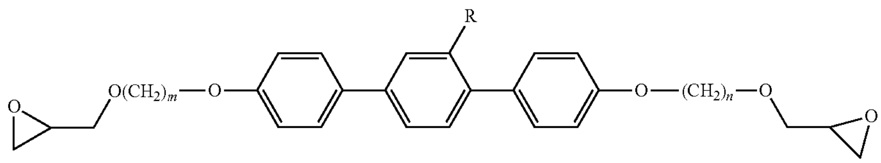

(wherein m and n each independently represent an integer of 1 to 18, and R represents a hydrogen atom, a halogen atom, an alkyl group having 1 to 6 carbon atoms, an alkoxy group having 1 to 6 carbon atoms, or a cyano group. When R is an alkyl group having 1 to 6 carbon atoms or an alkoxy group having 1 to 6 carbon atoms, R may be unsubstituted or substituted by one or at least two halogen atoms). These liquid crystal compounds may be used alone or may be used as a mixture of two or more.

Specific examples of the compound represented by general formula (3-b) include compounds represented by formula (3-b-1) to formula (3-b-16) below:

[Chem. 147]

(3-b-1)

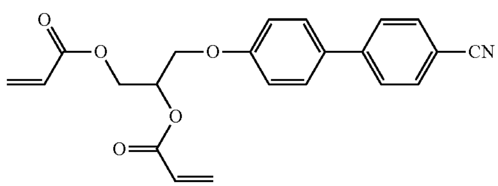

(3-b-2)

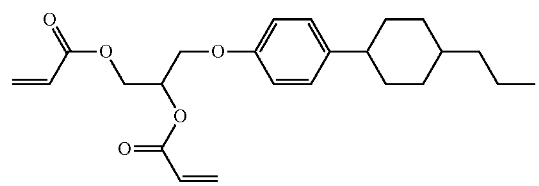

(3-b-3)

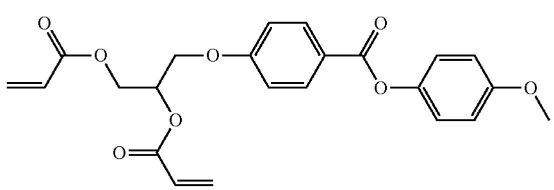

(3-b-4)

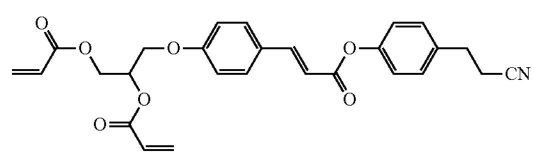

(3-b-5)

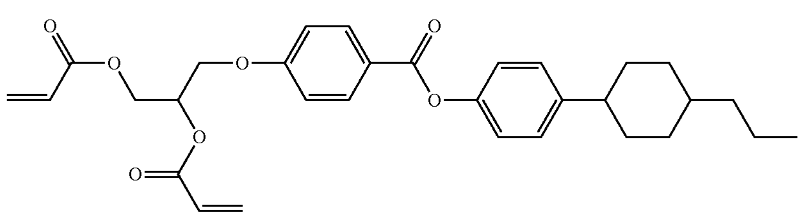

-continued
[Chem. 148]
(3-b-6)
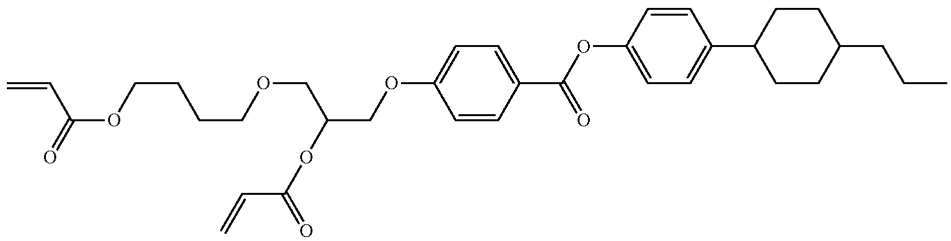
(3-b-7)
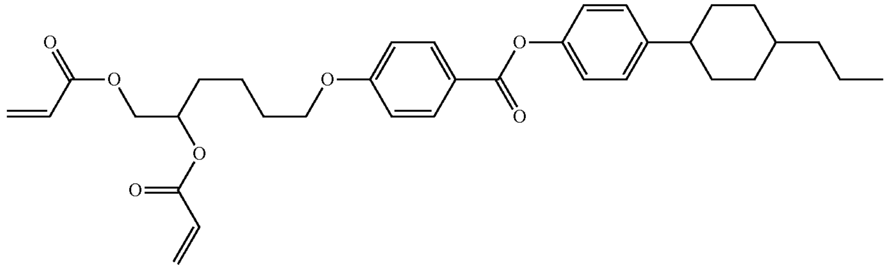
(3-b-8)
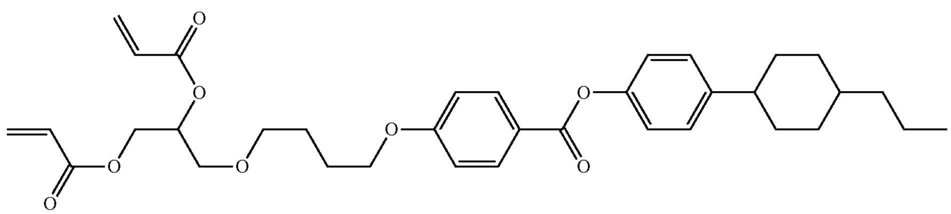
(3-b-9)
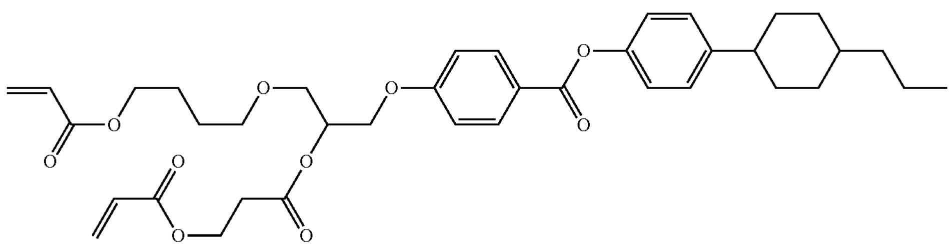
(3-b-10)
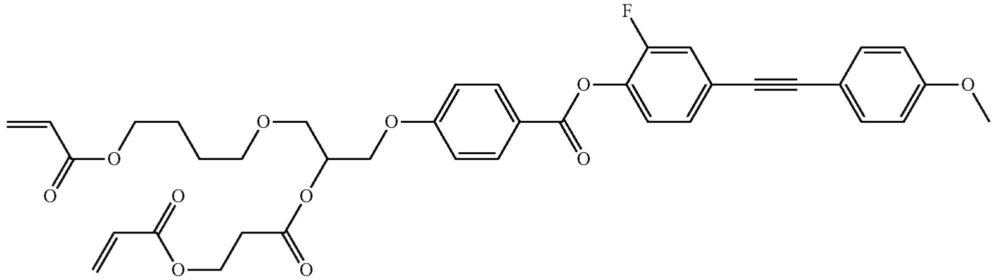
[Chem. 149]
(3-b-11)
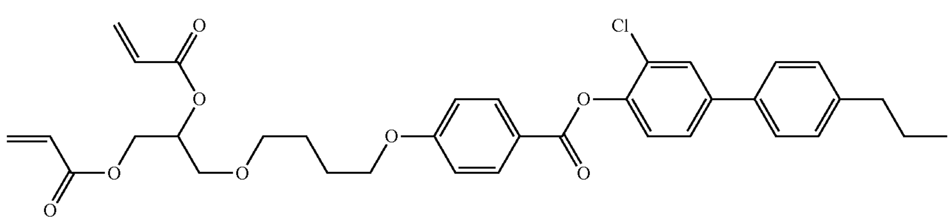

-continued
(3-b-12)
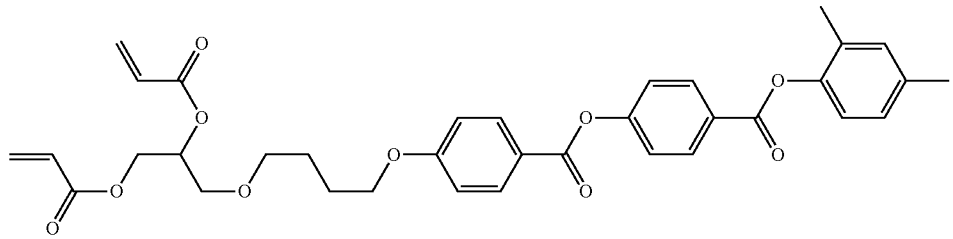
(3-b-13)
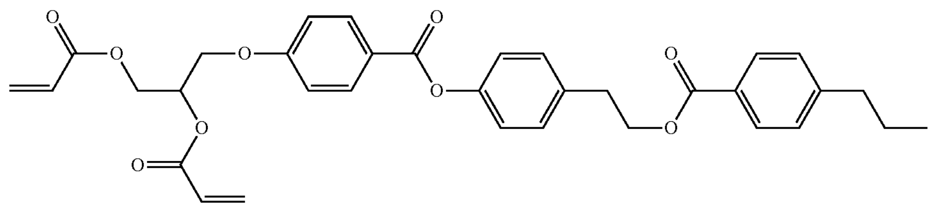
(3-b-14)
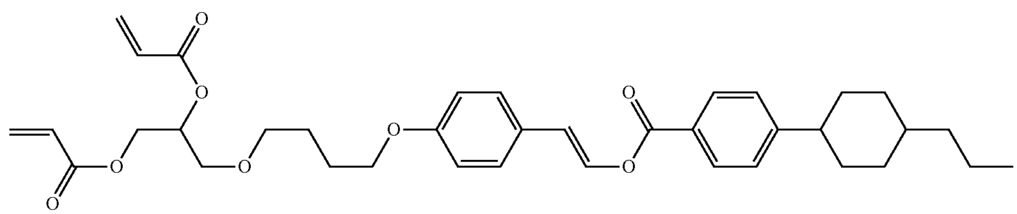
(3-b-15)
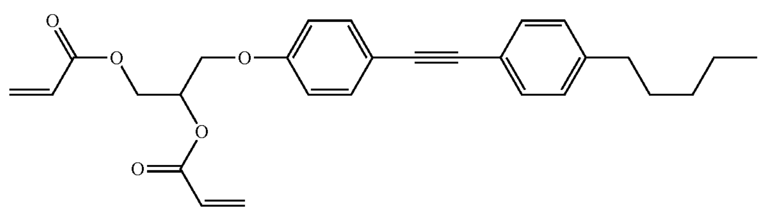
(3-b-16)
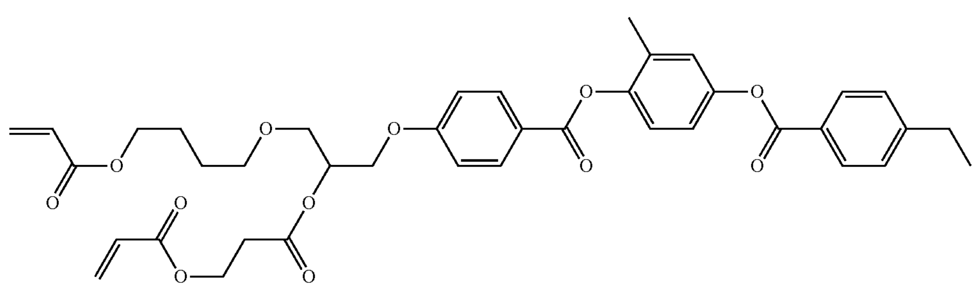
These liquid crystalline compounds may be used alone or as a mixture of two or more.
Specific examples of the compound represented by general formula (4-b) include compounds represented by formula (4-b-1) to formula (4-b-29) below:

[Chem. 150]
(4-b-1)
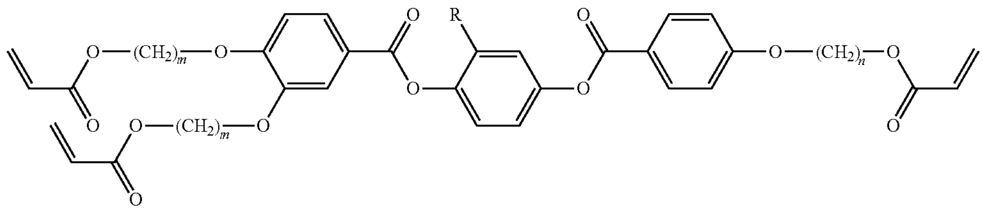
(4-b-2)
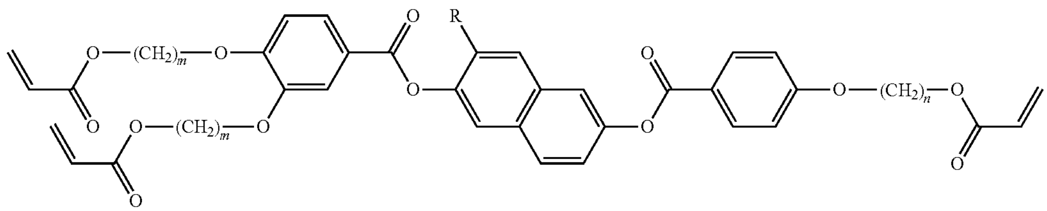
(4-b-3)
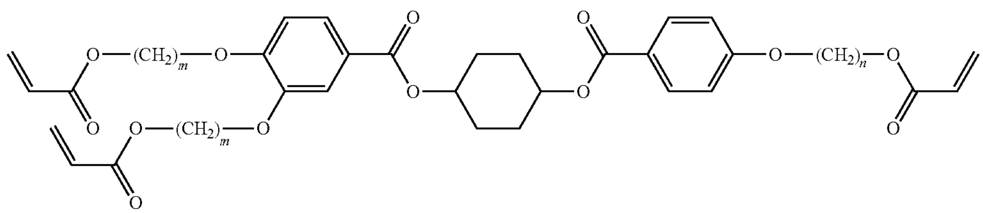
(4-b-4)
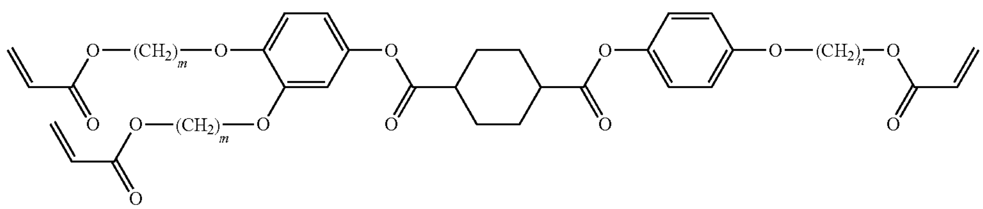
(4-b-5)
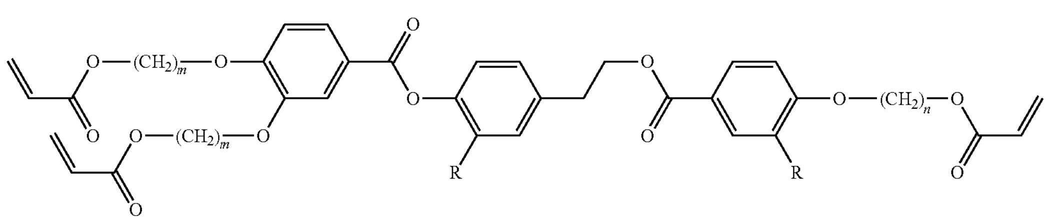
(4-b-6)
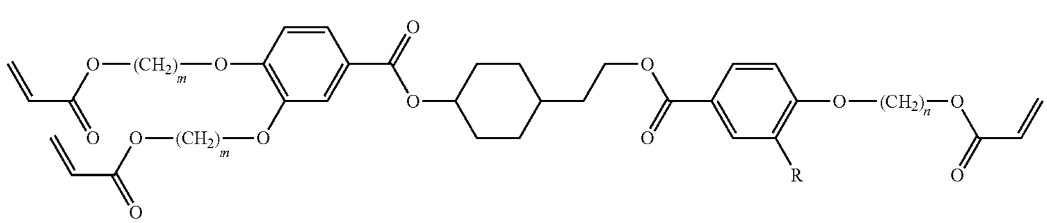

-continued
[Chem. 151]
(4-b-7)
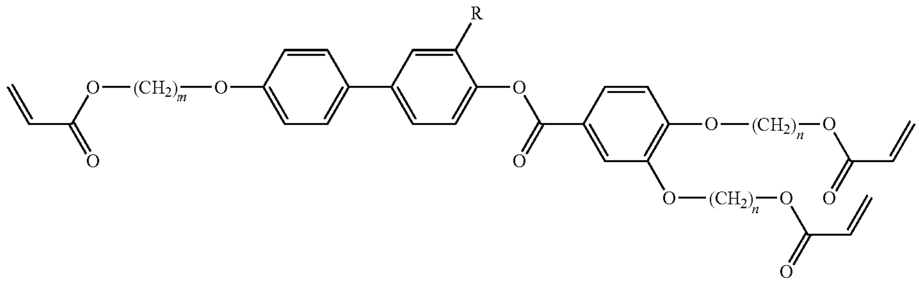
(4-b-8)
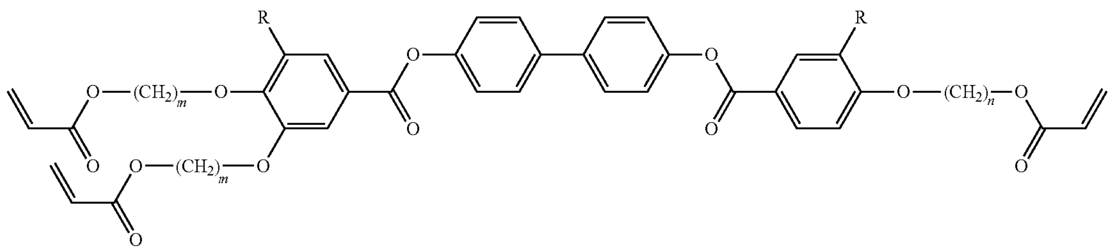
(4-b-9)
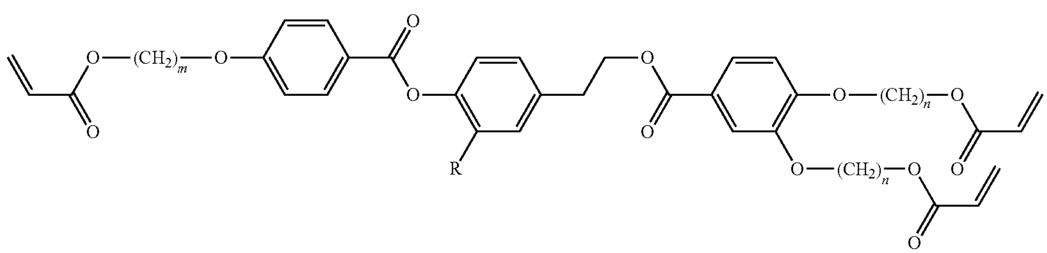
(4-b-10)
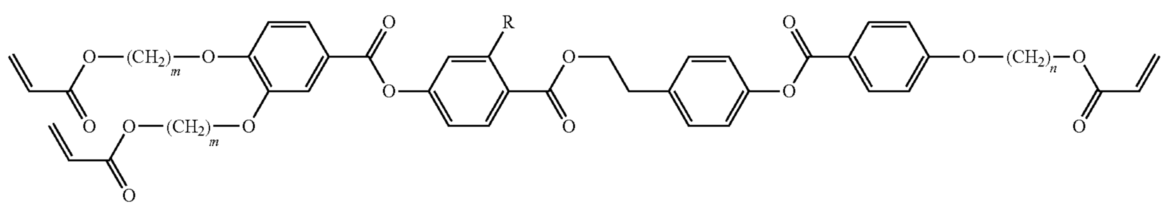
[Chem. 152]
(4-b-11)
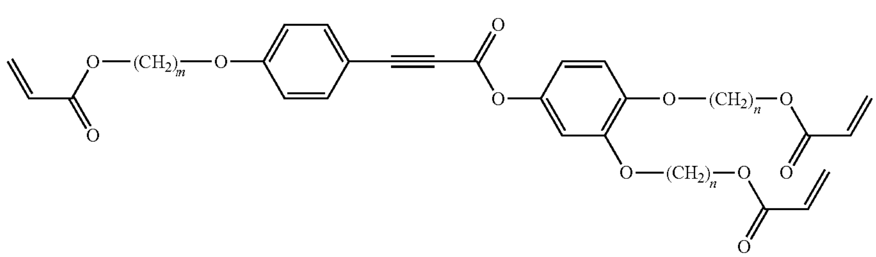
(4-b-12)
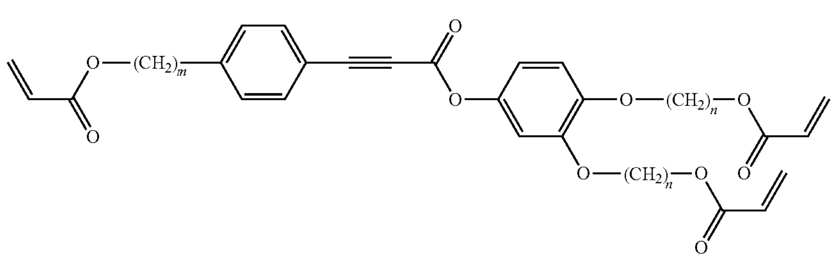

-continued
(4-b-13)
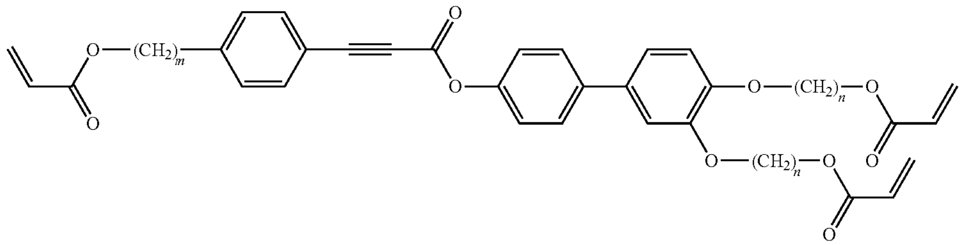
(4-b-14)
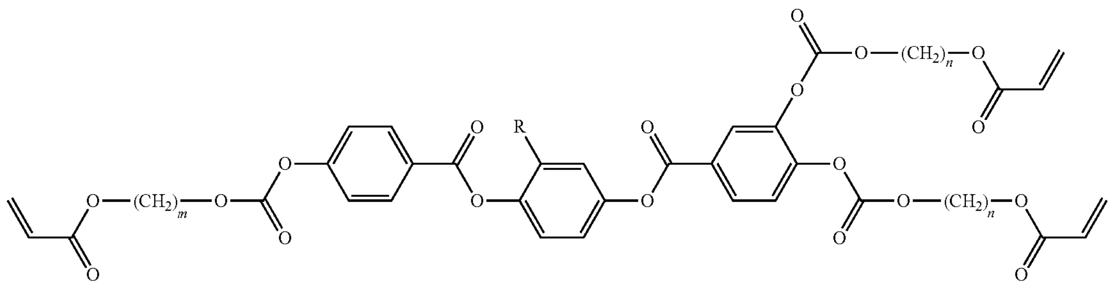
(4-b-15)
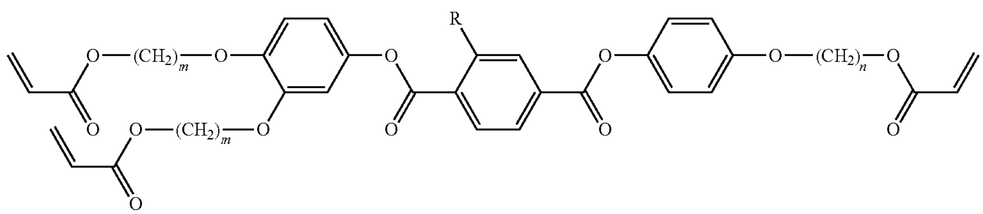
[Chem. 153]
(4-b-16)
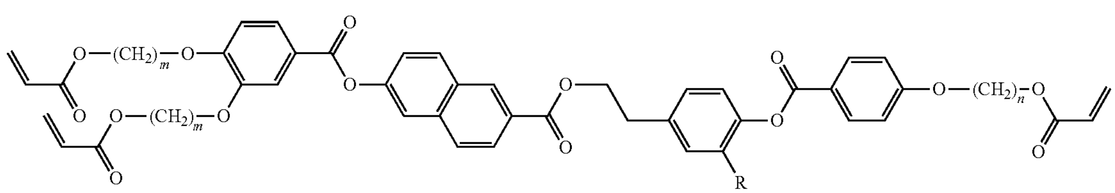
(4-b-17)
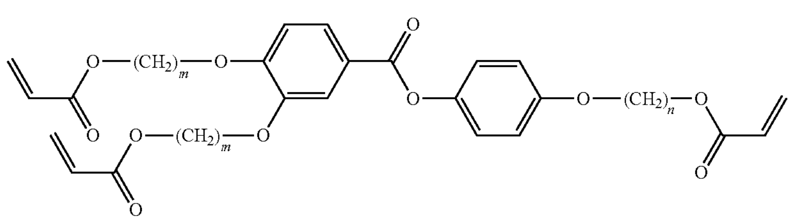
(4-b-18)
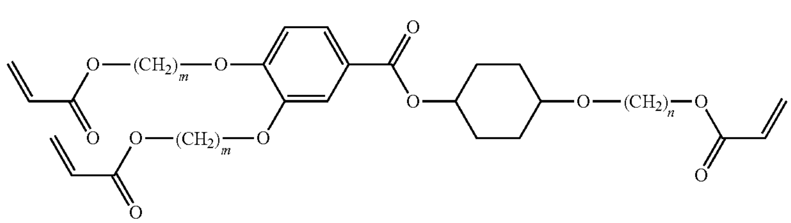

-continued
[Chem. 154]
(4-b-19)
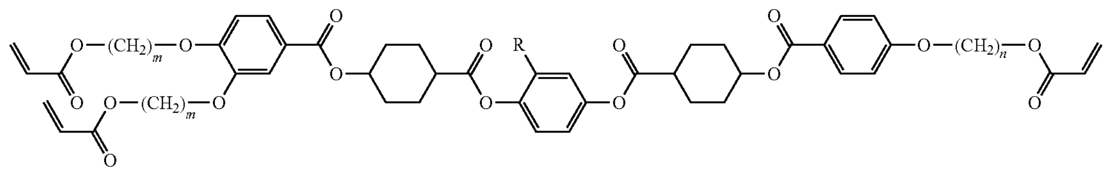
(4-b-20)
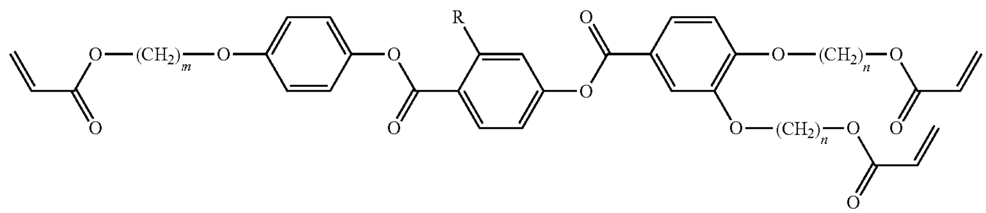
(4-b-21)
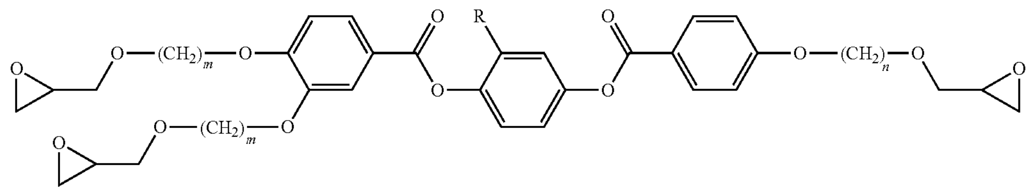
(4-b-22)
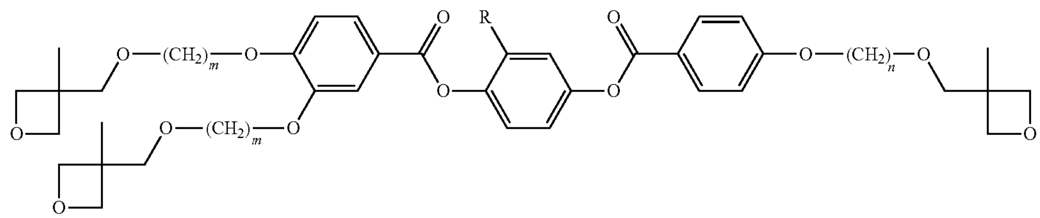
(4-b-23)
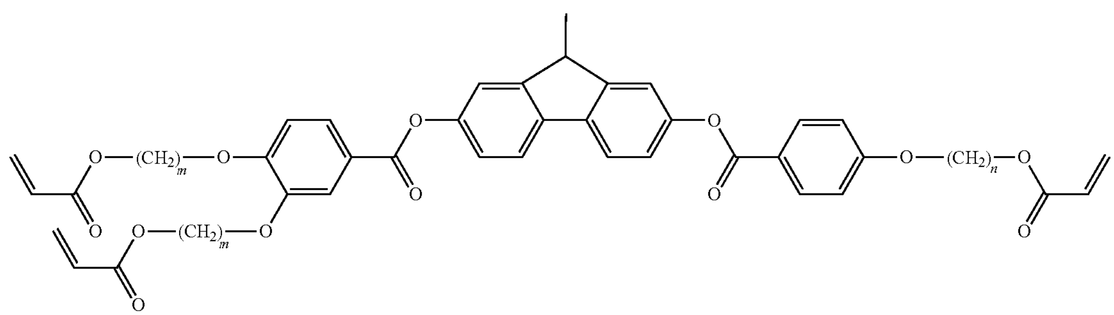
(4-b-24)
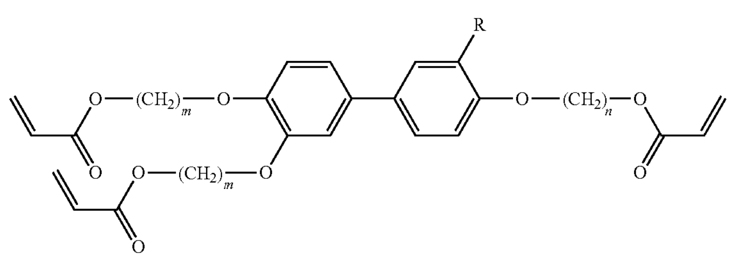

-continued

[Chem. 155]

(4-b-25)

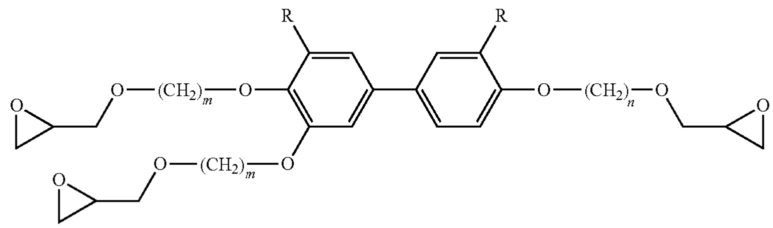

(4-b-26)

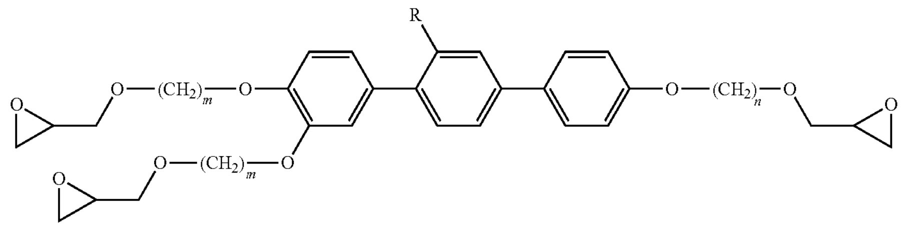

(4-b-27)

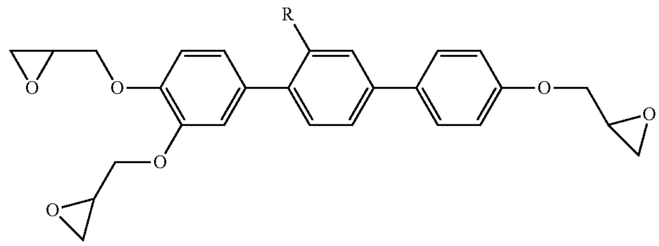

(4-b-28)

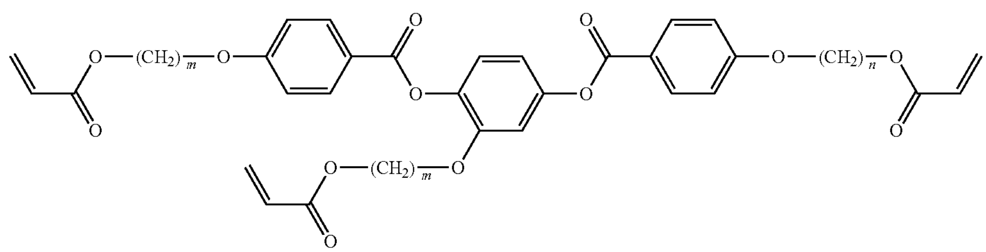

(4-b-29)

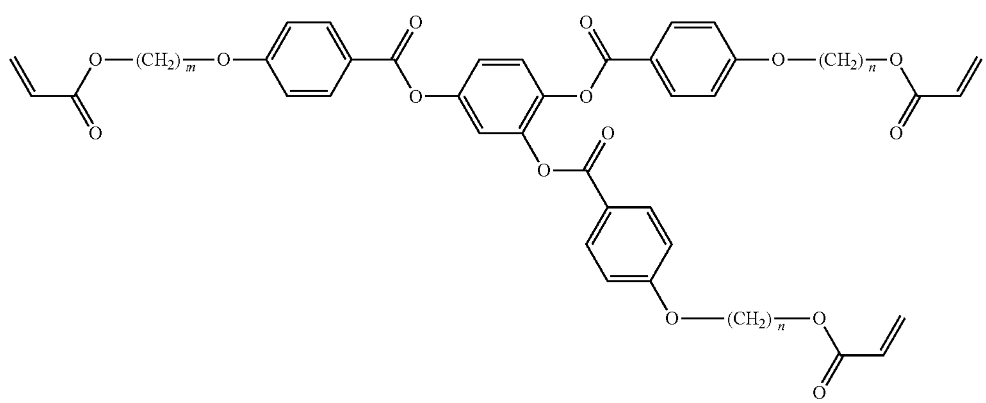

(wherein m and n each independently represent an integer of 1 to 10. R represents a hydrogen atom, a halogen atom, an alkyl group having 1 to 6 carbon atoms, an alkoxy group having 1 to 6 carbon atoms, or a cyano group. When R is an alkyl group having 1 to 6 carbon atoms or an alkoxy group having 1 to 6 carbon atoms, R may be unsubstituted or substituted by one or at least two halogen atoms). These liquid crystalline compounds may be used alone or as a mixture of two or more.

Specific examples of the compound represented by general formula (5-b) include compounds represented by formula (5-b-1) to formula (5-b-26) below:

[Chem. 156]
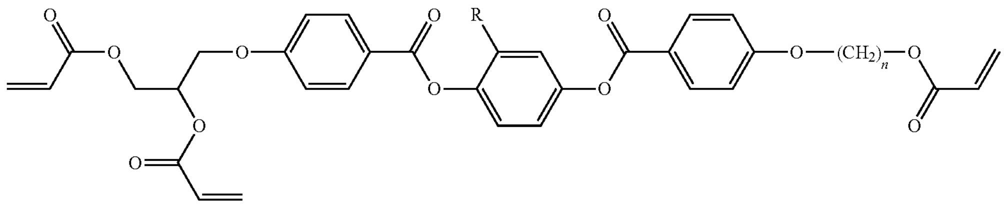
(5-b-1)
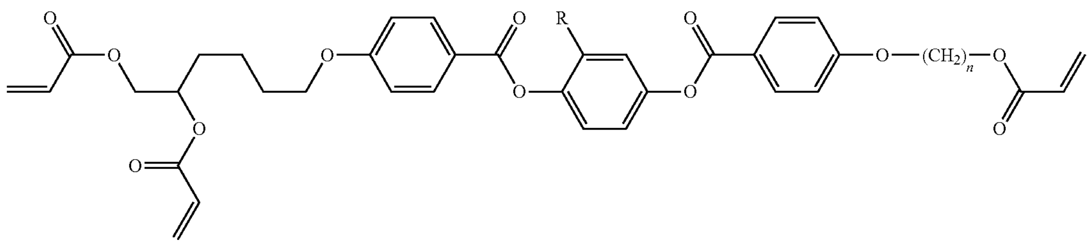
(5-b-2)
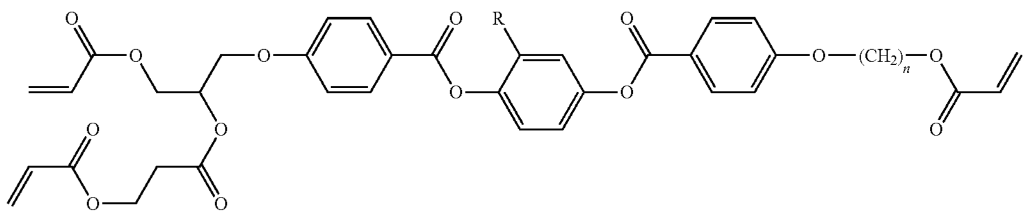
(5-b-3)
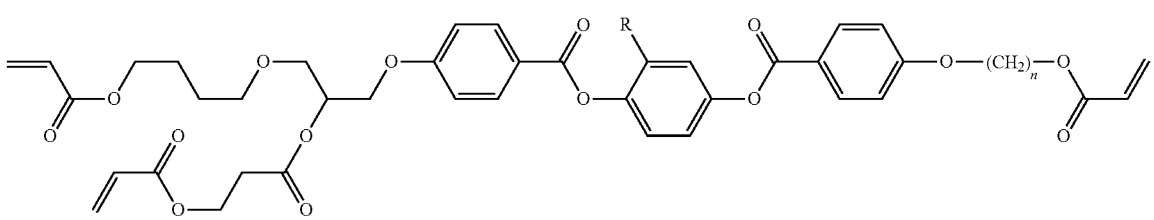
(5-b-4)
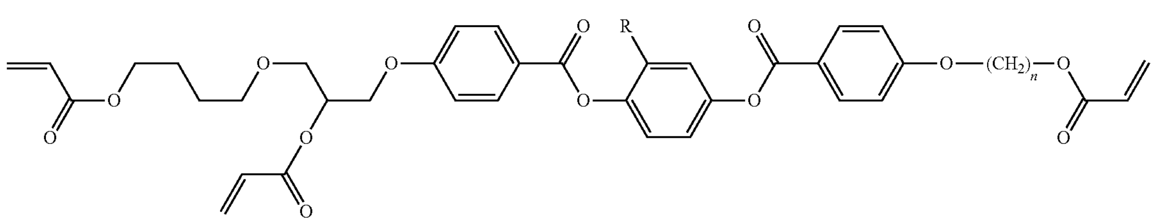
(5-b-5)
[Chem. 157]
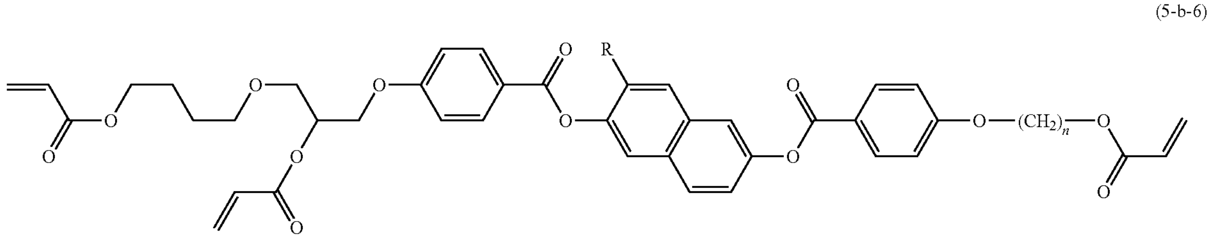
(5-b-6)

-continued
(5-b-7)
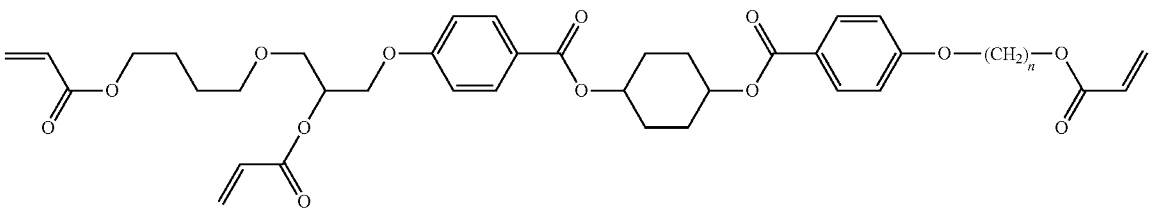
(5-b-8)
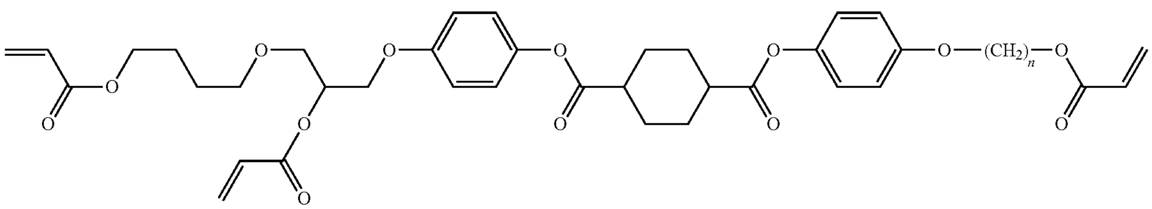
(5-b-9)
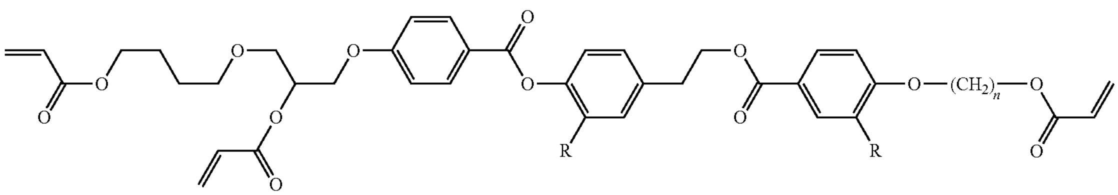
(5-b-10)
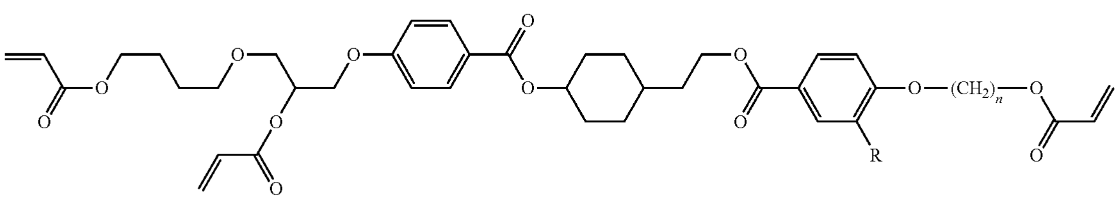
(5-b-11)
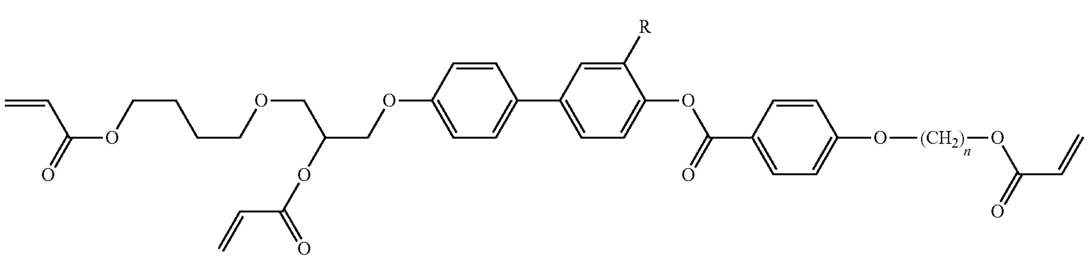
[Chem. 158]
(5-b-12)
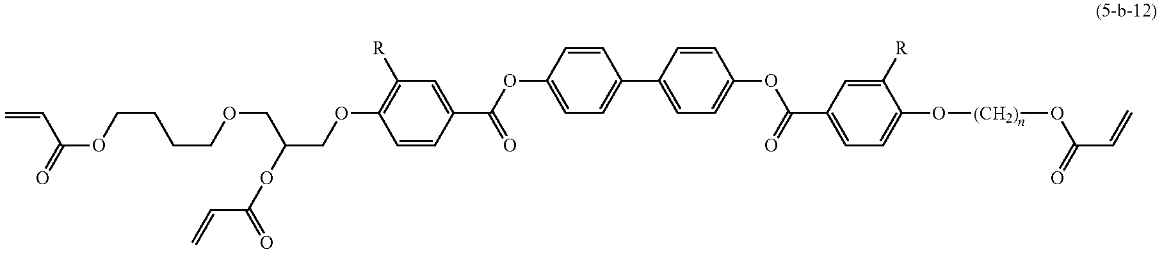

-continued
(5-b-13)
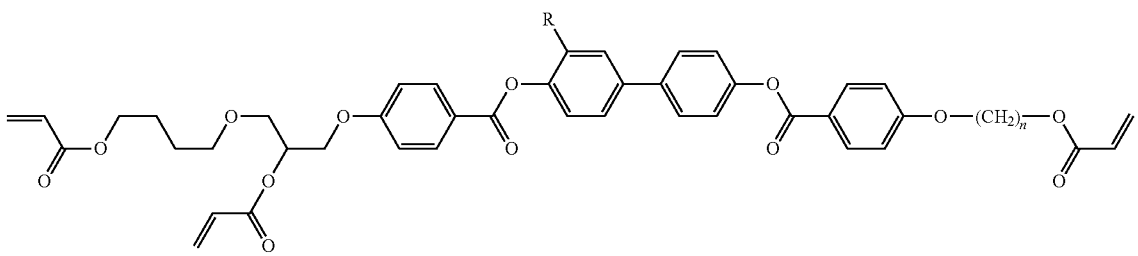
(5-b-14)
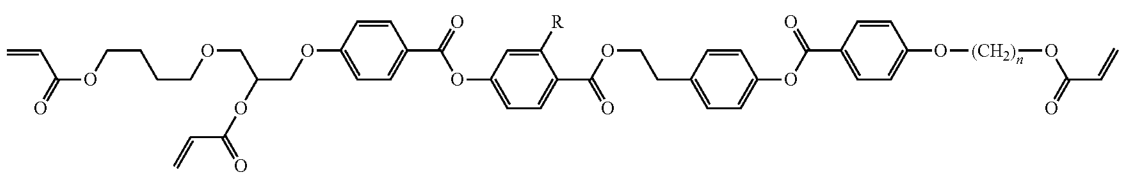
(5-b-15)
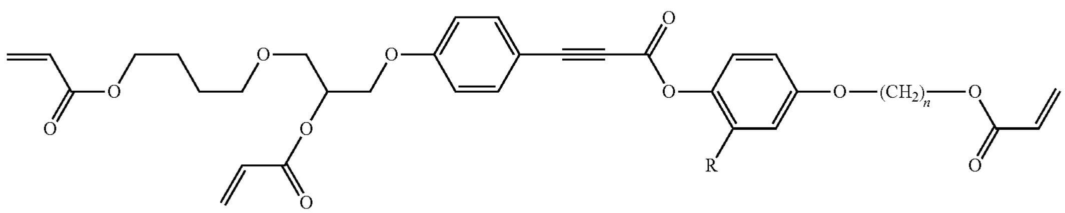
(5-b-16)
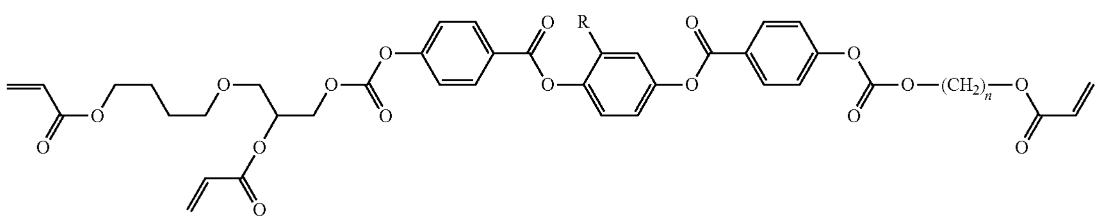
(5-b-17)
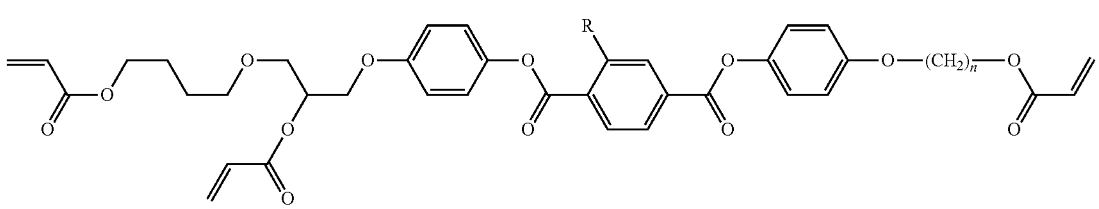
[Chem. 159]
(5-b-18)
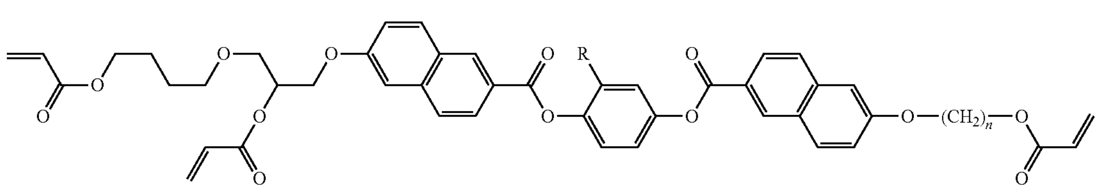
(5-b-19)
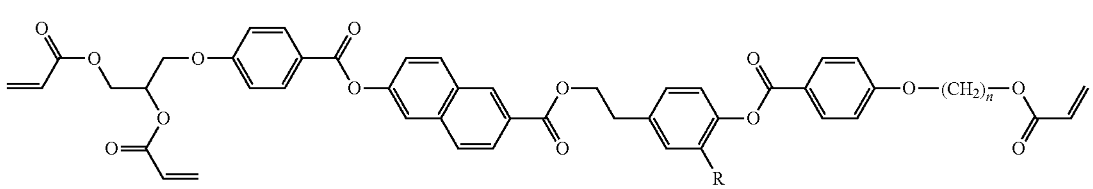

-continued
(5-b-20)
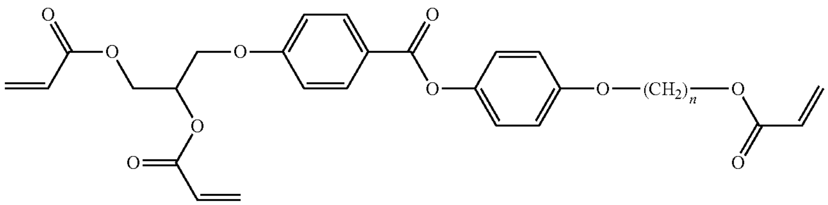
(5-b-21)
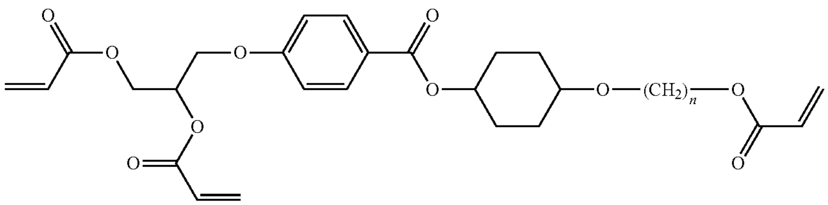
[Chem. 160]
(5-b-22)
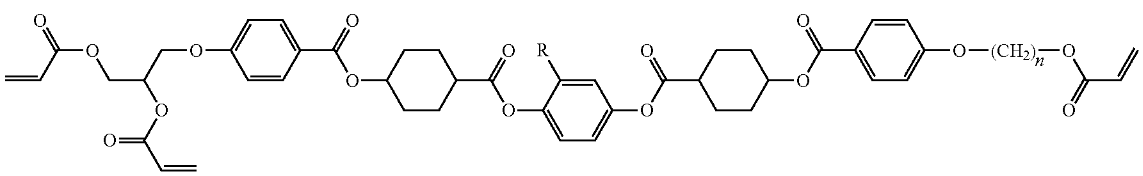
(5-b-23)
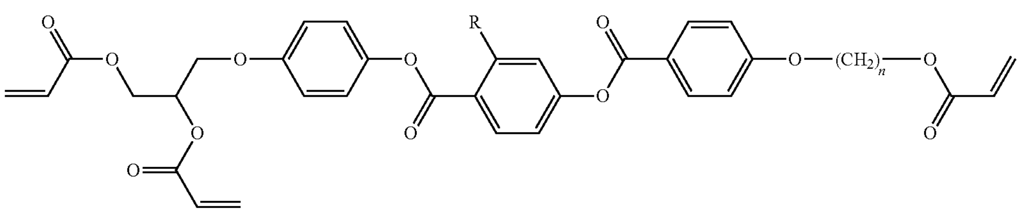
(5-b-24)
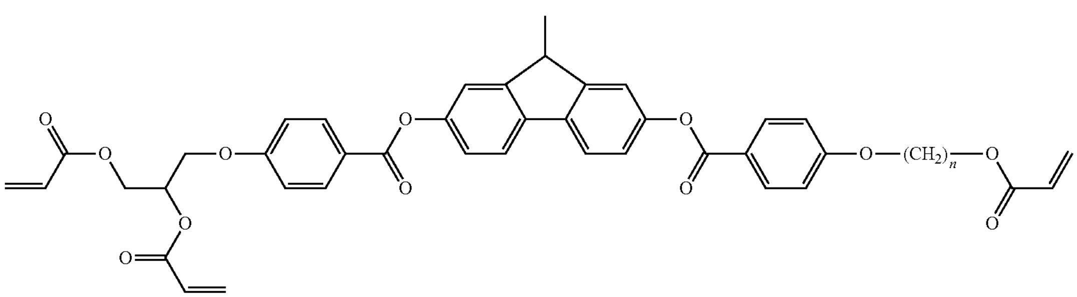
(5-b-25)
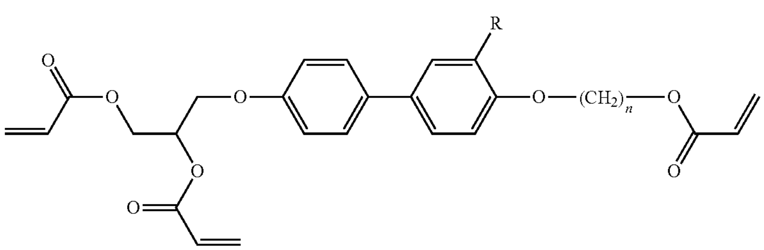
(5-b-26)
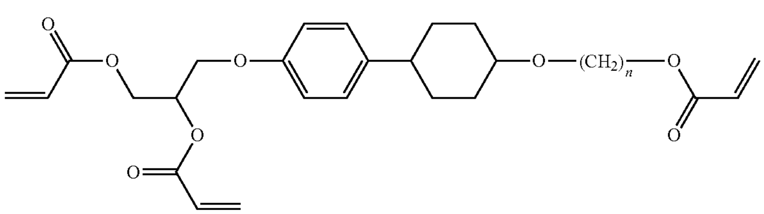

(wherein each n independently represents an integer of 1 to 10. R represents a hydrogen atom, a halogen atom, an alkyl group having 1 to 6 carbon atoms, an alkoxy group having 1 to 6 carbon atoms, or a cyano group. When R is an alkyl group having 1 to 6 carbon atoms or an alkoxy group having 1 to 6 carbon atoms, R may be unsubstituted or substituted by one or at least two halogen atoms). These liquid crystalline compounds may be used alone or may be used as a mixture of two or more.

Specific examples of the compound represented by general formula (6-b) include compounds represented by formula (6-b-1) to formula (6-b-23) below:

[Chem. 161]

(6-b-1)

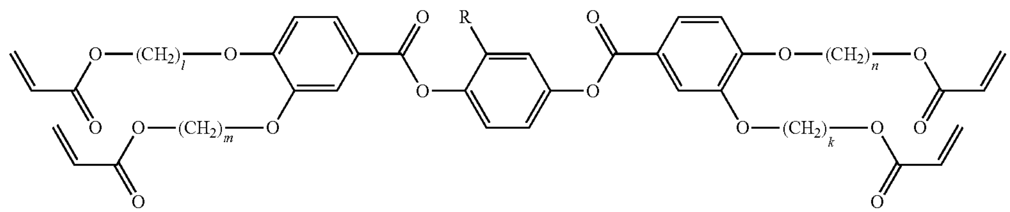

(6-b-2)

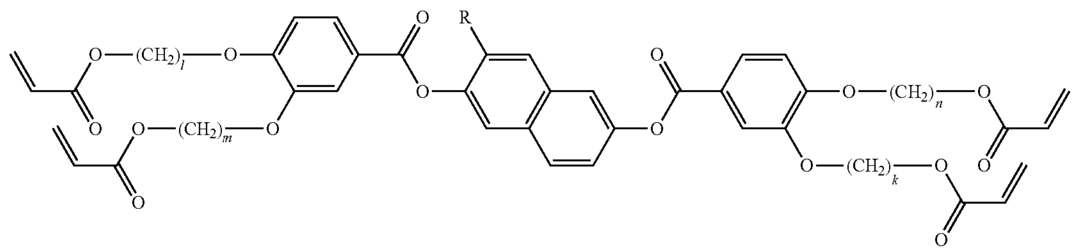

(6-b-3)

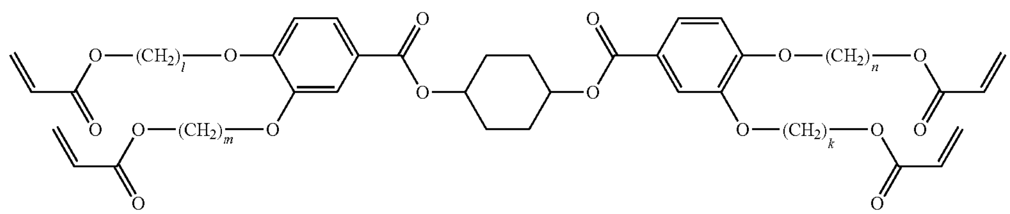

(6-b-4)

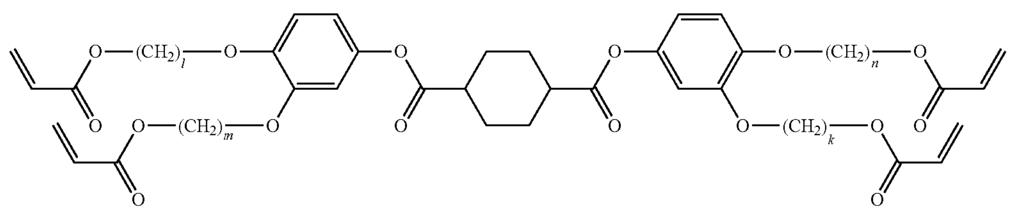

(6-b-5)

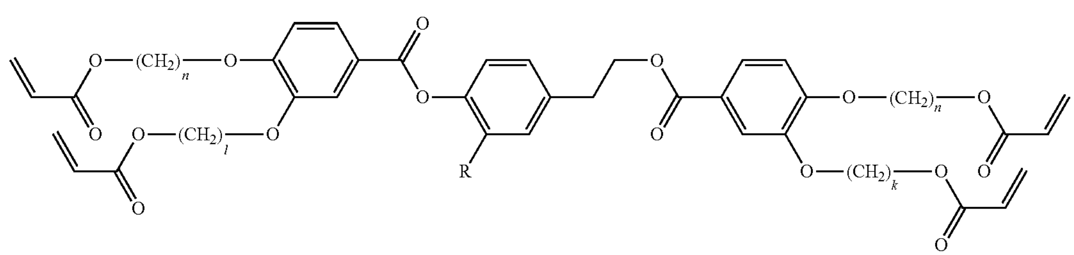

(6-b-6)

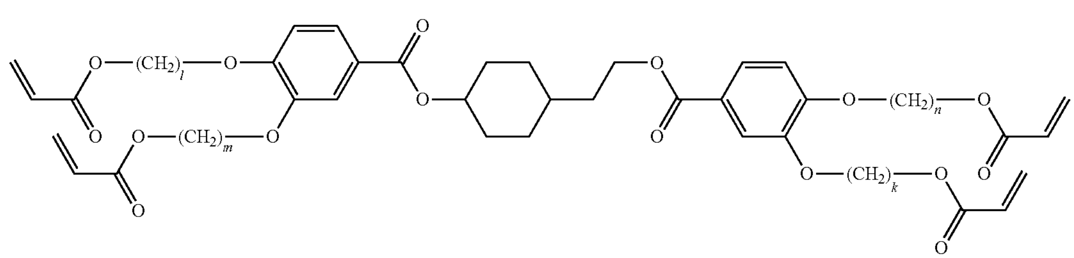

-continued
(6-b-7)
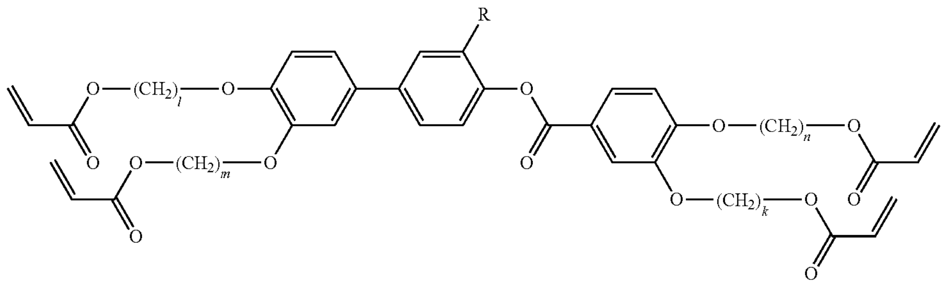
[Chem. 162]
(6-b-8)
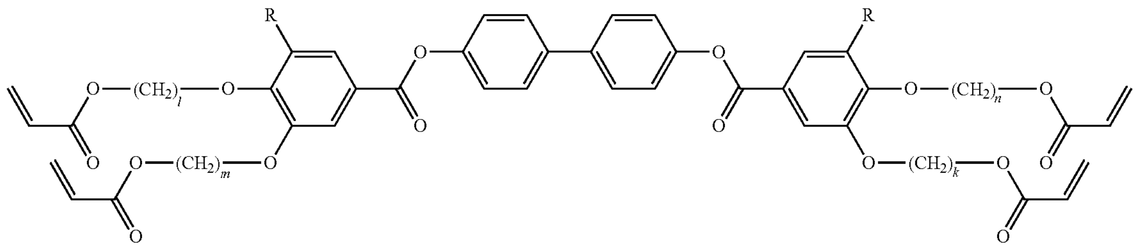
(6-b-9)
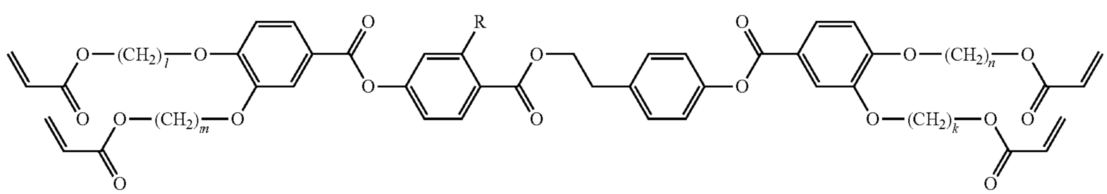
(6-b-10)
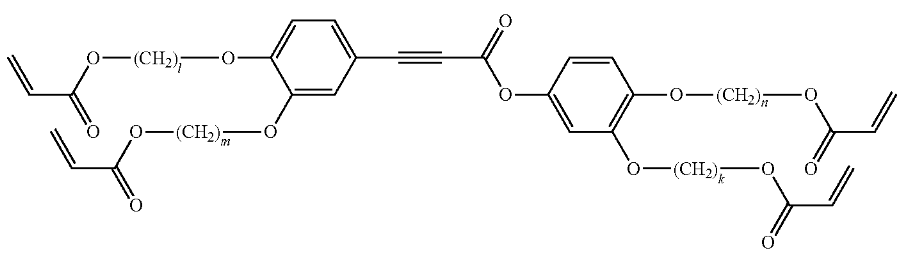
(6-b-11)
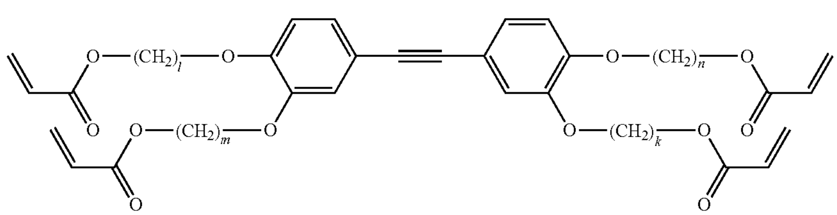
(6-b-12)
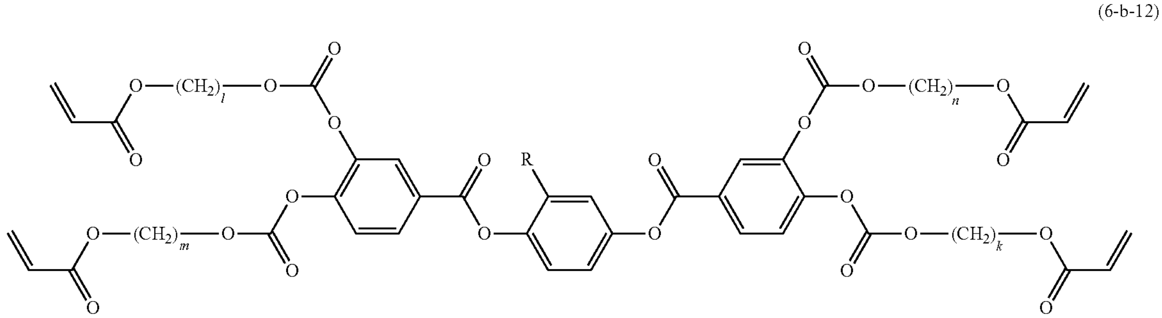

-continued
[Chem. 163]
(6-b-13)
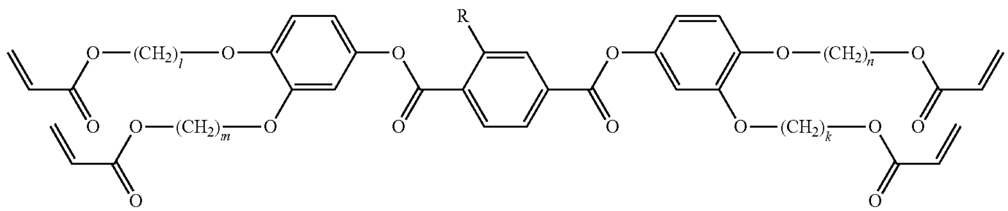
(6-b-14)
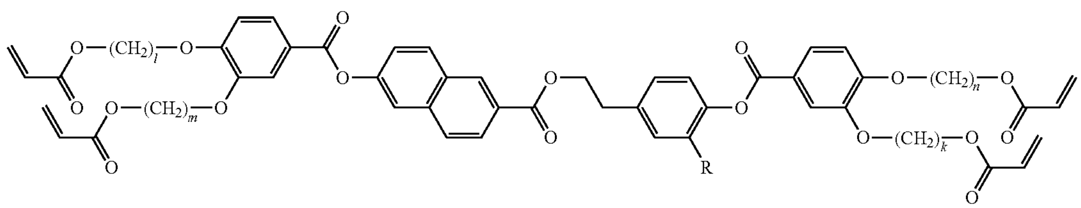
(6-b-15)
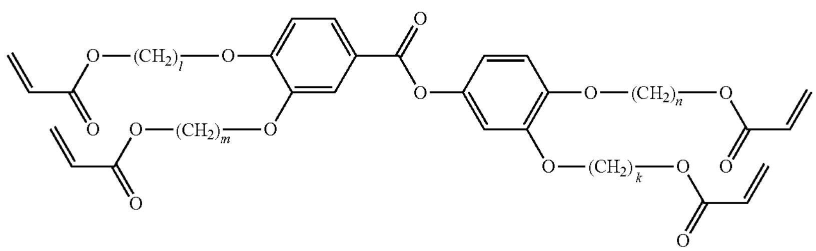
(6-b-16)
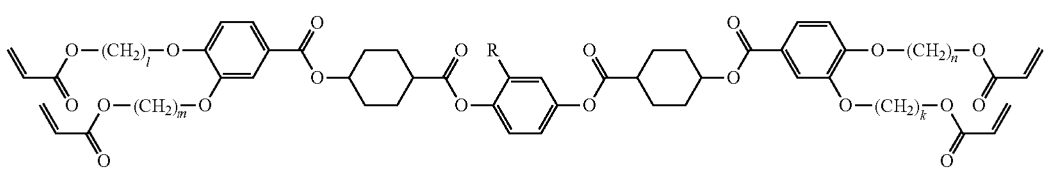
[Chem. 164]
(6-b-17)
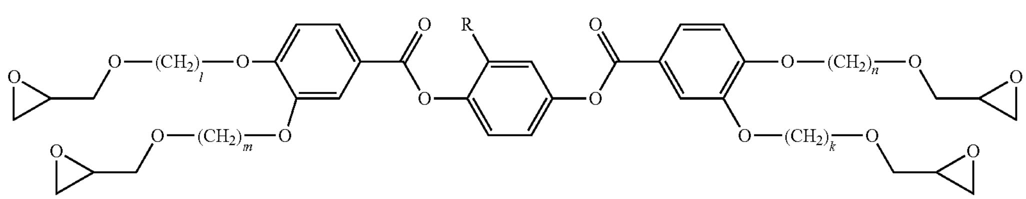
(6-b-18)
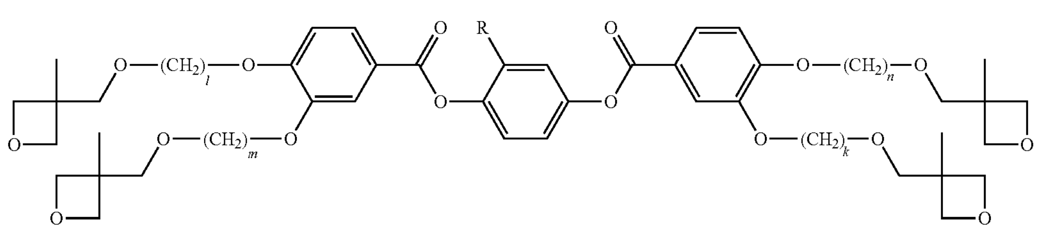

-continued (6-b-19)

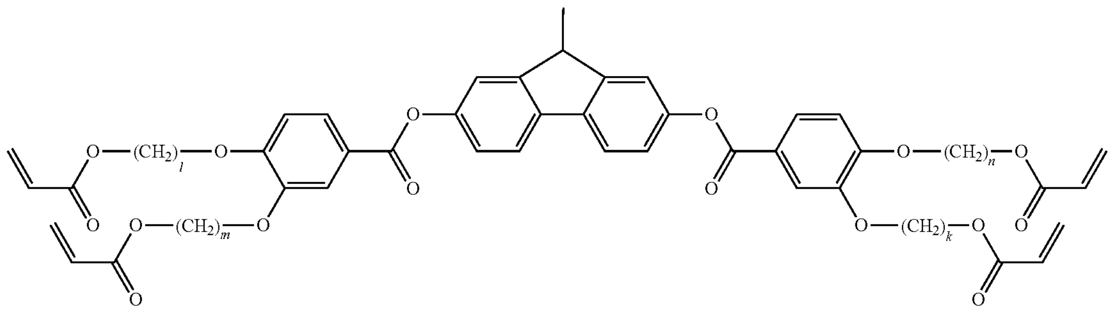

[Chem. 165]

(6-b-20)

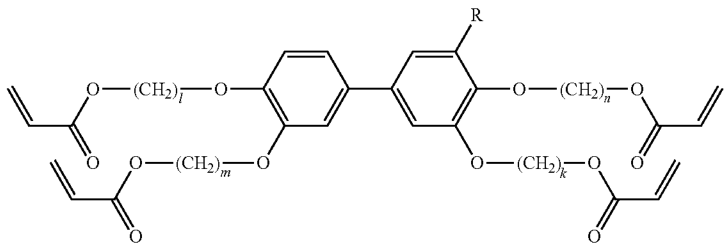

(6-b-21)

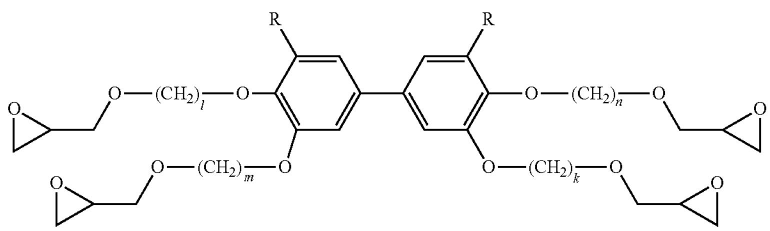

(6-b-22)

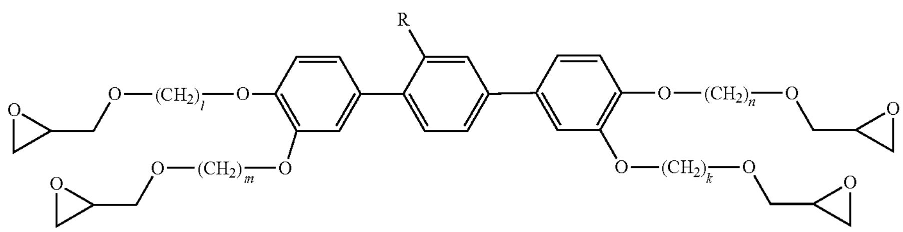

(6-b-23)

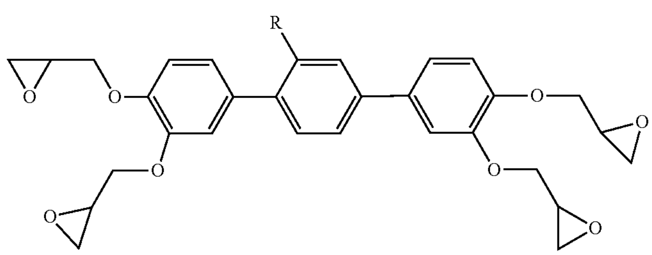

(wherein k, 1, m, and n each independently represent an integer of 1 to 10. R represents a hydrogen atom, a halogen atom, an alkyl group having 1 to 6 carbon atoms, an alkoxy group having 1 to 6 carbon atoms, or a cyano group. When R is an alkyl group having 1 to 6 carbon atoms or an alkoxy group having 1 to 6 carbon atoms, R may be unsubstituted or substituted by one or at least two halogen atoms). These liquid crystalline compounds may be used alone or may be used as a mixture of two or more.

Specific examples of the compound represented by general formula (7-b) include compounds represented by formula (7-b-1) to formula (7-b-25) below:

[Chem. 166]
(7-b-1)
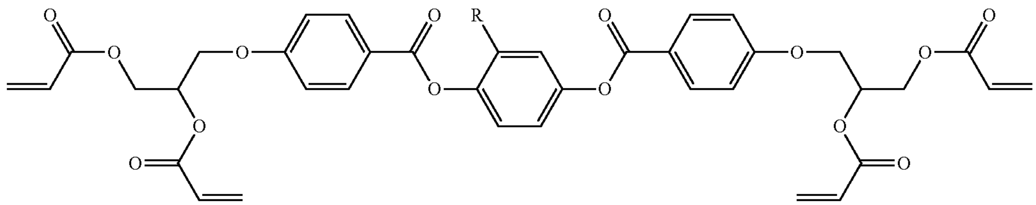
(7-b-2)
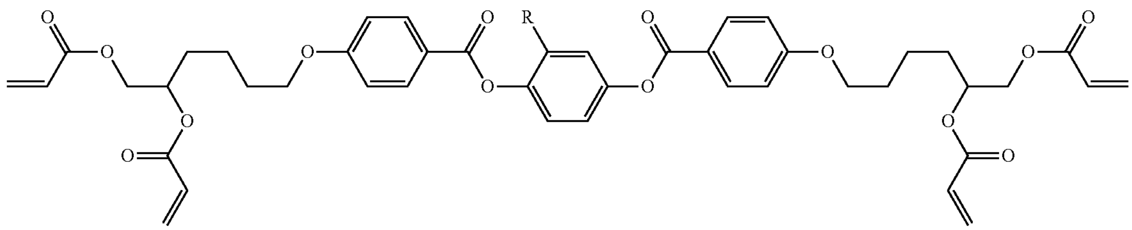
(7-b-3)
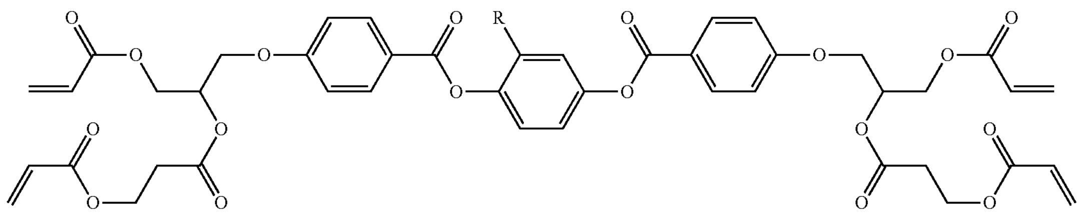
(7-b-4)
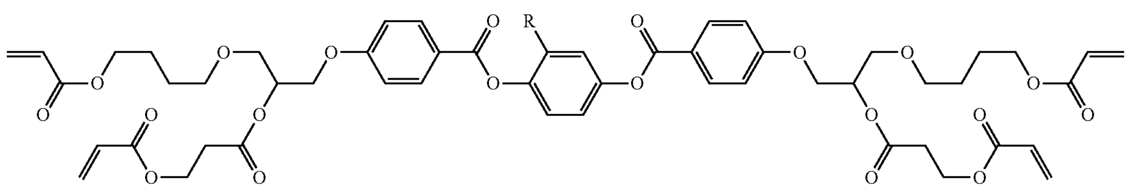
(7-b-5)
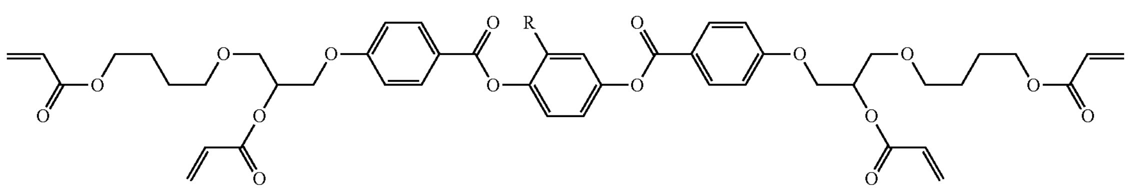
(7-b-6)
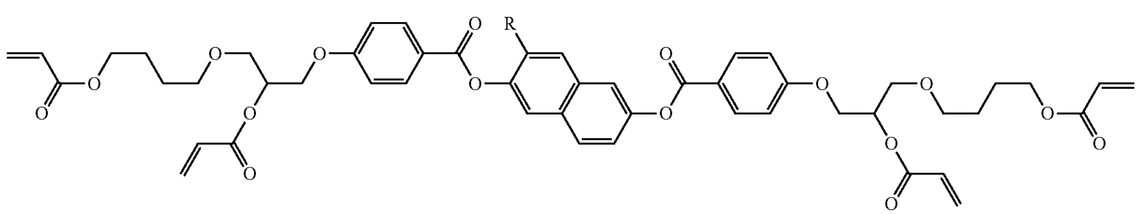
[Chem. 167]
(7-b-7)
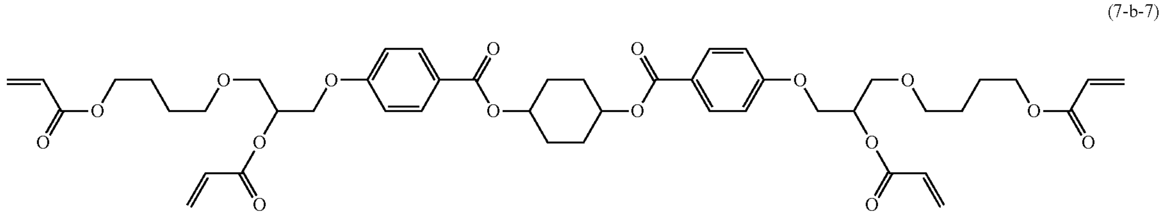

-continued
(7-b-8)
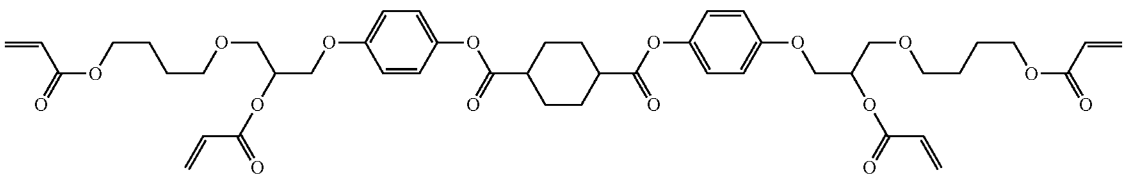
(7-b-9)
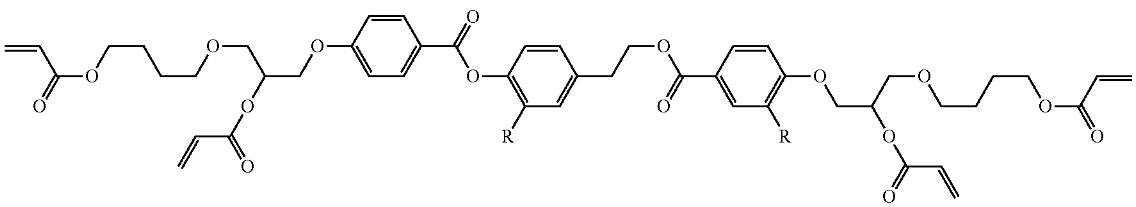
(7-b-10)
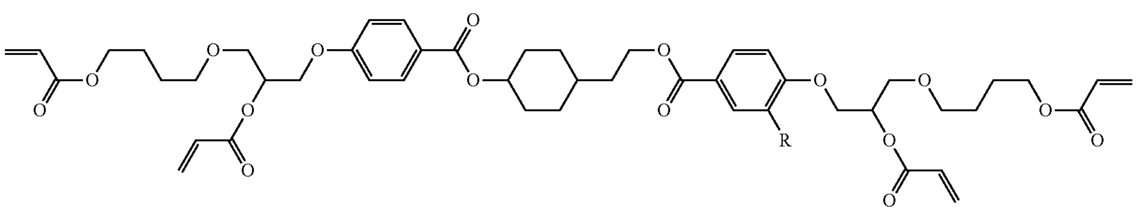
(7-b-11)
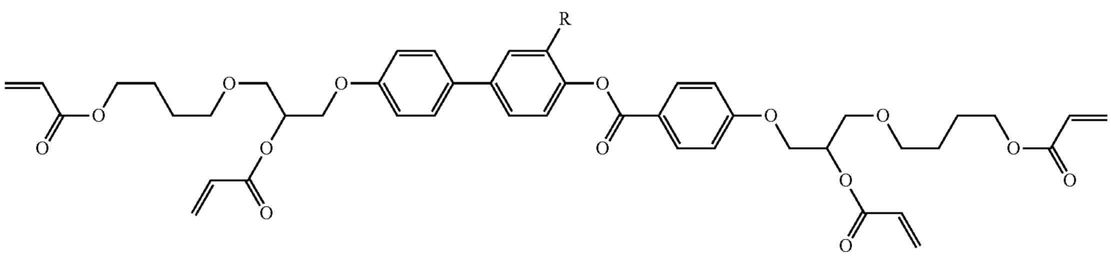
(7-b-12)
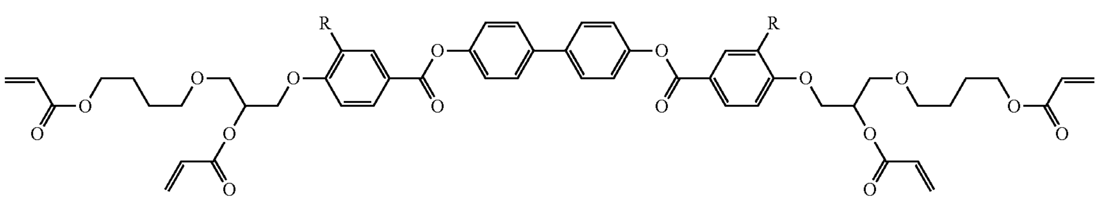
[Chem. 168]
(7-b-13)
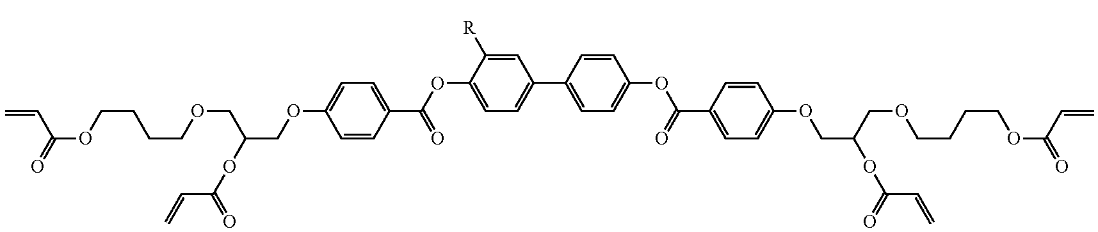
(7-b-14)
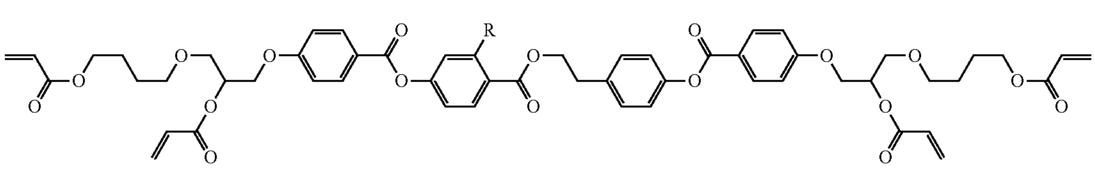

-continued
(7-b-15)
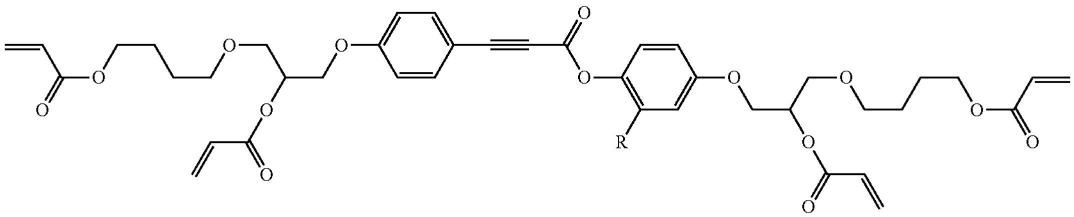
(7-b-16)
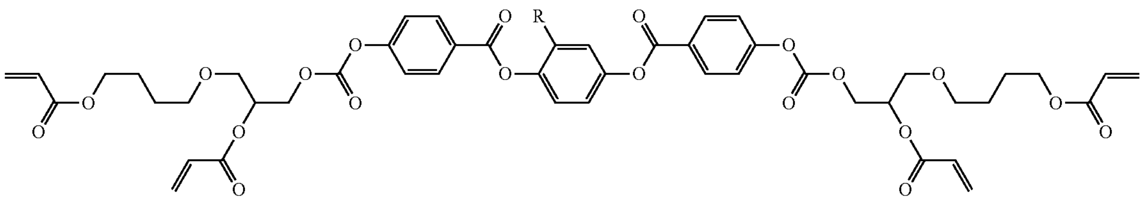
(7-b-17)
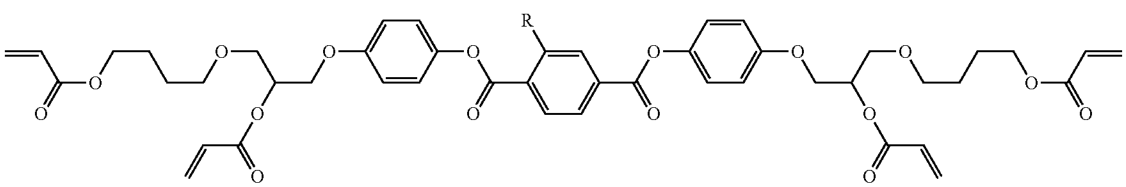
(7-b-18)
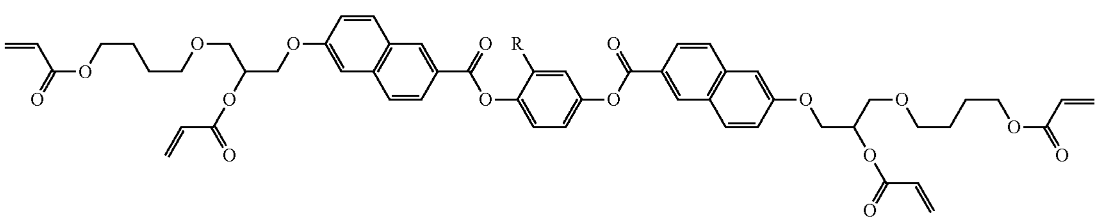
[Chem. 169]
(7-b-19)
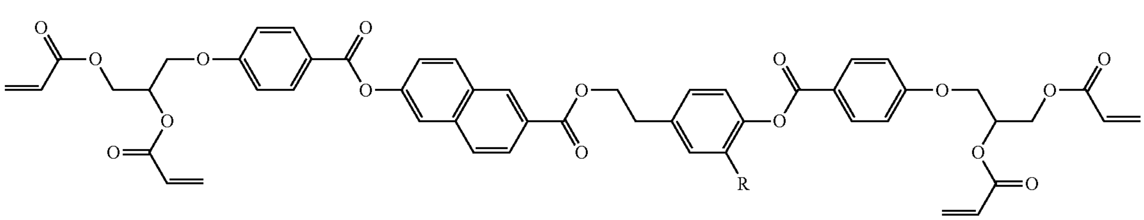
(7-b-20)
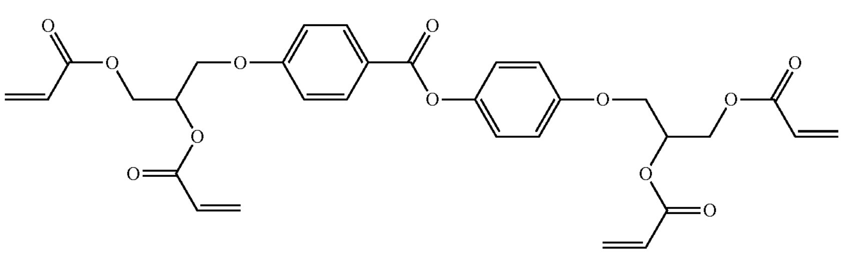

-continued (7-b-21)

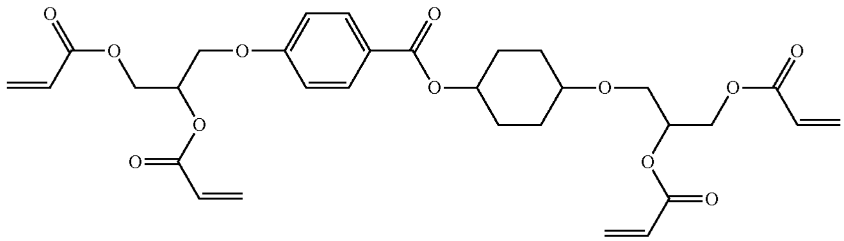

(7-b-22)

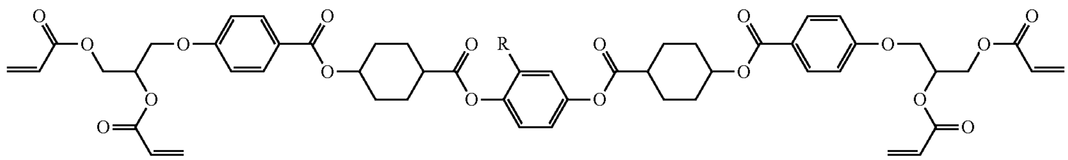

(7-b-23)

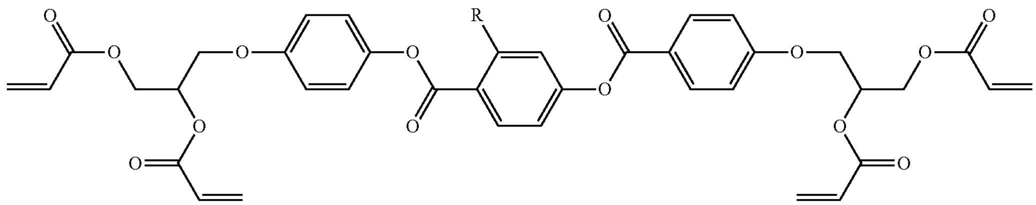

(7-b-24)

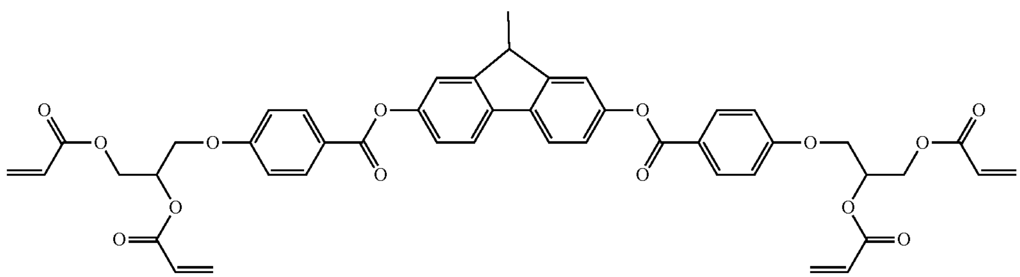

(7-b-25)

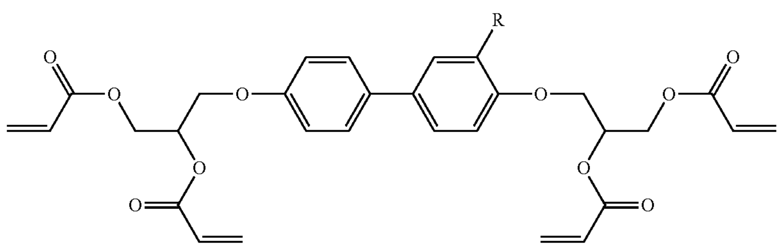

(wherein R represents a hydrogen atom, a halogen atom, an alkyl group having 1 to 6 carbon atoms, an alkoxy group having 1 to 6 carbon atoms, or a cyano group. When R is an alkyl group having 1 to 6 carbon atoms or an alkoxy group having 1 to 6 carbon atoms, R may be unsubstituted or substituted by one or at least two halogen atoms). These liquid crystalline compounds may be used alone or may be used as a mixture of two or more.

(Alignment Material)

The polymerizable composition of the present invention may contain an alignment material that improves alignment, for the purpose of improving the alignment. The alignment material used may be any commonly used alignment material so long as it is soluble in a solvent that can dissolve the liquid crystalline compounds having a polymerizable group and used in the polymerizable composition of the present invention. The alignment material may be added in such an amount that the alignment is not significantly impaired. Specifically, the amount of the alignment material is preferably 0.05 to 30% by weight, more preferably 0.5 to 15% by weight, and particularly preferably 1 to 10% by weight with respect to the total weight of the polymerizable compounds contained in the polymerizable composition.

Specific examples of the alignment material include photoisomerizable or photodimerizable compounds such as polyimides, polyamides, BCB (benzocyclobutene polymers), polyvinyl alcohols, polycarbonates, polystyrenes, polyphenylene ethers, polyarylates, polyethylene terephthalates, polyethersulfones, epoxy resins, epoxy acrylate resins, acrylic resins, coumarin compounds, chalcone compounds, cinnamate compounds, fulgide compounds, anthraquinone compounds, azo compounds, and arylethene compounds. Of these, materials aligned by UV irradiation or visible light irradiation (photo-alignment materials) are preferred.

Examples of the photo-alignment material include polyimides having cyclic alkanes, wholly aromatic polyarylates, polyvinyl cinnamate and a polyvinyl ester of p-methoxycinnamic acid shown in Japanese Unexamined Patent Application Publication No. 5-232473, cinnamate derivatives shown in Japanese Unexamined Patent Application Publications Nos. 6-287453 and 6-289374, and maleimide derivatives shown in Japanese Unexamined Patent Application Publication No. 2002-265541. Preferred specific examples include compounds represented by formula (12-1) to formula (12-7) below:
[Chem. 170]
(12-1)
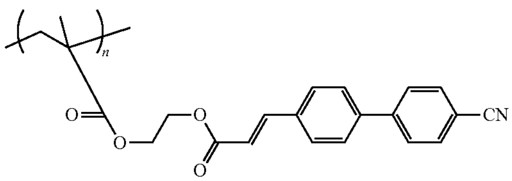
(12-2)
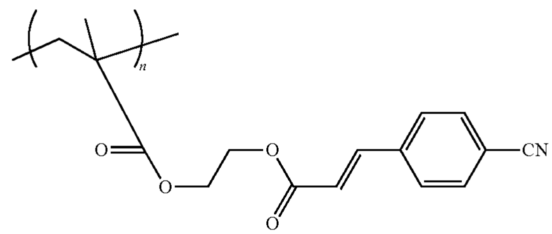
(12-3)
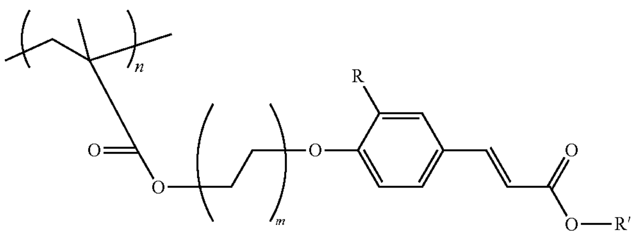
(12-4)
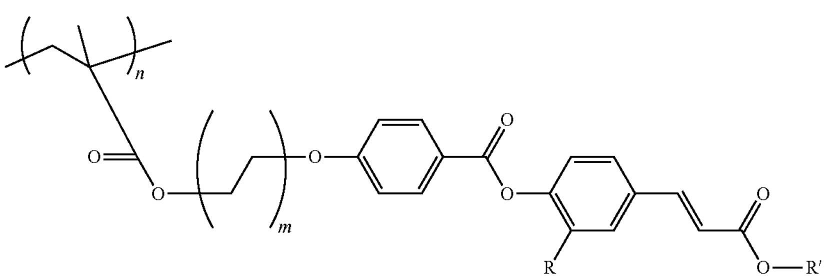
(12-5)
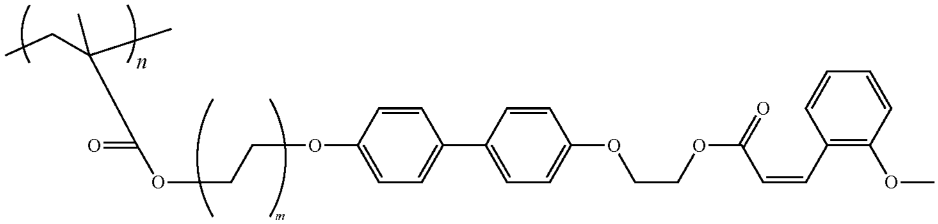

-continued (12-6)

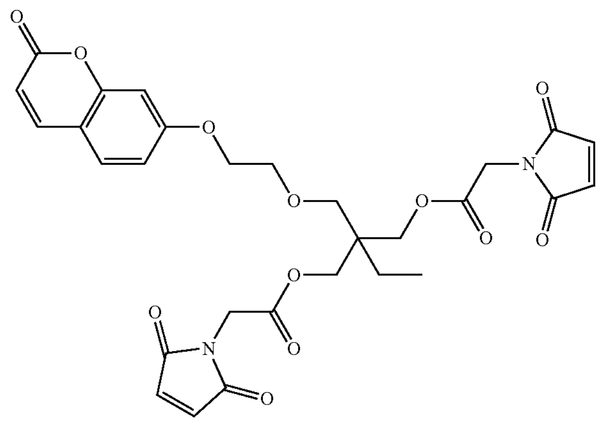

(12-7)

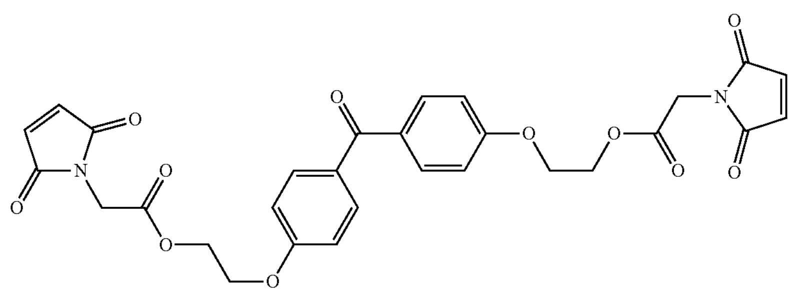

(wherein R represents a hydrogen atom, a halogen atom, an alkyl group having 1 to 3 carbon atoms, an alkoxy group, or a nitro group; R' represents a hydrogen atom or an alkyl group having 1 to 10 carbon atoms, the alkyl group being linear or branched, any hydrogen atom in the alkyl group being optionally replaced by a fluorine atom, one —$CH_2$— group or two or more nonadjacent —$CH_2$— groups in the alkyl group being each independently optionally replaced by —O—, —S—, —CO—, —COO—, —OCO—, —CO—S—, —S—CO—, —O—CO—O—, —CO—NH—, —NH—CO—, or —C≡C—; and a terminal $CH_3$ may be replaced by $CF_3$, $CCl_3$, a cyano group, a nitro group, an isocyano group, or a thioisocyano group. n represents 4 to 100,000, and m represents an integer of 1 to 10.).

(Polymer)

The polymer of the present invention is obtained by polymerizing the polymerizable composition of the present invention with the initiator contained in the polymerizable composition. The polymer of the present invention is used for optically anisotropic bodies, retardation films, lenses, coloring agents, printed materials, etc.

(Method for Producing Optically Anisotropic Body)

(Optically Anisotropic Body)

The optically anisotropic body of the present invention is obtained by applying the polymerizable composition of the present invention to a substrate or a substrate having an alignment function, aligning liquid crystal molecules in the polymerizable composition of the present invention uniformly while a nematic phase or a smectic phase is maintained, and then polymerizing the polymerizable composition.

(Substrate)

No particular limitation is imposed on the substrate used for the optically anisotropic body of the present invention, so long as the substrate is commonly used for liquid crystal display devices, organic light-emitting display devices, other display devices, optical components, coloring agents, markings, printed materials, and optical films and formed of a heat resistant material that can resist heat during drying after application of a solution of the polymerizable composition of the present invention. Examples of such a substrate include glass substrates, metal substrates, ceramic substrates, and organic materials such as plastic substrate and paper. In particular, when the substrate is formed of an organic material, examples of the organic material include cellulose derivatives, polyolefins, polyesters, polyolefins, polycarbonates, polyacrylates, polyarylates, polyethersulfones, polyimides, polyphenylene sulfides, polyphenylene ethers, nylon, and polystyrenes. Of these, plastic substrates such as polyesters, polystyrenes, polyolefins, cellulose derivatives, polyarylates, and polycarbonates are preferred. The shape of the substrate may be a flat plate shape and may also be a shape with a curved surface. If necessary, the substrate may include an electrode layer and have an anti-reflective function or a reflecting function.

To improve the ease of application of the polymerizable composition of the present invention and to improve its adhesion to the polymer, the substrate may be subjected to surface treatment. Examples of the surface treatment include ozone treatment, plasma treatment, corona treatment, and silane coupling treatment. To control light transmittance and light reflectance, an organic thin film, an inorganic oxide thin film, a metal thin film, etc. may be provided on the surface of the substrate by, for example, vapor deposition. To give optical added value, the substrate may be a pickup lens, a rod lens, an optical disk, a retardation film, a light diffusion film, a color filter, etc. In particular, a pickup lens, a retardation film, a light diffusion film, and a color filter are preferable because of higher added value.

(Alignment Treatment)

To allow the polymerizable composition of the present invention to be aligned after the polymerizable composition is applied and dried, the substrate has generally been subjected to alignment treatment, or an alignment film may be disposed on the substrate. Examples of the alignment treatment include stretching treatment, rubbing treatment, polarized UV-visible light irradiation treatment, ion beam treatment, and oblique deposition of $SiO_2$ on the substrate. The alignment film used may be a commonly used alignment film. Examples of such an alignment film include: compounds such as polyimides, polysiloxanes, polyamides, polyvinyl alcohols, polycarbonates, polystyrenes, polyphenylene ethers, polyarylates, polyethylene terephthalates, polyethersulfones, epoxy resins, epoxy acrylate resins, acrylic resins, azo compounds, coumarin compounds, chalcone compounds, cinnamate compounds, fulgide compounds, anthraquinone compounds, azo compounds, and arylethene compounds; and polymers and copolymers of these compounds. When rubbing is used for the alignment treatment of a compound, it is preferable that the crystallization of the compound is facilitated by the alignment treatment or a heating process performed after the alignment treatment. When the alignment treatment performed is other than rubbing, the compound used is preferably a photo-alignment material.

Generally, when a liquid crystal composition is brought into contact with a substrate having an alignment function, liquid crystal molecules located near the substrate are aligned in a direction of the alignment treatment performed on the substrate. Whether the liquid crystal molecules are aligned horizontally, inclined, or perpendicularly to the substrate is largely affected by the method of the alignment treatment performed on the substrate. For example, when an alignment film with a very small pretilt angle that is used for in-plane switching (IPS) liquid crystal display devices is disposed on the substrate, a polymerizable liquid crystal layer aligned substantially horizontally is obtained.

When an alignment film used for TN liquid crystal display devices is disposed on the substrate, a polymerizable liquid crystal layer with slightly inclined alignment is obtained. When an alignment film used for STN liquid crystal display devices is used, a polymerizable liquid crystal layer with largely inclined alignment is obtained.

(Application)

A commonly used coating method may be used to obtain the optically anisotropic body of the present invention, and examples of the coating method include an applicator method, a bar coating method, a spin coating method, a roll coating method, a direct gravure coating method, a reverse gravure coating method, a flexographic coating method, an inkjet method, a die coating method, a cap coating method, a dip coating method, a slit coating method, and a spray coating method. After the polymerizable composition is applied, the composition is dried.

It is preferable that, after the application of the polymerizable composition of the present invention, the liquid crystal molecules in the composition are uniformly aligned while a smectic phase or a nematic phase is maintained. One example of the alignment method is a heat treatment method. Specifically, after the polymerizable composition of the present invention is applied to the substrate, the polymerizable composition is heated to a temperature equal to or higher than the N (nematic phase)-I (isotropic liquid phase) transition temperature (hereinafter abbreviated as the N-I transition temperature) of the liquid crystal composition to bring the liquid crystal composition into the isotropic liquid state. Then, if necessary, the liquid crystal composition is gradually cooled, and the nematic phase thereby appears. In this case, it is preferable that the temperature is temporarily held at the temperature at which the liquid crystal phase appears. This allows liquid crystal phase domains to grow sufficiently, so that a monodomain is formed. Alternatively, after the polymerizable composition of the present invention is applied to the substrate, heat treatment is performed such that the temperature is held constant for a certain time within the temperature range in which the nematic phase of the polymerizable composition of the present invention appears.

If the heating temperature is excessively high, the polymerizable liquid crystal compound may undergo a non-preferable polymerization reaction and thereby deteriorate. If the polymerizable composition is cooled excessively, the polymerizable composition may undergo phase separation. In this case, crystals may precipitate, or a higher-order liquid crystal phase such as a smectic phase may appear, and it may be impossible to complete the alignment treatment.

With the above heat treatment, the optically anisotropic body produced is more uniform and has less alignment defects than optically anisotropic bodies produced by a simple application method.

After the uniform alignment treatment is performed as described above, the polymerizable composition may be cooled to the lowest possible temperature at which the liquid crystal phase does not undergo phase separation, i.e., until the polymerizable composition is supercooled. By polymerizing the polymerizable liquid crystalline compound at this temperature with the liquid crystal phase aligned, an optically anisotropic body with high alignment order and excellent transparency can be obtained.

(Polymerization Process)

The dried polymerizable composition uniformly aligned is subjected to polymerization treatment generally by irradiation with visible-UV light or heating. Specifically, when light irradiation is used for the polymerization, irradiation with visible-UV light of 420 nm or less is preferable, and irradiation with UV light having a wavelength of 250 to 370 nm is most preferable. If the polymerizable composition is, for example, decomposed under the visible-UV light of 420 nm or less, it is sometimes preferable to perform the polymerization treatment with visible-UV light of 420 nm or more.

(Polymerization Method)

Examples of the method for polymerizing the polymerizable composition of the present invention include an active energy ray irradiation method and a thermal polymerization method. The active energy ray irradiation method is preferred because the reaction proceeds at room temperature without heating. In particular, a method including irradiation with light such as UV light is preferable because of its simple procedure. The temperature during irradiation is set such that the polymerizable composition of the present invention can maintain its liquid crystal phase. It is preferable, if at all possible, to hold the temperature at 30° C. or lower, in order to avoid induction of thermal polymerization of the polymerizable composition. Generally, in the course of heating, the polymerizable composition is in the liquid crystal phase within the range of from C (solid)-N (nematic) transition temperature (hereinafter abbreviated as the C-N transition temperature) to the N-I transition temperature. However, in the course of cooling, the polymerizable composition is in a thermodynamically non-equilibrium state, and thus the liquid crystal state may be maintained without solidification even at the C-N transition temperature or lower. This state is referred to as a supercooled state. In the present invention, the supercooled state of the liquid crystal composition is also regarded as the state in which the liquid crystal phase is maintained. Specifically, irradiation with UV light of 390 nm or less is preferable, and irradiation with light having a wavelength of 250 to 370 nm is most preferable. However, if the polymerizable composition is, for example, decomposed under UV light of 390 nm or less, it is sometimes preferable to perform the polymerization treatment with UV light of 390 nm or more. Preferably, the light used is diffused light and is unpolarized light. The irradiation intensity of the UV light is preferably within the range of 0.05 kW/m$^2$ to 10 kW/m$^2$. The irradiation intensity of the UV light is particularly preferably within the range of 0.2 kW/m$^2$ to 2 kW/m$^2$. If the intensity of the UV light is less than 0.05 kW/m$^2$, a considerable time is required to complete the polymerization. If the intensity exceeds 2 kW/m$^2$, the liquid crystal molecules in the polymerizable composition tend to undergo photo-decomposition, and a large amount of polymerization heat is generated. In this case, the temperature during polymerization increases, and the order parameter of the polymerizable liquid crystal varies, so that the retardation of the film after polymerization may deviate from the intended retardation.

An optically anisotropic body having a plurality of regions with different alignment directions may be obtained by polymerizing only specific portion under UV irradiation using a mask, changing the alignment state of the unpolymerized portions by application of an electric field, a magnetic field, temperature, etc., and then polymerizing the unpolymerized portions.

When only the specific portions are polymerized under UV irradiation using the mask, an electric field, a magnetic field, temperature, etc. may be applied in advance to the unpolymerized polymerizable composition to control alignment, and the polymerizable composition in this state may be irradiated with light through the mask to polymerize the polymerizable composition. An optically anisotropic body having a plurality of regions with different alignment directions may also be obtained in the manner described above.

The optically anisotropic body obtained by polymerization of the polymerizable composition of the present invention may be separated from the substrate, and the separated optically anisotropic body may be used alone. The optically anisotropic body may not be separated from the substrate, and the optically anisotropic body with the substrate may be used. In particular, since the optically anisotropic body is unlikely to contaminate other members, the optically anisotropic body is useful for a substrate for deposition and is also useful when another substrate is laminated onto the optically anisotropic body.

(Retardation Film)

The retardation film of the present invention includes the optically anisotropic body described above. The liquid crystalline compound forms a continuous uniform alignment state on the substrate, and the retardation film has in-plane or out-of-plane (with respect to the substrate) biaxiality or both in-plane biaxiality and out-of-plane biaxiality or has in-plane biaxiality. An adhesive or an adhesive layer, a bonding agent or a bonding layer, a protective film, a polarizing film, etc. may be stacked.

Examples of the alignment mode applicable to the above retardation film include: a positive-A plate in which a rod-shaped liquid crystalline compound is aligned substantially horizontally with respect to substrates; a negative A-plate in which a uniaxially arranged disk-shaped liquid crystalline compound is aligned vertically to substrates; a positive C-plate in which a rod-shaped liquid crystalline compound is aligned substantially vertically to substrates; a negative C-plate in which a rod-shaped liquid crystalline compound is aligned in cholesteric alignment with respect to substrates or a uniaxially arranged disk-shaped liquid crystalline compound is aligned horizontally to substrates; a biaxial plate; a positive O-plate in which a rod-shaped liquid crystalline compound is aligned in hybrid alignment with respect to substrates, i.e., the inclination of the rod-shaped liquid crystalline compound is changed in the direction of the thickness of the substrates; and a negative O-plate in which a disk-shaped liquid crystalline compound is aligned in hybrid alignment with respect to substrates. When the retardation film is used for a liquid crystal display device, no particular limitation is imposed on the alignment mode so long as viewing angle dependence is improved, and any of various modes can be applied.

For example, the alignment mode applied may be the positive A-plate, the negative A-plate, the positive C-plate, the negative C-plate, the biaxial plate, the positive O-plate, or the negative O-plate. Of these, the positive A-plate and the negative C-plate are preferably used. It is more preferable to stack the positive A-plate and the negative C-plate.

The positive A-plate means an optically anisotropic body in which a polymerizable composition is homogeneously aligned. The negative C-plate means an optically anisotropic body in which a polymerizable composition is aligned in cholesteric alignment.

In a liquid crystal cell using a retardation film, it is preferable to use a positive A-plate as a first retardation layer, in order to compensate for viewing angle dependence of polarizing axis orthogonality to thereby increase the viewing angle. In the positive A-plate, the relation "nx>ny=nz" holds, where nx is the refractive index in the direction of an in-plane slow axis of the film, ny is the refractive index in the direction of an in-plane fast axis of the film, and nz is the refractive index in the direction of the thickness of the film. Preferably, the in-plane retardation value of the positive A-plate at a wavelength of 550 nm is within the range of 30 to 500 nm. No particular limitation is imposed on the retardation value in the thickness direction. Preferably, an Nz coefficient is within the range of 0.9 to 1.1.

To eliminate the birefringence of the liquid crystal molecules themselves, it is preferable to use, as a second retardation layer, a so-called negative C-plate having negative refractive index anisotropy. The negative C-plate may be stacked on the positive A-plate.

The negative C-plate is a retardation layer satisfying the relation "nx=ny>nz," where nx is the refractive index of the retardation layer in the direction of its in-plane slow axis, ny is the refractive index of the retardation layer in the direction of its in-plane fast axis, and nz is the refractive index of the retardation layer in its thickness direction. Preferably, the retardation value of the negative C-plate in the direction of its thickness is within the range of 20 to 400 nm.

The refractive index anisotropy in the thickness direction is represented by a retardation value Rth in the thickness direction represented by formula (2) below. The retardation value Rth in the thickness direction can be computed as follows. nx, ny, and nz are determined by numerical computation from formulas (1) and (4) to (7) using an in-plane retardation value $R_0$, a retardation value $R_{50}$ measured at an inclination of 50° with the slow axis serving as an inclination axis, the thickness d of the film, and the average refractive index $n_0$ of the film. Then the nx, ny, and nz determined are substituted into formula (2). The Nz coefficient can be computed from formula (3). The same applies to the rest of the present description.

$$R_0=(nx-ny)\times d \quad (1)$$

$$Rth=[(nx+ny)/2-nz]\times d \quad (2)$$

$$Nz\text{ coefficient}=(nx-nz)/(nx-ny) \quad (3)$$

$$R_{50}=(nx-ny')\times d/\cos(\phi) \quad (4)$$

$$(nx+ny+nz)/3=n_0 \quad (5)$$

Here, $$\phi=\sin^{-1}[\sin(50°)/n_0] \quad (6)$$

$$ny'=ny\times nz/[ny^2\times\sin^2(\phi)+nz^2\times\cos^2(\phi)]^{1/2} \quad (7)$$

In many commercial retardation measurement devices, the above numerical computation is performed automatically in the devices, and the in-plane retardation value $R_0$, the retardation value Rth in the thickness direction, etc. are automatically displayed. Examples of such a measurement device include RETS-100 (manufactured by Otsuka Chemical Co., Ltd.).

(Lens)

The polymerizable composition of the present invention can be used for the lens of the present invention. Specifically, the polymerizable composition is applied to a substrate or a substrate having the alignment function or injected into a lens-shaped die, aligned uniformly while the nematic phase or the smectic phase is maintained, and then polymerized. Examples of the shape of the lens include simple cell shapes, prism shapes, and lenticular shapes.

(Liquid Crystal Display Device)

The polymerizable composition of the present invention can be used for the liquid crystal display device of the present invention. Specifically, the polymerizable composition is applied to a substrate or a substrate having the alignment function, aligned uniformly while the nematic phase or the smectic phase is maintained, and then polymerized. The polymerizable composition may be used in the form of, for example, an optical compensation film, a patterned retardation film for liquid crystal stereoscopic display devices, a retardation correction layer for color filters, an overcoat layer, or an alignment film for liquid crystal mediums. In a liquid crystal display device, at least a liquid crystal medium layer, a TFT driving circuit, a black matrix layer, a color filter layer, a spacer, and an electrode circuit suitable for the liquid crystal medium layer are held between at least two substrates. An optical compensation layer, a polarizing plate layer, and a touch panel layer are generally disposed outside the two substrates. However, the optical compensation layer, an overcoat layer, the polarizing plate layer, and an electrode layer for the touch panel may be held between the two substrates.

Examples of the alignment mode of the liquid crystal display device include a TN mode, a VA mode, an IPS mode, an FFS mode, and an OCB mode. When the polymerizable composition is used for an optical compensation film or an optical compensation layer, a film having a retardation suitable for the alignment mode can be produced. When the polymerizable composition is used for a patterned retardation film, it is only necessary that the liquid crystalline compound in the polymerizable composition be aligned substantially horizontally to the substrate. When the polymerizable composition is used for an overcoat layer, it is only necessary that a liquid crystalline compound having a larger number of polymerizable groups per molecule be thermally polymerized. When the polymerizable composition is used for an alignment film for liquid crystal mediums, it is preferable to use a polymerizable composition prepared by mixing an alignment material and a liquid crystalline compound having a polymerizable group. The polymerizable composition may be mixed into a liquid crystal medium, and the effect of improving various properties such as response speed, contrast, etc. is obtained by controlling the ratio of the liquid crystal medium and the liquid crystalline compound.

(Organic Light-Emitting Display Device)

The polymerizable composition of the present invention can be used for an organic light-emitting display device. Specifically, the polymerizable composition is applied to a substrate or a substrate having the alignment function, aligned uniformly while the nematic phase or the smectic phase is maintained, and then polymerized. The retardation film obtained by the polymerization may be combined with a polarizing plate and used in the form of an antireflective film of the organic light-emitting display device. When the polymerizable composition is used for the antireflective film, it is preferable that the angle between the polarizing axis of the polarizing plate and the slow axis of the retardation film is about 45°. The polarizing plate and the retardation film may be laminated with an adhesive, a bonding agent, etc. The polymerizable composition may be directly deposited on a polarizing plate subjected to rubbing treatment or alignment treatment using a photo-alignment film stacked on the polarizing plate. The polarizing plate used in this case may be a film-shaped polarizing plate doped with a pigment or a metallic polarizing plate such as a wire grid.

(Lighting Device)

A polymer obtained by aligning the polymerizable composition of the present invention having the nematic phase or the smectic phase on a substrate having the alignment function and then polymerizing the polymerizable composition can be used as a heat dissipation material for lighting devices, particularly light-emitting diode devices. The heat dissipation material is preferably in the form of a prepreg, a polymer sheet, an adhesive, a sheet with a metallic foil, etc.

(Optical Component)

The polymerizable composition of the present invention can be used for the optical component of the present invention. Specifically, the polymerizable composition is polymerized while the nematic phase or the smectic phase is maintained, or the polymerizable composition combined with an alignment material is polymerized.

(Coloring Agent)

By adding a coloring agent such as a dye or an organic pigment to the polymerizable composition of the present invention, the resulting polymerizable composition can be used as a coloring agent.

(Polarizing Film)

By combining the polymerizable composition of the present invention with a dichroic pigment, a lyotropic liquid crystal, a chromonic liquid crystal, etc. or adding the polymerizable composition thereto, the resulting polymerizable composition can be used for a polarizing film.

EXAMPLES

The present invention will next be described by way of Examples and Comparative Examples. However, the present invention is not limited thereto. “Parts” and “%” are based on mass, unless otherwise specified.

Example 1

55 Parts of the compound represented by formula (1-a-5), 25 parts of the compound represented by formula (1-a-6), 20 parts of the compound represented by formula (2-a-1) with n=6, and 0.1 parts of p-methoxyphenol (MEHQ) were added to 400 parts of cyclopentanone (CPN), heated to 60° C., and stirred to dissolve. After dissolution was complete, the mixture was returned to room temperature. Then 3 parts of IRGACURE 907 (Irg 907: manufactured by BASF Japan Ltd.) and 0.15 parts of the surfactant represented by formula (H-1) were added, and the resulting mixture was further stirred to thereby obtain a solution. The solution was clear and uniform. The solution obtained was filtered through a 0.20 μm membrane filter to thereby obtain a polymerizable composition (1) in Example 1.

Examples 2 to 58 and Comparative Examples 1 to 11

Polymerizable compositions (2) to (58) in Examples 2 to 58 and polymerizable compositions (C1) to (C11) in Comparative Examples 1 to 11 were obtained under the same conditions as in the preparation of the polymerizable composition (1) in Example 1 except that ratios of compounds shown in tables below were changed as shown in Tables 1 to 12.

Specific compositions of the polymerizable compositions (1) to (58) of the present invention and the polymerizable compositions (C1) to (C11) for comparison are shown in the tables below. Table 13 shows the SP value of the polymerizable monomer represented by general formula (B) in each of compounds represented by formula (H-1) to formula (H-13), the value of formula (1) for the polymerizable monomer, the weight average molecular weight (Mw) of each of the compounds represented by formula (H-1) to formula (H-13), and the value of the mass ratio [(X)/(B)] of the polymerizable monomer (X) containing a fluorine atom to the polymerizable monomer represented by general formula (B) for each of the compounds represented by formula (H-1) to formula (H-13).

TABLE 1

| | Polymerizable composition | | | | | |
|---|---|---|---|---|---|---|
| | (1) | (2) | (3) | (4) | (5) | (6) |
| 1-a-5 | 55 | 55 | 55 | 55 | 55 | 55 |
| 1-a-6 | 25 | 25 | 25 | 25 | 25 | 25 |
| 2-a-1 (n = 6) | 20 | 20 | 20 | 20 | 20 | 20 |
| Irg 907 | 3 | 3 | 3 | 3 | 3 | 3 |
| MEHQ | 0.1 | 0.1 | 0.1 | 0.1 | 0.1 | 0.1 |
| H-1 | 0.15 | | | | | |
| H-2 | | 0.15 | | | | |
| H-3 | | | 0.15 | | | |
| H-4 | | | | 0.10 | | |
| H-5 | | | | | 0.15 | |
| H-6 | | | | | | 0.15 |
| CPN | 400 | 400 | 400 | 400 | 400 | 400 |

TABLE 2

| | Polymerizable composition | | | | | |
|---|---|---|---|---|---|---|
| | (7) | (8) | (9) | (10) | (11) | (12) |
| 1-a-5 | 55 | 55 | 55 | 55 | 55 | 55 |
| 1-a-6 | 25 | 25 | 25 | 25 | 25 | 25 |
| 2-a-1 (n = 6) | 20 | 20 | | | | |
| 2-a-1 (n = 3) | | | 20 | 20 | 20 | 20 |
| Irg 907 | 3 | 3 | 3 | 3 | 3 | 3 |
| MEHQ | 0.1 | 0.1 | 0.1 | 0.1 | 0.1 | 0.1 |
| H-7 | 0.15 | | | | | |
| H-8 | | 0.15 | | | | |
| H-2 | | | 0.15 | | | |
| H-3 | | | | 0.15 | | |
| H-4 | | | | | 0.10 | |
| H-5 | | | | | | 0.15 |
| CPN | 400 | 400 | 400 | 400 | 400 | 400 |

TABLE 3

| | Polymerizable composition | | | | | |
|---|---|---|---|---|---|---|
| | (13) | (14) | (15) | (16) | (17) | (18) |
| 1-a-5 | 55 | 55 | 55 | 55 | 55 | 55 |
| 1-a-6 | 25 | 25 | 25 | 25 | 25 | 25 |
| 2-a-1 (n = 6) | | 10 | 10 | 10 | 10 | 10 |
| 2-a-1 (n = 3) | 20 | 10 | 10 | 10 | 10 | 10 |
| Irg 907 | 3 | 3 | 3 | 3 | 3 | 3 |
| MEHQ | 0.1 | 0.1 | 0.1 | 0.1 | 0.1 | 0.1 |
| H-2 | | 0.15 | | | | |
| H-3 | | | 0.15 | | | |
| H-4 | | | | 0.10 | | |
| H-5 | | | | | 0.15 | |
| H-8 | 0.15 | | | | | 0.15 |
| CPN | 400 | 400 | 400 | 400 | 400 | 400 |

TABLE 4

| | Polymerizable composition | | | | | |
|---|---|---|---|---|---|---|
| | (19) | (20) | (21) | (22) | (23) | (24) |
| 1-a-5 | 80 | 80 | 80 | 80 | 80 | 55 |
| 1-a-6 | | | | | | 25 |
| 2-a-1 (n = 6) | | | 10 | 10 | 10 | 10 |
| 2-a-1 (n = 3) | | | 10 | 10 | 10 | 10 |
| 2-b-1 (m = n = 3) | 10 | 10 | | | | |
| 2-b-1 (m = n = 4) | 10 | 10 | | | | |
| 2-a-31 | | | | | | 10 |
| Irg 907 | 3 | 3 | 3 | 3 | 3 | 3 |
| MEHQ | 0.1 | 0.1 | 0.1 | 0.1 | 0.1 | 0.1 |
| H-2 | 0.15 | | | | 0.15 | |
| H-3 | | 0.15 | | | | 0.15 |
| H-4 | | | 0.10 | | | |
| H-5 | | | | 0.15 | | |
| CPN | 400 | 400 | 400 | 400 | 400 | 400 |

TABLE 5

| | Polymerizable composition | | | | | |
|---|---|---|---|---|---|---|
| | (25) | (26) | (27) | (28) | (29) | (30) |
| 1-a-5 | 55 | | | | | |
| 1-a-6 | 25 | 50 | 50 | 55 | 55 | 55 |
| 1-a-1 | | | | 25 | 25 | |
| 1-a-2 | | 20 | 20 | | | 25 |
| 2-a-1 (n = 6) | 10 | 15 | 15 | 10 | 10 | 10 |
| 2-a-1 (n = 3) | | | | 10 | 10 | 10 |
| 2-a-28 | 10 | 15 | 15 | | | |

TABLE 5-continued

| | Polymerizable composition | | | | | |
|---|---|---|---|---|---|---|
| | (25) | (26) | (27) | (28) | (29) | (30) |
| 2-a-31 | 10 | | | | | |
| Irg 907 | 3 | 3 | 3 | 3 | 3 | 3 |
| MEHQ | 0.1 | 0.1 | 0.1 | 0.1 | 0.1 | 0.1 |
| H-2 | | 0.15 | | 0.15 | | 0.15 |
| H-3 | 0.15 | | 0.15 | | 0.15 | |
| CPN | 400 | 400 | 400 | 400 | 400 | 400 |

TABLE 6

| | Polymerizable composition | | | | | |
|---|---|---|---|---|---|---|
| | (31) | (32) | (33) | (34) | (35) | (36) |
| 1-a-5 | | | | 30 | 30 | 30 |
| 1-a-6 | 55 | 55 | 55 | 40 | 40 | 40 |
| 1-a-2 | 25 | | | | | |
| 1-a-83 | | 25 | 25 | | | |
| 2-a-1 (n = 6) | 10 | 10 | 10 | 20 | 20 | 20 |
| 2-a-1 (n = 3) | 10 | 10 | 10 | | | |
| 3-a-7 | | | | 10 | | |
| 1-b-27 (m11 = 6, n11 = 2) | | | | | 10 | |
| 1-b-1 (m11 = 6, n11 = 0) | | | | | | 10 |
| Irg 907 | 3 | 3 | 3 | 3 | 3 | 3 |
| MEHQ | 0.1 | 0.1 | 0.1 | 0.1 | 0.1 | 0.1 |
| H-2 | | 0.15 | | 0.15 | 0.15 | 0.15 |
| H-3 | 0.15 | | 0.15 | | | |
| CPN | 400 | 400 | 400 | 400 | 400 | 400 |

TABLE 7

| | Polymerizable composition | | | | | |
|---|---|---|---|---|---|---|
| | (37) | (38) | (39) | (40) | (41) | (42) |
| 1-a-5 | 30 | 30 | 30 | 30 | | |
| 1-a-6 | 40 | 40 | 40 | 40 | | |
| 2-a-1 (n = 6) | 20 | 20 | 20 | 20 | | |
| 2-a-1 (n = 3) | | | | | | |
| 2-a-31 | | | 10 | | 100 | |
| 2-a-40 | | | | 10 | | 100 |
| 2-b-1 (m = n = 3) | 10 | | | | | |
| 2-b-1 (m = n = 4) | | 10 | | | | |
| Irg 907 | 3 | 3 | 3 | 3 | 3 | 3 |
| MEHQ | 0.1 | 0.1 | 0.1 | 0.1 | 0.1 | 0.1 |
| H-2 | 0.15 | 0.15 | 0.15 | 0.15 | 0.15 | 0.15 |
| CPN | 400 | 400 | 400 | 400 | | |
| CLF | | | | | 400 | |
| TCE | | | | | | 400 |

TABLE 8

| | Polymerizable composition | | | | | |
|---|---|---|---|---|---|---|
| | (43) | (44) | (45) | (46) | (47) | (48) |
| 1-a-5 | 40 | | | | | |
| 1-a-6 | 40 | 40 | 40 | 50 | 50 | 30 |
| 1-a-2 | | 40 | | 30 | | 30 |
| 1-a-83 | | | 40 | | 30 | |
| 2-a-1 (n = 6) | 10 | 20 | 20 | 5 | 5 | 25 |
| 2-a-28 | | | | 15 | 15 | 15 |
| Irg 907 | 3 | 3 | 3 | 3 | 3 | 3 |
| MEHQ | 0.1 | 0.1 | 0.1 | 0.1 | 0.1 | 0.1 |
| H-2 | 0.15 | 0.15 | 0.15 | 0.15 | 0.15 | 0.15 |
| MEK | 400 | 400 | 400 | 400 | 400 | 400 |

TABLE 9

| | Polymerizable composition | | | | | |
|---|---|---|---|---|---|---|
| | (49) | (50) | (51) | (52) | (53) | (54) |
| 1-a-6 | 40 | 40 | 40 | 40 | 40 | 40 |
| 1-a-2 | 30 | | | | | |
| 1-a-83 | | 30 | 30 | 30 | 30 | 30 |
| 2-a-1 (n = 6) | 20 | 20 | 20 | 20 | 20 | 20 |
| 2-a-1 (n = 3) | 10 | | | | | |
| 3-a-7 | | 10 | | | | |
| 1-b-27 (m11 = 6, n11 = 2) | | | 10 | | | |
| 1-b-1 (m11 = 6, n11 = 0) | | | | 10 | | |
| 2-b-1 (m = n = 3) | | | | | 10 | |
| 2-b-1 (m = n = 4) | | | | | | 10 |
| Irg 907 | 3 | 3 | 3 | 3 | 3 | 3 |
| MEHQ | 0.1 | 0.1 | 0.1 | 0.1 | 0.1 | 0.1 |
| H-2 | 0.15 | 0.15 | 0.15 | 0.15 | 0.15 | 0.15 |
| MEK | 400 | 400 | | | | |
| CPN | | | 400 | 400 | 400 | 400 |

TABLE 10

| Polymerizable composition | (55) | (56) | (57) | (58) |
|---|---|---|---|---|
| 1-a-5 | | | | 10 |
| 1-a-6 | 50 | 50 | 40 | 50 |
| 1-a-2 | 25 | | 20 | |
| 1-a-83 | | 25 | | 10 |
| 2-a-1 (n = 6) | 25 | 25 | 20 | 20 |
| 2-a-28 | | | 10 | |
| 2-b-1 (m = n = 3) | | | 10 | |
| 2-b-1 (m = n = 4) | | | | 10 |
| Irg 907 | 3 | 3 | 3 | 3 |
| MEHQ | 0.1 | 0.1 | 0.1 | 0.1 |
| H-2 | 0.15 | 0.15 | 0.15 | 0.15 |
| MEK | 200 | 200 | 300 | 200 |
| MIBK | 200 | 200 | 100 | 200 |

TABLE 11

| | Composition | | | | | |
|---|---|---|---|---|---|---|
| | (C1) | (C2) | (C3) | (C4) | (C5) | (C6) |
| 1-a-5 | 55 | 55 | 55 | 55 | 55 | 40 |
| 1-a-6 | 25 | 25 | 25 | 25 | 25 | 40 |
| 1-a-2 | | | | | | 10 |
| 2-a-1 (n = 6) | 20 | 20 | 20 | 20 | 20 | |
| 2-a-28 | | | | | | 10 |
| Irg 907 | 3 | 3 | 3 | 3 | 3 | 3 |
| MEHQ | 0.1 | 0.1 | 0.1 | 0.1 | 0.1 | 0.1 |
| H-9 | 0.15 | | | | | 0.15 |
| H-10 | | 0.15 | | | | |
| H-11 | | | 0.15 | | | |
| H-12 | | | | 0.15 | | |
| H-13 | | | | | 0.15 | |
| CPN | 400 | 400 | 400 | 400 | 400 | |
| MEK | | | | | | 400 |

TABLE 12
| Composition | (C7) | (C8) | (C9) | (C10) | (C11) |
|---|---|---|---|---|---|
| 1-a-5 | 40 | 40 | 40 | 40 | |
| 1-a-6 | 40 | 40 | 40 | 40 | 40 |
| 1-a-2 | 10 | 10 | 10 | 10 | 20 |
| 2-a-1 (n = 6) | | | | | 20 |
| 2-a-28 | 10 | 10 | 10 | 10 | 10 |
| 2-b-1 (m = n = 3) | | | | | 10 |
| Irg 907 | 3 | 3 | 3 | 3 | 3 |
| MEHQ | 0.1 | 0.1 | 0.1 | 0.1 | 0.1 |
| H-9 | | | | | 0.15 |
| H-10 | 0.15 | | | | |
| H-11 | | 0.15 | | | |
| H-12 | | | 0.15 | | |
| H-13 | | | | 0.15 | |
| MEK | 400 | 400 | 400 | 400 | 300 |
| MIBK | | | | | 100 |
[Chem. 171]
(1-a-5)
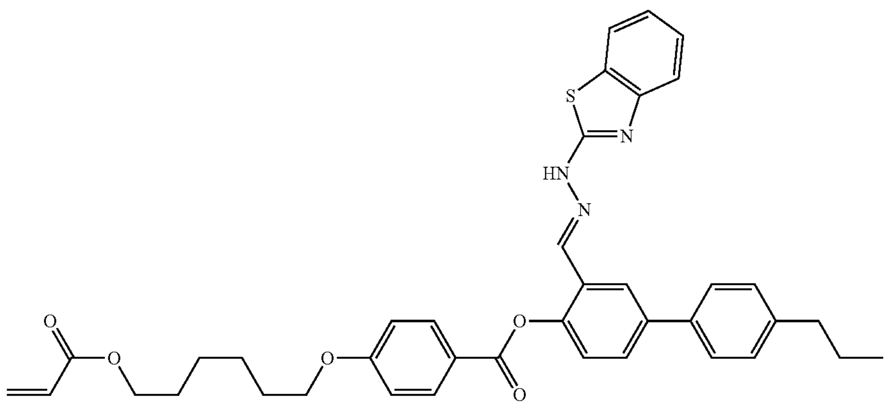
(1-a-6)
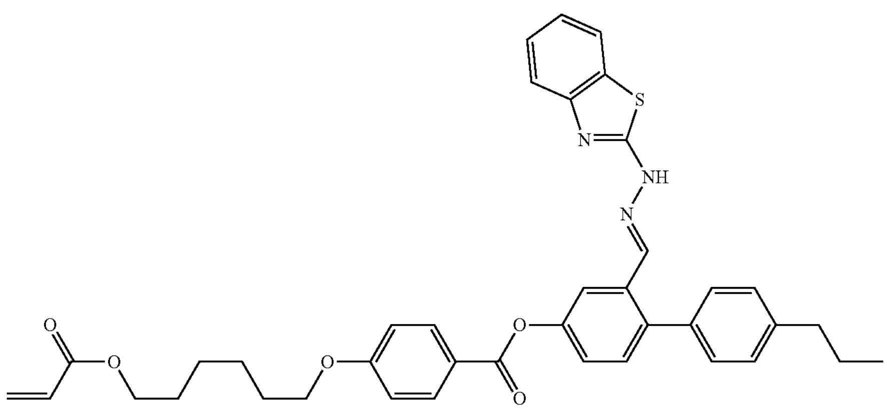
[Chem. 172]
(1-a-1)
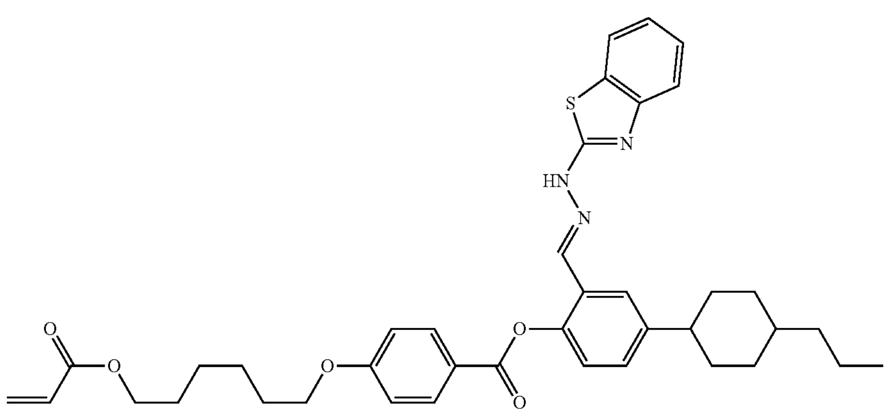

-continued
(1-a-2)
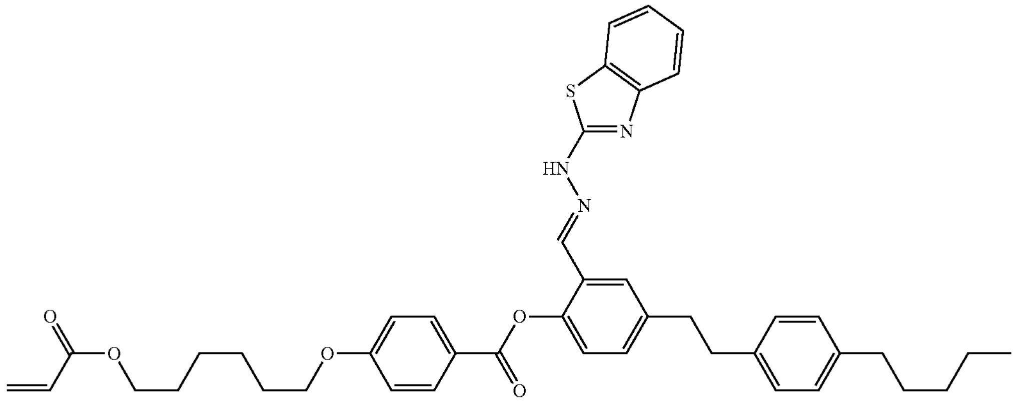
(1-a-83)
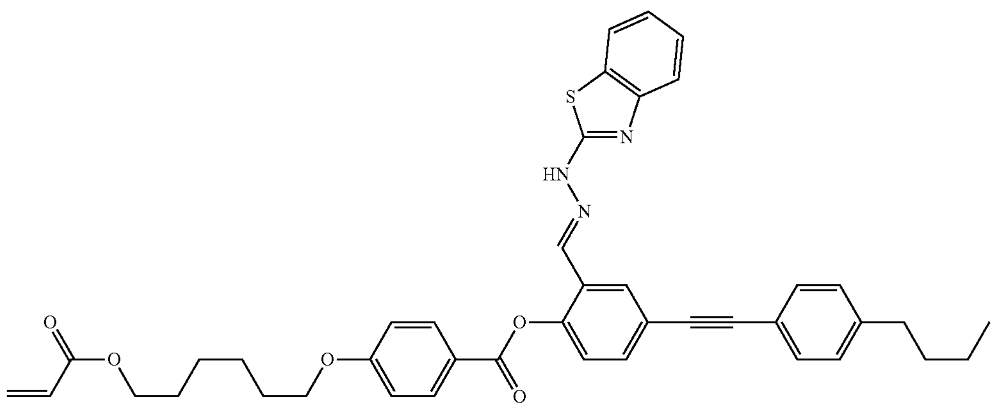
[Chem. 173]
(1-a-93)
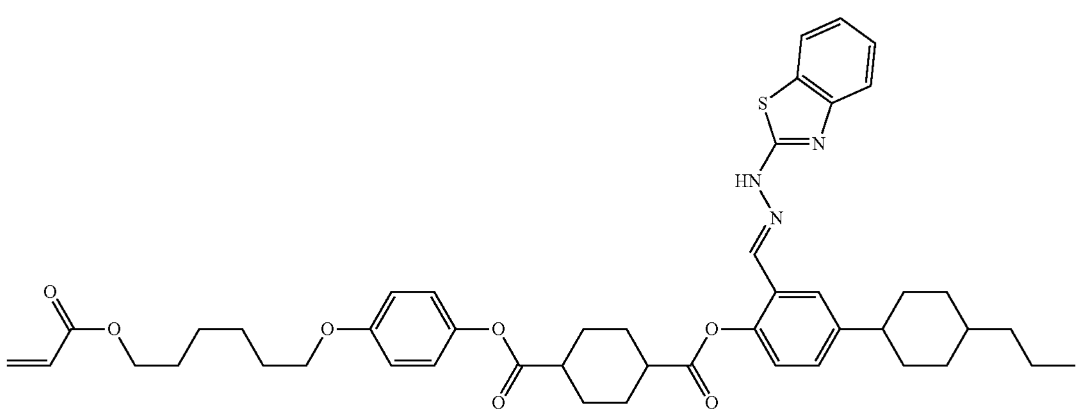

-continued
(1-a-100)
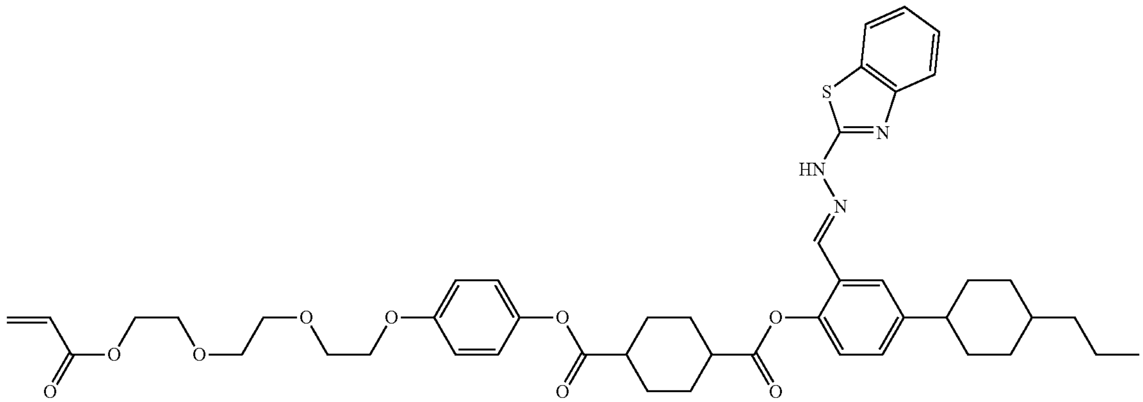
(1-a-101)
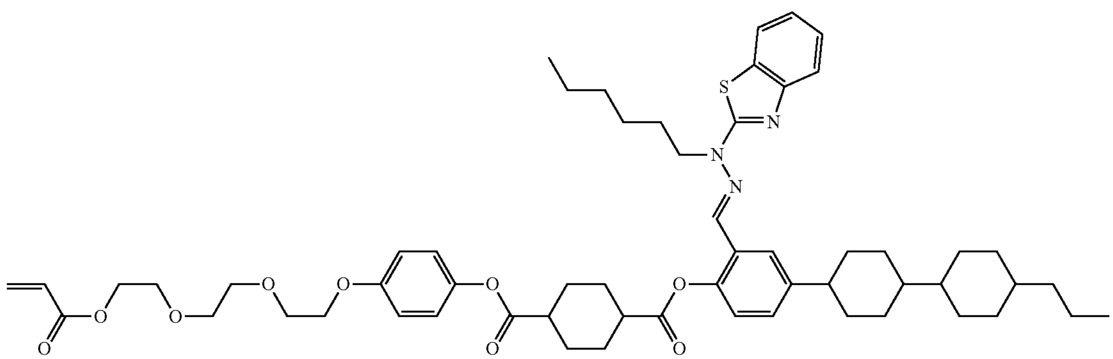
[Chem. 174]
(1-a-93)
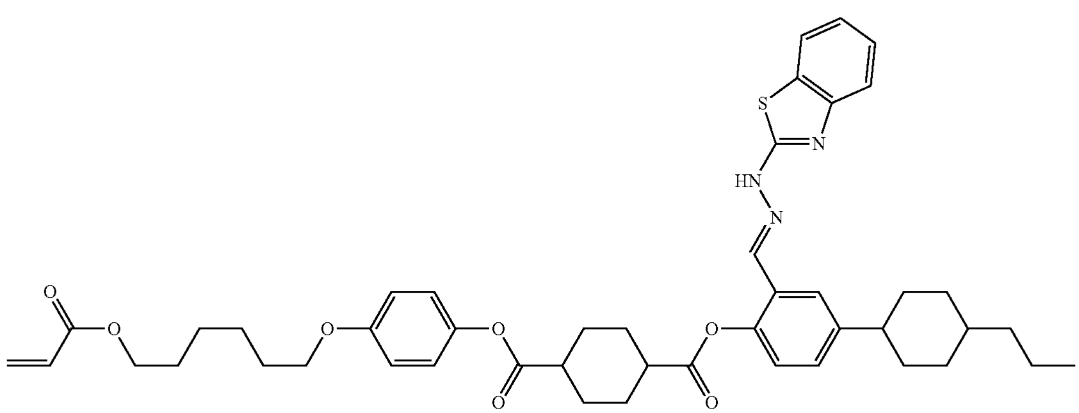

-continued
(1-a-100)
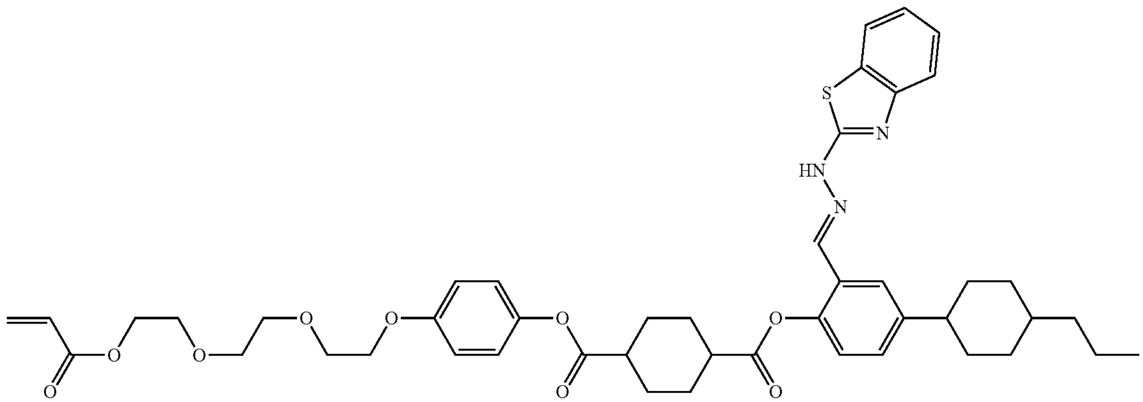
(1-a-101)
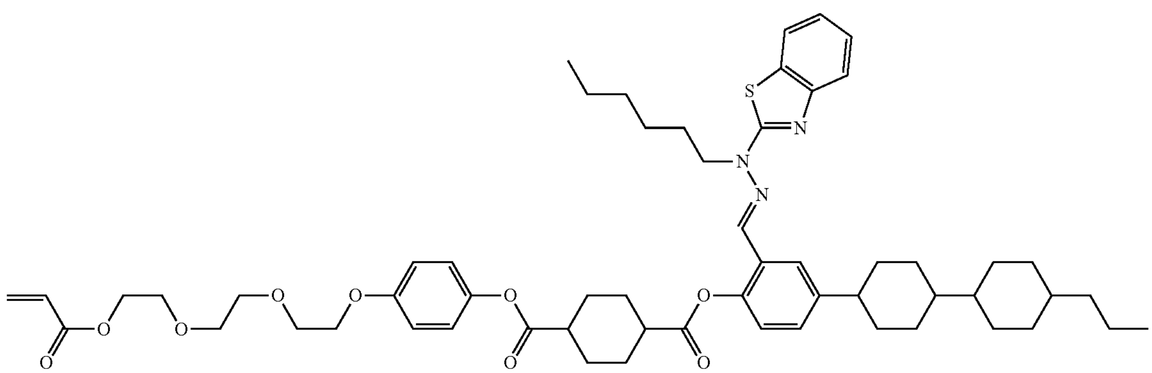
[Chem. 175]
(1-a-102)
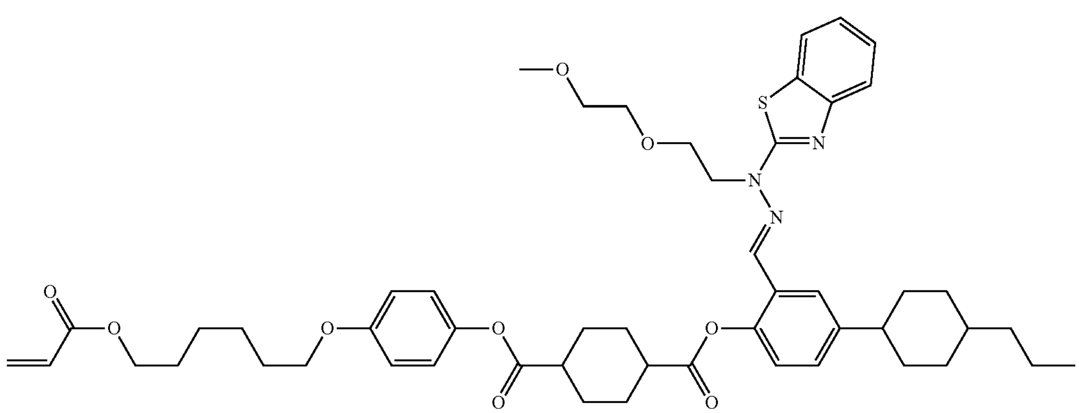

-continued
(1-a-103)
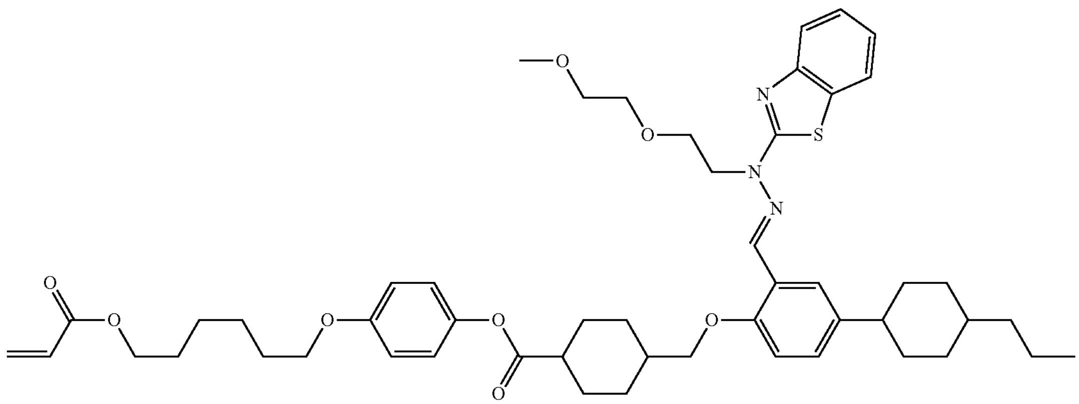
(1-a-104)
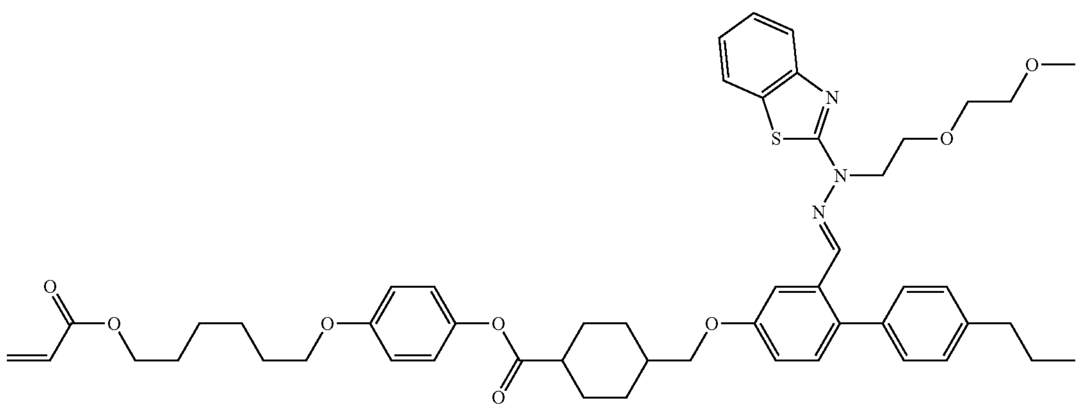
(1-a-105)
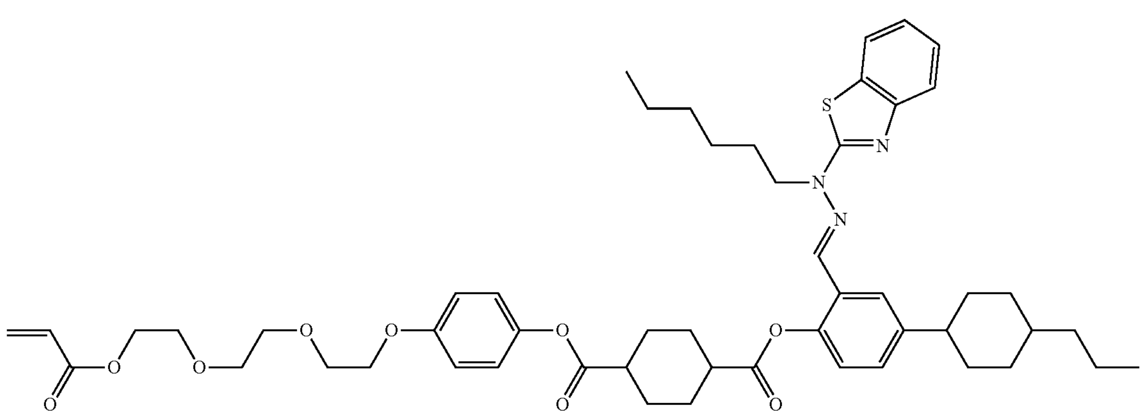

-continued
[Chem. 176]
(2-a-1)
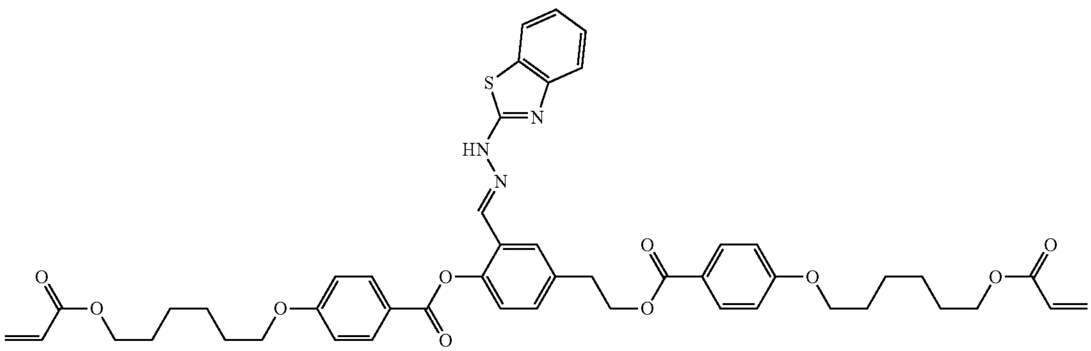
n = 6
(2-a-1)
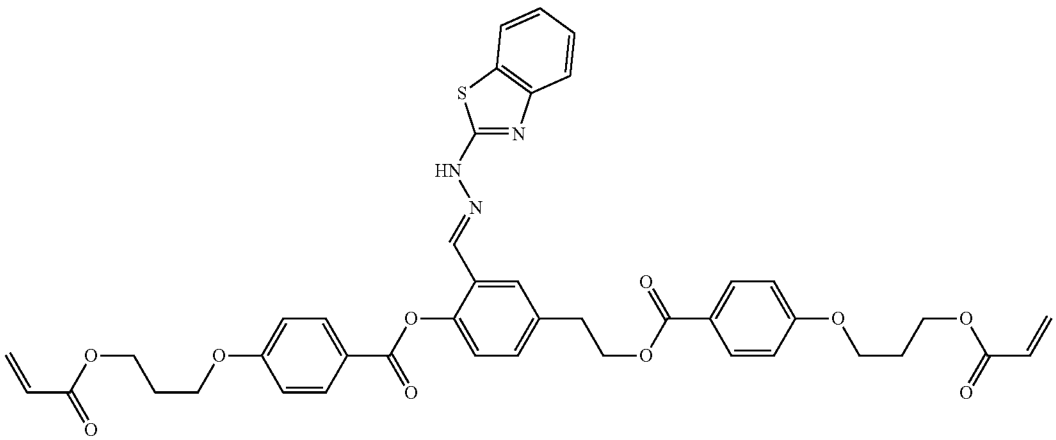
n = 3
[Chem. 177]
(2-a-31)
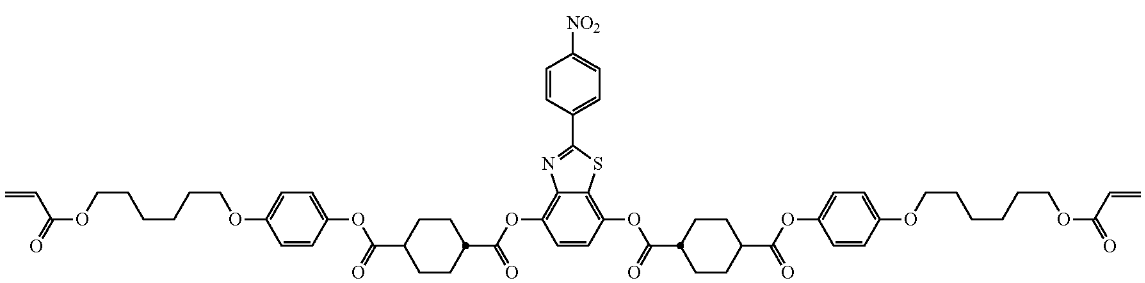
(2-a-40)
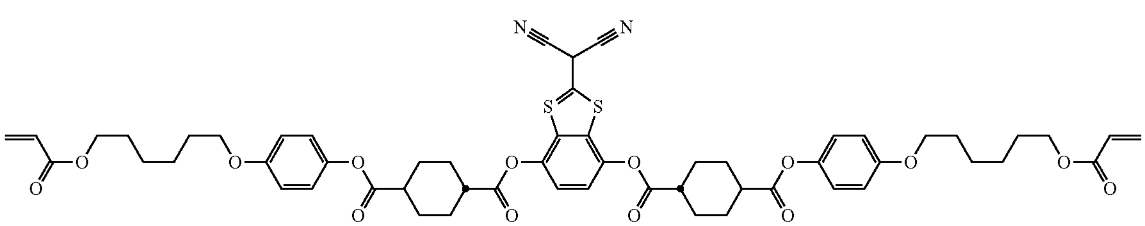

-continued
[Chem. 178]
(2-a-28)
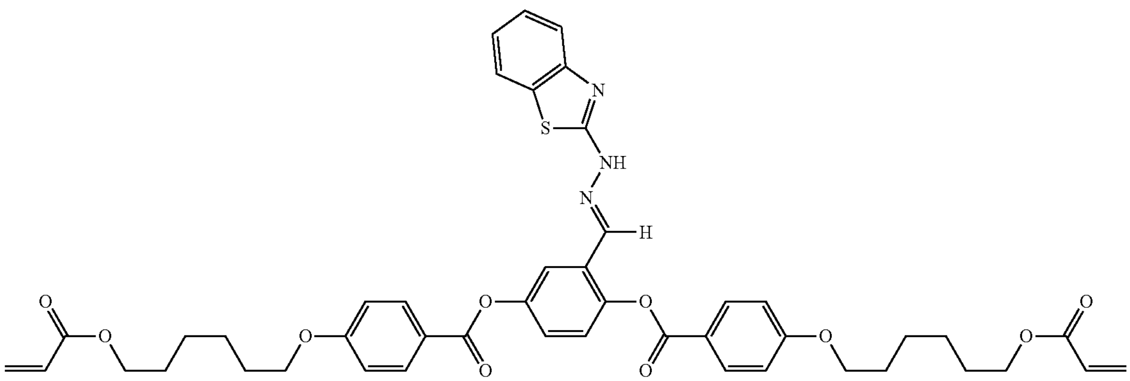
(2-a-30)
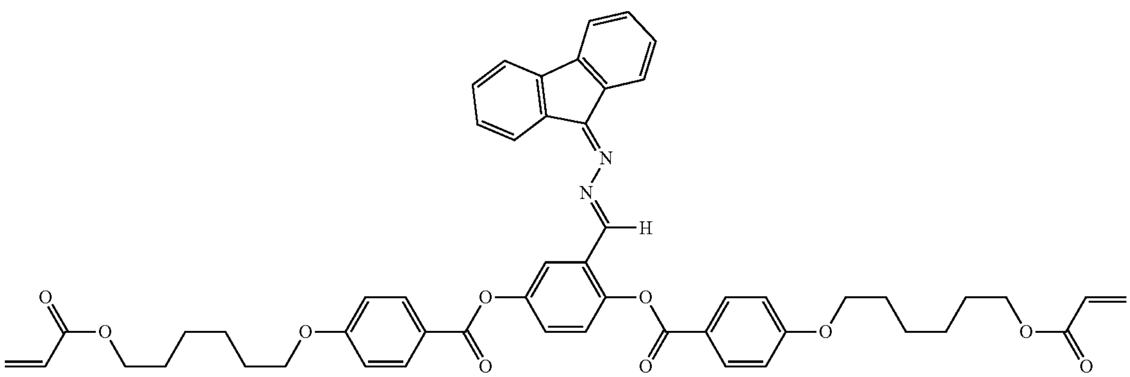
[Chem. 179]
(2-a-53)
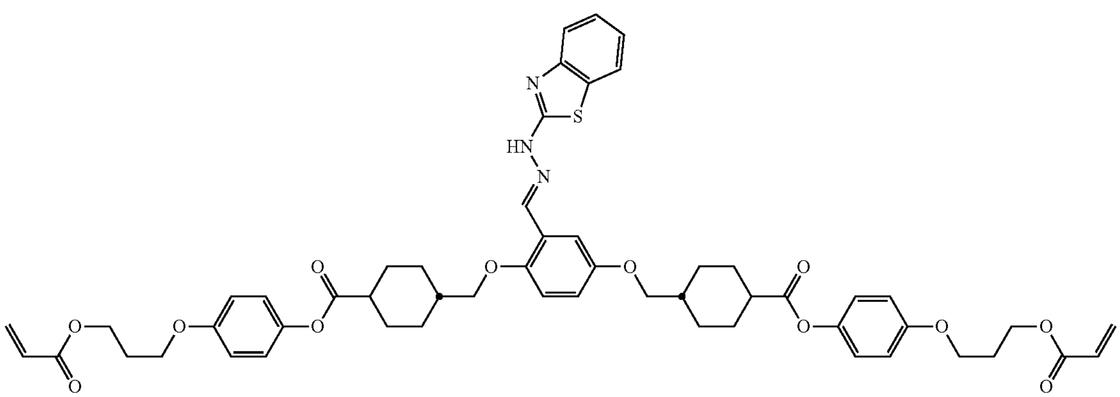
(2-a-55)
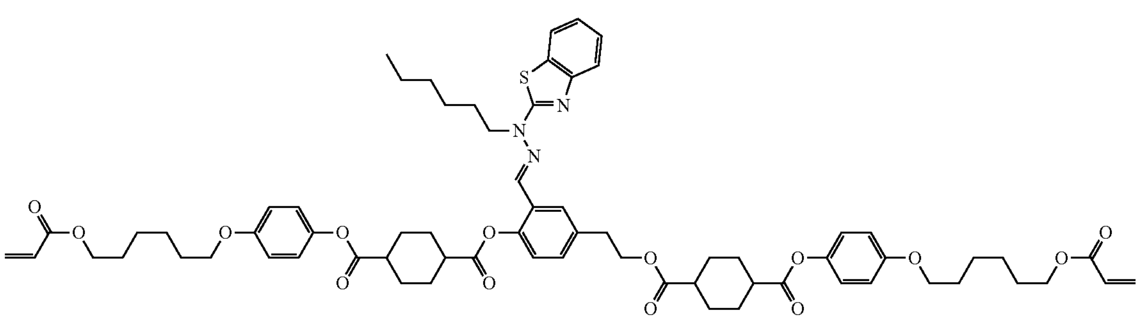

-continued
(2-a-56)
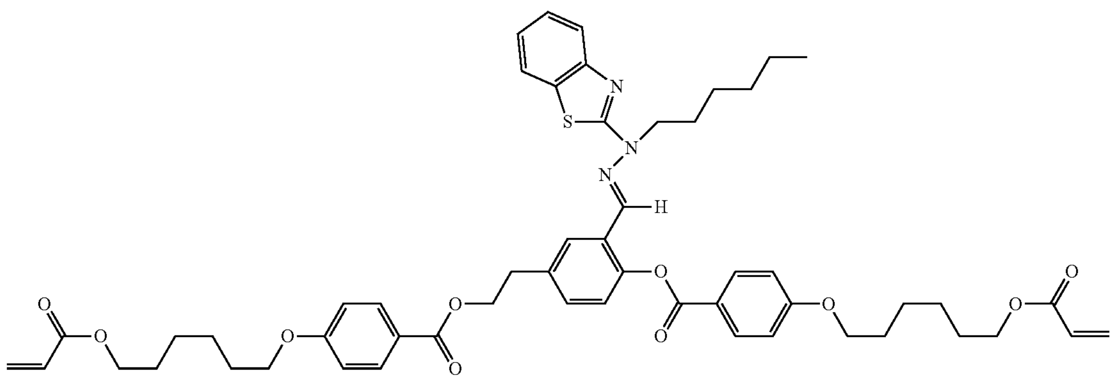
(2-a-57)
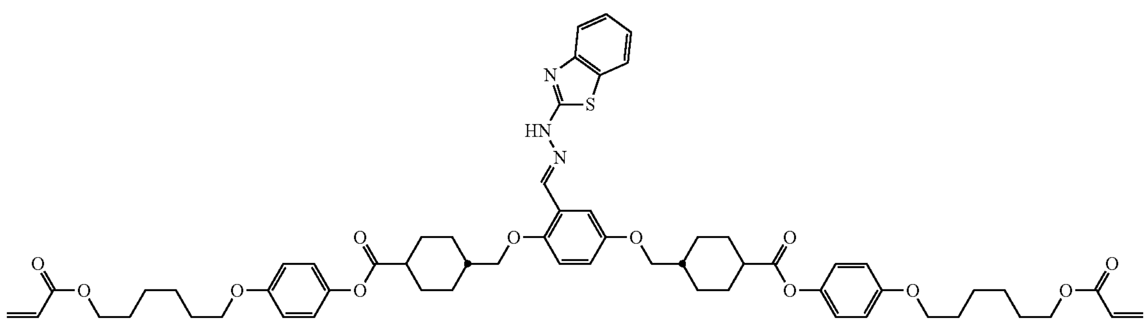
[Chem. 180]
(2-a-58)
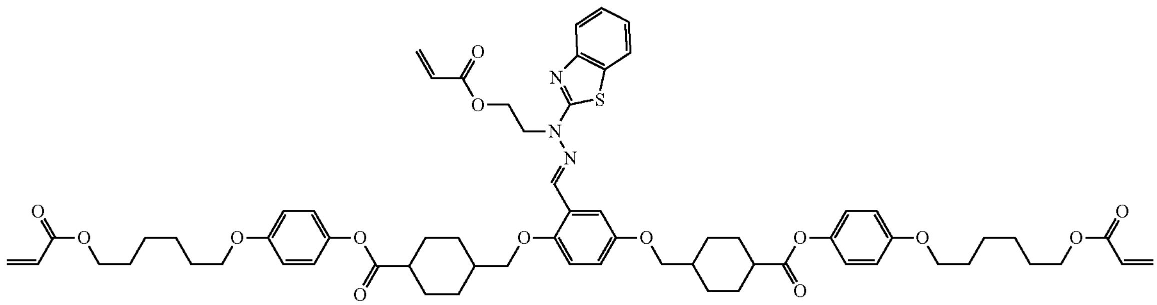
(2-a-59)
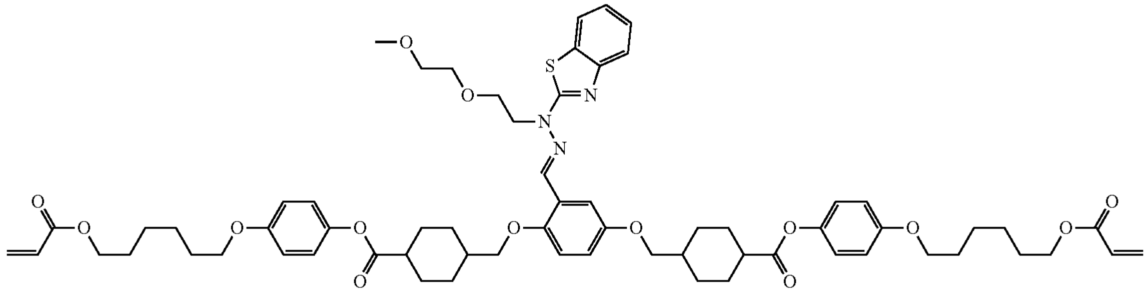

-continued
(2-a-60)
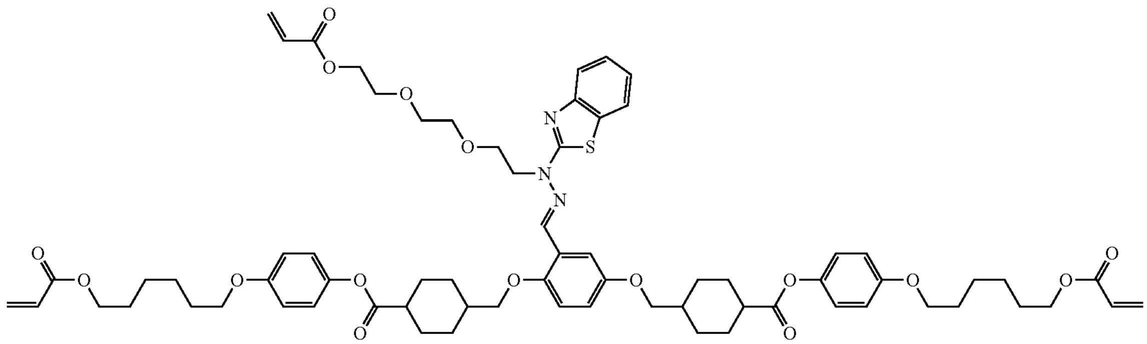
(2-a-61)
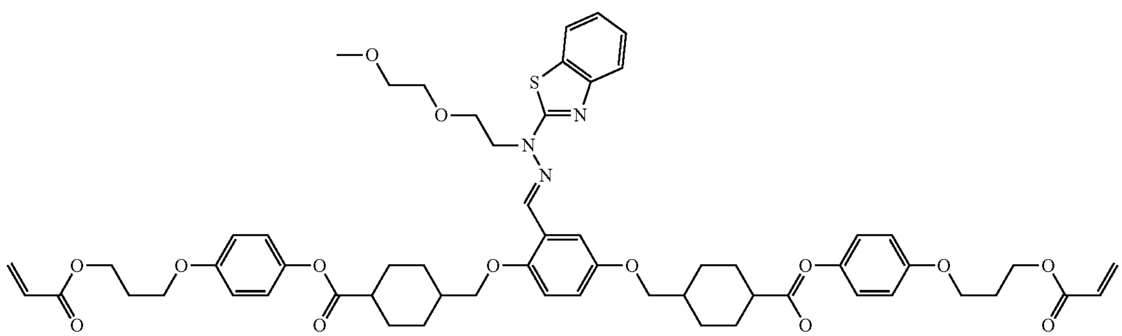
[Chem. 181]
(3-a-7)
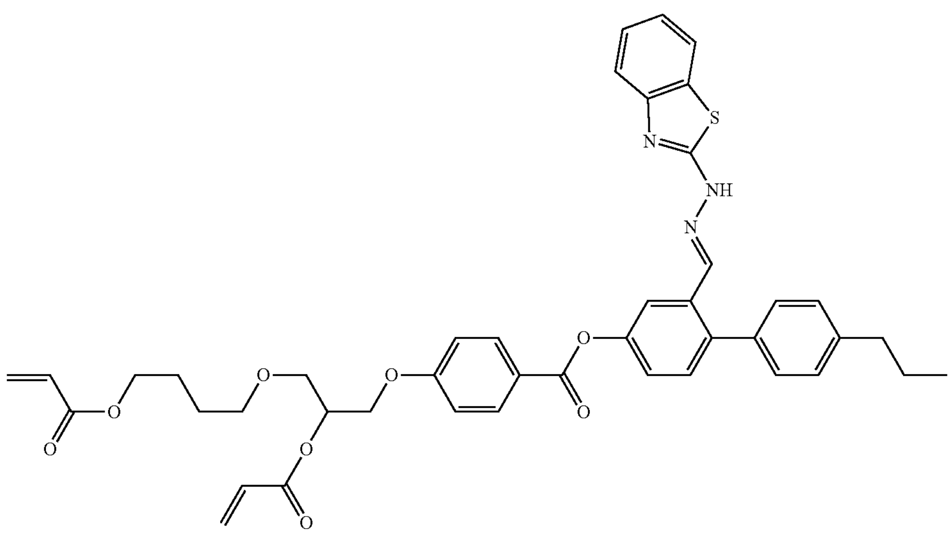
[Chem. 182]
(1-b-27)
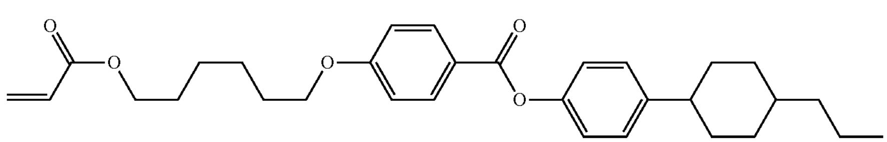
m = 6, n = 2

-continued
(1-b-1)
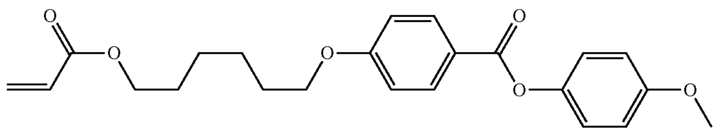
m = 6, n = 0
(2-b-1)
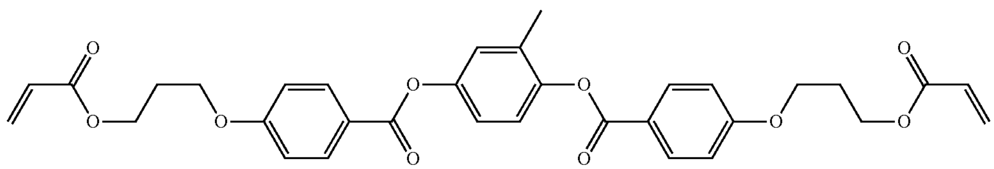
m = n = 3
(2-b-1)
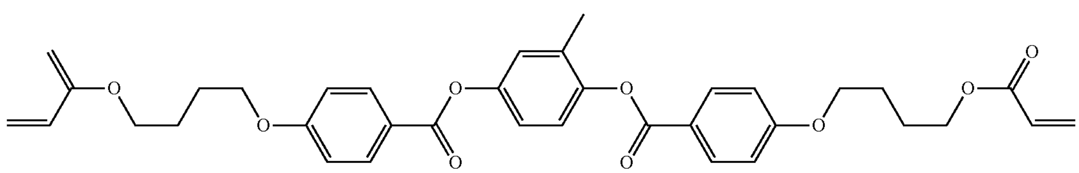
m = n = 4
(2-b-19)
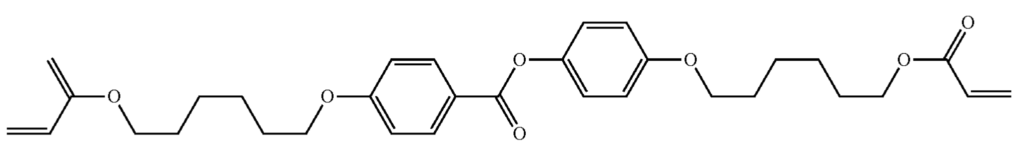
m = n = 6
[Chem. 183]
(H-1)
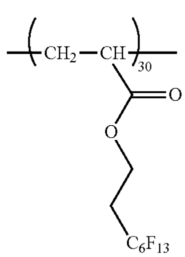
(H-2)
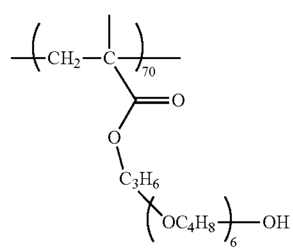
[Chem. 184]
(H-3)
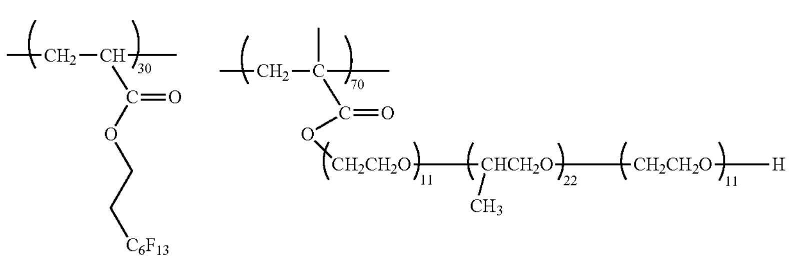

-continued
[Chem. 185]
(H-4)
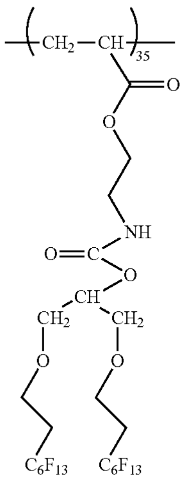
(H-9)
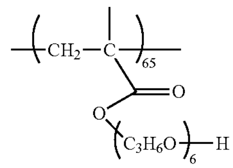
[Chem. 186]
(H-5)
(H-6)
(H-7)
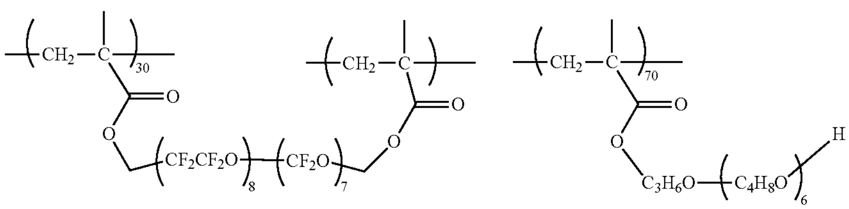
[Chem. 187]
(H-8)
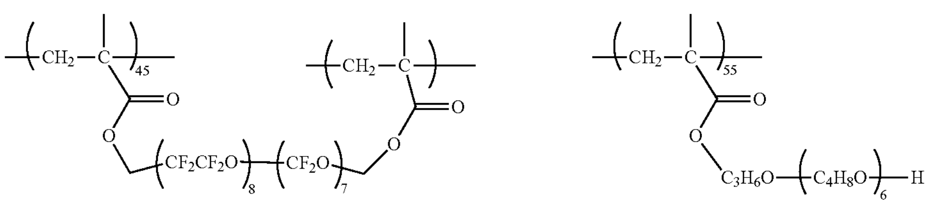
[Chem. 188]
(H-10)
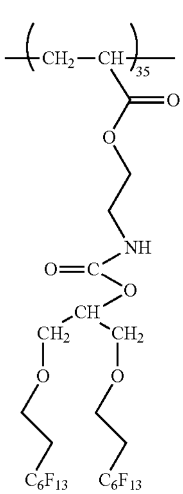
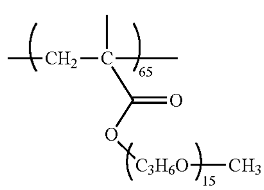

-continued
[Chem. 189]
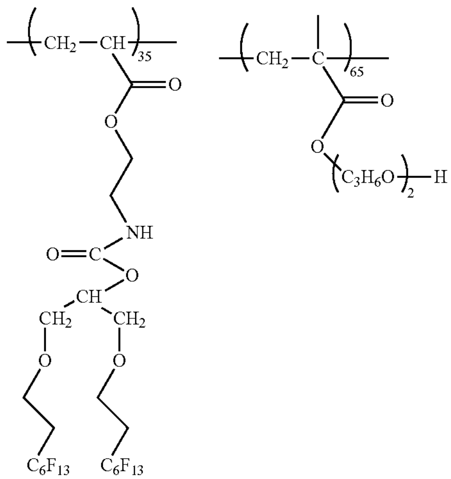
(H-11)
[Chem. 190]
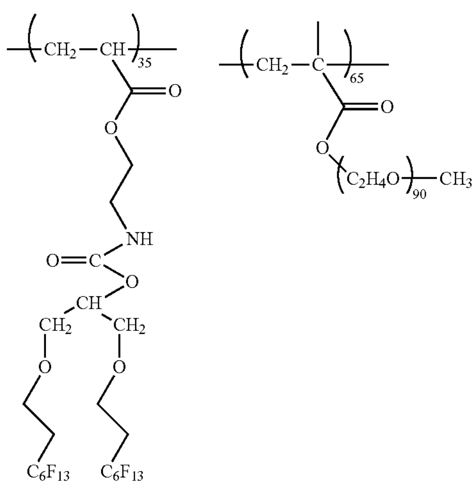
(H-12)
[Chem. 191]
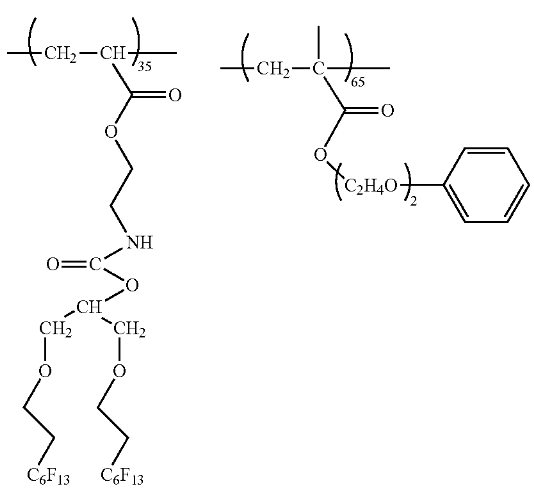
(H-13)

TABLE 13

| | SP value of polymerizable monomer represented by general formula (B) | Value of formula (1) | Weight average molecular weight | (X)/(B) |
|---|---|---|---|---|
| H-1 | 9.68 | 1.22 | 2,800 | 30/70 |
| H-2 | 9.68 | 1.22 | 9,500 | 30/70 |
| H-3 | 9.15 | 1.89 | 11,000 | 30/70 |
| H-4 | 9.88 | 1.33 | 28,000 | 35/65 |
| H-5 | 9.68 | 1.22 | 3,600 | 30/70 |
| H-6 | 9.68 | 1.22 | 11,000 | 30/70 |
| H-7 | 9.68 | 1.22 | 20,000 | 30/70 |
| H-8 | 9.68 | 1.22 | 4,600 | 45/55 |
| H-9 | 9.88 | 1.33 | 38,000 | 35/65 |
| H-10 | 8.69 | 1.55 | 5,000 | 35/65 |
| H-11 | 11.48 | 1.15 | 3,800 | 35/65 |
| H-12 | 9.36 | 2.22 | 7,000 | 35/65 |
| H-13 | 9.68 | 0.85 | 3,500 | 35/65 |

Chloroform (CLF)
1,1,2-Trichloroethane (TCE)
N-methylpyrrolidone (NMP)
Cyclopentanone (CPN)
Methyl ethyl ketone (MEK)
Methyl isobutyl ketone (MIBK)
Toluene (TOL)

The values of Re(450 nm)/Re(550 nm) of the compounds represented by the above formulas are shown in the following table.

TABLE 14

| Compound | Re(450 nm)/Re(550 nm) |
|---|---|
| Formula (1-a-5) | 0.881 |
| Formula (1-a-6) | 0.784 |
| Formula (1-a-1) | 0.716 |
| Formula (1-a-2) | 0.773 |
| Formula (1-a-83) | 0.957 |
| Formula (1-a-93) | 0.664 |
| Formula (1-a-100) | 0.571 |
| Formula (1-a-101) | 0.601 |
| Formula (1-a-102) | 0.769 |
| Formula (1-a-103) | 0.749 |
| Formula (1-a-104) | 0.867 |
| Formula (1-a-105) | 0.363 |
| Formula (2-a-1) with n = 6 | 0.988 |
| Formula (2-a-1) with n = 3 | 0.802 |
| Formula (2-a-31) | 0.900 |
| Formula (2-a-40) | 0.832 |
| Formula (2-a-28) | 0.845 |
| Formula (2-a-53) | 0.622 |
| Formula (2-a-55) | 0.838 |
| Formula (2-a-56) | 0.554 |
| Formula (2-a-57) | 0.675 |
| Formula (2-a-58) | 0.878 |
| Formula (2-a-59) | 0.723 |
| Formula (2-a-60) | 0.823 |
| Formula (2-a-61) | 0.758 |
| Formula (3-a-7) | 0.850 |

(Solubility Evaluation)

The solubility in each of Examples 1 to 58 and Comparative Examples 1 to 11 was evaluated as follows.

A: After preparation, the clear and uniform state can be visually observed.

B: The clear and uniform state can be visually observed after heating and stirring, but precipitates of compounds are found when the mixture is returned to room temperature.

C: Compounds cannot be uniformly dissolved even after heating and stirring.

(Storage Stability Evaluation)

For each of Examples 1 to 58 and Comparative Examples 1 to 11, the state after the polymerizable composition was left to stand at room temperature for 1 week was visually checked. The storage stability of the polymerizable composition was evaluated as follows.

A: The clear and uniform state is maintained even after the polymerizable composition is left to stand at room temperature for 3 days.

B: The clear and uniform state is maintained even after the polymerizable composition is left to stand at room temperature for 1 day.

C: Precipitates of compounds are found after the polymerizable composition is left to stand at room temperature for 1 hour.

The results obtained are shown in the following tables.

TABLE 15

| | Polymerizable composition | Solubility | Storage stability |
|---|---|---|---|
| Example 1 | (1) | A | A |
| Example 2 | (2) | A | A |
| Example 3 | (3) | A | A |
| Example 4 | (4) | A | A |
| Example 5 | (5) | A | A |
| Example 6 | (6) | A | A |
| Example 7 | (7) | A | A |
| Example 8 | (8) | A | A |
| Example 9 | (9) | A | A |
| Example 10 | (10) | A | A |
| Example 11 | (11) | A | A |
| Example 12 | (12) | A | A |
| Example 13 | (13) | A | A |
| Example 14 | (14) | A | A |
| Example 15 | (15) | A | A |
| Example 16 | (16) | A | A |

TABLE 16

| | Polymerizable composition | Solubility | Storage stability |
|---|---|---|---|
| Example 17 | (17) | A | A |
| Example 18 | (18) | A | A |
| Example 19 | (19) | A | A |
| Example 20 | (20) | A | A |
| Example 21 | (21) | A | A |
| Example 22 | (22) | A | A |
| Example 23 | (23) | A | A |
| Example 24 | (24) | A | A |
| Example 25 | (25) | A | A |
| Example 26 | (26) | A | A |
| Example 27 | (27) | A | A |
| Example 28 | (28) | A | A |
| Example 29 | (29) | A | A |
| Example 30 | (30) | A | A |
| Example 31 | (31) | A | A |
| Example 32 | (32) | A | A |
| Example 33 | (33) | A | A |
| Example 34 | (34) | A | A |

TABLE 17

| | Polymerizable composition | Solubility | Storage stability |
|---|---|---|---|
| Example 35 | (35) | A | A |
| Example 36 | (36) | A | A |
| Example 37 | (37) | A | A |
| Example 38 | (38) | A | A |
| Example 39 | (39) | A | A |
| Example 40 | (40) | A | A |
| Example 41 | (41) | A | A |
| Example 42 | (42) | A | A |
| Example 43 | (43) | A | A |
| Example 44 | (44) | A | A |
| Example 45 | (45) | A | A |

TABLE 17-continued

| | Polymerizable composition | Solubility | Storage stability |
|---|---|---|---|
| Example 46 | (46) | A | A |
| Example 47 | (47) | A | A |
| Example 48 | (48) | A | A |
| Example 49 | (49) | A | A |
| Example 50 | (50) | A | A |

TABLE 18

| | Polymerizable composition | Solubility | Storage stability |
|---|---|---|---|
| Example 51 | (51) | A | A |
| Example 52 | (52) | A | A |
| Example 53 | (53) | A | A |
| Example 54 | (54) | A | A |
| Example 55 | (55) | A | A |
| Example 56 | (56) | A | A |
| Example 57 | (57) | A | A |
| Example 58 | (58) | A | A |
| Comparative Example 1 | (C1) | A | A |
| Comparative Example 2 | (C2) | A | A |
| Comparative Example 3 | (C3) | A | A |
| Comparative Example 4 | (C4) | A | A |
| Comparative Example 5 | (C5) | A | A |
| Comparative Example 6 | (C6) | A | A |
| Comparative Example 7 | (C7) | A | A |

Example 59

A polyimide solution for an alignment film was applied to a 0.7 mm-thick glass substrate by spin coating, dried at 100° C. for 10 minutes, and then fired at 200° C. for 60 minutes to obtain a coating film. The coating film obtained was subjected to rubbing treatment. The rubbing treatment was performed using a commercial rubbing device.

The polymerizable composition (1) of the present invention was applied to the substrate subjected to rubbing by spin coating and dried at 100° C. for 2 minutes. The coating film obtained was cooled to room temperature and irradiated with UV rays at an intensity of 30 mW/cm$^2$ for 30 seconds using a high-pressure mercury lamp to thereby obtain an optically anisotropic body serving as a positive A-plate. The optically anisotropic body obtained was subjected to alignment evaluation, retardation ratio, leveling property evaluation, and offset evaluation according to the following criteria.

(Alignment Evaluation)

AA: No defects are found at all by visual inspection, and no defects are found at all by polarizing microscope observation.

A: No defects are found by visual inspection, but non-aligned portions are found in some parts by polarizing microscope observation.

B: No defects are found by visual inspection, but non-aligned portions are found over the entire region by polarizing microscope observation.

C: Defects are found in some parts by visual inspection, and non-aligned portions are found over the entire region by polarizing microscope observation.

(Retardation Ratio)

The retardation of the optically anisotropic body produced as an evaluation sample was measured using a retardation film-optical material inspection device RETS-100 (manufactured by Otsuka Electronics Co., Ltd.), and the in-plane retardation (Re(550)) at a wavelength of 550 nm was 130 nm. The ratio of the in-plane retardation (Re(450)) at a wavelength of 450 nm to Re(550), i.e., Re(450)/Re(550), was 0.855, and the retardation film obtained had high uniformity.

(Leveling Property Evaluation)

The degree of cissing in the optically anisotropic body produced as the evaluation sample was checked visually under crossed Nicols.

AA: No cissing defects are found at all on the surface of the coating film.

A: A very small number of cissing defects are found on the surface of the coating film.

B: A small number of cissing defects are found on the surface of the coating film.

C: A large number of cissing defects are found on the surface of the coating film.

(Offset Evaluation)

A TAC film (B) was placed on a polymerizable composition surface (A) of the optically anisotropic body produced as the evaluation sample, and the resulting stack was held under a load of 40 g/cm$^2$ at 80° C. for 30 minutes and then cooled to room temperature while the stacked state was maintained. Then the film (B) was removed, and whether or not the surfactant in the polymerizable composition was offset onto the film (B) was visually checked. When the surfactant is transferred to the film (B), the offset portion is observed as a whitish portion.

AA: Not observed at all.

A: Very slightly observed.

B: Slightly observed.

C: Observed over the entire region.

Examples 60 to 100 and Comparative Examples 12 to 16

Optically anisotropic bodies in Examples 60 to 100 each serving as a positive A-plate and optically anisotropic bodies in Comparative Examples 12 to 16 each serving as a positive A-plate were obtained under the same conditions as in Example 59 except that the polymerizable composition used was changed to one of the polymerizable compositions (2) to (42) of the present invention and the polymerizable compositions (C1) to (C5) for comparison. The results obtained are shown in the following tables.

TABLE 19

| | Polymerizable composition | Alignment evaluation | Retardation ratio | Leveling property evaluation | Offset evaluation |
|---|---|---|---|---|---|
| Example 59 | (1) | AA | 0.855 | AA | AA |
| Example 60 | (2) | AA | 0.850 | AA | AA |
| Example 61 | (3) | AA | 0.866 | A | AA |
| Example 62 | (4) | AA | 0.857 | A | AA |
| Example 63 | (5) | AA | 0.856 | A | AA |
| Example 64 | (6) | AA | 0.863 | A | AA |
| Example 65 | (7) | AA | 0.855 | A | AA |
| Example 66 | (8) | AA | 0.853 | A | AA |
| Example 67 | (9) | AA | 0.824 | AA | AA |
| Example 68 | (10) | AA | 0.822 | AA | AA |
| Example 69 | (11) | AA | 0.832 | A | AA |
| Example 70 | (12) | AA | 0.836 | A | AA |
| Example 71 | (13) | AA | 0.822 | A | AA |
| Example 72 | (14) | AA | 0.847 | AA | AA |
| Example 73 | (15) | AA | 0.848 | AA | AA |
| Example 74 | (16) | AA | 0.849 | A | AA |

TABLE 19-continued

| | Poly-merizable composition | Alignment evaluation | Retardation ratio | Leveling property evaluation | Offset evalu-ation |
|---|---|---|---|---|---|
| Example 75 | (17) | AA | 0.839 | A | AA |
| Example 76 | (18) | AA | 0.842 | A | AA |
| Example 77 | (19) | AA | 0.944 | AA | AA |
| Example 78 | (20) | AA | 0.943 | AA | AA |
| Example 79 | (21) | AA | 0.955 | A | AA |

TABLE 20

| | Poly-merizable composition | Alignment evaluation | Re-tardation ratio | Leveling property evaluation | Offset evaluation |
|---|---|---|---|---|---|
| Example 80 | (22) | AA | 0.943 | A | AA |
| Example 81 | (23) | AA | 0.943 | A | AA |
| Example 82 | (24) | AA | 0.852 | AA | AA |
| Example 83 | (25) | AA | 0.834 | AA | AA |
| Example 84 | (26) | AA | 0.816 | AA | AA |
| Example 85 | (27) | AA | 0.800 | AA | AA |
| Example 86 | (28) | AA | 0.785 | AA | AA |
| Example 87 | (29) | AA | 0.787 | AA | AA |
| Example 88 | (30) | AA | 0.788 | AA | AA |
| Example 89 | (31) | AA | 0.788 | AA | AA |
| Example 90 | (32) | AA | 0.787 | AA | AA |
| Example 91 | (33) | AA | 0.839 | AA | AA |
| Example 92 | (34) | AA | 0.848 | AA | AA |
| Example 93 | (35) | AA | 0.886 | AA | AA |
| Example 94 | (36) | AA | 0.886 | AA | AA |
| Example 95 | (37) | AA | 0.895 | AA | AA |
| Example 96 | (38) | AA | 0.892 | AA | AA |
| Example 97 | (39) | AA | 0.840 | AA | AA |
| Example 98 | (40) | AA | 0.832 | AA | AA |
| Example 99 | (41) | A | 0.900 | A | A |
| Example 100 | (42) | A | 0.832 | A | A |
| Comparative Example 12 | (C1) | B | 0.858 | C | B |
| Comparative Example 13 | (C2) | A | 0.859 | B | B |
| Comparative Example 14 | (C3) | A | 0.863 | B | B |
| Comparative Example 15 | (C4) | A | 0.856 | B | B |
| Comparative Example 16 | (C5) | A | 0.865 | C | C |

Example 101

A uniaxially stretched 50 μm-thick PET film was subjected to rubbing treatment using a commercial rubbing device, and the polymerizable composition (43) of the present invention was applied by bar coating and dried at 80° C. for 2 minutes. The coating film obtained was cooled to room temperature and irradiated with UV rays at a conveying speed of 6 m/min using a UV conveyer device (manufactured by GS Yuasa Corporation) to thereby obtain an optically anisotropic body in Example 101 serving as a positive A-plate. The optically anisotropic body obtained was subjected to alignment evaluation, retardation ratio, leveling property evaluation, and offset evaluation in the same manner as in Example 59.

Examples 102 to 112 and Comparative Examples 17 to 21

Optically anisotropic bodies in Examples 102 to 112 and Comparative Examples 17 to 21 each serving as a positive A-plate were obtained under the same conditions as in Example 101 except that the polymerizable composition used was changed to one of the polymerizable compositions (44) to (54) of the present invention and the polymerizable compositions (C6) to (C10) for comparison. For each of the optically anisotropic bodies obtained, the alignment evaluation, the retardation ratio, the leveling property evaluation, and the offset evaluation were performed in the same manner as in Example 59.

Example 113

A non-stretched 40 μm-thick cycloolefin polymer film "ZEONOR" (manufactured by ZEON CORPORATION) was subjected to rubbing treatment using a commercial rubbing device, and the polymerizable composition (55) of the present invention was applied by bar coating and dried at 80° C. for 2 minutes. The coating film obtained was cooled to room temperature and irradiated with UV rays at a conveying speed of 6 m/min using a UV conveyer device (manufactured by GS Yuasa Corporation) to thereby obtain an optically anisotropic body in Example 113 serving as a positive A-plate. The optically anisotropic body obtained was subjected to alignment evaluation, retardation ratio, leveling property evaluation, and offset evaluation in the same manner as in Example 59.

Example 114

An optically anisotropic body in Example 114 serving as a positive A-plate was obtained under the same conditions as in Example 113 except that the polymerizable composition used was changed to the polymerizable composition (56) of the present invention. The optically anisotropic body obtained was subjected to alignment evaluation, retardation ratio, leveling property evaluation, and offset evaluation in the same manner as in Example 59. The results obtained are shown in the following table.

TABLE 21

| | Poly-merizable composition | Alignment evaluation | Re-tardation ratio | Leveling property evaluation | Offset evaluation |
|---|---|---|---|---|---|
| Example 101 | (43) | AA | 0.837 | AA | AA |
| Example 102 | (44) | AA | 0.812 | AA | AA |
| Example 103 | (45) | AA | 0.878 | AA | AA |
| Example 104 | (46) | AA | 0.791 | AA | AA |
| Example 105 | (47) | AA | 0.831 | AA | AA |
| Example 106 | (48) | AA | 0.829 | AA | AA |
| Example 107 | (49) | AA | 0.815 | AA | AA |
| Example 108 | (50) | AA | 0.868 | AA | AA |
| Example 109 | (51) | AA | 0.896 | AA | AA |
| Example 110 | (52) | AA | 0.910 | AA | AA |
| Example 111 | (53) | AA | 0.921 | AA | AA |
| Example 112 | (54) | AA | 0.912 | AA | AA |
| Example 113 | (55) | AA | 0.818 | AA | AA |
| Example 114 | (56) | AA | 0.854 | AA | AA |
| Comparative Example 17 | (C6) | B | 0.824 | C | B |
| Comparative Example 18 | (C7) | A | 0.822 | B | B |
| Comparative Example 19 | (C8) | A | 0.822 | B | B |
| Comparative Example 20 | (C9) | A | 0.815 | B | B |
| Comparative Example 21 | (C10) | A | 0.821 | C | C |

Example 115

5 Parts of a photo-alignment material represented by formula (12-4) below was dissolved in 95 parts of cyclopentanone to obtain a solution. The solution obtained was filtered through a 0.45 μm membrane filter to thereby obtain a photo-alignment solution (1). Next, the solution obtained was applied to a 0.7 mm-thick glass substrate by spin coating, dried at 80° C. for 2 minutes, and then irradiated with linearly polarized light of 313 nm at an intensity of 10 mW/cm$^2$ for 20 seconds to thereby obtain a photo-alignment film (1). The polymerizable composition (57) was applied to the obtained photo-alignment film by spin coating and dried at 100° C. for 2 minutes. The coating film obtained was cooled to room temperature and irradiated with UV rays at an intensity of 30 mW/cm$^2$ for 30 seconds using a high-pressure mercury lamp to thereby obtain an optically anisotropic body in Example 115 serving as a positive A-plate. The optically anisotropic body obtained was subjected to alignment evaluation, retardation ratio, leveling property evaluation, and offset evaluation in the same manner as in Example 59. The results of the alignment evaluation showed that no defects were found at all by visual inspection and that no defects were found at all by polarizing microscope observation. The retardation of the optically anisotropic body obtained was measured using the RETS-100 (manufactured by Otsuka Electronics Co., Ltd.). The in-plane retardation (Re(550)) at a wavelength of 550 nm was 125 nm, and the retardation film obtained had high uniformity.

Example 116

5 Parts of a photo-alignment material represented by formula (12-9) below was dissolved in 95 parts of N-methyl-2-pyrrolidone, and the solution obtained was filtered through a 0.45 μm membrane filter to thereby obtain a photo-alignment solution (2). Next, the solution obtained was applied to a 0.7 mm-thick glass substrate by spin coating, dried at 100° C. for 5 minutes, further dried at 130° C. for 10 minutes, and then irradiated with linearly polarized light of 313 nm at an intensity of 10 mW/cm$^2$ for 1 minute to thereby obtain a photo-alignment film (2). The polymerizable composition (57) was applied to the obtained photo-alignment film by spin coating and dried at 100° C. for 2 minutes. The coating film obtained was cooled to room temperature and irradiated with UV rays at an intensity of 30 mW/cm$^2$ for 30 seconds using a high-pressure mercury lamp to thereby obtain an optically anisotropic body in Example 116 serving as a positive A-plate. The optically anisotropic body obtained was subjected to alignment evaluation, retardation ratio, leveling property evaluation, and offset evaluation in the same manner as in Example 59. The results of the alignment evaluation showed that no defects were found at all by visual inspection and that no defects were found at all by polarizing microscope observation. The retardation of the optically anisotropic body obtained was measured using the RETS-100 (manufactured by Otsuka Electronics Co., Ltd.). The in-plane retardation (Re(550)) at a wavelength of 550 nm was 120 nm, and the retardation film obtained had high uniformity.

[Chem. 192]

(12-4)

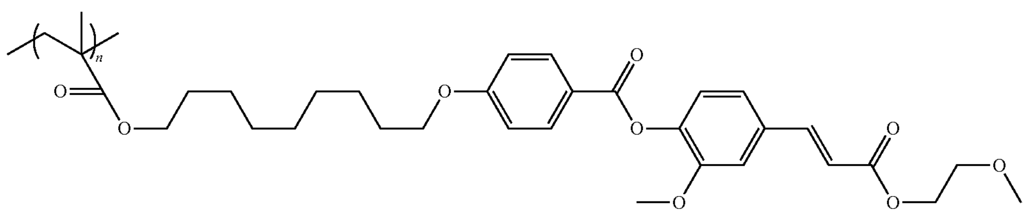

(12-9)

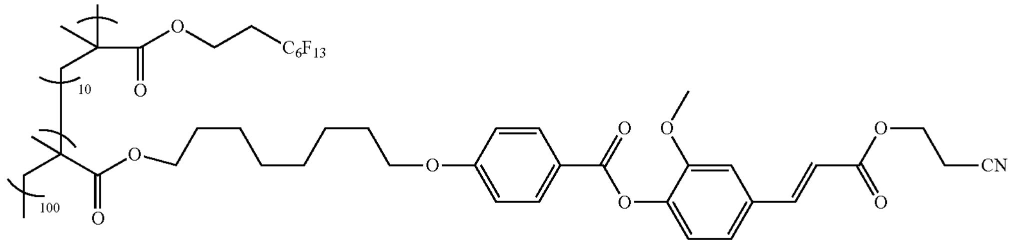

(12-8)

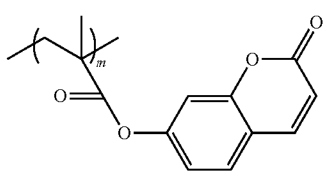

Example 117

1 Part of a photo-alignment material represented by formula (12-8) above was dissolved in 50 parts of (2-ethoxyethoxy) ethanol and 49 parts of 2-butoxyethanol, and the solution obtained was filtered through a 0.45 μm membrane filter to thereby obtain a photo-alignment solution (3). Next, the solution obtained was applied to an 80 μm-thick polymethyl methacrylate (PMMA) film by bar coating, dried at 80° C. for 2 minutes, and irradiated with linearly polarized light of 365 nm at an intensity of 10 mW/cm$^2$ for 50 seconds to thereby obtain a photo-alignment film (3). The polymerizable composition (57) was applied to the obtained photo-alignment film by spin coating and dried at 100° C. for 2 minutes. The coating film obtained was cooled to room temperature and irradiated with UV rays at an intensity of 30 $mW/cm^2$ for 30 seconds using a high-pressure mercury lamp to thereby obtain an optically anisotropic body in Example 117 serving as a positive A-plate. The optically anisotropic body obtained was subjected to alignment evaluation, retardation ratio, leveling property evaluation, and offset evaluation in the same manner as in Example 59. The results of the alignment evaluation showed that no defects were found at all by visual inspection and that no defects were found at all by polarizing microscope observation. The retardation of the optically anisotropic body obtained was measured using the RETS-100 (manufactured by Otsuka Electronics Co., Ltd.). The in-plane retardation (Re(550)) at a wavelength of 550 nm was 137 nm, and the retardation film obtained had high uniformity.

Comparative Examples 22 to 24

An optically anisotropic body in Comparative Example 22 serving as a positive A-plate was obtained under the same conditions as in Example 115 except that the polymerizable composition (C11) for comparison was used. An optically anisotropic body in Comparative Example 23 serving as a positive A-plate was obtained under the same conditions as in Example 116 except that the polymerizable composition (C11) for comparison was used. An optically anisotropic body in Comparative Example 24 serving as a positive A-plate was obtained under the same conditions as in Example 117 except that the polymerizable composition (C11) for comparison was used. The optically anisotropic bodies obtained were subjected to alignment evaluation, retardation ratio, leveling property evaluation, and offset evaluation in the same manner as in Example 59. The results of the alignment evaluation showed that no defects were found at all by visual inspection and that no defects were found at all by polarizing microscope observation. The retardation films obtained had high uniformity. The degree of cissing of each of the obtained optically anisotropic bodies (22) to (24) for comparison was visually inspected under crossed Nicols, and a small number of cissing defects were found on the surfaces of the coating films. For each of the obtained optically anisotropic bodies (22) to (24) for comparison, whether or not the surfactant in the polymerizable composition was offset was visually checked, and slight offset was observed.

Example 118

A 180 μm-thick PET film was subjected to rubbing treatment using a commercial rubbing device, and the polymerizable composition (58) of the present invention was applied by bar coating and dried at 80° C. for 2 minutes. The coating film obtained was cooled to room temperature and irradiated with UV rays at a conveying speed of 5 m/min using a UV conveyer device (manufactured by GS Yuasa Corporation) with a lamp power of 2 kW to thereby obtain an optically anisotropic body serving as a positive A-plate. The optically anisotropic body obtained was subjected to alignment evaluation, retardation ratio, leveling property evaluation, and offset evaluation in the same manner as in Example 59.

The retardation Re(550) of the optically anisotropic body obtained was 137 nm, and the ratio of the in-plane retardation (Re(450)) at a wavelength of 450 nm to Re(550), i.e., Re(450)/Re(550), was 0.872. The retardation film obtained had high uniformity. The degree of cissing in the optically anisotropic body (106) obtained was checked visually under crossed Nicols. No cissing defects were observed at all on the surface of the coating film.

Next, a 75 μm-thick polyvinyl alcohol film with an average polymerization degree of about 2,400 and a saponification degree of 99.9 mol % or more was uniaxially stretched by a factor of about 5.5 under dry conditions. While the stretched state was maintained, the film was immersed in pure water at 60° C. for 60 seconds and then immersed in an aqueous solution with an iodine/potassium iodide/water ratio of 0.05/5/100 by weight at 28° C. for 20 seconds. The resulting film was immersed in an aqueous solution with a potassium iodide/boric acid/water ratio of 8.5/8.5/100 by weight at 72° C. for 300 seconds. Then the resulting film was washed with pure water at 26° C. for 20 seconds and dried at 65° C. to thereby obtain a polarizing film in which iodine was adsorbed and aligned on the polyvinyl alcohol resin.

Saponified triacetylcellulose films (KC8UX2MW manufactured by Konica Minolta Opto Products Co., Ltd.) were applied to opposite surfaces of the thus-obtained polarizer through a polyvinyl alcohol-based adhesive prepared using 3 parts of carboxyl group-modified polyvinyl alcohol [KURARAY POVAL KL318 manufactured by KURARAY Co., Ltd.] and 1.5 parts of water-soluble polyamide epoxy resin [Sumirez Resin 650 (an aqueous solution with a solid content of 30%) manufactured by Sumika Chemtex Co., Ltd.] to protect the opposite surfaces, and a polarizing film was thereby produced.

The polarizing film obtained and the retardation film were laminated through an adhesive such that the angle between the polarizing axis of the polarizing film and the slow axis of the retardation film was 45° to thereby obtain an antireflective film of the present invention. The antireflective film obtained and an aluminum plate used as an alternative to an organic light-emitting element were laminated through an adhesive, and reflective visibility from the aluminum plate was visually checked from the front and at an oblique angle of 45°. No reflection from the aluminum plate was observed. The results obtained are shown in the following table.

TABLE 22

| | Polymerizable composition | Alignment evaluation | Retardation ratio | Leveling property evaluation | Offset evaluation |
|---|---|---|---|---|---|
| Example 115 | (57) | AA | 0.876 | AA | AA |
| Example 116 | (57) | AA | 0.864 | AA | AA |
| Example 117 | (57) | AA | 0.863 | AA | AA |
| Example 118 | (58) | AA | 0.872 | AA | AA |
| Comparative Example 22 | (C11) | B | 0.878 | B | B |
| Comparative Example 23 | (C11) | B | 0.872 | B | B |
| Comparative Example 24 | (C11) | B | 0.871 | B | B |

Examples 119 to 137

Polymerizable compositions (59) to (77) in Examples 119 to 137 were obtained under the same conditions as in the preparation of the polymerizable composition (1) in Example 1 except that ratios of compounds shown in tables below were changed as shown in the tables below. Specific compositions of the polymerizable compositions (59) to (77) of the present invention are shown in the following tables.

TABLE 23

| | Polymerizable composition | | | | | |
|---|---|---|---|---|---|---|
| | (59) | (60) | (61) | (62) | (63) | (64) |
| 1-a-5 | | | 25 | | 40 | |
| 1-a-6 | 20 | 20 | 25 | 40 | | |
| 1-a-93 | 40 | 40 | | | | |
| 1-a-100 | | | | | | 40 |
| 2-a-1 (n = 6) | | | 50 | 50 | 50 | |
| 2-a-1 (n = 3) | | | | | 10 | 20 |
| 2-a-11 | | | | | | 40 |
| 2-a-53 | | 20 | | | | |
| 2-a-57 | 40 | 20 | | | | |
| 2-b-19 (m = n = 6) | | | | 10 | | |
| Irg 907 | 6 | 6 | 6 | 6 | 6 | 6 |
| MEHQ | 0.1 | 0.1 | 0.1 | 0.1 | 0.1 | 0.1 |
| H-2 | 0.15 | 0.15 | 0.05 | 0.05 | 0.05 | 0.15 |
| TOL | 400 | 400 | 400 | 400 | 400 | 400 |

TABLE 24

| | Polymerizable composition | | | | | |
|---|---|---|---|---|---|---|
| | (65) | (66) | (67) | (68) | (69) | (70) |
| 1-a-93 | 50 | | | | | |
| 1-a-101 | | 20 | | | | |
| 1-a-105 | | 10 | | | | |
| 2-a-11 | 50 | | | | | |
| 2-a-55 | | 50 | | | | |
| 2-a-56 | | 20 | | | | |
| 2-a-58 | | | | 50 | | |
| 2-a-59 | | | | | 85 | 50 |
| 2-a-60 | | | 100 | 50 | 15 | 50 |
| Irg 907 | 6 | 6 | 6 | 6 | 6 | 6 |
| MEHQ | 0.1 | 0.1 | 0.1 | 0.1 | 0.1 | 0.1 |
| H-2 | 0.05 | 0.15 | 0.15 | 0.15 | 0.15 | 0.15 |
| CPN | | 400 | | | | |
| TOL | 400 | | 400 | 400 | 400 | 400 |

TABLE 25

| | Polymerizable composition | | | | | | |
|---|---|---|---|---|---|---|---|
| | (71) | (72) | (73) | (74) | (75) | (76) | (77) |
| 1-a-102 | | 20 | | | 50 | 25 | 50 |
| 1-a-103 | | | 20 | | | 25 | |
| 1-a-104 | | | | 20 | | | |
| 2-a-59 | 50 | 50 | 50 | 50 | | | 50 |
| 2-a-60 | | 30 | 30 | 30 | 50 | 50 | |
| 2-a-61 | 50 | | | | | | |
| Irg 907 | 6 | 6 | 6 | 6 | 6 | 6 | 6 |
| MEHQ | 0.1 | 0.1 | 0.1 | 0.1 | 0.1 | 0.1 | 0.1 |
| H-2 | 0.15 | 0.15 | 0.15 | 0.15 | 0.15 | 0.15 | 0.05 |
| TOL | 400 | 400 | 400 | 400 | 400 | 400 | 400 |

(Solubility Evaluation)

The solubility in each of Examples 119 to 137 was evaluated as follows.

A: After preparation, the clear and uniform state can be visually observed.

B: The clear and uniform state can be visually observed after heating and stirring, but precipitates of compounds are found when the mixture is returned to room temperature.

C: Compounds cannot be uniformly dissolved even after heating and stirring.

(Storage Stability Evaluation)

For each of Examples 119 to 137, the state after the polymerizable composition was left to stand at room temperature for 1 week was visually checked. The storage stability was evaluated as follows.

A: The clear and uniform state is maintained even after the polymerizable composition is left to stand at room temperature for 3 days.

B: The clear and uniform state is maintained even after the polymerizable composition is left to stand at room temperature for 1 day.

C: Precipitates of compounds are found after the polymerizable composition is left to stand at room temperature for 1 hour.

The results obtained are shown in the following table.

TABLE 26

| | Polymerizable composition | Solubility | Storage stability |
|---|---|---|---|
| Example 119 | (59) | A | A |
| Example 120 | (60) | A | A |
| Example 121 | (61) | A | A |
| Example 122 | (62) | A | A |
| Example 123 | (63) | A | A |
| Example 124 | (64) | A | A |
| Example 125 | (65) | A | A |
| Example 126 | (66) | A | A |
| Example 127 | (67) | A | A |
| Example 128 | (68) | A | A |
| Example 129 | (69) | A | A |
| Example 130 | (70) | A | A |
| Example 131 | (71) | A | A |
| Example 132 | (72) | A | A |
| Example 133 | (73) | A | A |
| Example 134 | (74) | A | A |
| Example 135 | (75) | A | A |
| Example 136 | (76) | A | A |
| Example 137 | (77) | A | A |

Examples 138 to 151

Optically anisotropic bodies in Examples 138 to 151 each serving as a positive A-plate were obtained under the same conditions as in Example 101 except that the polymerizable composition used was changed to one of the polymerizable compositions (119) to (120), (124), and (126) to (136) of the present invention. The optically anisotropic bodies obtained were subjected to alignment evaluation, retardation ratio, leveling property evaluation, and offset evaluation in the same manner as in Example 59. The results obtained are shown in the following table.

TABLE 27

| | Poly-merizable composition | Alignment evaluation | Re-tardation ratio | Leveling property evaluation | Offset evaluation |
|---|---|---|---|---|---|
| Example 138 | (119) | AA | 0.856 | AA | AA |
| Example 139 | (120) | AA | 0.843 | AA | AA |
| Example 140 | (124) | AA | 0.843 | AA | AA |
| Example 141 | (126) | AA | 0.846 | AA | AA |
| Example 142 | (127) | AA | 0.831 | AA | AA |
| Example 143 | (128) | AA | 0.855 | AA | AA |
| Example 144 | (129) | AA | 0.822 | AA | AA |
| Example 145 | (130) | AA | 0.830 | AA | AA |
| Example 146 | (131) | AA | 0.818 | AA | AA |
| Example 147 | (132) | AA | 0.827 | AA | AA |
| Example 148 | (133) | AA | 0.842 | AA | AA |
| Example 149 | (134) | AA | 0.854 | AA | AA |
| Example 150 | (135) | AA | 0.870 | AA | AA |
| Example 151 | (136) | AA | 0.865 | AA | AA |

Examples 152 to 155

One of the polymerizable compositions (121) to (123) and (137) of the present invention was applied by bar coating to a film prepared by stacking a silane coupling agent-based vertical alignment film on a COP film substrate and then dried at 100° C. for 2 minutes. The coating films obtained were cooled to room temperature and irradiated with UV rays at a conveying speed of 6 m/min using a UV conveyer device (manufactured by GS Yuasa Corporation) to thereby obtain optically anisotropic bodies in Examples 152 to 155 each serving as a positive C-plate. The optically anisotropic bodies obtained were subjected to alignment evaluation, retardation ratio, leveling property evaluation, and offset property evaluation in the same manner as in Example 59. The results obtained are shown in the following table.

TABLE 28

| | Poly-merizable composition | Alignment evaluation | Re-tardation ratio | Leveling property evaluation | Offset evaluation |
|---|---|---|---|---|---|
| Example 152 | (121) | AA | 0.861 | AA | AA |
| Example 153 | (122) | AA | 0.878 | AA | AA |
| Example 154 | (123) | AA | 0.874 | AA | AA |
| Example 155 | (137) | AA | 0.872 | AA | AA |

Examples 156 to 157

A uniaxially stretched 50 μm-thick PET film was subjected to rubbing treatment using a commercial rubbing device, and one of the polymerizable compositions (125) and (137) of the present invention was applied by bar coating to the PET film and dried at 100° C. for 2 minutes. The coating films obtained were cooled to room temperature and irradiated with UV rays at a conveying speed of 6 m/min using a UV conveyer device (manufactured by GS Yuasa Corporation) to thereby obtain optically anisotropic bodies in Examples 156 to 157 each serving as a positive 0-plate. The optically anisotropic bodies obtained were subjected to alignment evaluation, retardation ratio, leveling property evaluation, and offset property evaluation in the same manner as in Example 59. The results obtained are shown in the following table.

TABLE 29

| | Poly-merizable composition | Alignment evaluation | Re-tardation ratio | Leveling property evaluation | Offset evaluation |
|---|---|---|---|---|---|
| Example 156 | (125) | AA | 0.826 | AA | AA |
| Example 157 | (137) | AA | 0.854 | AA | AA |

The polymerizable compositions of the present invention using the surfactants represented by formula (H-1) to formula (H-8) (Examples 1 to 58 and Examples 138 to 157) were excellent in solubility and storage stability. In the optically anisotropic bodies formed from the polymerizable compositions (1) to (77) (Examples 59 to 118 and Examples 138 to 157), the results of all the leveling property evaluation, offset evaluation, and alignment evaluation were good, and the productivity of these optically anisotropic bodies was good. In particular, in the polymerizable compositions using the fluorosurfactants having a specific polyoxyalkylene skeleton and having a specific molecular weight, the results of the alignment evaluation, leveling property evaluation, and offset evaluation were very good. As can be seen from the results in Comparative Examples 1 to 24, when the fluorosurfactants having no polyoxyalkylene skeleton and having a molecular weight outside the specific range were used, the results of any of the alignment evaluation, leveling property evaluation, and offset evaluation were poor. These results were poorer than those in the polymerizable compositions of the present invention.

The invention claimed is:

1. A method for producing a polymer product;
providing a polymerizable composition; and
polymerizing the polymerizable composition, wherein the polymerizable composition comprising:

a) a polymerizable compound having one polymerizable group or two or more polymerizable groups and satisfying formula (I)

$$Re(450\ nm)/Re(550\ nm)<1.0 \quad (I)$$

(wherein Re(450 nm) is an in-plane retardation at a wavelength of 450 nm when the polymerizable compound having one polymerizable group is aligned on a substrate such that the direction of long axes of molecules of the polymerizable compound is horizontal to the substrate, and Re(550 nm) is an in-plane retardation at a wavelength of 550 nm when the polymerizable compound having one polymerizable group is aligned on the substrate such that the direction of the long axes of the molecules of the polymerizable compound is horizontal to the substrate); and b) at least one fluorosurfactant selected from the group consisting of copolymers (III) having a weight average molecular weight of 2,500 to 30,000 and each obtained by copolymerizing essential monomers including a polymerizable monomer containing a fluorine atom and a polymerizable monomer represented by general formula (B), having a solubility parameter (SP value) of 8.9 to 10.5 $(cal/cm^3)^{0.5}$, and satisfying the following formula (1A):

$$1.00<100\times(s+t+u)/MB<2.10 \quad (1A)$$

(wherein s is an integer of 1 or more; t and u are each an integer of 0 or 1 or more; and MB is the molecular weight of the polymerizable monomer represented by general formula (B)):

(B)

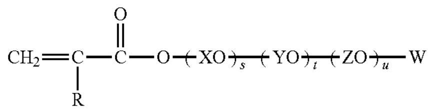

(wherein R is a hydrogen atom or a methyl group; X, Y, and Z are each independently an alkylene group; s is an integer of 1 or more; t and u are each an integer of 0 or 1 or more; and W is a hydrogen atom, an alkyl group having 1 to 6 carbon atoms, or an aryl group).

2. The method according to claim 1, wherein the polymer product is an optically anisotropic body.

3. The method according to claim 1, wherein the polymer product is a retardation film.

4. The method according to claim 1, further comprising using the polymer product as an optically anisotropic body to obtain a display device.

5. The method according to claim 1, further comprising using the polymer product as an optically anisotropic body to obtain a light-emitting device.

6. The method according to claim 1, further comprising using the polymer product to obtain a light-emitting diode lighting device.

7. The method according to claim 1, further comprising using the polymer product to obtain a lens sheet.

8. The method according to claim 1, wherein the polymerizable composition further comprises a dichroic pigment.

9. The method according to claim 1, further comprising using the polymer product to obtain a polarizing film.

10. The method according to claim 1, further comprising using the polymer product as a retardation film to obtain a display device.

11. The method according to claim 1, further comprising using the polymer product as a retardation film to obtain a a light-emitting device.

* * * * *